United States Patent
Kwon et al.

(10) Patent No.: US 10,856,021 B2
(45) Date of Patent: Dec. 1, 2020

(54) BROADCAST SIGNAL TRANSMISSION APPARATUS, BROADCAST SIGNAL RECEPTION APPARATUS, BROADCAST SIGNAL TRANSMISSION METHOD, AND BROADCAST SIGNAL RECEPTION METHOD

(71) Applicant: LG ELECTRONICS INC., Seoul (KR)

(72) Inventors: Woosuk Kwon, Seoul (KR); Minsung Kwak, Seoul (KR); Kyoungsoo Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/554,192

(22) PCT Filed: Feb. 29, 2016

(86) PCT No.: PCT/KR2016/002024
§ 371 (c)(1),
(2) Date: Aug. 28, 2017

(87) PCT Pub. No.: WO2016/144031
PCT Pub. Date: Sep. 15, 2016

(65) Prior Publication Data
US 2018/0041782 A1 Feb. 8, 2018

Related U.S. Application Data

(60) Provisional application No. 62/131,818, filed on Mar. 11, 2015, provisional application No. 62/135,696, filed on Mar. 19, 2015.

(51) Int. Cl.
| H04L 29/06 | (2006.01) |
| H04L 29/08 | (2006.01) |
| H04N 21/235 | (2011.01) |
| H04N 21/236 | (2011.01) |
| H04N 21/2381 | (2011.01) |

(Continued)

(52) U.S. Cl.
CPC .......... *H04N 21/235* (2013.01); *H04L 12/18* (2013.01); *H04L 12/184* (2013.01); *H04L 69/04* (2013.01);
(Continued)

(58) Field of Classification Search
CPC ...... H04N 21/235; H04N 21/23; H04N 21/20; H04N 21/00; H04N 21/64322;
(Continued)

(56) References Cited

U.S. PATENT DOCUMENTS 8,250,619 B2 * 8/2012 Song ................ H04N 21/23614
725/118
2004/0264433 A1 12/2004 Melpignano
(Continued)

FOREIGN PATENT DOCUMENTS

CN 101442521 A 5/2009
KR 10-2013-0120422 A 11/2013
(Continued)

*Primary Examiner* — Jeffrey M Rutkowski
*Assistant Examiner* — Luna Weissberger
(74) *Attorney, Agent, or Firm* — Dentons US LLP

(57) ABSTRACT

The present invention suggests a method for transmitting a broadcast signal. The method for transmitting a broadcast signal according to the present invention suggests a system capable of supporting a next-generation broadcast service in an environment that supports a next-generation hybrid broadcast using a terrestrial broadcasting network and an Internet network. In addition, suggested is an efficient signaling scheme which is capable of encompassing both a terrestrial broadcasting network and an Internet network in an environment that supports a next-generation hybrid broadcast.

16 Claims, 94 Drawing Sheets

(51) Int. Cl.
*H04N 21/61* (2011.01)
*H04L 12/18* (2006.01)
*H04N 21/643* (2011.01)
*H04L 12/741* (2013.01)

(52) U.S. Cl.
CPC ............ *H04L 69/22* (2013.01); *H04L 69/324* (2013.01); *H04N 21/236* (2013.01); *H04N 21/2353* (2013.01); *H04N 21/2381* (2013.01); *H04N 21/6112* (2013.01); *H04N 21/64322* (2013.01); *H04L 45/74* (2013.01)

(58) Field of Classification Search
CPC ........ H04H 20/28; H04H 20/20; H04L 45/47; H04L 49/39; H04L 49/3009
USPC ......................................................... 370/392
See application file for complete search history.

(56) References Cited

U.S. PATENT DOCUMENTS

| | | | |
|---|---|---|---|
| 2008/0025312 A1* | 1/2008 | Kuppuswamy | ....... H04W 28/06 370/392 |
| 2009/0013356 A1 | 1/2009 | Doerr et al. | |
| 2009/0082048 A1* | 3/2009 | Song | ..................... H04L 12/189 455/518 |
| 2012/0113993 A1 | 5/2012 | Sridhar et al. | |
| 2012/0307842 A1 | 12/2012 | Petrov et al. | |
| 2012/0324513 A1 | 12/2012 | Hwang et al. | |
| 2012/0327955 A1 | 12/2012 | Herrmann et al. | |
| 2013/0219431 A1* | 8/2013 | Hong | ..................... H04H 20/42 725/54 |
| 2013/0279380 A1* | 10/2013 | Hong | ..................... H04H 20/72 370/310 |
| 2013/0286895 A1 | 10/2013 | Mittapalli et al. | |
| 2014/0314103 A1 | 10/2014 | Michael | |
| 2014/0380135 A1* | 12/2014 | Hong | ..................... H04H 20/42 714/776 |
| 2015/0230129 A1 | 8/2015 | Abdulla et al. | |
| 2018/0367502 A1 | 12/2018 | Kwon et al. | |

FOREIGN PATENT DOCUMENTS

| | | |
|---|---|---|
| KR | 10-2013-0127990 A | 11/2013 |
| KR | 1020140005227 A | 1/2014 |
| WO | 2014/209057 A1 | 12/2014 |
| WO | 2015/005715 A1 | 1/2015 |

\* cited by examiner

FIG. 2

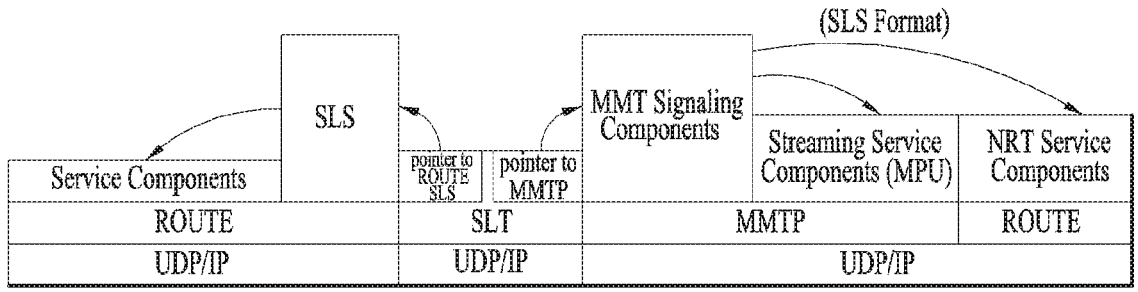

FIG. 3

| Element or Attribute Name | Use |
|---|---|
| SLT | |
| @bsid | 1 |
| @sltSectionVersion | 1 |
| @sltSectionNumber | 0..1 |
| @totalSltSectionNumbers | 0..1 |
| @language | 0..1 |
| @capabilities | 0..1 |
| InetSigLoc | 0..1 |
| Service | 1..N |
|     @serviceId | 1 |
|     @SLT serviceSeqNumber | 1 |
|     @protected | 0..1 |
|     @majorChannelNo | 1 |
|     @minorChannelNo | 1 |
|     @serviceCategory | 1 |
|     @shortServiceName | 1 |
|     @hidden | 0..1 |
|     @slsProtocolType | 1 |
|     BroadcastSignaling | 0..1 |
|     @slsPlpId | 0..1 |
|     @slsDestinationIpAddress | 0..1 |
|     @slsDestinationUdpPort | 0..1 |
|     @slsSourceIpAddress | 0..1 |
|     @slsMajorProtocolVersion | 0..1 |
|     @SlsMinorProtocolVersion | 0..1 |
|     @serviceLanguage | 0..1 |
|     @broadbandAccessRequired | 0..1 |
|     @capabilities | 0..1 |
|     InetSigLoc | 0..1 |

FIG. 5

| Element or Attribute Name | | | | Use |
|---|---|---|---|---|
| bundleDescription | | | | |
| | userServiceDescription | | | |
| | | @serviceId | | M |
| | | @atsc: serviceId | | M |
| | | @atsc: serviceStatus | | OD |
| | | @atsc: fullMPDUri | | M |
| | | @atsc: sTSIDUri | | M |
| | | name | | 0..N |
| | | | lang | CM |
| | | serviceLanguage | | 0...N |
| | | atsc: capabilityCode | | 0..1 |
| | | deliveryMethod | | 1..N |
| | | | r12: broadcastAppService | 1..N |
| | | | | basePattern | 1..N |
| | | | r12: unicastAppService | 0..N |
| | | | | basePattern | 1..N |

FIG. 6

| Element and Attribute Names | | | Use |
|---|---|---|---|
| S - TSID | | | |
| | @serviceId | | O |
| | RS | | 1..N |
| | | @bsid | OD |
| | | @sIpAddr | OD |
| | | @dIpAddr | OD |
| | | @dport | OD |
| | | @PLPID | OD |
| | | LS | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

FIG. 7

| Element or Attribute Name | | | | | | Use |
|---|---|---|---|---|---|---|
| bundleDescription | | | | | | |
| | userServiceDescription | | | | | |
| | | @serviceId | | | | M |
| | | @atsc: serviceId | | | | M |
| | | Name | | | | 0..N |
| | | | Lang | | | CM |
| | | serviceLanguage | | | | 0..N |
| | | atsc: capabilityCode | | | | 0..1 |
| | | atsc: Channel | | | | 1 |
| | | | @atsc: majorChannelNo | | | M |
| | | | @atsc: minorChannelNo | | | M |
| | | | @atsc: serviceLang | | | O |
| | | | @atsc: serviceGenre | | | O |
| | | | @atsc: serviceIcon | | | M |
| | | | atsc: ServiceDescription | | | 0..N |
| | | | | @atsc: serviceDescrText | | M |
| | | | | @atsc: serviceDescrLang | | O |
| | | atsc:mpuComponent | | | | 0..1 |
| | | | @atsc: mmtPackageId | | | M |
| | | | @atsc: next MmtPackageId | | | O |
| | | atsc: routeComponent | | | | 0..1 |
| | | | @atsc: sTSIDUri | | | M |
| | | | @slsPlpId | | | OD |
| | | | @slsDestinationIpAddress | | | OD |
| | | | @slsDestinationUdpPort | | | M |
| | | | @slsSourceIpAddress | | | M |
| | | | @slsMajorProtocolVersion | | | OD |
| | | | @SlsMinorProtocolVersion | | | OD |
| | | atsc: broadbandComponent | | | | 0..1 |
| | | | @atsc: fullfMPDUri | | | M |
| | | atsc: ComponentInfo | | | | 1..N |
| | | | @atsc: component Type | | | M |
| | | | @atsc: component Role | | | M |
| | | | @atsc: component ProtectedFlag | | | OD |
| | | | @atsc: component Id | | | M |
| | | | @atsc: component Name | | | O |

FIG. 13
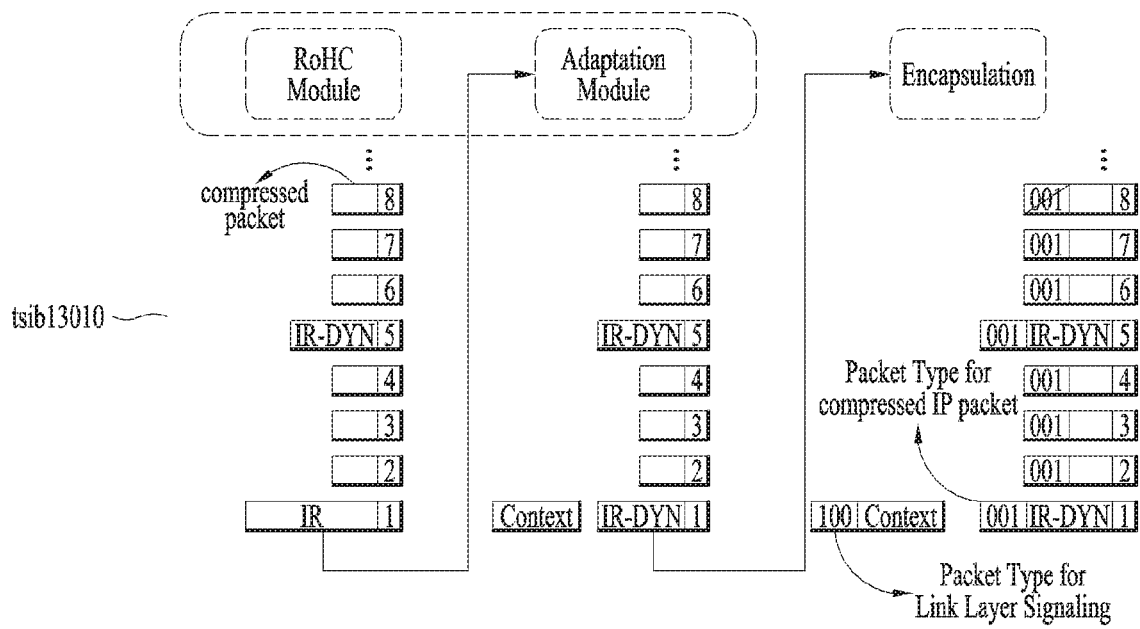
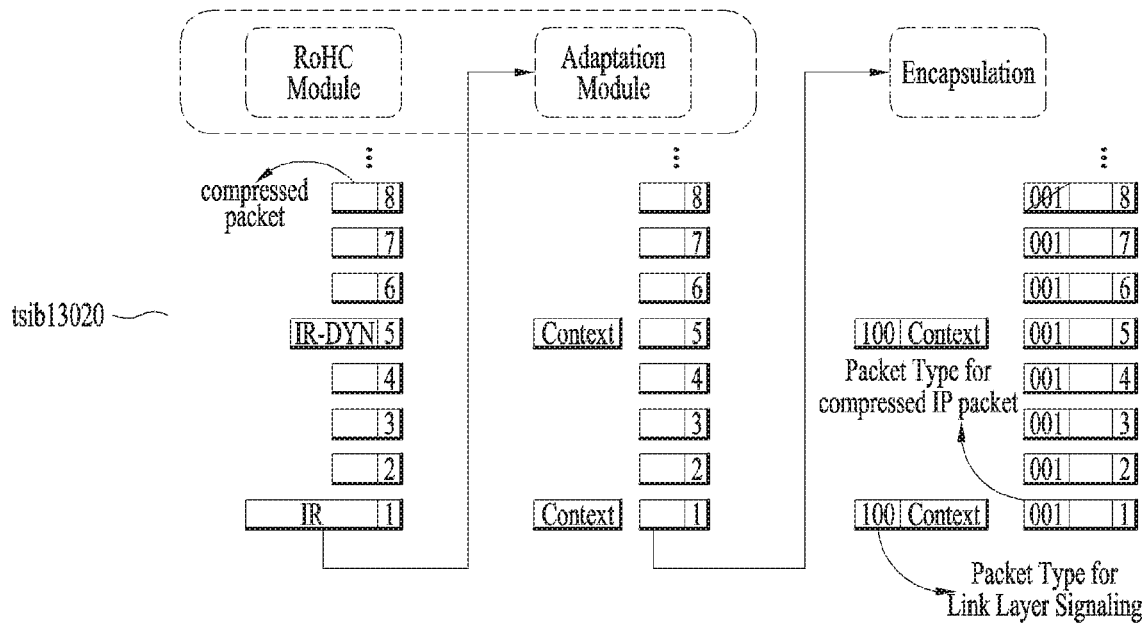

FIG. 14

| Syntax | Number of bits | Mnemonic |
|---|---|---|
| Link_Mapping_Table() { | | |
|   signaling_type | 8 | "0x01" |
|   PLP_ID | 6 | uimsbf |
|   Reserved | 2 | |
|   num_session | 8 | uimsbf |
|   for(i = 0; i < num_session; i++) { | | |
|     src_IP_add | 32 | uimsbf |
|     dst_IP_add | 32 | uimsbf |
|     src_UDP_port | 16 | uimsbf |
|     dst_UDP_port | 16 | uimsbf |
|     SID_flag | 1 | bslbf |
|     compressed_flag | 1 | bslbf |
|     reserved | 6 | '000000' |
|     if(SID_flag == "1") { | | |
|       SID | 8 | uimsbf |
|     } | | |
|     if(compressed_flag == "1") { | | |
|       context_id | 8 | uimsbf |
|     } | | |
|   } | | |
| } | | | tsib14010

| Syntax | Number of bits | Mnemonic |
|---|---|---|
| ROHC-U_description_table { | | |
|   signaling_type | 8 | "0x02" |
|   PLP_ID | 6 | uimsbf |
|   adaptation_mode | 2 | uimsbf |
|   context_config | 2 | bslbf |
|   reserved | 6 | bslbf |
|   context_id | 8 | uimsbf |
|   context_profile | 8 | uimsbf |
|   if (context_config == 0x01) { | | |
|     context_length | 8 | uimsbf |
|     static_chain_byte () | var | |
|   } | | |
|   else if (context_config == 0X02) { | | |
|     context_length | 8 | uimsbf |
|     dynamic_chain_byte () | var | |
|   } | | |
|   else if(context_config = 0x03) { | | |
|     context_length | 8 | uimsbf |
|     static_chain_byte () | var | uimsbf |
|     dynamic_chain_byte () | var | uimsbf |
|   } | | |
| } | | | tsib14020

FIG. 30

| Transport Mode | Static Chain | Dynamic Chain | General Header Compressed Packet | Associated Configuration Mode |
|---|---|---|---|---|
| Mode 1 | Signaling | Signaling | Normal Data Pipe | Mode 1, Mode 2 |
| Mode 2 | Signaling | Base Data Pipe | | |
| Mode 3 | Base Data Pipe | Base Data Pipe | | |
| Mode 4 | Signaling | Normal Data Pipe (IR-DYN packet) | | Mode 3 |
| Mode 5 | Base Data Pipe | | | |

FIG. 31

| Syntax | No. of Bits | Format |
|---|---|---|
| ROHC_static_descriptor( ) { | | |
|     descriptor_tag | 8 | uimsbf |
|     descriptor_length | 8 | uimsbf |
|     context_id | 8 or 16 | |
|     context_profile | 8 | uimsbf |
|     static_chain_length | 8 | uimsbf |
|     static_chain ( ) | var | bslbf |
| } | | |

FIG. 32
| Syntax | No. of Bits | Format |
|---|---|---|
| ROHC_dynamic_descriptor( ) { | | |
| descriptor_tag | 8 | uimsbf |
| descriptor_length | 8 | uimsbf |
| context_id | 8 or 16 | |
| context_profile | 8 | uimsbf |
| dynamic_chain_length | 8 | uimsbf |
| dynamic_chain ( ) | var | bslbf |
| } | | |
FIG. 33
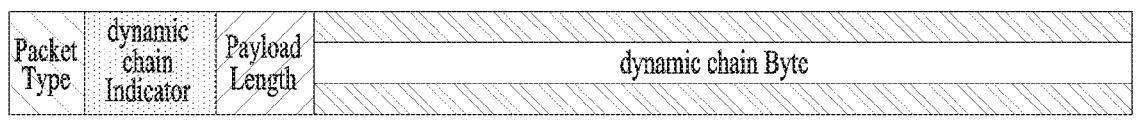

FIG. 34

| Syntax | No. of Bits | Format |
|---|---|---|
| ROHC_init_descriptor( ) { | | |
| descriptor_tag | 8 | uimsbf |
| descriptor_length | 8 | uimsbf |
| context_id | 8 or 16 | |
| context_profile | 8 | uimsbf |
| max_cid | 8 | uimsbf |
| large_cid | 8 | bslbf |
| } | | |

FIG. 35

| Syntax | No. of bits | Format |
|---|---|---|
| Fast_Information_Chunk (){ | | |
|     FIT_data_version | 8 | uimsbf |
|     num_broadcast | 8 | uimsbf |
|     for( i=0 ; i<num_broadcast ; i++ ){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for( j=0 ; j< num_service ; j++ ){ | | |
|             service_id | 16 | uimsbf |
|             service_category | 6 | uimsbf |
|             service_hidden_flag | 1 | bslbf |
|             SP_indicator | 1 | bslbf |
|             RoHC_init_descriptor( ) | var | |
|         } | | |
|     } | | |
| } | | |

FIG. 36

| Syntax | No. of bits | Format |
|---|---|---|
| Fast_Information_Chunk(){ | | |
|     FIT_data_version | 8 | uimsbf |
|     num_broadcast | 8 | uimsbf |
|     for(i=0 ; i<num_broadcast ; i++){ | | |
|       broadcast_id | 16 | uimsbf |
|       delivery_system_id | 16 | uimsbf |
|       base_PLP_id | 8 | uimsbf |
|       base_PLP_version | 5 | uimsbf |
|       reserved | 3 | '111' |
|       num_service | 8 | uimsbf |
|       for(j=0 ; j< num_service ; j++){ | | |
|         service_id | 16 | uimsbf |
|         service_category | 6 | uimsbf |
|         service_hidden_flag | 1 | bslbf |
|         SP_indicator | 1 | bslbf |
|         context_id | 8 or 16 | |
|         context_profile | 8 | uimsbf |
|         max_cid | 8 | uimsbf |
|         large_cid | 8 | bslbf |
|       } | | |
|     } | | |
| } | | |

FIG. 37

| Syntax | No. of bits | Format |
|---|---|---|
| Fast_Information_Chunk (){ | | |
|     FIT_data_version | 8 | uimsbf |
|     num_broadcast | 8 | uimsbf |
|     for( i=0 ; i<num_broadcast ; i++ ){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for( j=0 ; j< num_service ; j++ ){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for( k=0 ; k<num_component ; k++ ){ | | |
|                 component_id | 8 | bslbf |
|                 PLP_id | 8 | bslbf |
|                 RoHC_init_descriptor() | var | |
|             } | | |
|         } | | |
|     } | | |
| } | | |

FIG. 38

| Syntax | No. of bits | Format |
|---|---|---|
| Fast_Information_Chunk(){ | | |
|   FIT_data_version | 8 | uimsbf |
|   num_broadcast | 8 | uimsbf |
|   for( i=0 ; i<num_broadcast ; i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for( j=0 ; j< num_service ; j++){ | | |
|       service_id | 16 | uimsbf |
|       service_category | 6 | uimsbf |
|       service_hidden_flag | 1 | bslbf |
|       SP_indicator | 1 | bslbf |
|       num_component | 8 | uimsbf |
|       for( k=0 ; k<num_component ; k++){ | | |
|         component_id | 8 | bslbf |
|         PLP_id | 8 | bslbf |
|         context_id | 8 or 16 | |
|         context_profile | 8 | uimsbf |
|         max_cid | 8 | uimsbf |
|         large_cid | 8 | bslbf |
|       } | | |
|     } | | |
|   } | | |
| } | | |

FIG. 40

| Signaling Class | Description |
|---|---|
| 000 | Signaling for Channel Scan and Service Acquisition |
| 001 | Signaling for Emergency Alert |
| 010 | Signaling for Header Compression |
| 011 | Reserved |
| 100 | Reserved |
| 101 | Reserved |
| 110 | Reserved |
| 111 | Various |

FIG. 41

| Information Type for Header Compression | Description |
|---|---|
| 000 | Initialization Information |
| 001 | Configuration Parameters |
| 010 | Static Chain |
| 011 | Dynamic Chain |
| 100 | Reserved |
| 101 | Reserved |
| 110 | Reserved |
| 111 | Reserved |

FIG. 42

| Syntax | No. Bits | Format |
|---|---|---|
| Payload_for_Initialization() { | | |
|     num_RoHC_channels | 8 | uimsbf |
|     for(i=0;i<num_DP;i++) { | | |
|         RoHC_channel_id | 8 | uimsbf |
|         max_cid | 16 | uimbf |
|         large_cids | 1 | bslbf |
|         reserved | 3 | '111' |
|         num_profiles | 4 | uimsbf |
|         for(j=0;j<num_profiles;j++) { | | |
|             profiles() | var | uimsbf |
|         } | | |
|         num_IP_stream | 8 | uimsbf |
|         for(k=for(k=0;k<num_IP_stream;k++) { | | |
|             IP_address() | var | uimsbf |
|         } | | |
|     } | | |
| } | | |

FIG. 43

| Syntax | No. Bits | Format |
|---|---|---|
| Payload_for_ROHC_configuration() { | | |
|     RoHC_channel_id | 8 | uimsbf |
|     num_context | 8 | uimsbf |
|     for(i=0;i<num_DP;i++) { | | |
|         context_id | 8 or 16 | uimsbf |
|         context_profile | 8 | uimsbf |
|         packet_configuration_mode | 4 | uimsbf |
|         context_transmission_mode | 4 | uimsbf |
|     } | | |
| } | | |

FIG. 44

| Syntax | No. Bits | Format |
|---|---|---|
| Payload_for_static_chain() { | | |
|     context_id | 8 or 16 | uimsbf |
|     context_profile | 8 | uimsbf |
|     static_chain_length | 8 | uimsbf |
|     static_chain () | var | bslbf |
|     dynamic_chain_incl | 1 | uimsbf |
|     reserved | 7 | '111' |
|     if( dynamic_chain_incl == 0x01) { | | |
|         dynamic_chain_length | 8 | uimsbf |
|         dynamic_chain () | var | bslbf |
|     } | | |
| } | | |

FIG. 45

| Syntax | No. Bits | Format |
|---|---|---|
| Payload_for_dynamic_chain() { | | |
|     context_id | 8 or 16 | |
|     context_profile | 8 | uimsbf |
|     dynamic_chain_length | 8 | uimsbf |
|     dynamic_chain () | var | bslbf |
| } | | |

FIG. 56

| Link Layer Organization Type | Logical Data Path | | |
|---|---|---|---|
| | Normal Data Path | Base Data Pipe | Dedicated Channel |
| Organization Type 1 | O | X | X |
| Organization Type 2 | O | O | X |
| Organization Type 3 | O | X | O |
| Organization Type 4 | O | O | O |

FIG. 62

| Syntax | No. Bits | Format |
|---|---|---|
| Fast_Information_Table(){ | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension | 16 | uimsbf |
|     reserved | 2 | '11' |
|     FIT_data_version | 5 | uimsbf |
|     current_next_indicator | 1 | bslbf |
|     section_number | 8 | uimsbf |
|     last_section_number | 8 | uimsbf |
|     number_broadcast | 8 | uimsbf |
|     for(i=0;i<num_brdadcast;i++){ | | |
|         broadcast_id | 16 | uimsbf |
|         delivery_system_id | 16 | uimsbf |
|         base_DP_id | 8 | uimsbf |
|         base_DP_version | 5 | uimsbf |
|         reserved | 3 | '111' |
|         num_service | 8 | uimsbf |
|         for(i=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0;k<num_component;k++){ | | |
|                 component_id | 8 | bslbf |
|                 DP_id | 8 | bslbf |
|                 RoHC_init_descriptor(){ | | |
|                     context_id | 8 or 16 | |
|                     context_profile | 8 | uimsbf |
|                     max_cid | 8 | uimsbf |
|                     large_cid | 8 | bslbf |
|                 } | | |
|             } | | |
|         } | | |
|     } | | |
| } | | |

FIG. 63

| Synrax | No. Bits | Format |
|---|---|---|
| Emergency_Alert_Table () { | | |
|     table_id | 8 | uimsbf |
|     section_synax-indicator | 1 | '0' |
|     private_indicator | 1 | '1' |
|     reserved | 2 | '11' |
|     secion_length | 12 | uimsbf |
|     table_id_extension { | | |
|         EAT_protocol_version | 8 | 0X0 |
|         reserved | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     automatic_thing_flag | 1 | bslbf |
|     num_EAS_messages | 7 | uimsbf |
|     IF(automatic_tuning_flag==0X01) { | | |
|         automatic_tuning_channel_number | 8 | uimsbf |
|         automatic_tuning_DP_id | 8 | uimsbf |
|         automatic_tuning_service_id | 16 | uimsbf |
|     } | | |
|     for (m=0; m<num_EAS_messages; m++) { | | |
|         EAS_message_id | 32 | uimsbf |
|         EAS_IP_version_flag | 1 | bslbf |
|         EAS_message_transfer_type | 3 | uimsbf |
|         EAS_message_encoding_type | 3 | uimsbf |
|         EAS_NRT_flag | 1 | bslbf |
|         if(EAS_message_transfer_type==0X02) { | | |
|             reserved | 4 | '1111' |
|             EAS_message_length/*N*/ | 12 | uimsbf |
|             EAS_message_bytes() | 8*N | var |
|         } | | |
|         else if (EAS_message_transfer_type==0X003) { | | |
|             IP_address | 32 or 128 | uimsbf |
|             UDP_port_num | 16 | uimsbf |
|             DP_id | 8 | uimsbf |
|         } | | |
|         if(EAS_NRT_flag==0X01){ | | |
|             EAS_NRT_service_id | 16 | uimsbf |
|         } | | |
|     } | | |
| } | | |

FIG. 67

| Syntax | Bits | Format |
|---|---|---|
| FIC_payload(){ | | |
|     FIC_protocol_version | 8 | |
|     transport_stream_id | 16 | |
|     num_partitions | 8 | |
|     for (i= 0 ; i<num_partitions ; i++) { | | |
|         partition_id | 8 | uimsbf |
|         partition_protocol_version | 8 | uimsbf |
|         num_services | 8 | uimsbf |
|         for (j= 0 ; j<num_services ;j++) { | | |
|             service_id | 8 | uimsbf |
|             service_data_version | 8 | uimsbf |
|             service_channel_number | 8 | uimsbf |
|             service_category | 8 | uimsbf |
|             service_status | 3 | uimsbf |
|             service_distribution | 2 | uimsbf |
|             sp_indicator | 1 | bslbf |
|             IP_version_flag | 1 | bslbf |
|             SSC_source_IP_address_flag | 1 | bslbf |
|             if( SSC_source_IP_address_flag) | | |
|                 SSC_source_IP_address | 32 or 128 | uimsbf |
|             SSC_destination_IP_address | 32 or 128 | uimsbf |
|             SSC_destination_UDP_port | 16 | uimsbf |
|             SSC_TSI | 16 | uimsbf |
|             SSC_DP_ID | 8 | uimsbf |
|         } | | |
|         num_partition_level_descriptors | 8 | uimsbf |
|         for (k= 0 ; k< num_partition_level_descriptors ; k++ | | |
|             partition_level_descriptor( ) | var | |
|     } | | |
|     num_FIC_level_descriptors | 8 | uimsbf |
|     for (n= 0 ; n<num_FIC_level_descriptors ; n++) | | |
|         FIC_level_descriptor() | var | |
| } | | |

FIG. 68
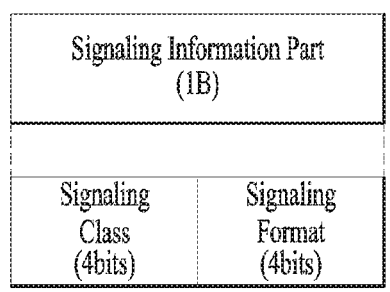
(a)
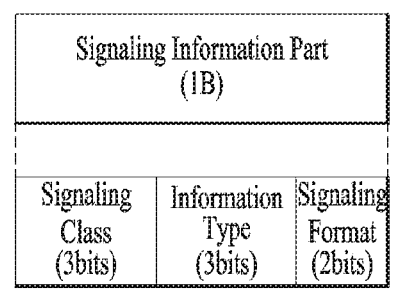
(b)

FIG. 70

| Flag | | Operation | | PHY Input Format |
|---|---|---|---|---|
| HCF | EF | Header Compression | Encapsulation | |
| 1 | 1 | Enable | Enable | Link Layer Packet with Compressed IP payload |
| 1 | 0 | Enable | Disable | Not used |
| 0 | 1 | Disable | Enable | Link Layer Packet with IP payload |
| 0 | 0 | Disable | Disable | IP Packet direct input |

FIG. 71

| Syntax | No. Bits | Format |
|---|---|---|
| Link_Layer_mode_control_descriptor() { | | |
|     descriptor_tag | 8 | uimsbf |
|     descriptor_length | 8 | uimsbf |
|     num_DP | 8 | uimsbf |
|     for(i=0;i<num_dp;i++) { | | |
|         DP_id | 8 | uimsbf |
|         HCF | 1 | bslbf |
|         EF | 1 | bslbf |
|         reserved | 6 | uimsbf |
|     } | | |
| } | | |

FIG. 74

| Index | Field value | Encapsulation Mode |
|---|---|---|
| 0 | 00 | None (Bypass) |
| 1 | 01 | Encapsulation 1 (Default) |
| 2 | 10 | Encapsulation 2 |
| 3 | 11 | Encapsulation 3 |

FIG. 75

| Index | Field value | Header Compression Mode |
|---|---|---|
| 0 | 000 | None (No Compression) |
| 1 | 001 | RoHC (default) |
| 2 | 010 | Header Compression 2 |
| 3 | 011 | Header Compression 3 |
| 4 | 100 | Reserved |
| 5 | 101 | Reserved |
| 6 | 110 | Reserved |
| 7 | 111 | Reserved |

FIG. 76

| Index | Field value | Packet Reconfiguration Mode |
|---|---|---|
| 0 | 00 | None (No Reconfiguration) |
| 1 | 01 | Reconfiguration 1 (default) |
| 2 | 10 | Reconfiguration 2 |
| 3 | 11 | Reconfiguration 3 |

FIG. 77

| Index | Field value | Context Transmission Mode |
|---|---|---|
| 0 | 000 | Transmission Mode 1 |
| 1 | 001 | Transmission Mode 2 |
| 2 | 010 | Transmission Mode 3 |
| 3 | 011 | Transmission Mode 4 |
| 4 | 100 | Transmission Mode 5 |
| 5 | 101 | Reserved |
| 6 | 110 | Reserved |
| 7 | 111 | Reserved |

FIG. 78

| Syntax | No. Bits | Format |
|---|---|---|
| RoHC_Initialization_in_link( ){ | | |
|     link_id | 8 | uimsbf |
|     max_cid | 16 | uimbf |
|     large_cids | 1 | bslbf |
|     reserved | 3 | 111 |
|     num_profiles | 4 | uimsbf |
|     for(j= 0;j<num_profiles ; j++) { | | |
|         profiles( ) | 8 | uimsbf |
|     } | | |
|     num_IP_stream | 8 | uimsbf |
|     for(k= 0;k<num_IP_stream ; k++) | | |
|     { | | |
|         IP_address() | 32 | uimsbf |
|     } | | |
| } | | |

FIG. 79

| Index | Field value | Signaling path | Priority |
|---|---|---|---|
| 0 | 000 | None (No signaling path) | - |
| 1 | 001 | Dedicated Data Pipe | 1 |
| 2 | 010 | Specific signaling channel (FIC) | 2 |
| 3 | 011 | Specific signaling channel (EAC) | 3 |
| 4 | 100 | Reserved | 4 |
| 5 | 101 | Reserved | 5 |
| 6 | 110 | Reserved | 6 |
| 7 | 111 | Reserved | 7 |

FIG. 80

| Bit position | Field value | Signaling path mapping |
|---|---|---|
| b0 (MSB) | | Dedicated Data Pipe |
| b1 | 0 : disable | Specific signaling channel (FIC) |
| b2 | 1 : enable | Specific signaling channel (EAC) |
| b3(LSB) | | Specific signaling channel (other) |

FIG. 83

| Syntax | No. Bits | Format |
|---|---|---|
| Link_Layer_Initialization_descriptor( ) { | | |
|     descriptor_tag | 8 | uimsbf |
|     descriptor_length | 8 | uimsbf |
|     num_link | 8 | uimsbf |
|     for(i= 0 ;i<num_link ; i++) { | | |
|         link_id | 8 | uimsbf |
|         encapsulation_mode | 2 | bslbf |
|         if (encapsulation_mode==0) { | | |
|             reserved | 6 | bslbf |
|         } | | |
|         else { | | |
|             header_compression_mode | 3 | bslbf |
|             if (header_compression_mode ==0) { | | |
|                 reserved | 3 | |
|             } | | |
|             else { | | |
|                 packet_reconfiguration_mode | 2 | |
|                 context_transmission_mode | 3 | bslbf |
|                 reserved | 1 | bslbf |
|                 max_cid | 16 | uimbf |
|                 large_cids | 1 | bslbf |
|                 num_profiles | 4 | uimsbf |
|                 for(j= 0 ;j<num_profiles ; j++) { | | |
|                     profiles( ) | | |
|                 } | 8 | uimsbf |
|             } | | |
|         } | | |
|     } | | |
| } | | |

FIG. 84

| Syntax | No. Bits | Format |
|---|---|---|
| Link_Layer_Initialization_descriptor( ) { | | |
|     descriptor_tag | 8 | uimsbf |
|     descriptor_length | 8 | uimsbf |
|     num_link | 8 | uimsbf |
|     for(i=0;i<num_link;i++){ | | |
|         link_id | 8 | uimsbf |
|         encapsulation_mode | 2 | bslbf |
|         if (encapsulation_mode ==0) { | | |
|             reserved | 6 | bslbf |
|         } | | |
|         else { | | |
|             header_compression_mode | 3 | bslbf |
|             if (header_compression_mode ==0) { | | |
|                 reserved | 3 | |
|             } | | |
|             else { | | |
|                 packet_reconfiguration_mode | 2 | bslbf |
|                 context_transmission_mode | 3 | bslbf |
|                 reserved | 6 | bslbf |
|             } | | |
|         } | | |
|     } | | |
| } | | |

FIG. 85

| Syntax | No. Bits | Format |
|---|---|---|
| Link_Layer_Initialization_descriptor() { | | |
|     descriptor_tag | 8 | uimsbf |
|     descriptor_length | 8 | uimsbf |
|     num_link | 8 | uimsbf |
|     signaling_path_configuration | 4 | bslbf |
|     reserved | 4 | bslbf |
|     if (signaling_path_configuration >='1000') { | | |
|         dedicated_DP_id | 8 | uimsbf |
|     } | | |
|     for(i=0;i<num_link;i++){ | | |
|         link_id | 8 | uimsbf |
|         encapsulation_mode | 2 | bslbf |
|         if (encapsulation_mode ==0) { | | |
|             reserved | 6 | bslbf |
|         } | | |
|         else { | | |
|             header_compression_mode | 3 | bslbf |
|             if (header_compression_mode ==0) { | | |
|                 reserved | 3 | bslbf |
|             } | | |
|             else { | | |
|                 packet_reconfiguration_mode | 2 | bslbf |
|                 context_transmission_mode | 3 | bslbf |
|                 reserved | 6 | bslbf |
|             } | | |
|         } | | |
|     } | | |
| } | | |

FIG. 92

| Syntax | No.Bits | Format |
|---|---|---|
| Packet_Structure_for_Dedicated_Channel() { | | |
| length | 16 | uimsbf |
| data_version | 8 | uimsbf |
| payload_format | 4 | bslbf |
| stuffing_flag | 1 | bslbf |
| Reserved | 3 | bslbf |
| CRC | 32 | rpchof |
| payload_data_bytes() | var | |
| if (stuffing_flag == 1 ) { | | |
| stuffing_length | 8 | uimsbf |
| stuffing_bytes | var | '0' |
| } | | |
| } | | |

FIG. 93

| Syntax | No.Bits | Format |
|---|---|---|
| Dedicated_Channel_Configuration() { | | |
| num_dedicated_channel | 4 | uimsbf |
| reserved | 4 | bslbf |
| for(i= 0 ;i< num_dedicated_channel;i++){ | | |
| dedicated_channel_id | 4 | bslbf |
| operation_mode | 4 | bslbf |
| } | | |
| } | | |

FIG. 99
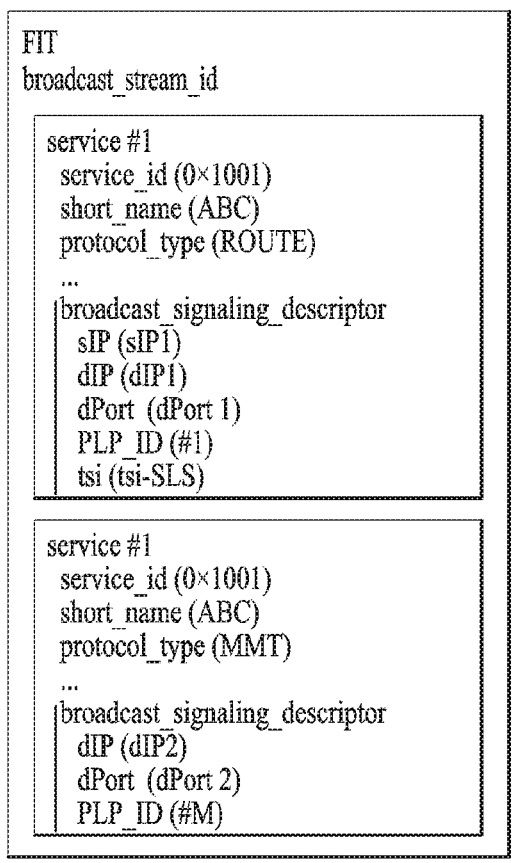
Syntax A
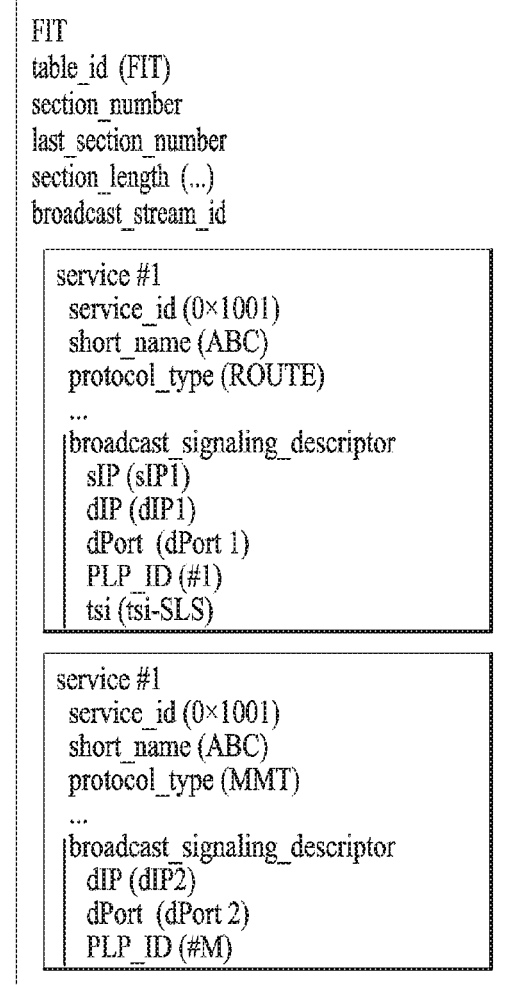
Syntax B

FIG. 101

| Syntax | No. Bits | Format |
|---|---|---|
| fast_information_table() { | | |
|   FIT_protocol_version | 8 | uimsbf |
|   broadcast_stream_id | 16 | uimsbf |
|   FIT_section_number | 4 | uimsbf |
|   total_FIT_section_number | 4 | uimsbf |
|   FIT_section_version | 4 | uimsbf |
|   FIT_section_length | 12 | uimsbf |
|   num_services | 8 | uimsbf |
|   for (i=0; i<num_services;i++) { | | |
|     service_id | 16 | uimsbf |
|     SLS_data_version | 8 | uimsbf |
|     service_category | 5 | uimsbf |
|     short_service_name_length | 3 | uimsbf |
|     for (j=0;j<short_name_length; j++) { | | |
|       short_service_name_byte_pair() | 16*m | bslbf |
|     } | | |
|     provider_id | 8 | uimsbf |
|     service_status | 3 | uimsbf |
|     sp_indicator | 1 | bslbf |
|     num_service_level_descriptors | 4 | uimsbf |
|     for (j=0;j<num_service_level_descriptors;j++){ | | |
|       service_level_descriptor() | var | |
|     } | | |
|   } | | |
|   reserved | 4 | '1111' |
|   num_FIT_level_descriptors | 4 | uimsbf |
|   for (n=0; n<num_FIT_level_descriptors; n++) { | | |
|     FIT_level_descriptor() | var | |
|   } | | |
| } | | |

FIG. 102

| service_category | Format |
|---|---|
| 0x00 | The service category is not specified by the service_category field. |
| 0x01 | A/V service |
| 0x02 | Audio service |
| 0x03 | App Based service |
| 0x04~0x07 | Reserved for future use |
| 0x08 | Service Guide – Service Guide (Announcement) |
| 0x09~0x1F | Reserved for future use |

FIG. 103

| Syntax | No. Bits | Format |
|---|---|---|
| broadcast_signaling_location_descriptor() { | | |
|     descriptor_tag | 8 | TBD |
|     descriptor_length | 8 | |
|     reserved | 6 | '111111' |
|     IP_version_flag | 1 | bslbf |
|     SLS_source_IP_address_flag | 1 | bslbf |
|     if(SLS_source_IP_address_flag) { | | |
|         SLS_source_IP_address | 32 or 128 | uimsbf |
|     } | | |
|     SLS_destination_IP_address | 32 or 128 | uimsbf |
|     SLS_destination_UDP_port | 16 | uimsbf |
|     SLS_TSI | 16 | uimsbf |
|     SLS_PLP_ID | 8 | uimsbf |
| } | | |

BROADCAST SIGNAL TRANSMISSION APPARATUS, BROADCAST SIGNAL RECEPTION APPARATUS, BROADCAST SIGNAL TRANSMISSION METHOD, AND BROADCAST SIGNAL RECEPTION METHOD

This application is a National Phase application of International Application No. PCT/KR2016/002024, filed Feb. 29, 2016, and claims the benefit of U.S. Provisional Application No. 62/131,818, filed on Mar. 11, 2015, and U.S. Provisional Application No. 62/135,696, filed on Mar. 19, 2015 all of which are hereby incorporated by reference in their entirety for all purposes as if fully set forth herein.

TECHNICAL FIELD

The present invention relates to an apparatus for transmitting a broadcast signal, an apparatus for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The present invention provides a system capable of effectively supporting future broadcast services in an environment supporting future hybrid broadcasting using terrestrial broadcast networks and the Internet and related signaling methods.

Advantageous Effects

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 illustrates a relation between an SLT and service layer signaling (SLS) according to an embodiment of the present invention;

FIG. 3 illustrates an SLT according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 13 illustrates an example of adaptation modes in IP header compression according to an embodiment of the present invention (transmitting side);

FIG. 14 illustrates a link mapping table (LMT) and an RoHC-U description table according to an embodiment of the present invention;

FIG. 30 is a view showing a combination of information that can be delivered through Out of Band according to an embodiment of the present invention;

FIG. 31 is a view showing configuration of a descriptor including a static chain according to an embodiment of the present invention;

FIG. 32 is a view showing configuration of a descriptor including a dynamic chain according to an embodiment of the present invention;

FIG. 33 is a view showing configuration of a packet format including a static chain and a packet format including a dynamic chain according to an embodiment of the present invention;

FIG. 34 is a diagram illustrating configuration of ROHC_init_descriptor( ) according to an embodiment of the present invention;

FIG. 35 is a diagram illustrating configuration of Fast_Information_Chunk( ) including ROHC_init_descriptor( ) according to an embodiment of the present invention;

FIG. 36 is a diagram illustrating configuration of Fast_Information_Chunk( ) including a parameter required for a RoHC initial procedure according to an embodiment of the present invention;

FIG. 37 is a diagram illustrating configuration of Fast_Information_Chunk( ) including ROHC_init_descriptor( ) according to another embodiment of the present invention;

FIG. 38 is a diagram illustrating configuration of Fast_Information_Chunk( ) including a parameter required for a RoHC initial procedure according to another embodiment of the present invention;

FIG. 40 is a chart that defines the signaling class field according to the present embodiment;

FIG. 41 is a chart that defines an information type;

FIG. 42 is a diagram illustrating a structure of Payload_for_Initialization( ) according to an embodiment of the present invention when an information type for header compression has a value of "000";

FIG. 43 is a diagram illustrating a structure of Payload_for_ROHC_configuration( ) when the information type for header compression has a value of "001";

FIG. 44 is a diagram illustrating a structure of Payload_for_static_chain( ) when the information type for header compression has a value of "010";

FIG. 45 is a diagram illustrating a structure of Payload_for_dynamic_chain( ) when the information type for header compression has a value of "011";

FIG. 56 is a view illustrating the definition of a link layer based on the organization type thereof according to an embodiment of the present invention;

FIG. 62 is a view illustrating the syntax of a fast information channel (FIC) according to an embodiment of the present invention;

FIG. 63 is a view illustrating the syntax of an emergency alert table (EAT) according to an embodiment of the present invention;

FIG. 67 is a view illustrating the syntax of an FIC according to another embodiment of the present invention;

FIG. 68 is a view illustrating Signaling_Information_Part( ) according to an embodiment of the present invention;

FIG. 70 is a view illustrating the operation in a link layer based on the value of a flag and the type of packet that is transmitted to a physical layer according to an embodiment of the present invention;

FIG. 71 is a view illustrating a descriptor for signaling a mode control parameter according to an embodiment of the present invention;

FIG. 74 is a view illustrating information that identifies an encapsulation mode according to an embodiment of the present invention;

FIG. 75 is a view illustrating information that identifies a header compression mode according to an embodiment of the present invention;

FIG. 76 is a view illustrating information that identifies a packet reconfiguration mode according to an embodiment of the present invention;

FIG. 77 is a view illustrating information that identifies a context transmission mode according to an embodiment of the present invention;

FIG. 78 is a view illustrating initialization information, in a case in which RoHC is applied in a header compression mode, according to an embodiment of the present invention;

FIG. 79 is a view illustrating information that identifies a link layer signaling path configuration according to an embodiment of the present invention;

FIG. 80 is a view illustrating information about signaling path configuration in a bit mapping mode according to an embodiment of the present invention;

FIG. 83 is a view illustrating a signaling format in a form for transmitting an initialization parameter according to an embodiment of the present invention;

FIG. 84 is a view illustrating a signaling format in a form for transmitting an initialization parameter according to another embodiment of the present invention;

FIG. 85 is a view illustrating a signaling format in a form for transmitting an initialization parameter according to a further embodiment of the present invention;

FIG. 92 is a diagram illustrating a format of (or a dedicated format) of data transmitted through a dedicated channel according to an embodiment of the present invention;

FIG. 93 is a diagram illustrating configuration information of a dedicated channel for signaling information about a dedicated channel according to an embodiment of the present invention;

FIG. 99 is a diagram showing the syntax of a FIT according to an embodiment of the present invention;

FIG. 101 is a diagram showing a FIT according to an embodiment of the present invention;

FIG. 102 is a diagram showing a code value for service_category information according to an embodiment of the present invention;

FIG. 103 is a diagram showing broadcast_signaling_location_descriptor( ) according to an embodiment of the present invention;

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
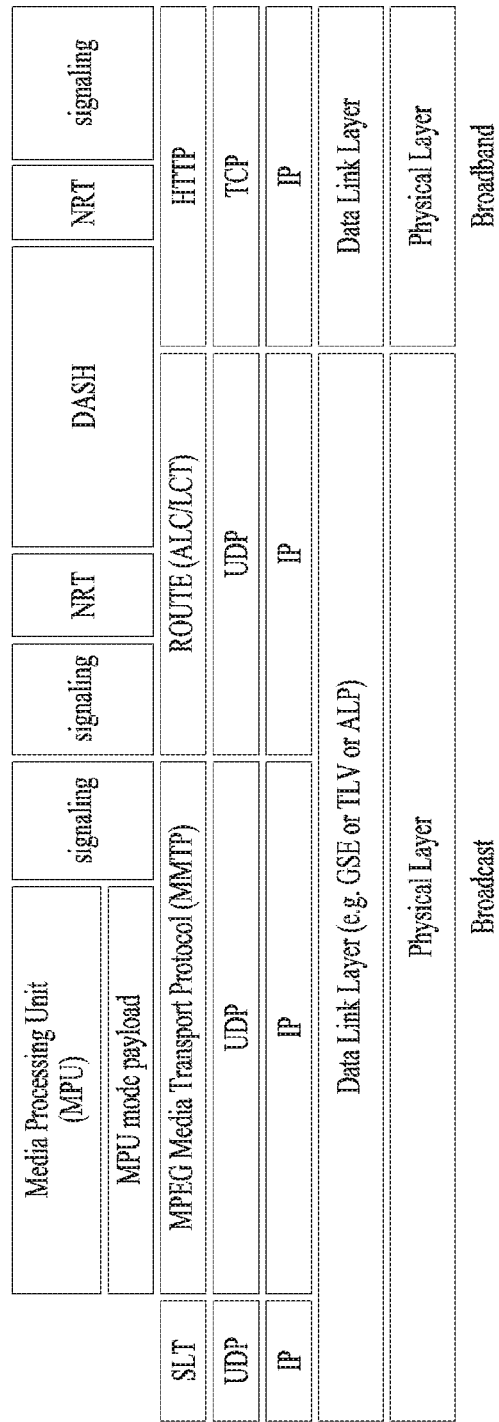
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have be a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

Figure 4:
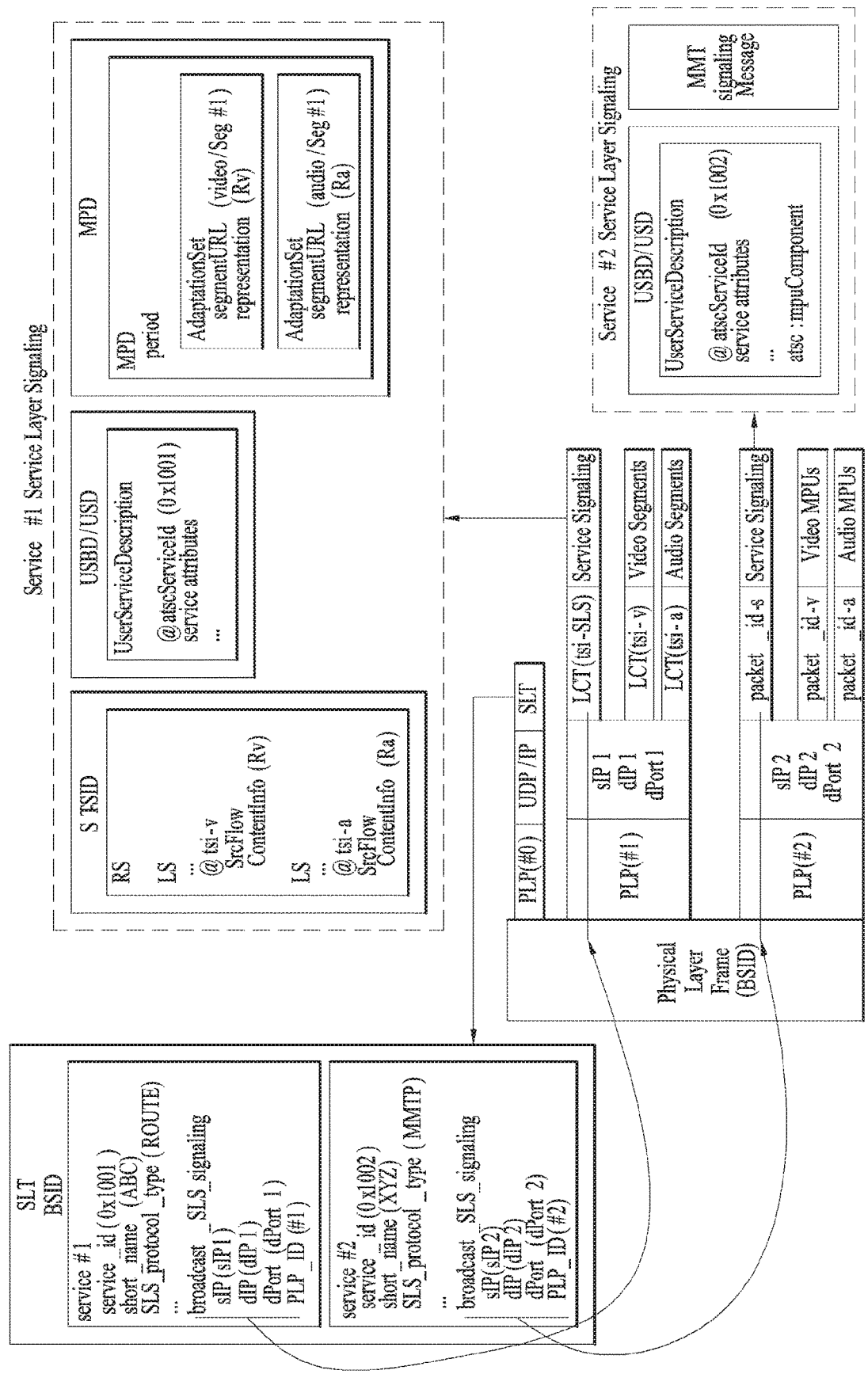
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions.

The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, an network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session (s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE.

atsc:routeComponent may include @atsc:sTSIDUri, @sTSIDPlpId, @sTSIDDestinationIpAddress, @sTSID-DestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer pipe).

@sTSIDDestinationIpAddress can be a string containing the dotted-IPv4 destination address of the packets carrying S-TSID for this service. (default: current MMTP session's source IP address)

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7–254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
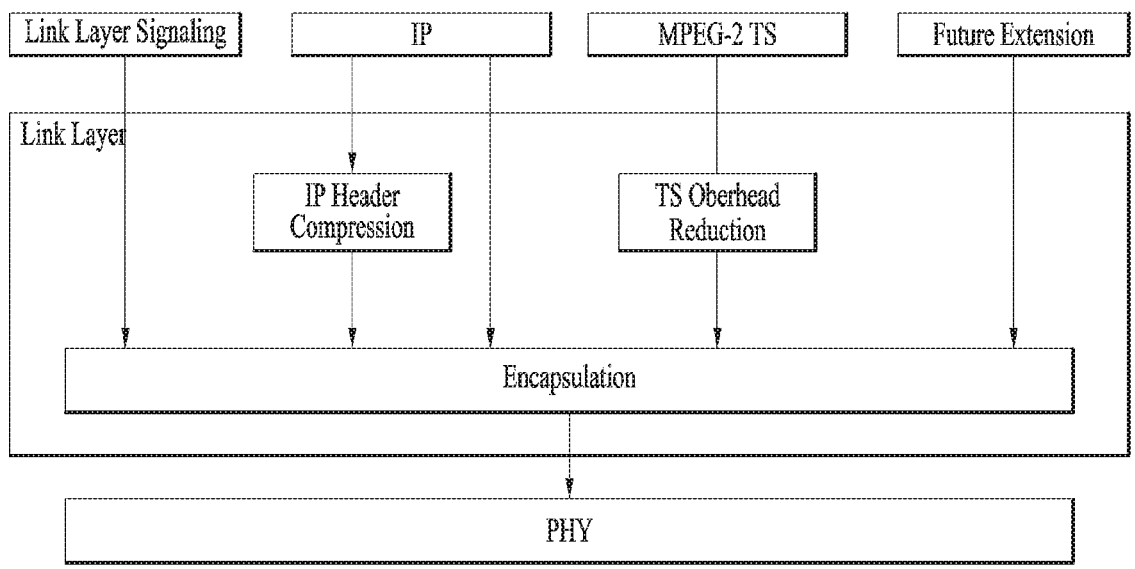
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
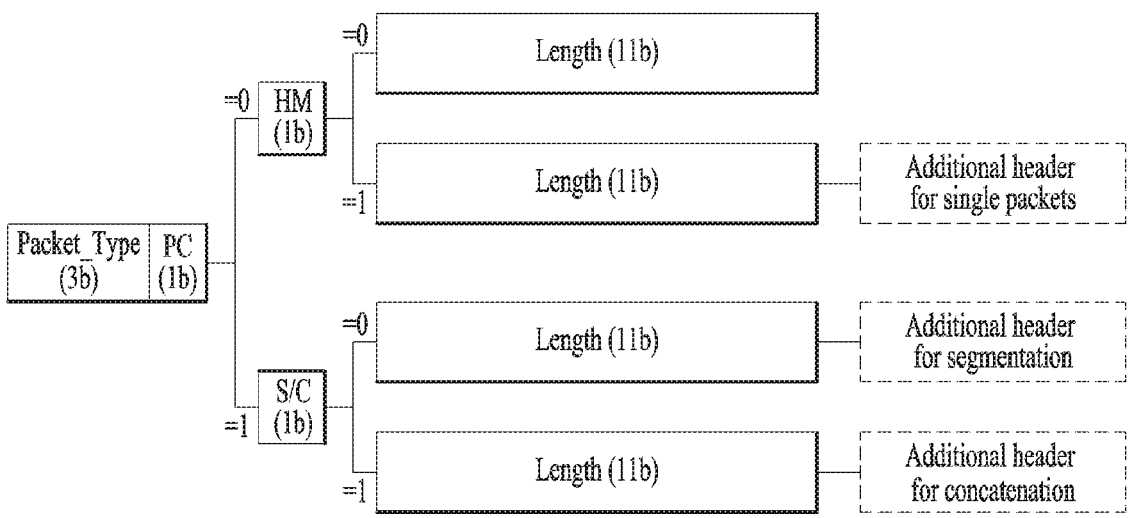
FIG. 9 illustrates a structure of a base header of a link layer packet according to an embodiment of the present invention.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010". Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be a 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

Figure 10:
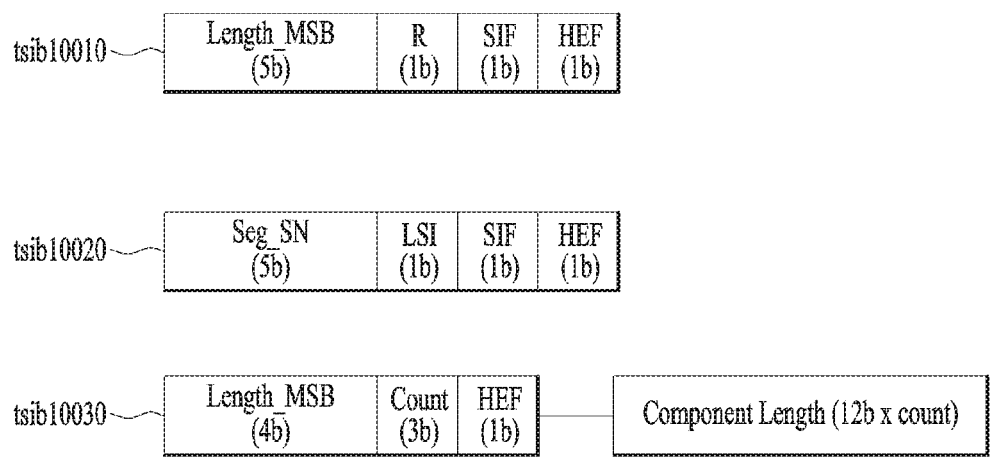
FIG. 10 illustrates a structure of an additional header of a link layer packet according to an embodiment of the present invention.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)="1". The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)="0". Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be a 8-bit field that can indicate the sub stream identifier for the link layer packet. If there is optional header extension, SID present between additional header and optional header extension.

Header_Extension ( ) can include the fields defined below.

Extension_Type can be an 8-bit field that can indicate the type of the Header_Extension ( ).

Extension_Length can be a 8-bit field that can indicate the length of the Header Extension ( ) in bytes counting from the next byte to the last byte of the Header_Extension ( ).

Extension_Byte can be a byte representing the value of the Header_Extension ( ).

Figure 11:
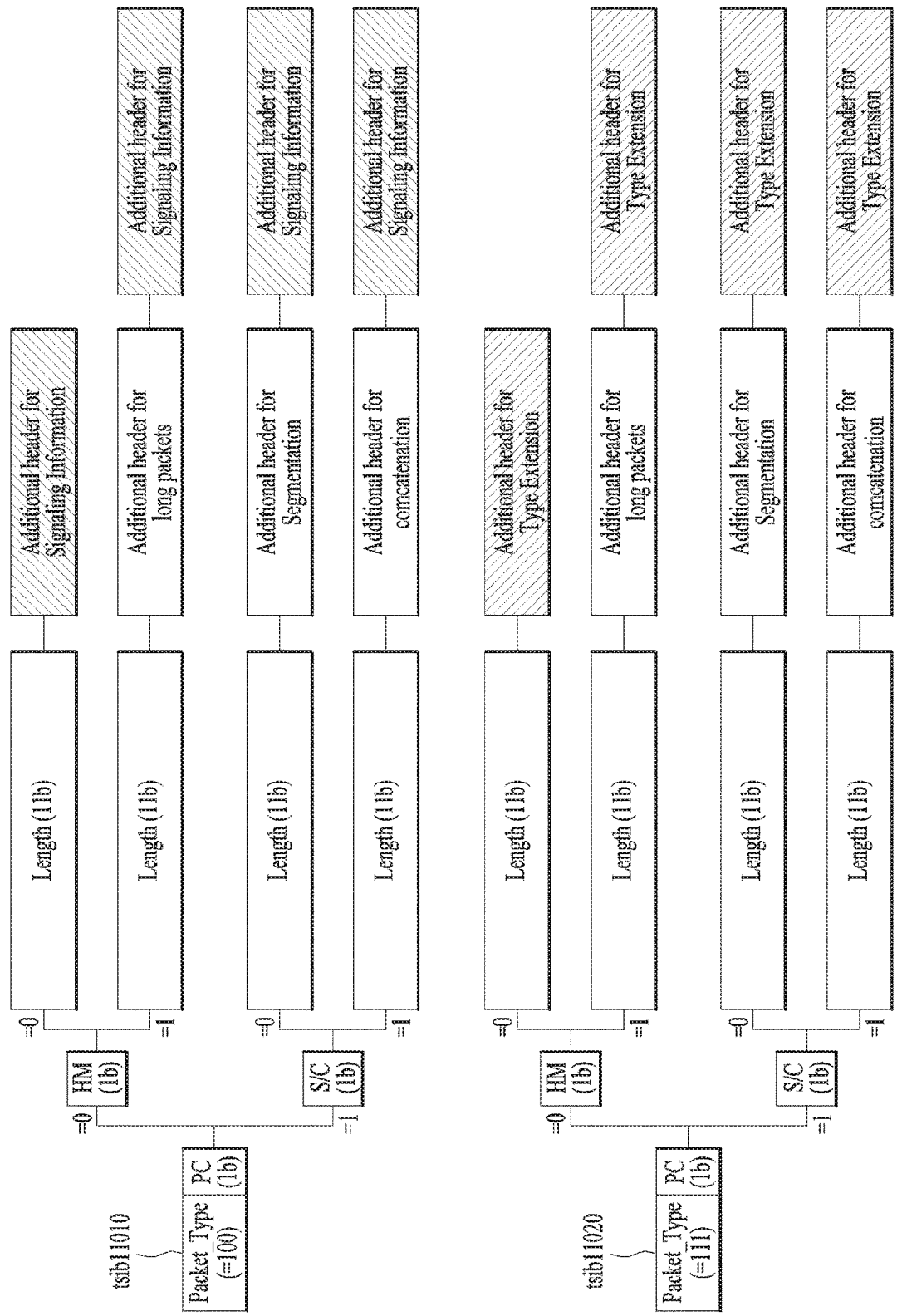
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type_Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

Figure 12:
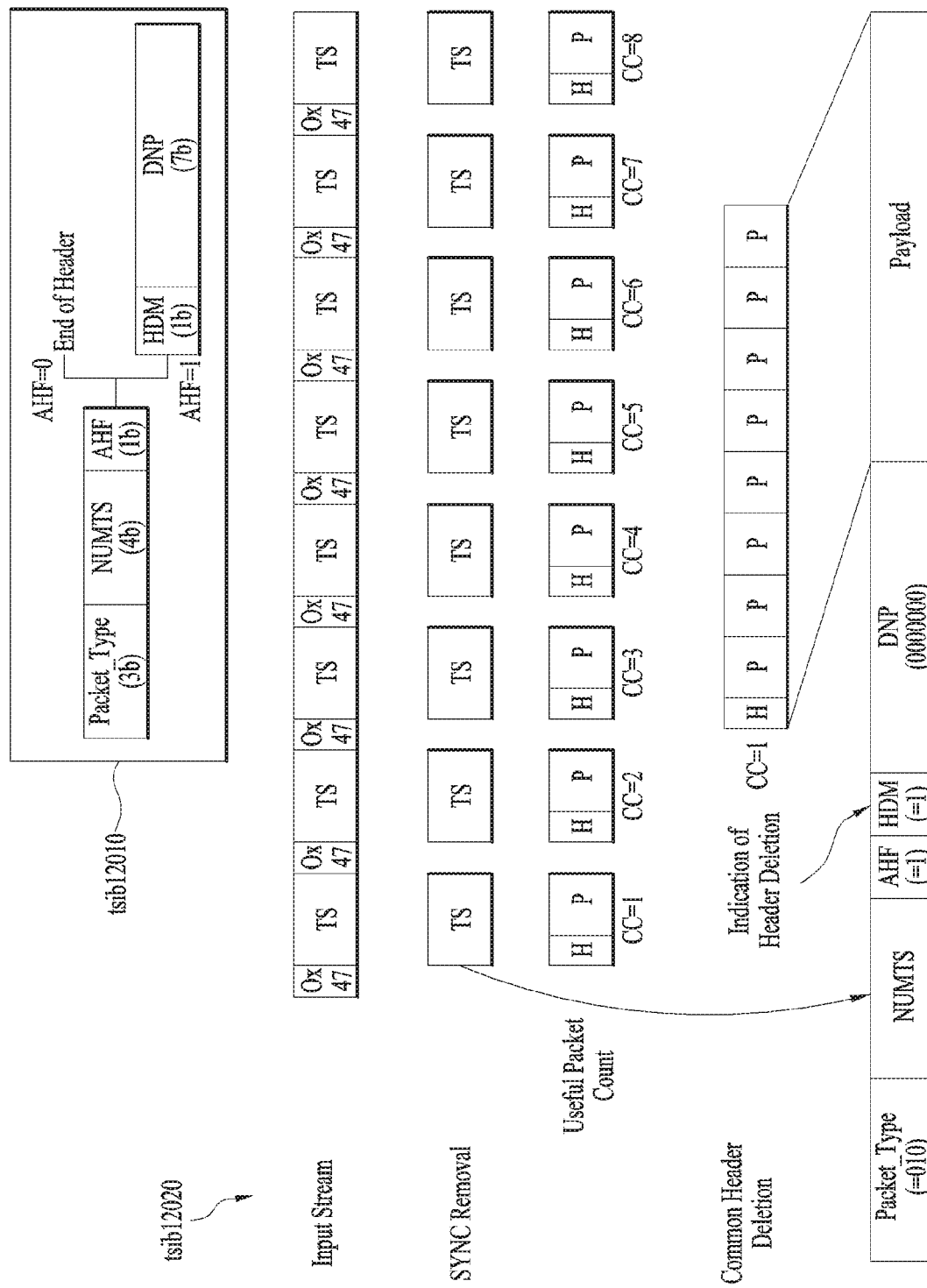
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirctional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling In Adaptation Mode 2 (tsib13010), the adaptation module can detect the IR packet from ROHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to "100".

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to "0x02".

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to "0x0". If the static_chain( ) or dynamic_chain( ) byte is included in this table, this field may be set to "0x01" or "0x02" respectively. If both of the static_chain( ) and dynamic_chain( ) byte are included in this table, this field may be set to "0x03".

context_length can be an 8-bit field that indicates the length of the static chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

Figure 15:
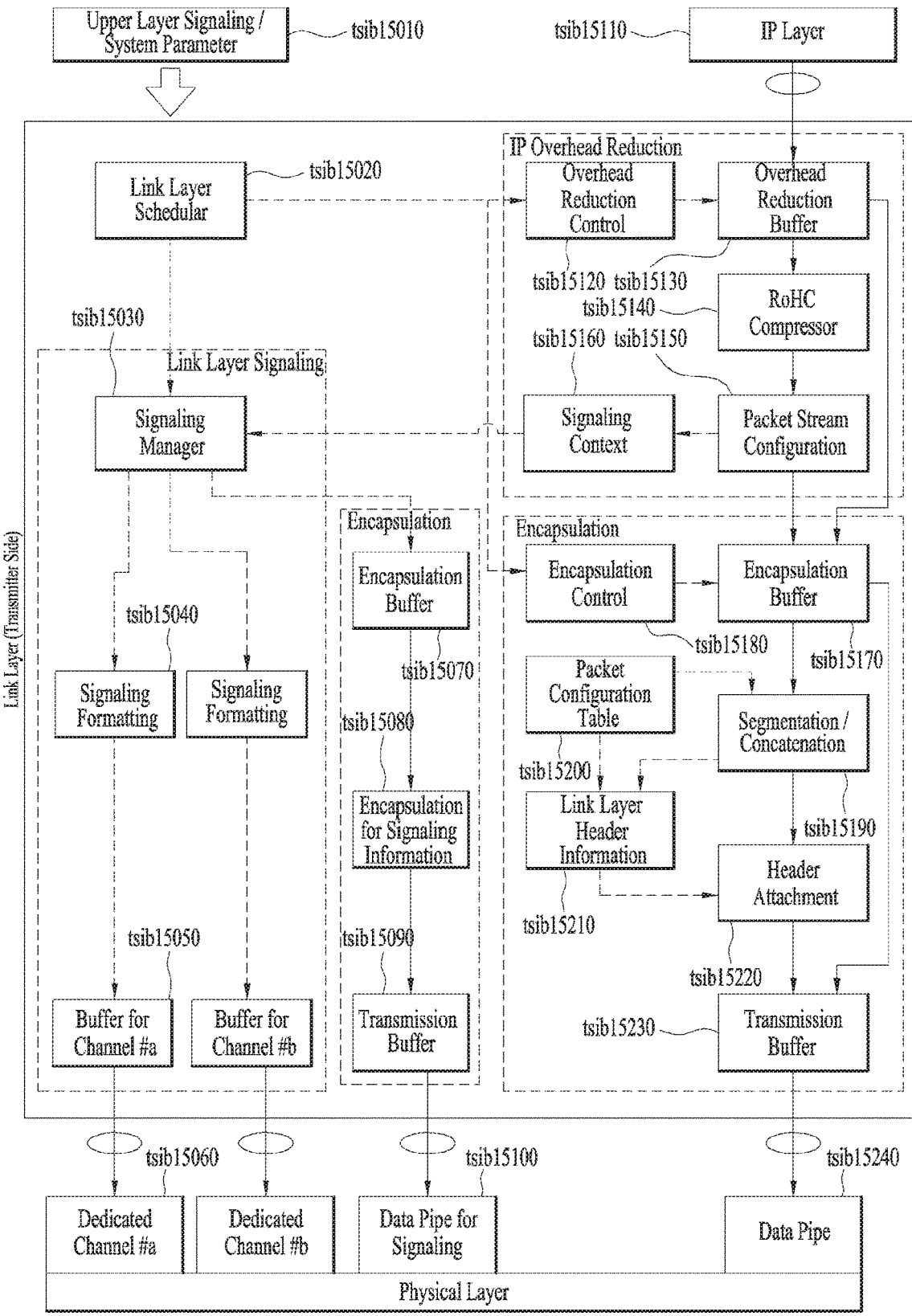
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be filterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel. A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

Figure 16:
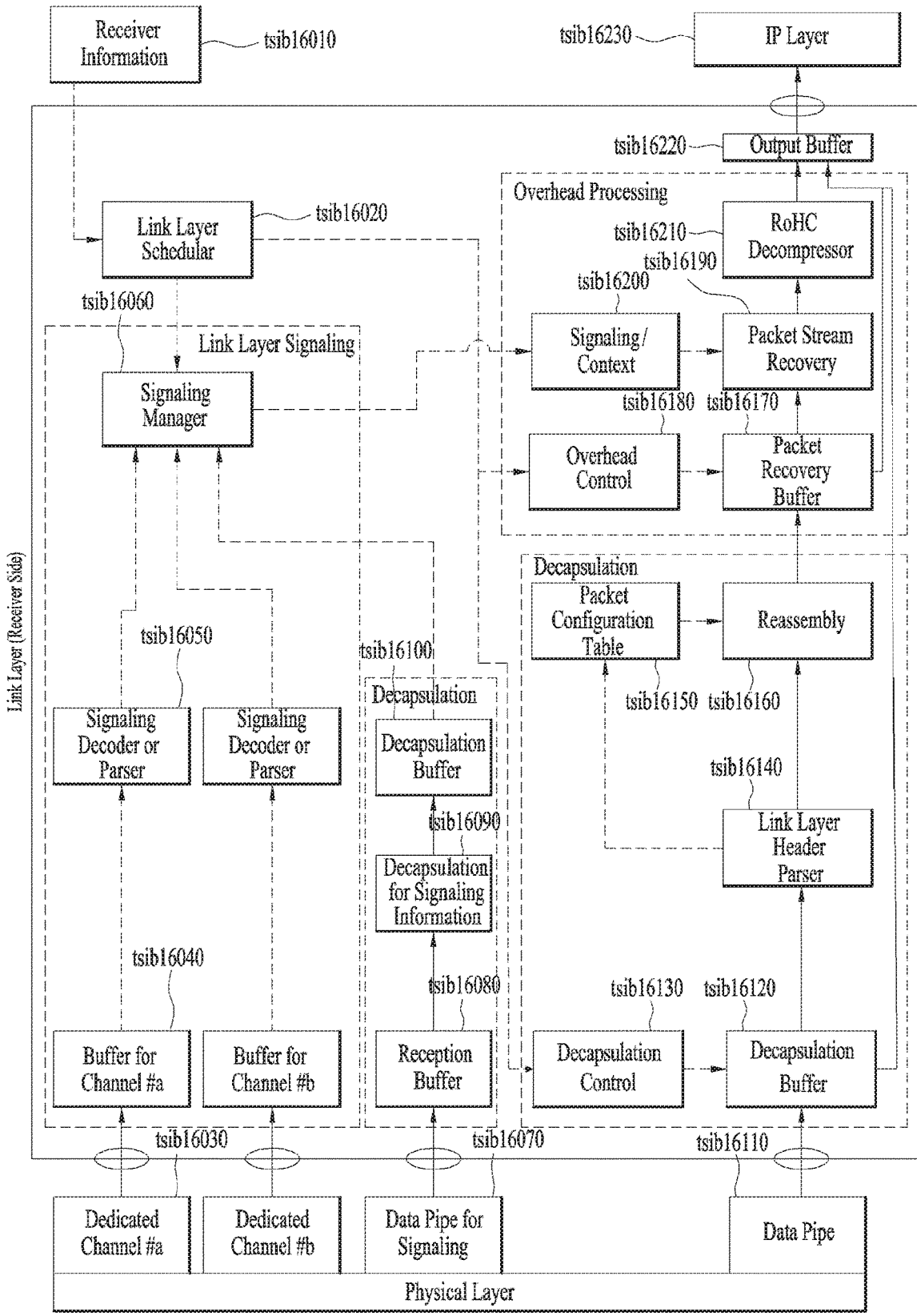
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
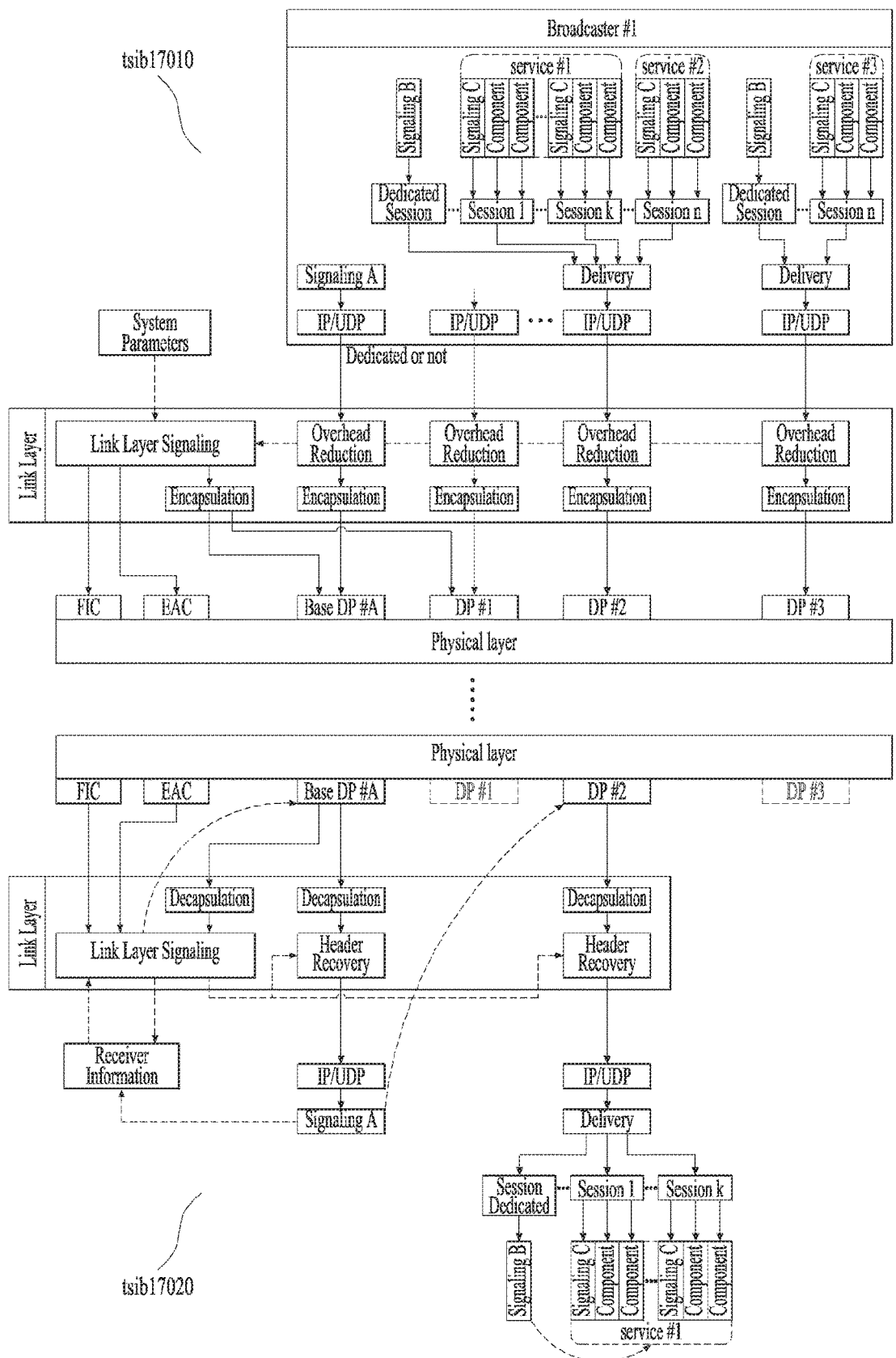
FIG. 17 illustrates a configuration of signaling transmission through a link layer according to an embodiment of the present invention (transmitting/receiving sides)

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

Figure 18:
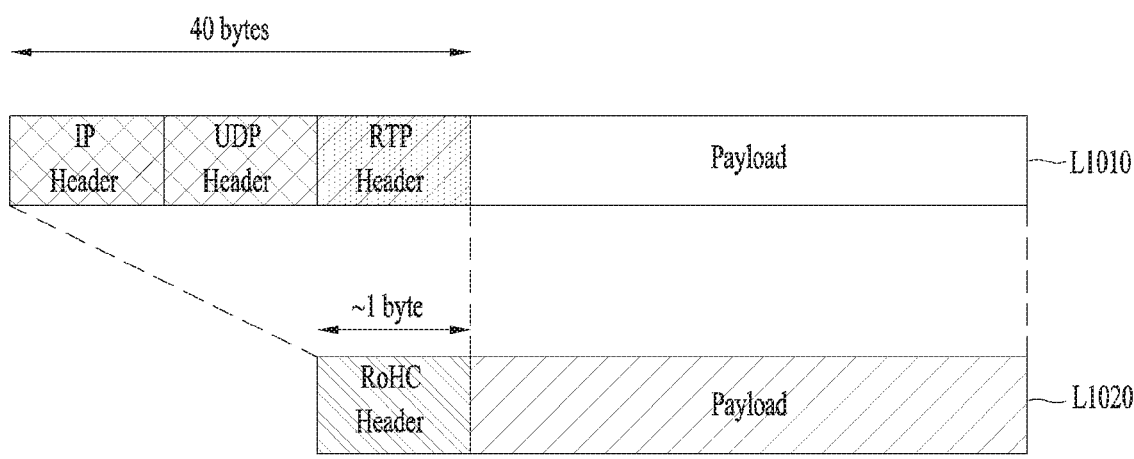
FIG. 18 is a view showing the structure of a Robust Header Compression (RoHC) packet and an uncompressed Internet Protocol (IP) packet according to an embodiment of the present invention.

FIG. 18 is a view showing the structure of a Robust Header Compression (RoHC) packet and an uncompressed Internet Protocol (IP) packet according to an embodiment of the present invention.

An IP packet L1010 according to an embodiment of the present invention may include an IP Header, a User Datagram Protocol Header (UDP header), a Real time Transport Protocol Header (RTP Header), and/or a Payload.

An IP Header, a UDP Header, and an RTP Header according to an embodiment of the present invention may have a total length of about 40 bytes.

An RoHC Packet L1020 according to an embodiment of the present invention may include an RoHC Header and/or a Payload.

An RoHC Header according to an embodiment of the present invention is one obtained by compressing the headers of the IP packet. The RoHC Header may have a length of about 1 byte.

According to an embodiment of the present invention, RoHC may indicate the total headers as one context ID. RoHC may perform compression in a scheme in which the total headers are transported at the beginning of transport and unchanged portions are omitted excluding context ID and main information in the middle of transport.

According to an embodiment of the present invention, IP version, IP source address, IP destination address, IP fragment flag, UDP source port, UDP destination port, etc. may be almost unchanged at the time of IP streaming. Almost unchanged fields during streaming like the above-described fields may be named static fields. RoHC according to an embodiment of the present invention may not further transport such static fields for a while after transporting the static fields once. An embodiment of the present invention may name a state in which the static fields are not further transported for a while after transporting the static fields once an Initialization Refresh (IR) state and name a packet transporting the static fields an IR packet. In addition, according to an embodiment of the present invention, fields which are changed at any time but are maintained for a predetermined time may be named dynamic fields. An embodiment of the present invention may further transport the above-described dynamic fields. According to an embodiment of the present invention, a packet transporting the dynamic fields may be named an IR-DYN packet. According to an embodiment of the present invention, the IR packet and the IR-DYN packet may have a similar size to a conventional header since the IR packet and the IR-DYN packet contain all information of the conventional header.

According to an embodiment of the present invention, a method of compressing a header portion of the IP packet to reduce overhead of transported Internet Protocol (IP) packet data may be used. According to an embodiment of the present invention, an RoHC scheme, which is one of the IP packet header compression schemes, may be used and the RoHC scheme may secure reliability in a wireless section. The RoHC scheme may be used in a broadcasting system, such as Digital Video Broadcasting-Next Generation Handheld (DVB-NGH) and a mobile communication system, such as Long Term Evolution (LTE). The RoHC scheme may be used for a UDP and/or RTP packet although the RoHC scheme is a scheme for compressing and transporting the header of the IP packet.

According to an embodiment of the present invention, RoHC may indicate the total headers as one context ID. RoHC may perform compression in a scheme in which the total headers are transported at the beginning of transport and unchanged portions are omitted excluding context ID and main information in the middle of transport. In a case in which the above-described RoHC scheme is applied to a broadcasting system, a broadcast receiver may not know when to receive an IP stream and a general receiver which does not know all header information may not recognize a corresponding IP packet. An embodiment of the present invention may solve the above-described problem using signaling used in the broadcasting system.

An embodiment of the present invention may provide an IP header compression method for supporting sufficient transport of an IP packet in a next generation digital broadcasting system.

According to another embodiment of the present invention, the RoHC scheme may be applied to a packet of a FLUTE-based protocol. In order to apply the RoHC scheme to a FLUTE/ALC/LCT packet according to an embodiment of the present invention, a packet header may be classified into static fields, dynamic fields, and inferable fields. In the FLUTE/ALC/LCT packet according to an embodiment of the present invention, the static fields may include LCT Version Number (V), Congestion Control flag (C), Transport Session Identifier flag (S), Half-word flag(H), Congestion Control Information (CCI), Transport Session Identification (TSI), and/or Expected Residual Transmission time (ERT). LCT Version Number (V) may be a 4-bit field indicating version number of an LCT protocol. This field may be fixed to 1. Congestion Control flag (C) may be a 2-bit field indicating the size of Congestion Control. This field may have a size of 32, 64, 96, or 128 bits according to a value. Transport Session Identifier flag (S) may be a 1-bit field, which may be a variable indicating the size of TSI. This field may have a size of 32*S+16*H. Half-word flag (H) may be a 1-bit field, which may be a common variable indicating the size of TSI and TOI. Congestion Control Information (CCI) may have a size of 32, 64, 96, or 128 bits. This field may be a value used for a receiver to Congestion Control a packet in a transported session. This field may include the number of layers, the number of logical channels, and sequence numbers. This field may be used to refer to throughput of an available bandwidth in a path between a transmitter and the receiver. Transport Session Identification (TSI) may have a size of 16, 32, or 48 bits. This field may indicate an identifier identifying a session from a specific transmitter. Expected Residual Transmission time (ERT) is a 0 or 32-bit field indicating a time during which reception is effective. In the FLUTE/ALC/LCT packet according to an embodiment of the present invention, the dynamic fields may include Transport Object Identifier flag (O), Close Session flag (A), Close Object flag (B), LCT header length (HDR_LEN), CodePoint (CP), Sender Current Time (SCT), and/or Source Block Number (SBN). Transport Object Identifier flag (O) may be a 2-bit field, which may be a variable indicating the size of TOI. This field may have a size of 32*O+16*H. Close Session flag (A) may be a 1-bit field. This field may be generally set to 0. This field may be set to 1 when transport of a session packet is completed. Close Object flag (B) may be a 1-bit field. This field may be generally set to 0. This field may be set to 1 when transport of a data (Object) packet is completed. LCT header length (HDR_LEN) may be an 8-bit field. This field may express a header of LCT as 32 bits. CodePoint (CP) may be an 8-bit field indicating data type. Sender Current Time (SCT) may be a 0 or 32-bit field indicating a time during which the transmitter transports data to the receiver. Source Block Number (SBN) may be a 32-bit field. This field may identify a Source block of an Encoding Symbol in a generated Payload. In the FLUTE/ALC/LCT packet according to an embodiment of the present invention, the inferable fields may include Transport Object Identification (TOI), FEC Payload ID, Encoding Symbol ID (ESI), and/or Encoding Symbol(s). Transport Object Identification (TOI) may be a field having 16, 32, 48, 64, 80, 96, or 112 bits indicating an identifier identifying data (Object) from the receiver. The length and format of FEC Payload ID may be set by FEC Encoding ID. This field may be included in an FEC building block. Encoding Symbol ID (ESI) may be a 32-bit field identifying a special Encoding Symbol generated from a Source Block in a Payload. Encoding Symbol(s) may be divided data from which the receiver reforms data and have a variable size based on a divided size.

Figure 19:
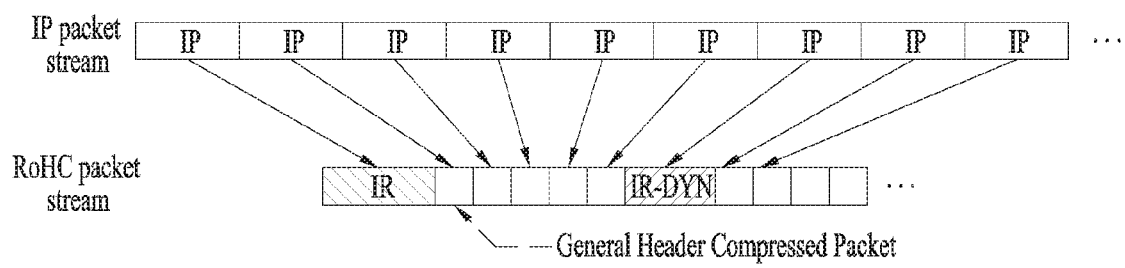
FIG. 19 is a view showing a concept of an RoHC packet stream according to an embodiment of the present invention.

FIG. 19 is a view showing a concept of an RoHC packet stream according to an embodiment of the present invention.

As shown in this figure, static fields transported while being included in an IR packet and dynamic fields transported while being included in an IR-DYN packet may be transported only when needed. Other packets may be transported in the form of a header compressed packet including only about 1 to 2 bytes information.

According to an embodiment of the present invention, it is possible to reduce a header of 30 bytes or more per packet through the above-described concept of the RoHC packet stream. The header compressed packet may be classified into type 0, type 1, and type 2 according to the form of a compressed header. Use of an RoHC packet according to an embodiment of the present invention may conform to a conventional standard document.

Figure 20:
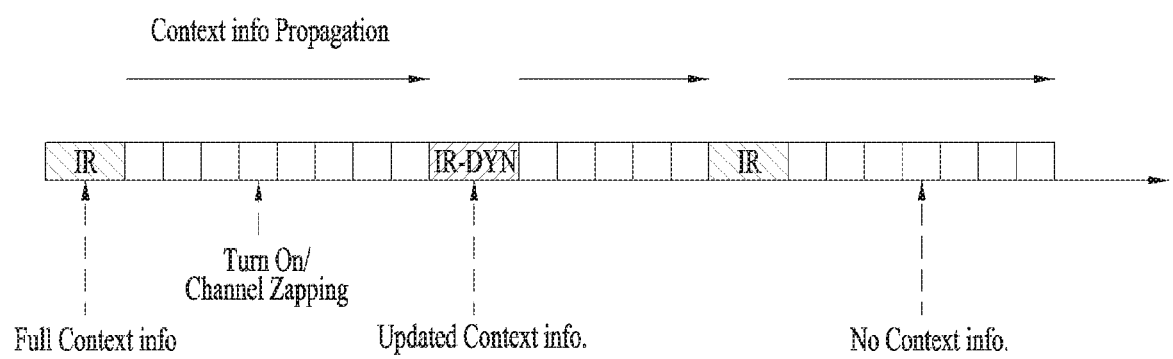
FIG. 20 is a view showing a context information propagation procedure during transport of an RoHC packet stream according to an embodiment of the present invention.

FIG. 20 is a view showing a context information propagation procedure during transport of an RoHC packet stream according to an embodiment of the present invention.

As shown in this figure, full context info may be included in an IR packet and updated context info may be included in an IR-DYN packet. In addition, a header compressed packet excluding the IR packet and the IR-DYN packet may not include context info.

According to an embodiment of the present invention, a receiver having no IR information may not decode an RoHC stream until receiving the next IR packet to configure full context for unidirectional transport having no feedback channel. That is, in this figure, in a case in which the receiver receives an RoHC stream from a part denoted by Turn On, the receiver may not decode the RoHC stream until receiving the next IR packet. An embodiment of the present invention may transport IR information through a separate signaling channel so as to solve the above-described problem.

According to an embodiment of the present invention, RoHC configuration information, initial parameter, and/or IR packet information (full context information) may be needed so as to normally decode a transported RoHC packet.

According to an embodiment of the present invention, a header compressed packet compressed using an IP header compression method may be in-band transported and an IR packet including a static chain containing unchanged header information and a dynamic chain for context update may be out-of-band transported so as to reduce overhead of IP transport and to achieve efficient transport. At this time, packets received by the receiver may be recovered in order before transport.

Figure 21:
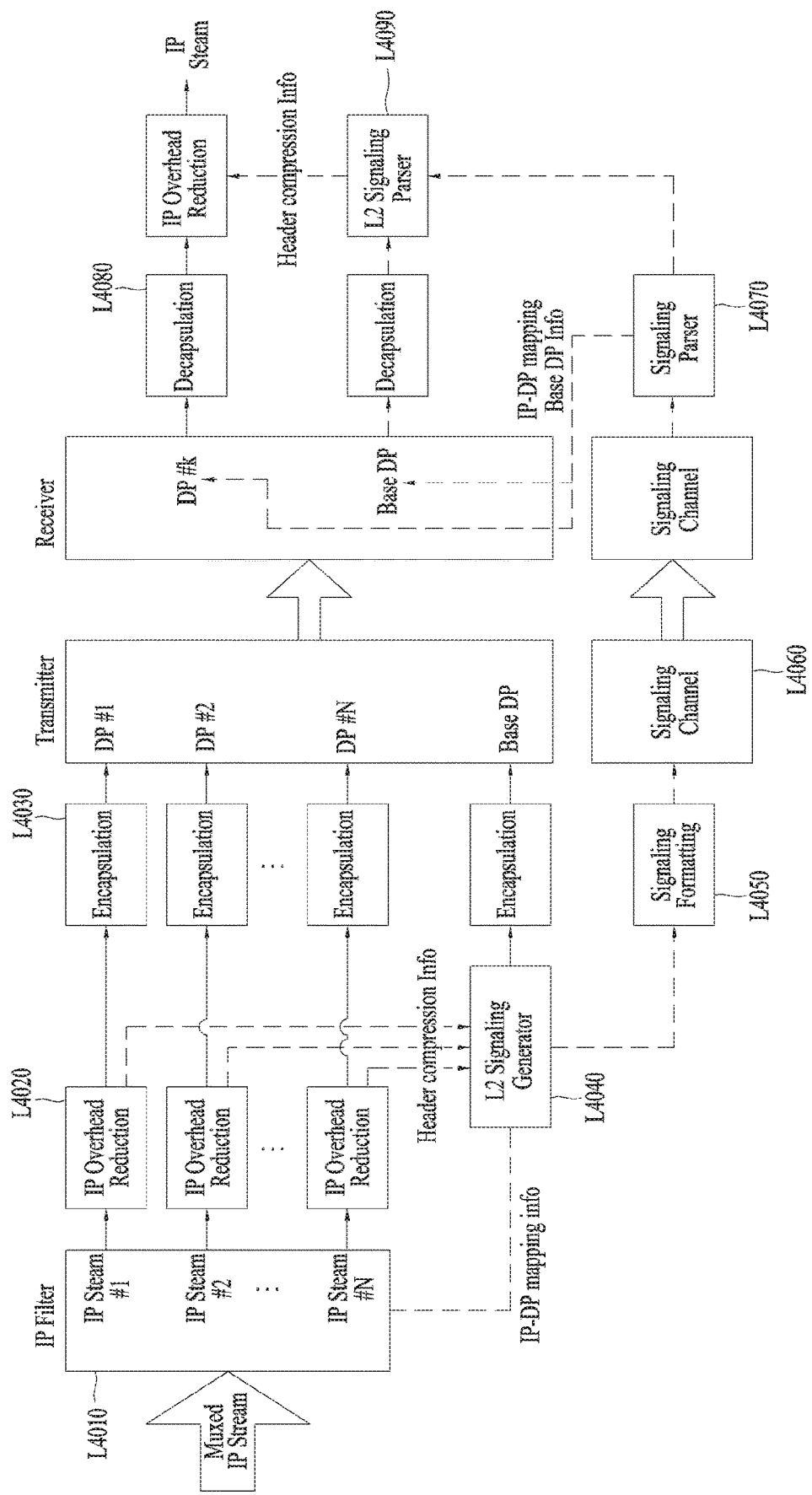
FIG. 21 is a view showing a transmitting and receiving system of an IP stream, to which an IP header compression scheme according to an embodiment of the present invention is applied.

FIG. 21 is a view showing a transmitting and receiving system of an IP stream, to which an IP header compression scheme according to an embodiment of the present invention is applied.

According to an embodiment of the present invention, IP streams may be configured to enter different Data Pipes (DPs). At this time, Header Compression Info may be transported to a receiver through an L2 signaling transport procedure and Header Compression Info may be used to recover the IP stream, to which the IP header compression scheme is applied, received by the receiver to an original IP stream. Header Compression Info may be encapsulated and transported to a DP. At this time, Header Compression Info may be transported to a normal DP or a DP for signaling transport (Base DP) according to the structure of a physical layer. In addition, Header Compression Info may be transported through a separate signaling channel in a case in which it is supported by the physical layer.

According to an embodiment of the present invention, IP-DP mapping info may be transported to the receiver through the L2 signaling transport procedure and IP-DP mapping info may be used to recover the IP stream from the DP received by the receiver. IP-DP mapping info may be encapsulated and transported to a DP. At this time, IP-DP mapping info may be transported to a normal DP or a DP for signaling transport (Base DP) according to the structure of a physical layer. In addition, IP-DP mapping info may be transported through a separate signaling channel in a case in which it is supported by the physical layer.

As shown in this figure, an IP Stream muxed by a compressor may be divided into one or more IP streams by an IP Filter L4010. Each IP stream may be compressed by an IP header compression scheme L4020 and may be transported to each DP through an encapsulation procedure L4030. At this time, an L2 Signaling Generator L4040 may generate signaling information including Header Compression Info and/or IP-DP mapping info. The generated signaling information may be encapsulated and transported to a decompressor through a Base DP or may pass through a Signaling Formatting procedure L4050 and transported to the decompressor through a signaling channel L4060.

As shown in this figure, the DPs received by the decompressor may be recovered into respective IP streams by IP-DP mapping info parsed by a Signaling Parser L4070. The IP streams, having passed through a Decapsulation procedure L4080, may be recovered into the IP stream before the IP header compression scheme is applied by Header Compression Info parsed by an L2 Signaling Parser L4090.

Figure 22:
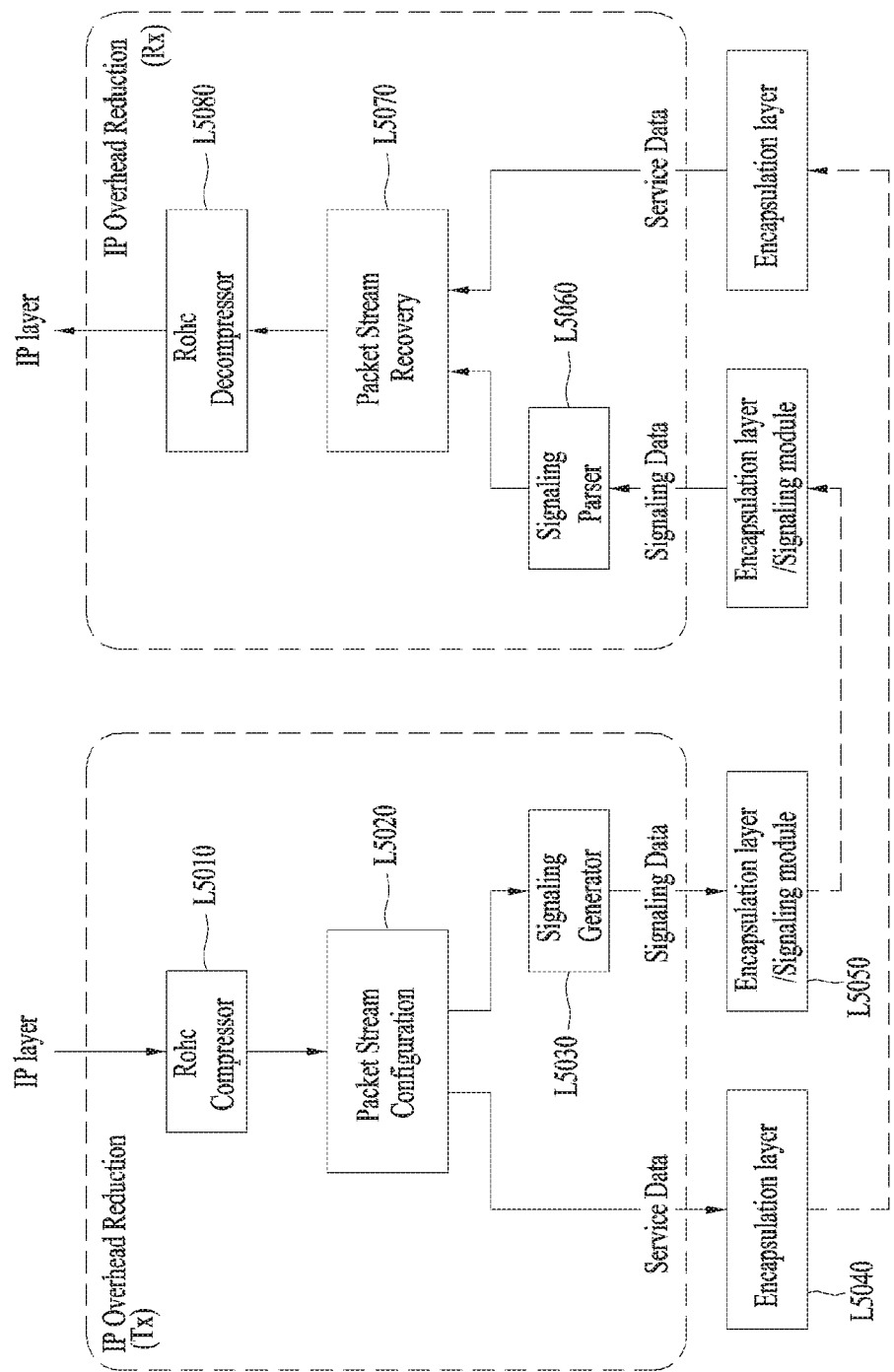
FIG. 22 is a view showing an IP overhead reduction procedure in a transmitter/receiver according to an embodiment of the present invention.

FIG. 22 is a view showing an IP overhead reduction procedure in a transmitter/receiver according to an embodiment of the present invention.

According to an embodiment of the present invention, when an IP stream enters an overhead reduction procedure, an RoHC Compressor L5010 may perform header compression for the corresponding stream. An embodiment of the present invention may use an RoHC method as a header compression algorithm. In a Packet Stream Configuration procedure L5020, a packet stream having passed through an RoHC procedure may be reconfigured according to the form of an RoHC packet. The reconfigured RoHC packet stream may be delivered to an encapsulation layer L5040 and then transported to the receiver through a physical layer. RoHC context information and/or signaling information generated in a procedure of reconfiguring the packet stream may be made into a transportable form through a signaling generator L5030 and delivered to a encapsulation layer or a signaling module L5050 according to the form of transport.

According to an embodiment of the present invention, the receiver may receive a stream for service data and signaling data delivered through a signaling channel or a separate DP. A Signaling Parser L5060 may receive signaling data to parse RoHC context information and/or signaling information and deliver the parsed information to a Packet Stream Recovery procedure L5070. In the Packet Stream Recovery procedure L5070, the receiver may recover the packet stream reconfigured by the compressor into a form in which an RoHC decompressor L5080 can decompress the packet stream using RoHC context information and/or signaling information included in the signaling data. The RoHC Decompressor L5080 may convert the recovered RoHC packet stream into an IP stream. The converted IP stream may be delivered to an upper layer through an IP layer.

Figure 23:
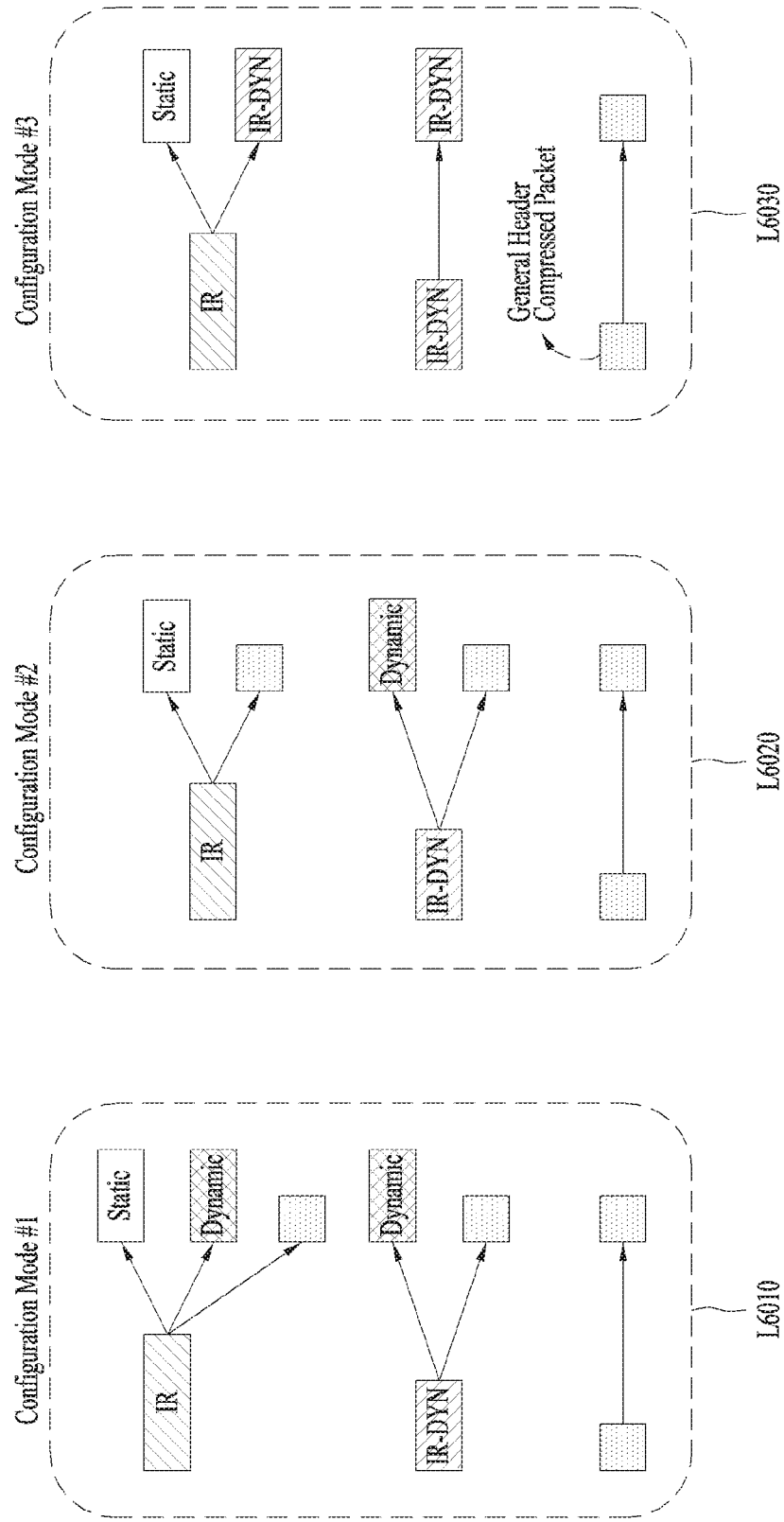
FIG. 23 is a view showing a procedure of reconfiguring an RoHC packet to configure a new packet stream according to an embodiment of the present invention.

FIG. 23 is a view showing a procedure of reconfiguring an RoHC packet to configure a new packet stream according to an embodiment of the present invention.

The present invention may include three configuration modes.

According to a first configuration mode (Configuration Mode #1) L6010, which is an embodiment of the present invention, the first configuration mode may extract a static chain and a dynamic chain from an IR packet and convert the remainder of the corresponding packet into a general header compressed packet. The first configuration mode may extract a dynamic chain from an IR-DYN packet and convert the remainder of the corresponding packet into a general header compressed packet. The first configuration mode may transport the general header compressed packet without any change.

According to a second configuration mode (Configuration Mode #2) L6020, which is another embodiment of the present invention, the second configuration mode may extract only a static chain from an IR packet and convert the remainder of the corresponding packet into a general header compressed packet. The second configuration mode may extract a dynamic chain from an IR-DYN packet and convert the remainder of the corresponding packet into a general header compressed packet. The second configuration mode may transport the general header compressed packet without any change.

According to a third configuration mode (Configuration Mode #3) L6030, which is another embodiment of the present invention, the third configuration mode may extract a static chain from an IR packet and convert the remainder of the corresponding packet into an IR-DYN packet. The third configuration mode may transport the IR-DYN packet without any change and transport a general header compressed packet without any change.

Figure 24:
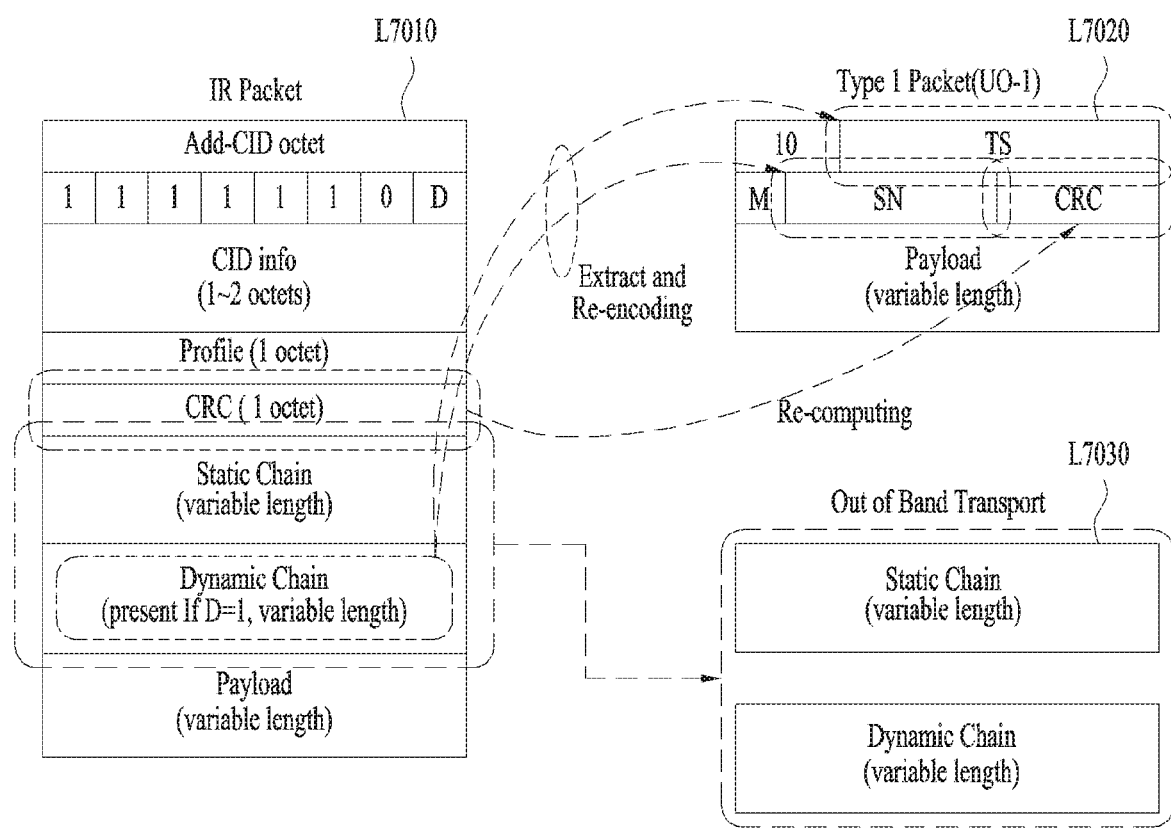
FIG. 24 is a view showing a procedure of converting an IR packet into a general header compressed packet in a procedure of reconfiguring an RoHC packet to configure a new packet stream according to an embodiment of the present invention.

FIG. 24 is a view showing a procedure of converting an IR packet into a general header compressed packet in a procedure of reconfiguring an RoHC packet to configure a new packet stream according to an embodiment of the present invention.

An IR packet L7010 according to an embodiment of the present invention may include packet type, context ID, Profile, CRC, Static Chain, Dynamic Chain, and/or Payload. Packet type may indicate type of the corresponding IR packet. For example, in this figure, the packet type of the IR packet may indicate 1111110D and the last D may indicate whether a dynamic chain is included in the corresponding packet. Context ID may use 8 bits or more bits. Context ID may identify a channel through which the corresponding packet is transported. Context ID may be named a context identifier (CID). When a compressor sends a packet having an uncompressed full header while a specific CID is added thereto first and sends subsequent packets while omitting header fields having static, dynamic, or inferred properties as the same CID, a decompressor may recover all RTP headers by adding the omitted field to the compression header received after the second packet with reference to initially stored header field information based on the CID. Profile may indicate a profile of the IR packet identified by the packet type. CRC may indicate a CRC code for error check. Static Chain may indicate information which is not almost changed during streaming. For example, IP version, IP source address, IP destination address, IP fragment flag, UDP source port, UDP destination port, etc. may be included in the static chain during IP streaming. Dynamic Chain may indicate information which is changed at any time but is maintained for a predetermined time. Payload may include data to be transported.

A general header compressed packet L7020 according to an embodiment of the present invention may include Time Stamp (TS), Sequence Number (SN), CRC, and/or Payload. A general header compressed packet according to an embodiment of the present invention may correspond to a UO-1 packet corresponding to packet type 1. Time Stamp (TS) may indicate time stamp information for time synchronization. Sequence Number (SN) may indicate information indicating sequence of packets. CRC may indicate a CRC code for error check. Payload may include data to be transported.

According to an embodiment of the present invention, a static chain and a dynamic chain may be extracted from the IR packet L7010 and the extracted static chain and dynamic chain may be transported through Out of Band L7030. The Time Stamp (TS) and the Sequence Number (SN) included in the general header compressed packet L7020 may be re-encoded using information of the dynamic chain included in the IR packet L7010. The CRC included in the general header compressed packet L7020 may be re-calculated separately from the CRC included in the IR packet L7010.

Figure 25:
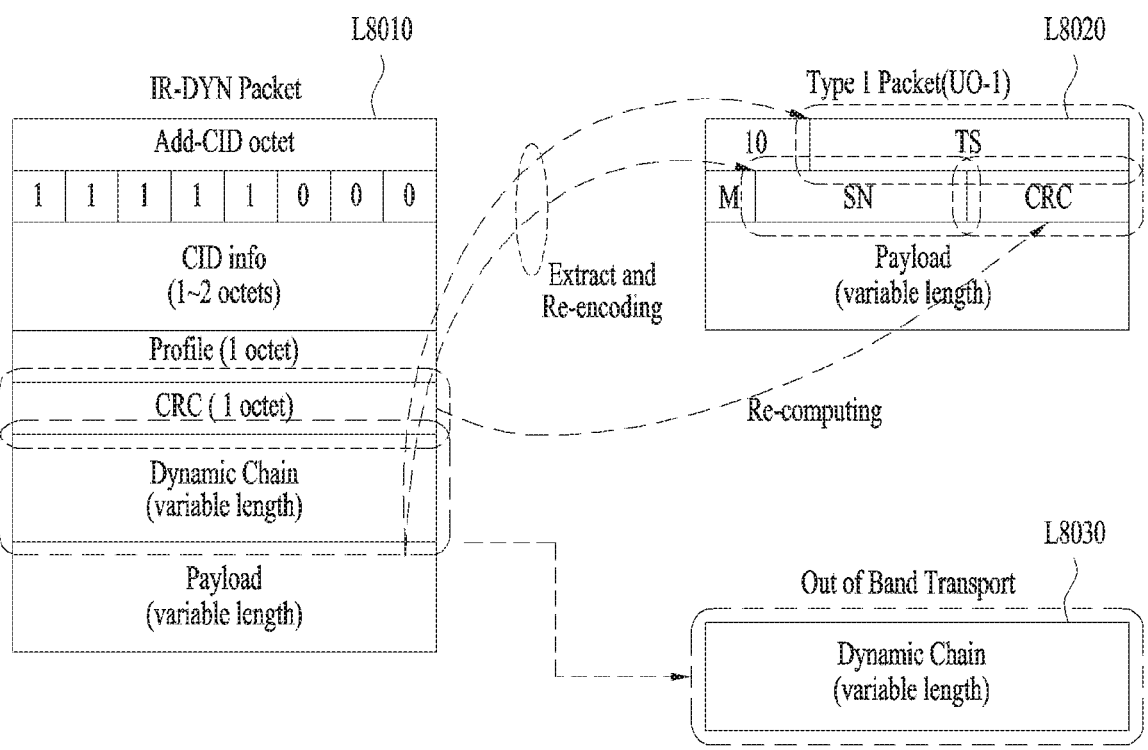
FIG. 25 is a view showing a procedure of converting an IR-DYN packet into a general header compressed packet in a procedure of reconfiguring an RoHC packet to configure a new packet stream according to an embodiment of the present invention.

FIG. 25 is a view showing a procedure of converting an IR-DYN packet into a general header compressed packet in a procedure of reconfiguring an RoHC packet to configure a new packet stream according to an embodiment of the present invention.

An IR-DYN packet L8010 according to an embodiment of the present invention may include packet type, context ID, Profile, CRC, Dynamic Chain, and/or Payload. Packet type may indicate type of the corresponding IR-DYN packet. For example, in this figure, the packet type of the IR-DYN packet may indicate 11111000. Context ID may use 8 bits or more bits. Context ID may identify a channel through which the corresponding IR-DYN packet is transported. Profile may indicate a profile of the IR-DYN packet identified by the packet type. CRC may indicate a CRC code for error check. Dynamic Chain may indicate information which is changed at any time but is maintained for a predetermined time. Payload may include data to be transported.

A general header compressed packet L8020 according to an embodiment of the present invention may include Time Stamp (TS), Sequence Number (SN), CRC, and/or Payload, which were previously described.

According to an embodiment of the present invention, a dynamic chain may be extracted from the IR-DYN packet L8010 and the extracted dynamic chain may be transported through Out of Band L8030. The Time Stamp (TS) and the Sequence Number (SN) included in the general header compressed packet L8020 may be re-encoded using information of the dynamic chain included in the IR-DYN packet L8010. The CRC included in the general header compressed packet L8020 may be re-calculated separately from the CRC included in the IR-DYN packet L8010.

Figure 26:
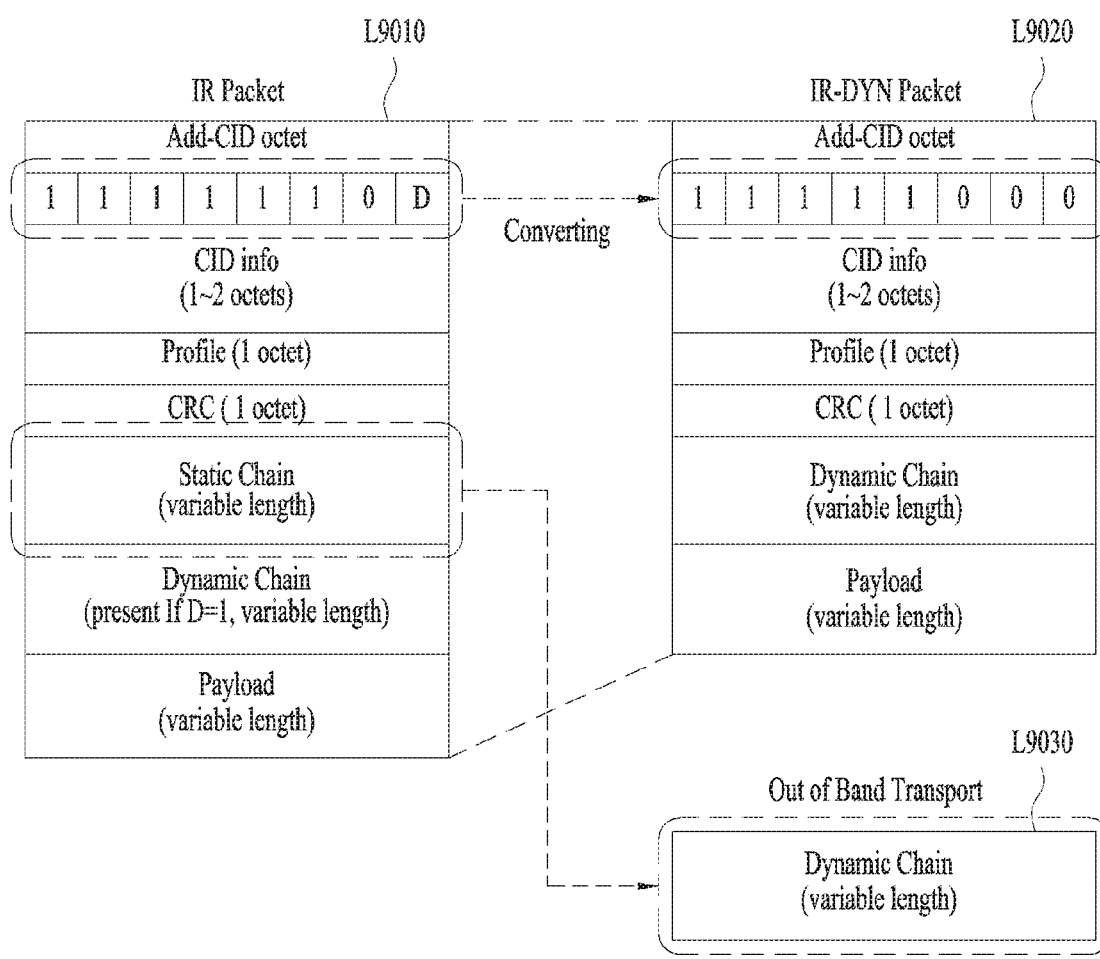
FIG. 26 is a view showing a procedure of converting an IR packet into an IR-DYN packet in a procedure of reconfiguring an RoHC packet to configure a new packet stream according to an embodiment of the present invention.

FIG. 26 is a view showing a procedure of converting an IR packet into an IR-DYN packet in a procedure of reconfiguring an RoHC packet to configure a new packet stream according to an embodiment of the present invention.

An IR packet L9010 and an IR-DYN packet L9020 according to an embodiment of the present invention were previously described in detail.

According to an embodiment of the present invention, packet type of the IR packet L9010 may be changed into a packet type value corresponding to the IR-DYN packet L9020. A static chain may be extracted from the IR packet L9010 and the extracted static chain may be transported through Out of Band L9030. The remaining fields included in the IR packet L9010 excluding the packet type and the static chain may be identically used in the IR-DYN packet L9020.

According to an embodiment of the present invention, encoding and calculation methods related to fields used in a procedure of reconfiguring an RoHC packet to configure a new packet stream may conform to a related standard document or other methods may be applied.

Figure 27:
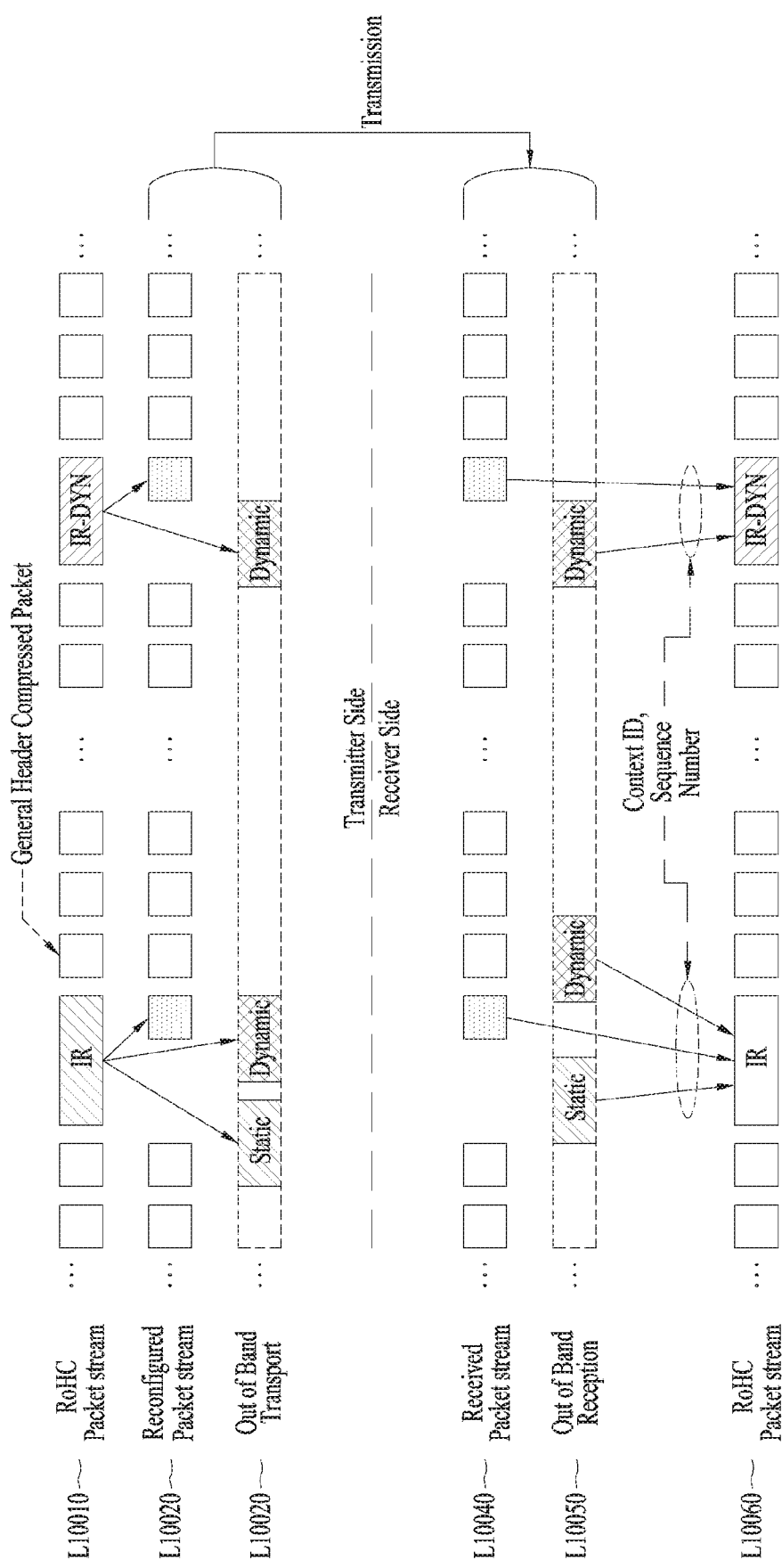
FIG. 27 is a view showing a configuration and recovery procedure of an RoHC packet stream in a first configuration mode (Configuration Mode #1) according to an embodiment of the present invention.

FIG. 27 is a view showing a configuration and recovery procedure of an RoHC packet stream in a first configuration mode (Configuration Mode #1) according to an embodiment of the present invention.

A configuration procedure of an RoHC packet stream in a transmitter according to an embodiment of the present invention is as follows.

A transmitter according to an embodiment of the present invention may detect an IR packet and an IR-DYN packet from an RoHC packet stream L10010 based on RoHC header information. Next, the transmitter may generate a general header compressed packet using sequence number included in the IR and IR-DYN packets. The general header compressed packet may be arbitrarily generated since the general header compressed packet includes Sequence Number (SN) information irrespective of which type the general header compressed packet has. SN may correspond to information basically present in RTP. For UDP, the transmitter may arbitrarily generate and use SN. Next, the transmitter may replace the corresponding IR or IR-DYN packet with the generated general header compressed packet. The transmitter may extract a static chain and a dynamic chain from the IR packet and extract a dynamic chain from the IR-DYN packet. The extracted static chain and dynamic chain may be transported through Out of Band L10030. For all RoHC packet streams, the transmitter may replace headers of the IR and IR-DYN packets with a header of the general header compressed packet through the same procedure as the above-described procedure and extract a static chain and/or a dynamic chain. A reconfigured packet stream L10020 may be transported through a data pipe and the extracted static chain and dynamic chain may be transported through Out of Band L10030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L10040), and detect a static chain and a dynamic chain corresponding to the packet stream to be received. The static chain and/or the dynamic chain may be received through Out of Band (Out of Band Reception, L10050). Next, the receiver may detect a general header compressed packet having the same SN as the above-described static chain or dynamic chain from the pack stream transported through the data pipe using SN of the extracted static chain and dynamic chain. Next, the receiver may combine the detected general header compressed packet with the static chain and/or the dynamic chain to configure an IR and/or IR-DYN packet. The configured IR and/or IR-DYN packet may be transported to an RoHC decompressor. In addition, the receiver may configure an RoHC packet stream L10060 including an IR packet, an IR-DYN packet, and/or a general header compressed packet. The configured RoHC packet stream may be transported to the RoHC decompressor. A receiver according to an embodiment of the present invention may use static chain, dynamic chain, and SN and/or Context ID of an IR packet and an IR-DYN packet to recover an RoHC packet stream.

Figure 28:
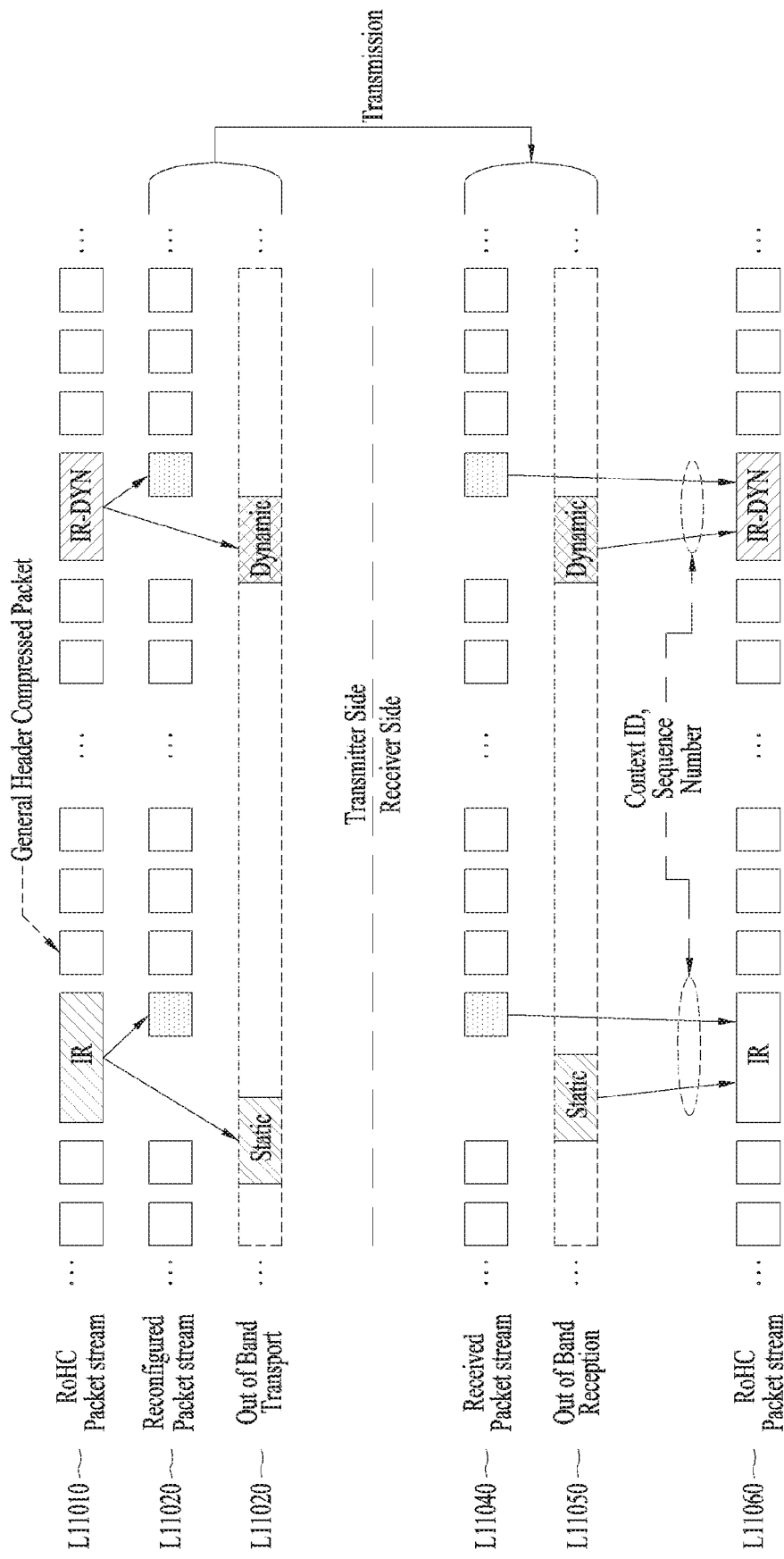
FIG. 28 is a view showing a configuration and recovery procedure of an RoHC packet stream in a second configuration mode (Configuration Mode #2) according to an embodiment of the present invention.

FIG. 28 is a view showing a configuration and recovery procedure of an RoHC packet stream in a second configuration mode (Configuration Mode #2) according to an embodiment of the present invention.

A configuration procedure of an RoHC packet stream in a transmitter according to an embodiment of the present invention is as follows.

A transmitter according to an embodiment of the present invention may detect an IR packet and an IR-DYN packet from an RoHC packet stream L11010 based on RoHC header information. Next, the transmitter may generate a general header compressed packet using sequence number included in the IR and IR-DYN packets. The general header compressed packet may be arbitrarily generated since the general header compressed packet includes Sequence Number (SN) information irrespective of which type the general header compressed packet has. SN may correspond to information basically present in RTP. For UDP, the transmitter may arbitrarily generate and use SN. Next, the transmitter may replace the corresponding IR or IR-DYN packet with the generated general header compressed packet. The transmitter may extract a static chain from the IR packet and extract a dynamic chain from the IR-DYN packet. The extracted static chain and dynamic chain may be transported through Out of Band L11030. For all RoHC packet streams, the transmitter may replace headers of the IR and IR-DYN packets with a header of the general header compressed packet through the same procedure as the above-described procedure and extract a static chain and/or a dynamic chain. A reconfigured packet stream L11020 may be transported through a data pipe and the extracted static chain and dynamic chain may be transported through Out of Band L11030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L11040), and detect a static chain and a dynamic chain corresponding to the packet stream to be received. The static chain and/or the dynamic chain may be received through Out of Band (Out of Band Reception, L11050). Next, the receiver may detect a general header compressed packet having the same SN as the above-described static chain or dynamic chain from the pack stream transported through the data pipe using SN of the extracted static chain and dynamic chain. Next, the receiver may combine the detected general header compressed packet with the static chain and/or the dynamic chain to configure an IR and/or IR-DYN packet. The configured IR and/or IR-DYN packet may be transported to an RoHC decompressor. In addition, the receiver may configure an RoHC packet stream L11060 including an IR packet, an IR-DYN packet, and/or a general header compressed packet. The configured RoHC packet stream may be transported to the RoHC decompressor. A receiver according to an embodiment of the present invention may use static chain, dynamic chain, and SN and/or Context ID of an IR packet and an IR-DYN packet to recover an RoHC packet stream.

Figure 29:
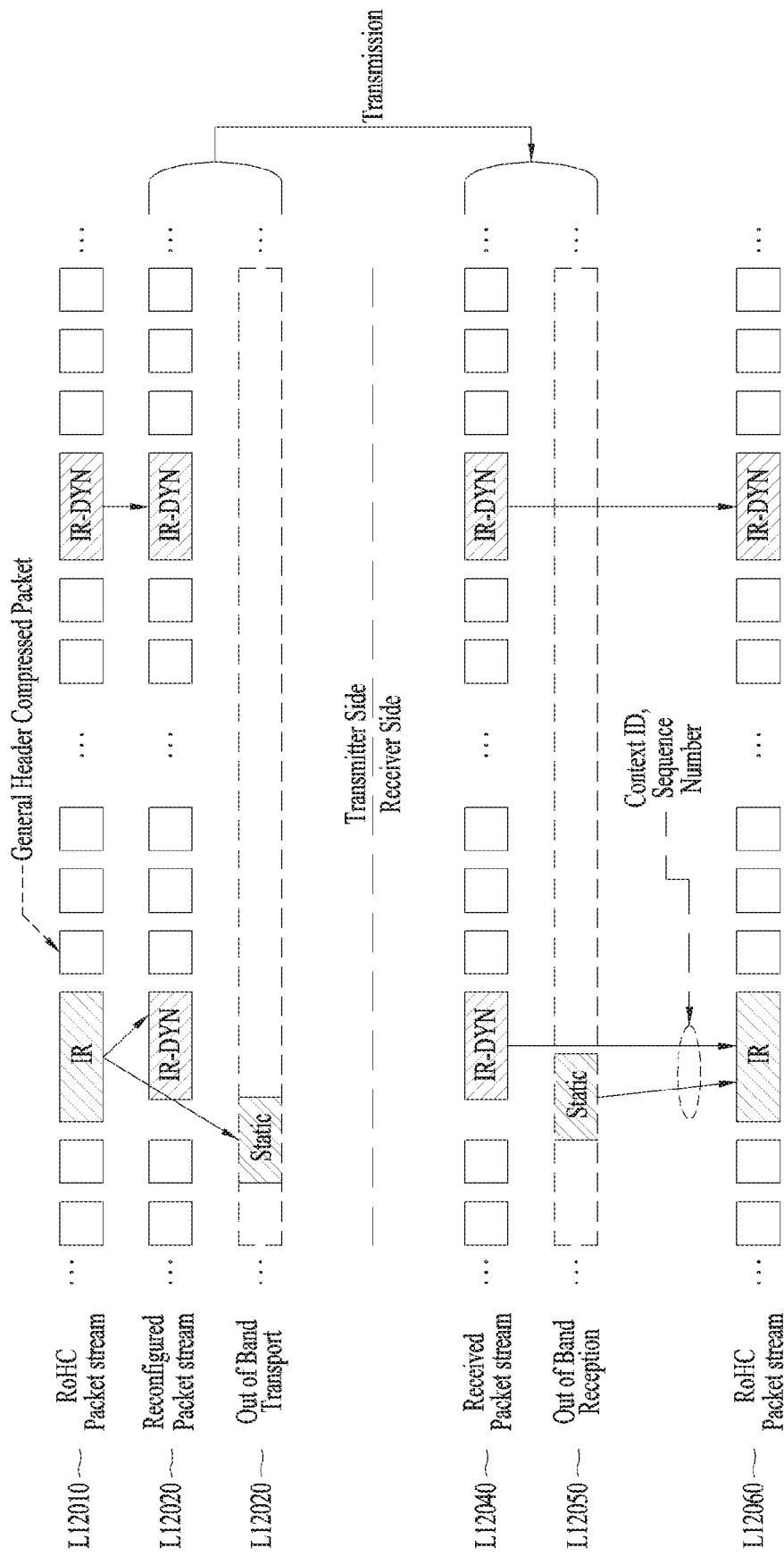
FIG. 29 is a view showing a configuration and recovery procedure of an RoHC packet stream in a third configuration mode (Configuration Mode #3) according to an embodiment of the present invention.

FIG. 29 is a view showing a configuration and recovery procedure of an RoHC packet stream in a third configuration mode (Configuration Mode #3) according to an embodiment of the present invention.

A configuration procedure of an RoHC packet stream in a transmitter according to an embodiment of the present invention is as follows.

A transmitter according to an embodiment of the present invention may detect an IR packet from an RoHC packet stream L12010 based on RoHC header information. Next, the transmitter may extract a static chain from the IR packet and convert the IR packet into an IR-DYN packet using the remainder of the IR packet excluding the extracted static chain. For all RoHC packet streams, the transmitter may replace a header of the IR packet with a header of the IR-DYN packet through the same procedure as the above-described procedure and extract a static chain. A reconfigured packet stream L12020 may be transported through a data pipe and the extracted static chain may be transported through Out of Band L12030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L12040), and detect a static chain corresponding to the packet stream to be received. The static chain may be received through Out of Band (Out of Band Reception, L12050). Next, the receiver may detect an IR-DYN packet from the pack stream transported through the data pipe. Next, the receiver may combine the detected IR-DYN packet with the static chain to configure an IR packet. The configured IR packet may be transported to an RoHC decompressor. In addition, the receiver may configure an RoHC packet stream L12060 including an IR packet, an IR-DYN packet, and/or a general header compressed packet. The configured RoHC packet stream may be transported to the RoHC decompressor. A receiver according to an embodiment of the present invention may use static chain and SN and/or Context ID of an IR-DYN packet to recover an RoHC packet stream.

FIG. 30 is a view showing a combination of information that can be delivered through Out of Band according to an embodiment of the present invention.

According to an embodiment of the present invention, a method of delivering a static chain and/or a dynamic chain extracted in a configuration procedure of an RoHC packet stream through Out of Band may mainly include a delivering method through signaling and a delivering method through a data pipe, through which a parameter necessary for system decoding is delivered. According to an embodiment of the present invention, the data pipe, through which the parameter necessary for the system decoding is delivered, may be named Base Data Pipe (DP).

As shown in this figure, a static chain and/or a dynamic chain may be delivered through signaling or Base DP. According to an embodiment of the present invention, a first transport mode (Transport Mode #1) to a third transport mode (Transport Mode #3) may be used in the first configuration mode (Configuration Mode #1) or the second configuration mode (Configuration Mode #2), and a fourth transport mode (Transport Mode #4) and a fifth third transport mode (Transport Mode #5) may be used in the third configuration mode (Configuration Mode #3)

According to an embodiment of the present invention, each configuration mode and transport mode may be switched and used through separate signaling based on a situation of the system, and only one configuration mode and one transport mode may be fixed and used according to a design procedure of the system.

As shown in this figure, in the first transport mode (Transport Mode #1), a static chain may be transported through signaling, a dynamic chain may be transported through signaling, and a general header compressed packet may be transported through Normal Data Pipe.

As shown in this figure, in the second transport mode (Transport Mode #2), a static chain may be transported through signaling, a dynamic chain may be transported through Base Data Pipe, and a general header compressed packet may be transported through Normal Data Pipe.

As shown in this figure, in the third transport mode (Transport Mode #3), a static chain may be transported through Base Data Pipe, a dynamic chain may be transported through Base Data Pipe, and a general header compressed packet may be transported through Normal Data Pipe.

As shown in this figure, in the fourth transport mode (Transport Mode #4), a static chain may be transported through signaling, a dynamic chain may be transported through Normal Data Pipe, and a general header compressed packet may be transported through Normal Data Pipe. At this time, the dynamic chain may be transported by an IR-DYN packet.

As shown in this figure, in the fifth transport mode (Transport Mode #5), a static chain may be transported through Base Data Pipe, a dynamic chain may be transported through Normal Data Pipe, and a general header compressed packet may be transported through Normal Data Pipe. At this time, the dynamic chain may be transported by an IR-DYN packet.

FIG. 31 is a view showing configuration of a descriptor including a static chain according to an embodiment of the present invention.

According to an embodiment of the present invention, a transport format for transport through signaling may be needed to transport a static chain through signaling, to which a descriptor form may correspond.

A descriptor including a static chain according to an embodiment of the present invention may include a descriptor_tag field, a descriptor_length field, a context_id field, a context_profile field, a static_chain_length field, and/or a static_chain( ) field.

The descriptor_tag field may indicate that this descriptor is a descriptor including a static chain.

The descriptor_length field may indicate a length of this descriptor.

The context_id field may indicate context ID for a corresponding RoHC packet stream. The length of context ID may be decided in an initial configuration procedure of the system. This field may be named context identifier information and identify a corresponding RoHC packet stream based on a static field or a dynamic field.

The context_profile field may indicate compression protocol information of a corresponding RoHC packet stream. That is, this field may indicate up to which protocol a header of an RoHC packet included in the corresponding RoHC packet stream has been compressed.

The static_chain_length field may indicate the length of following static chain( ) in unit of byte. In a case in which this descriptor includes only one static chain, this field may be replaced by the above-described descriptor_length field.

The static_chain( ) field may include information for the static chain.

FIG. 32 is a view showing configuration of a descriptor including a dynamic chain according to an embodiment of the present invention.

According to an embodiment of the present invention, a transport format for transport through signaling may be needed to transport a dynamic chain through signaling, to which a descriptor form may correspond.

A descriptor including a dynamic chain according to an embodiment of the present invention may include a descriptor_tag field, a descriptor_length field, a context_id field, a context_profile field, a dynamic_chain_length field, and/or a dynamic_chain( ) field.

The descriptor_tag field may indicate that this descriptor is a descriptor including a dynamic chain.

The descriptor_length field may indicate a length of this descriptor.

The context_id field may indicate context ID for a corresponding RoHC packet stream. The length of context ID may be decided in an initial configuration procedure of the system.

The context_profile field may indicate compression protocol information of a corresponding RoHC packet stream.

The dynamic_chain_length field may indicate the length of following dynamic chain( ) in unit of byte. In a case in which this descriptor includes only one dynamic chain, this field may be replaced by the above-described descriptor_length field The dynamic_chain( ) field may include information for the dynamic chain.

FIG. 33 is a view showing configuration of a packet format including a static chain and a packet format including a dynamic chain according to an embodiment of the present invention.

According to an embodiment of the present invention, a transport format for transport in a packet form may be needed to transport a static chain and/or a dynamic chain through Base DP, to which a packet format form shown in this figure may correspond.

In order to configure a static chain and/or a dynamic chain according to an embodiment of the present invention in a packet format, a header for informing of information about the corresponding static chain and/or dynamic chain may be added. The added header may include a Packet Type field, a Static/Dynamic chain Indicator field, and a Payload Length field. In a case in which a packet according to an embodiment of the present invention has a structure in which it is difficult to indicate a static chain and/or a dynamic chain in detail, the information of the above-described descriptor including the static chain or the dynamic chain may be included in a payload of this packet A packet format including a static chain according to an embodiment of the present invention may include a Packet Type field, a Static chain Indicator field, a Payload Length field, and/or a Static Chain Byte field.

The Packet Type field may indicate type information of this packet.

The Static chain Indicator field may indicate whether information constituting a payload is a static chain or a dynamic chain.

The Payload Length field may indicate the length of a payload including a static chain.

The Static Chain Byte field may indicate information of the static chain included in the payload of this packet.

A packet format including a dynamic chain according to an embodiment of the present invention may include a Packet Type field, a Dynamic chain Indicator field, a Payload Length field, and/or a Dynamic Chain Byte field.

The Packet Type field may indicate type information of this packet.

The Dynamic chain Indicator field may indicate whether information constituting a payload is a static chain or a dynamic chain.

The Payload Length field may indicate the length of a payload including a dynamic chain.

The Dynamic Chain Byte field may indicate information of the dynamic chain included in the payload of this packet.

FIG. 34 is a diagram illustrating configuration of ROHC_init_descriptor( ) according to an embodiment of the present invention.

Robust header compression (RoHC) according to an embodiment of the present invention may be configured for a bidirectional transmission system. In the bidirectional transmission system, a RoHC compressor and a RoHC decompressor according to an embodiment of the present invention may perform an initial set up procedure and in this procedure, transmit and receive a parameter required for the initial procedure. According to an embodiment of the present invention, the procedure for transmitting and receiving the parameter required for aforementioned initial procedure can be referred as a negotiation procedure or an initialization procedure. However, according to an embodiment of the present invention, a unidirectional system such as a broadcast system cannot perform the aforementioned negotiation procedure and can replace the aforementioned initialization procedure with a separate method.

According to an embodiment of the present invention, during the initialization procedure, the RoHC compressor and the RoHC decompressor may transmit and receive the following parameters. The parameter required for the initial procedure according to an embodiment of the present invention may include MAX_CID, LARGE_CIDS, PROFILES, FEEDBACK_FOR, and/or MRRU.

MAX_CID may be used to notify the decompressor of a maximum value of a context ID (CID).

LARGE_CIDS may indicate whether a short CID (0 to 15 (decimal number)) and an embedded CID (0 to 16383 (decimal number)) are used for configuration of the CID. Thus, a size of a byte for representation of the CID may also be determined.

PROFILES may indicate a range of a protocol for header compression via RoHC. According to an embodiment of the present invention, RoHC can compress and restore a stream when the compressor and the decompressor have the same profile.

FEEDBACK_FOR may correspond to an optionally used field and indicate whether a backward channel for transmission of feedback information is present in a corresponding RoHC channel.

A maximum reconstructed reception unit (MRRU) may indicate a maximum size of a segment when segmentation is used in the RoHC compressor.

According to an embodiment of the present invention, a descriptor including parameters may be transmitted in order to transmit a parameter required for the aforementioned RoHC initial procedure.

According to an embodiment of the present invention, ROHC_init_descriptor( ) may include a descriptor_tag field, a descriptor_length field, a context_id field, a context_profile field, a max_cid field, and/or a large_cid field.

The descriptor_tag field may identify whether the descriptor is a descriptor including a parameter required for a RoHC initial procedure.

The descriptor_length field may indicate a length of the descriptor.

The context_id field may indicate a CID of a corresponding RoHC packet stream.

The context_profile field may be a field including the aforementioned PROFILES parameter and indicate a range of a protocol for header compression via RoHC.

The max_cid field may be a field including the aforementioned MAX_CID parameter and may indicate a maximum value of a CID.

The large_cid field may be a field including the aforementioned LARGE_CIDS parameter and may indicate whether a short CID (0 to 15 (decimal number)) and an embedded CID (0 to 16383 (decimal number)) are used for configuration of the CID.

According to an embodiment of the present invention, ROHC_init_descriptor( ) may include the aforementioned FEEDBACK_FOR parameter and/or MRRU parameter.

FIG. 35 is a diagram illustrating configuration of Fast_Information_Chunk( ) including ROHC_init_descriptor( ) according to an embodiment of the present invention.

ROHC_init_descriptor( ) according to an embodiment of the present invention may be transmitted through a fast information channel (FIC). In this case, ROHC_init_descriptor( ) may be included in Fast_Information_Chunk( ) and transmitted. According to an embodiment of the present invention, ROHC_init_descriptor( ) may be included in a service level of Fast_Information_Chunk( ) and transmitted.

A field included in Fast_Information_Chunk( ) including ROHC_init_descriptor( ) according to an embodiment of the present invention has been described above.

ROHC_init_descriptor( ) according to an embodiment of the present invention may be changed in its term according to system configuration and changed in its size according to a system optimization situation.

Fast_Information_Chunk( ) according to an embodiment of the present invention may be referred to as fast information chunk.

FIG. 36 is a diagram illustrating configuration of Fast_Information_Chunk( ) including a parameter required for a RoHC initial procedure according to an embodiment of the present invention.

The parameter required for the RoHC initial procedure according to an embodiment of the present invention may be transmitted through a fast information channel (FIC). In this case, the parameter required for the RoHC initial procedure may be included in Fast_Information_Chunk( ) and transmitted. According to an embodiment of the present invention, the parameter required for the RoHC initial procedure may be included in a service level of Fast_Information_Chunk( ) and transmitted.

A field included in Fast_Information_Chunk( ) including the parameter required for the RoHC initial procedure according to an embodiment of the present invention has been described above.

The parameter required for the RoHC initial procedure according to an embodiment of the present invention may be changed in its term according to system configuration and changed in its size according to a system optimization situation.

FIG. 37 is a diagram illustrating configuration of Fast_Information_Chunk( ) including ROHC_init_descriptor( ) according to another embodiment of the present invention.

According to an embodiment of the present invention, when important information about a component included in a broadcast service is included in Fast_Information_Chunk( ) and transmitted, ROHC_init_descriptor( ) may be included in a component level of Fast_Information_Chunk( ) and transmitted. That is, ROHC_init_descriptor( ) may be transmitted for each respective component included in Fast_Information_Chunk( ).

A field included in Fast_Information_Chunk( ) including ROHC_init_descriptor( ) according to another embodiment of the present invention has been described above.

ROHC_init_descriptor( ) according to an embodiment of the present invention may be changed in its term according to system configuration and changed in its size according to a system optimization situation.

FIG. 38 is a diagram illustrating configuration of Fast_Information_Chunk( ) including a parameter required for a RoHC initial procedure according to another embodiment of the present invention.

According to an embodiment of the present invention, when important information about a component included in a broadcast service is included in Fast_Information_Chunk( ) and transmitted, a parameter required for the RoHC initial procedure may be included in a component level of Fast_Information_Chunk( ) and transmitted. That is, the parameter required for the RoHC initial procedure may be transmitted or each respective component included in Fast_Information_Chunk( ).

A field included in Fast_Information_Chunk( ) including a parameter required for the RoHC initial procedure according to another embodiment of the present invention has been described above.

The parameter required for the RoHC initial procedure according to an embodiment of the present invention may be changed in its term according to system configuration and changed in its size according to a system optimization situation.

Figure 39:
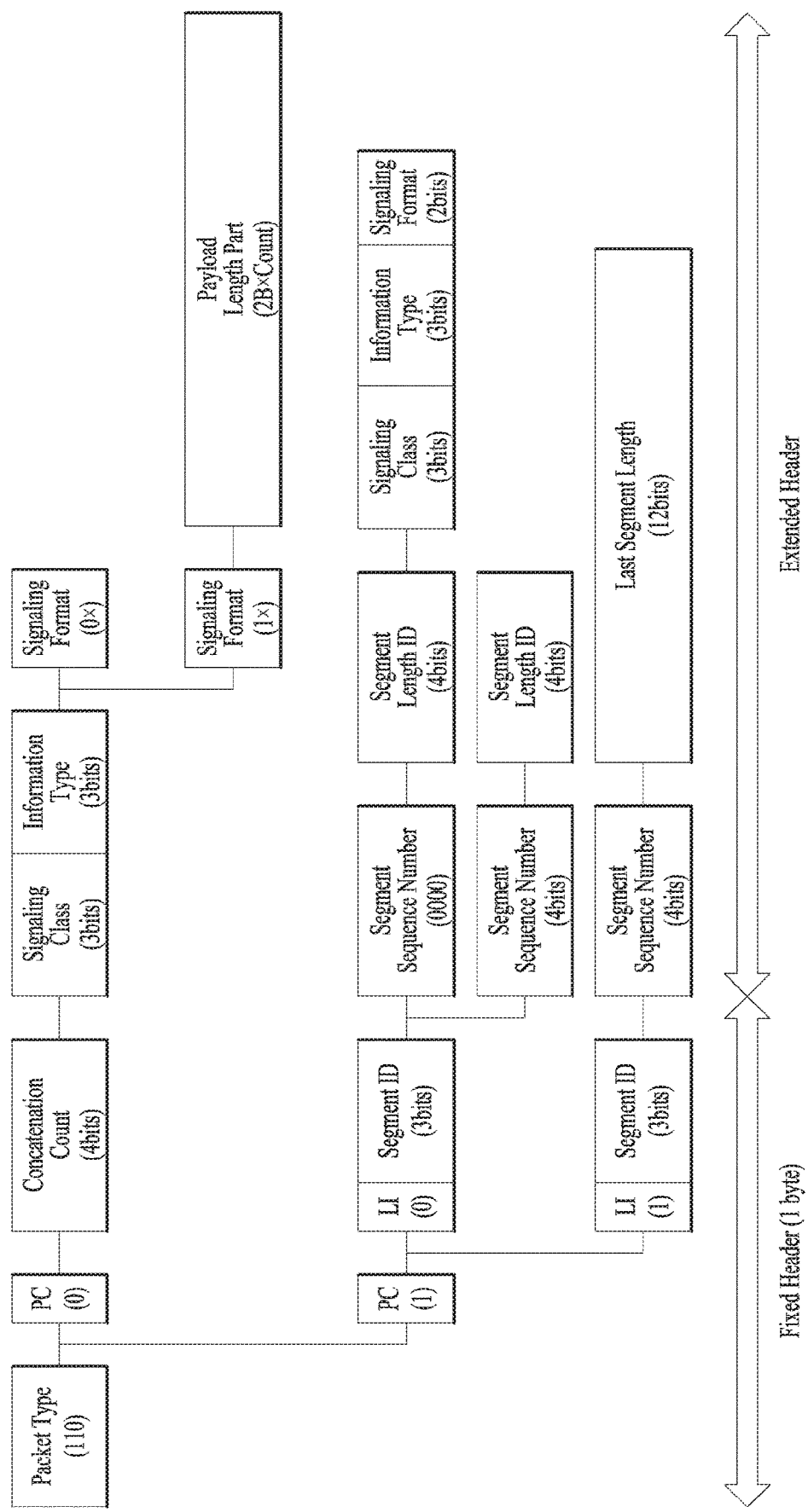
FIG. 39 illustrates a configuration of a header of a packet for signaling according to an embodiment of the present invention.

FIG. 39 illustrates a configuration of a header of a packet for signaling according to an embodiment of the present invention. The packet for signaling according to the present embodiment may be referred to as a link layer packet or a signaling packet. The link layer packet according to the present embodiment may include a link layer packet header and a link layer packet payload. In addition, as illustrated in FIG. 22, a packet header of the link layer packet according to the present embodiment may include a fixed header and an extended header. A length of the fixed header may be restricted to 1 byte. Therefore, in an embodiment of the present invention, additional signaling information may be transmitted through the extended header. The fixed header may include a 3-bit packet type field and a 1-bit packet configuration (PC) field. FIG. 22 illustrates a relation between fields and signaling fields transmitted through the fixed header and the extended header included in the link layer packet when the packet type field is set to "110". Hereinafter, a description will be given of the signaling fields included in FIG. 22.

The fixed header and/or the extended header according to the present embodiment may have a configuration varying with a value of the PC field.

The PC field is a field that indicates a packet configuration. In particular, the PC field may indicate processing of signaling information (or data) which is included in the link layer packet payload and/or the length of the extended header information according to the processing of signaling information (or data).

When the PC field has a value "0", the fixed header may include a 4-bit concatenation count field.

The concatenation count field is a field that is present when only a descriptor other than a section table is transmitted as a signal. The concatenation count (count) field indicates the number of descriptors included in the link layer packet payload. According to the present embodiment, descriptors, the number of which equals a value obtained by adding 1 to a value of the concatenation count (count) field, may be included in one link layer packet payload. Therefore, since the number of bits allocated to the concatenation count (count) field corresponds to 3 bits, signaling may be performed such that a maximum of eight descriptors are configured as one link layer packet.

When the PC field has a value of "1", the fixed header may include a 1-bit last segment indicator (LI) field and a 3-bit segment ID field.

The LI field may indicate whether the link layer packet includes last segmentation signaling data. In other words, signaling data may be segmented and transmitted. When the LI field has a value of "0", the value indicates that signaling data included in a current link layer packet does not correspond to a last segment. When the LI field has a value of "1", the value indicates that the signaling data included in the current link layer packet corresponds to the last segment.

The segment ID field may indicate an ID for identification of a segment when signaling data is segmented.

The extended header according to the present embodiment may have a configuration varying with the configuration of the fixed header.

However, as illustrated in the figure, the extended header according to the present embodiment may include a signaling class field, an information type field, and a signaling format field irrespective of the configuration of the fixed header. The field that is included in the extended header according to an embodiment of the present invention may be applied other layers. This may be changed by a designer.

The signaling class field according to the present embodiment may indicate a class of signaling included in the link layer packet payload. Specifically, the packet header according to the present embodiment may be used for one of signaling for channel scan and service acquisition, signaling for emergency alert, and signaling for header compression. When each of the signaling instances is used, the link layer packet payload according to the present embodiment may transmit associated signaling information. In addition, the signaling class field according to the present embodiment may have a length of 3 bits, which may be changed by a designer. Details will be described below.

The information type field according to the present embodiment may have a length of 2 bits or 3 bits, and indicate a type of signaling information included in the link layer packet payload. This may be changed by a designer. Details will be described below.

The signaling format field according to the present embodiment may have a length of 3 bits, which may be changed by a designer.

The signaling format field may indicate the format of signaling data included in a link layer packet payload.

As described in the foregoing, when the PC field has a value of "0", the extended header according to the present embodiment may include the signaling class field, the information type field, and the signaling format field. In this case, the extended header according to the present embodiment may include a payload length part field according to a value of the signaling format field.

A value that indicates a whole length of the link layer packet or a value that indicates a length of the payload of the link layer packet may be allocated to the above-described payload length part field depending on system configuration.

In addition, when the PC field has a value of "1", the extended header according to the present embodiment may include a 4-bit segment sequence number (Seg_SN) field.

When the LI field has a value of "0", the extended header according to the present embodiment may include a 4-bit Seg_SN field, a 4-bit segment length ID field, the signaling class field, the information type field, and the signaling format field.

When the signaling data is segmented, the segment sequence number field indicates an order of respective segments. A head of the signaling data includes an index of a corresponding data table, and thus the respective segments segmented when a receiver receives the packet need to be aligned in order. Link layer packets having payloads segmented from one piece of signaling data have the same segment ID and may have different segment sequence numbers.

The segment length ID field may indicate a length of a corresponding segment.

When the L1 field has a value of "1", the extended header according to the present embodiment may include a 4-bit Seg_SN field and a 12-bit last segment length field. The Seg_SN field may indicate an order of a segment corresponding to a last segment ID, and the last segment length field may indicate a length of the corresponding segment.

FIG. 40 is a chart that defines the signaling class field according to the present embodiment.

A left column of the chart indicates a value of a 3-bit signaling class field, and a right column of the chart indicates a description of a type of signaling of a packet header indicated by a value of each signaling class field.

Hereinafter, a description will be given of the value of each signaling class field.

When the signaling class field has a value of "000", signaling of the packet payload corresponds to the signaling for channel scan and service acquisition. As illustrated in the figure, the description may correspond to "Signaling for Channel Scan and Service Acquisition". In this case, the link layer packet payload may transmit signaling information related to channel scan and service acquisition.

When the signaling class field has a value of "001", signaling of the packet header corresponds to the signaling for emergency alert. As illustrated in the figure, the description may correspond to "Signaling for Emergency Alert". In this case, the link layer packet payload may transmit signaling information related to emergency alert.

When the signaling class field has a value of "010", signaling of the packet header corresponds to the signaling for header compression. As illustrated in the figure, the description may correspond to "Signaling for Header Compression". In this case, the link layer packet payload may transmit signaling information related to header compression.

When the signaling class field has values of "011" to "110", the packet header may be used for another type of signaling in the future. In this case, the description may correspond to "Reserved". In this case, the link layer packet payload according to the present embodiment may transmit information corresponding to signaling other than a signaling class proposed by the present invention in the future. A value corresponding to one of "011" to "110" may be allocated to the signaling class field.

When the signaling class field has a value of "111", the packet header may be used for two or more types of the above-described signaling. In this case, the description may correspond to "Various". Therefore, the link layer packet payload according to the present embodiment may transmit information corresponding to signaling which corresponds to two or more signaling classes.

FIG. 39 corresponds to a case used for the signaling for header compression. Here, the signaling class field corresponds to a value of "010".

FIG. 41 is a chart that defines an information type.

A left column of the chart indicates a value of a 3-bit information type field, and a right column of the chart indicates a description of a type of information transmitted by the packet payload indicated by a value of each information type field.

Specifically, FIG. 41 is a chart that defines an information type when the signaling class field according to the present embodiment has a value of "010". The information type may be indicated by a length of 3 bits. In addition, the information type may indicate a type of signaling information included in the link layer packet payload.

The description of each information type is as shown in the chart. Hereinafter, a value of the information type field will be described.

When the information type field has a value of "000", the description may correspond to "Initialization Information".

In this case, the link layer packet payload may include signaling information related to initialization information.

When the information type field has a value of "001", the description may correspond to "Configuration Parameters". In this case, the link layer packet payload may include signaling information related to configuration parameters.

When the information type field has a value of "010", the description may correspond to "Static Chain". In this case, the link layer packet payload may include signaling information related to a static chain.

When the information type field has a value of "011", the description may correspond to "Dynamic Chain".

FIG. 42 is a diagram illustrating a structure of Payload_for_Initialization( ) according to an embodiment of the present invention when an information type for header compression has a value of "000".

The initialization information may include information about a configuration of an RoHC channel between a compressor and a decompressor. The RoHC channel may transmit one or more context information items. All contexts transmitted by the RoHC channel may include common information. The RoHC channel may include one or a plurality of DPs.

Payload_for_Initialization( ) according to the present embodiment may include a num_RoHC_channels field, an RoHC_channel_id field, a max_cid field, a large_cids field, a num_profiles field, a profiles( ) field, a num_IP_stream field, and an IP_address( ) field.

The num_RoHC_channels field may indicate the number of RoHC channels for transmission of packets to which RoHC is applied. An RoHC channel may include one or a plurality of DPs. When the RoHC channel includes one DP, RoHC channel information may be replaced based on information of the DP. In this case, the num_RoHC_channels field may be replaced by a num_DP field.

The RoHC_channel_id field may indicate an ID of an RoHC channel for transmission of packets to which RoHC is applied. When the RoHC channel includes one DP, the RoHC_channel_id field may be replaced by a DP_id field.

The max_cid field may indicate a maximum value of a CID. A value of the max_cid field may be input to the decompressor.

The large_cids field includes the above-described large_cids field, and may indicate whether a short CID (0 to 15 (decimal number)) is used or an embedded CID (0 to 16383 (decimal number)) is used in a configuration of the CID.

The num_profiles field may include the number of profiles supportable by the RoHC channel.

The profiles( ) field may indicate a range of a header compression protocol in an RoHC process according to an embodiment of the present invention. In the RoHC process according to the present embodiment, the compressor may compress RoHC packets having the same profile into a stream, and the decompressor may restore the RoHC packets.

The num_IP_stream field may indicate the number of IP streams transmitted through the RoHC channel.

The IP_address field may indicate a destination address of a filtered IP stream which is input to an RoHC compressor.

FIG. 43 is a diagram illustrating a structure of Payload_for_ROHC_configuration( ) when the information type for header compression has a value of "001".

Payload_for_ROHC_configuration( ) according to the present embodiment may include a configuration parameter. The configuration parameter may indicate a configuration of each packet and a transmission mode of a context.

The configuration parameter according to the present embodiment may correspond to a field included in Payload_for_ROHC_configuration( ). The configuration parameter may indicate a packet configuration of each context and/or a transmission mode (transport mode) of the context. In this case, RoHC_channel_id may be used to identify the same context_ids transmitted through different RoHC channels.

Payload_for_ROHC_configuration( ) according to the present embodiment may include an RoHC_channel_id field, a context_id field, a packet_configuration_mode field, a context_transmission_mode field, and a context_profile field.

The context_id field may indicate a context ID of a corresponding RoHC packet stream. A length of the context ID may be determined in an initial process of configuring a system. Therefore, the length may be determined based on a structure of Payload_for_Initialization( ) according to the present embodiment.

The packet_configuration_mode field may indicate a configuration mode of a packet stream including a corresponding context.

The context_transmission_mode field indicates a transmission mode of a corresponding context, which is identical to the above-described transmission mode (or transport mode).

Description of the RoHC_channel_id field and the context_profile field included in Payload_for_ROHC_configuration( ) according to the present embodiment is similar to the above description.

FIG. 44 is a diagram illustrating a structure of Payload_for_static_chain( ) when the information type for header compression has a value of "010".

Payload_for_static_chain( ) according to the present embodiment may include a context_id field, a context_profile field, a static_chain_length field, a static_chain( ) field, a dynamic_chain_incl field, a dynamic_chain_length field, and a dynamic_chain_byte field.

The dynamic_chain_incl field may indicate whether information about a dynamic chain is transmitted together with information about a static chain. Description of the context_id field, the context_profile field, the static_chain_length field, the static_chain( ) field, the dynamic_chain_length field, and the dynamic_chain_byte field included in Payload_for_static_chain( ) according to the present embodiment is similar to the above description.

FIG. 45 is a diagram illustrating a structure of Payload_for_dynamic_chain( ) when the information type for header compression has a value of "011".

Payload_for_dynamic_chain( ) according to the present embodiment may include a context_id field, a context_profile field, a dynamic_chain_length field, and a dynamic_chain_byte field.

Description of the fields included in Payload_for_dynamic_chain( ) according to the present embodiment is similar to the above description.

Figure 46:
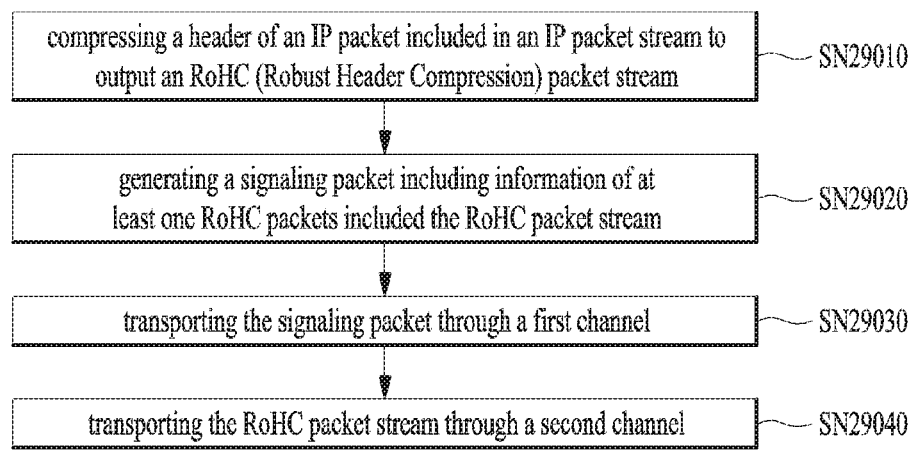
FIG. 46 is a flow chart illustrating a broadcast signal transmitting method according to an embodiment of the present invention.

FIG. 46 is a flow chart illustrating a broadcast signal transmitting method according to an embodiment of the present invention.

A broadcast signal transmitting method according to an embodiment of the present invention may be performed in the following order. First, the transmitting end may compress a header of an IP packet included in an IP packet stream to output an RoHC (Robust Header Compression) packet stream. (SN29010)

The processing of generating the RoHC packet stream and a configuration of each RoHC packet were previously described in detail with reference to FIGS. 18 to 38. Next, the transmitting end may generate a signaling packet including information of at least one RoHC packet included in the RoHC packet stream (SN29020), which was previously described in detail with reference to FIGS. 39 to 46. Next, the transmitting end may transport the signaling packet through a first channel. (SN29030) Next, the transmitting end may transport the RoHC packet stream through a second channel. (SN29040) The details of method for transmitting each packets was previously described in detail with reference to FIG. 4.

According to an embodiment of the present invention, the above described signaling packet may include a signaling packet header and a signaling packet payload. The signaling packet header may include signaling information included in the signaling packet payload.

The signaling packet header according to an embodiment of the present invention may include a fixed header and a extended header. The extended header may include a signaling class field and/or information type field. The signaling class field according to an embodiment of the present invention may indicate description related to channel scan and service acquisition, an emergency alert and a header compression. The information type field according to an embodiment of the present invention may locate after the signaling class field, and may indicate signaling information included in the signaling packet payload.

The signaling field included in the signaling packet header was previously described in detail reference with FIGS. 42 to 45.

Figure 47:
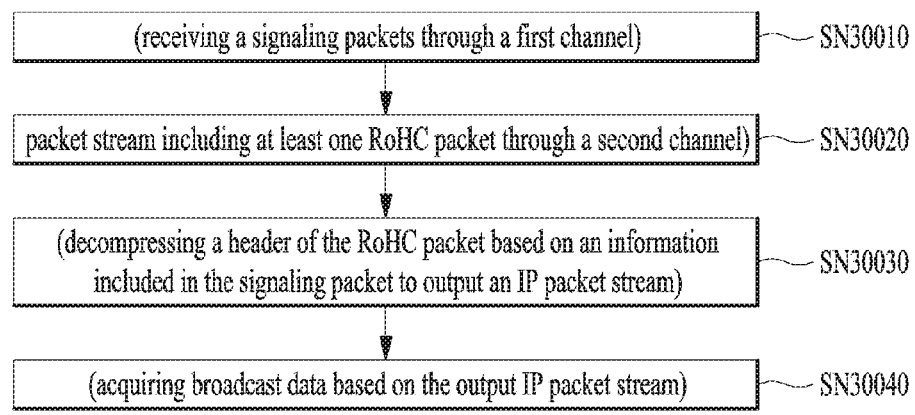
FIG. 47 is a flow chart illustrating a broadcast signal receiving method according to an embodiment of the present invention.

FIG. 47 is a flow chart illustrating a broadcast signal receiving method according to an embodiment of the present invention.

The broadcast signal receiving method according an embodiment of the present invention may correspond reverse processing of the broadcast signal transmitting method which was previously described in detail with reference to FIG. 46. In particular, the broadcast signal receiving method according an embodiment of the present invention may be performed in the following order. First, the receiving end may receive a signaling packets through a first channel. (SN30010) Next, the receiving end may receive a RoHC (Robust Header Compression) packet stream including at least one RoHC packet through a second channel, which was previously described in detail with reference to FIGS. 23 to 29. (SN30020) Next, the receiving end may decompress a header of the RoHC packet based on an information included in the signaling packet and may output an IP packet stream, which was previously described in detail with reference to FIGS. 27 to 29. (SN30030) Next, the receiving end may acquire broadcast data based on the output IP packet stream. (SN30040)

The broadcast signal receiving method according an embodiment of the present invention may process the signaling packet and RoHC packet stream which was previously describe in detail with reference FIG. 46. In particular, the signaling packet may include a signaling packet header and a signaling packet payload. The signaling packet header may include signaling information included in the signaling packet payload. The structure of the signaling packet and the signaling field included in the signaling packet was previously described in detail with reference FIG. 46.

Figure 48:
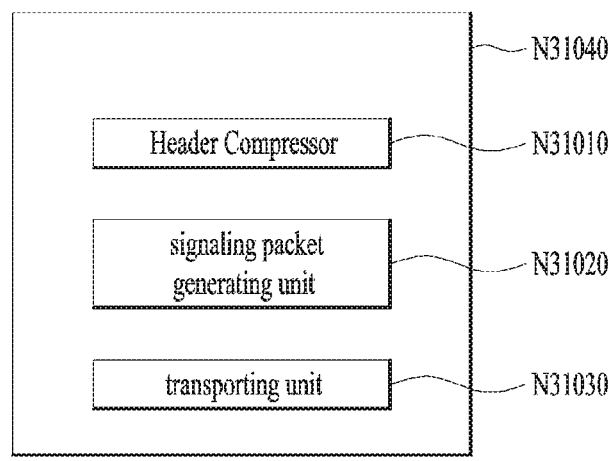
FIG. 48 is a diagram illustrating a broadcast signal transmitting apparatus according to an embodiment of the present invention.

FIG. 48 is a diagram illustrating a broadcast signal transmitting apparatus according to an embodiment of the present invention.

The broadcast signal transmitting apparatus (N31040) according to an embodiment of the present invention may include Header Compressor (N31010), signaling packet generating unit (N31020) and/or transporting unit (N31030). The broadcast signal transmitting apparatus (N31040) according to an embodiment of the present invention may perform the broadcast signal transmitting method which was previously described in detail with reference FIG. 46.

The header compressor (N31010) may compress a header of an IP packet included in an IP packet stream to output (or generate) a RoHC packet stream. The header compressor according to an embodiment of the present invention may referred to a RoHC compressor of header compression unit.

The signaling packet generating unit (N31020) may generate a signaling packet including information of at least one RoHC packets included the RoHC packet stream.

The transporting unit (N31030) may transport the signaling packet through a first channel and the RoHC packet stream through a second channel.

The units of the broadcast signal transmitting apparatus (N31040) were previously described in detail with reference to FIG. 22. Also, the units that may be included in the broadcast signal transmitting apparatus are not limited by drawings in present invention.

Figure 49:
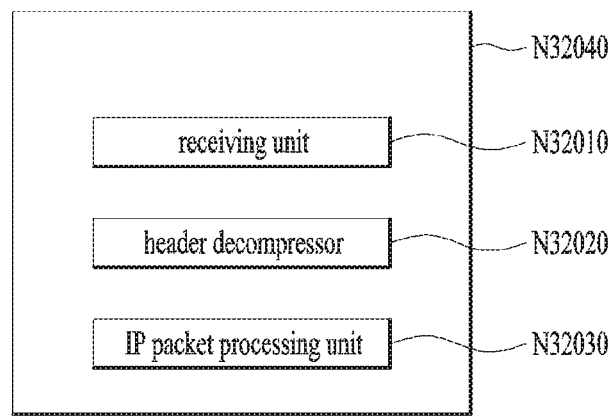
FIG. 49 is a diagram illustrating a broadcast signal receiving apparatus according to an embodiment of the present invention.

FIG. 49 is a diagram illustrating a broadcast signal receiving apparatus according to an embodiment of the present invention.

The broadcast signal receiving apparatus according to an embodiment of the present invention may perform reverse processing of the broadcast signal transmitting apparatus which was previously described in detail with reference to FIG. 48. Therefore, the broadcast signal receiving apparatus according to an embodiment of the present invention may perform the broadcast signal receiving method which was previously described in detail with reference to FIG. 47.

The broadcast signal receiving apparatus (N32040) according to an embodiment of the present invention may include a receiving unit (N32010), a header decompressor (N32020) and/or an IP packet processing unit (N32030).

The receiving unit (N32010) may receive a signaling packet through a first channel and receive a RoHC (Robust Header Compression) packet stream including at least one RoHC packet through a second channel.

The header decompressor (N32020) may decompress a header of the RoHC packet included in the restored RoHC packet stream to generate an IP packet stream. The header decompressor according to the embodiment of the present invention may be referred to as an RoHC decompressor.

The IP packet processing unit (N32030) may process the generated IP packet stream to acquire broadcast data.

The units of the broadcast signal receiving apparatus according to an embodiment of the present invention (N32040) were previously described in detail with reference to FIG. 22.

In addition, the units which may be included in the broadcast signal reception apparatus according to the embodiment of the present invention are not limited by this figure.

Figure 50:
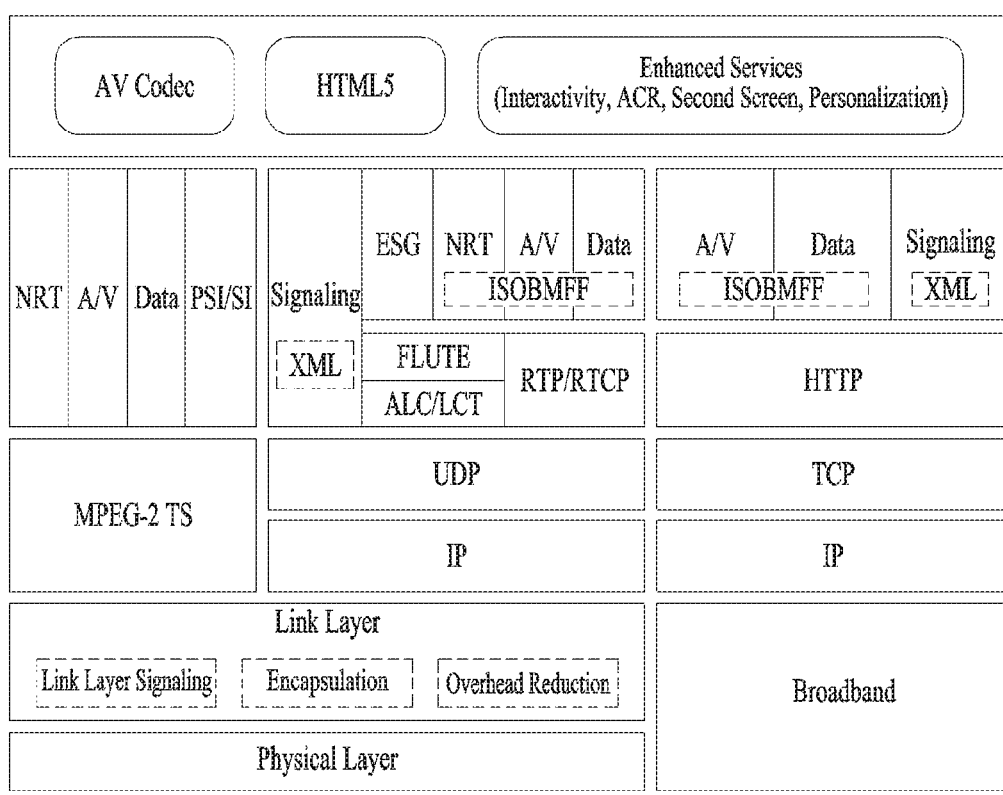
FIG. 50 is a view illustrating a protocol stack for a next generation broadcasting system according to an embodiment of the present invention.

FIG. 50 is a view showing a protocol stack for a next generation broadcasting system according to an embodiment of the present invention.

The broadcasting system according to the present invention may correspond to a hybrid broadcasting system in which an Internet Protocol (IP) centric broadcast network and a broadband are coupled.

The broadcasting system according to the present invention may be designed to maintain compatibility with a conventional MPEG-2 based broadcasting system.

The broadcasting system according to the present invention may correspond to a hybrid broadcasting system based on coupling of an IP centric broadcast network, a broadband network, and/or a mobile communication network (or a cellular network).

Referring to the figure, a physical layer may use a physical protocol adopted in a broadcasting system, such as an ATSC system and/or a DVB system. For example, in the physical layer according to the present invention, a transmitter/receiver may transmit/receive a terrestrial broadcast signal and convert a transport frame including broadcast data into an appropriate form.

In an encapsulation layer, an IP datagram is acquired from information acquired from the physical layer or the acquired IP datagram is converted into a specific frame (for example, an RS Frame, GSE-lite, GSE, or a signal frame). The frame main include a set of IP datagrams. For example, in the encapsulation layer, the transmitter include data processed from the physical layer in a transport frame or the receiver extracts an MPEG-2 TS and an IP datagram from the transport frame acquired from the physical layer.

A fast information channel (FIC) includes information (for example, mapping information between a service ID and a frame) necessary to access a service and/or content. The FIC may be named a fast access channel (FAC).

The broadcasting system according to the present invention may use protocols, such as an Internet Protocol (IP), a User Datagram Protocol (UDP), a Transmission Control Protocol (TCP), an Asynchronous Layered Coding/Layered Coding Transport (ALC/LCT), a Rate Control Protocol/RTP Control Protocol (RCP/RTCP), a Hypertext Transfer Protocol (HTTP), and a File Delivery over Unidirectional Transport (FLUTE). A stack between these protocols may refer to the structure shown in the figure.

In the broadcasting system according to the present invention, data may be transported in the form of an ISO based media file format (ISOBMFF). An Electrical Service Guide (ESG), Non Real Time (NRT), Audio/Video (A/V), and/or general data may be transported in the form of the ISOBMFF.

Transport of data through a broadcast network may include transport of a linear content and/or transport of a non-linear content.

Transport of RTP/RTCP based A/V and data (closed caption, emergency alert message, etc.) may correspond to transport of a linear content.

An RTP payload may be transported in the form of an RTP/AV stream including a Network Abstraction Layer (NAL) and/or in a form encapsulated in an ISO based media file format. Transport of the RTP payload may correspond to transport of a linear content. Transport in the form encapsulated in the ISO based media file format may include an MPEG DASH media segment for A/V, etc.

Transport of a FLUTE based ESG, transport of non-timed data, transport of an NRT content may correspond to transport of a non-linear content. These may be transported in an MIME type file form and/or a form encapsulated in an ISO based media file format. Transport in the form encapsulated in the ISO based media file format may include an MPEG DASH media segment for A/V, etc.

Transport through a broadband network may be divided into transport of a content and transport of signaling data.

Transport of the content includes transport of a linear content (A/V and data (closed caption, emergency alert message, etc.)), transport of a non-linear content (ESG, non-timed data, etc.), and transport of a MPEG DASH based Media segment (A/V and data).

Transport of the signaling data may be transport including a signaling table (including an MPD of MPEG DASH) transported through a broadcasting network.

In the broadcasting system according to the present invention, synchronization between linear/non-linear contents transported through the broadcasting network or synchronization between a content transported through the broadcasting network and a content transported through the broadband may be supported. For example, in a case in which one UD content is separately and simultaneously transported through the broadcasting network and the broadband, the receiver may adjust the timeline dependent upon a transport protocol and synchronize the content through the broadcasting network and the content through the broadband to reconfigure the contents as one UD content.

An applications layer of the broadcasting system according to the present invention may realize technical characteristics, such as Interactivity, Personalization, Second Screen, and automatic content recognition (ACR). These characteristics are important in extension from ATSC 2.0 to ATSC 3.0. For example, HTML5 may be used for a characteristic of interactivity.

In a presentation layer of the broadcasting system according to the present invention, HTML and/or HTML5 may be used to identify spatial and temporal relationships between components or interactive applications.

In the present invention, signaling includes signaling information necessary to support effective acquisition of a content and/or a service. Signaling data may be expressed in a binary or XMK form. The signaling data may be transmitted through the terrestrial broadcasting network or the broadband.

A real-time broadcast A/V content and/or data may be expressed in an ISO Base Media File Format, etc. In this case, the A/V content and/or data may be transmitted through the terrestrial broadcasting network in real time and may be transmitted based on IP/UDP/FLUTE in non-real time. Alternatively, the broadcast A/V content and/or data may be received by receiving or requesting a content in a streaming mode using Dynamic Adaptive Streaming over HTTP (DASH) through the Internet in real time. In the broadcasting system according to the embodiment of the present invention, the received broadcast A/V content and/or data may be combined to provide various enhanced services, such as an Interactive service and a second screen service, to a viewer.

In a hybrid-based broadcast system of a TS and an IP stream, a link layer may be used to transmit data having a TS or IP stream type. When various types of data are to be transmitted through a physical layer, the link layer may convert the data into a format supported by the physical layer and deliver the converted data to the physical layer. In this way, the various types of data may be transmitted through the same physical layer. Here, the physical layer may correspond to a step of transmitting data using an MIMO/MISO scheme or the like by interleaving, multiplexing, and/or modulating the data.

The link layer needs to be designed such that an influence on an operation of the link layer is minimized even when a configuration of the physical layer is changed. In other words, the operation of the link layer needs to be configured such that the operation may be compatible with various physical layers.

The present invention proposes a link layer capable of independently operating irrespective of types of an upper layer and a lower layer. In this way, it is possible to support various upper layers and lower layers. Here, the upper layer may refer to a layer of a data stream such as a TS stream, an IP stream, or the like. Here, the lower layer may refer to the physical layer. In addition, the present invention proposes a link layer having a correctable structure in which a function supportable by the link layer may be extended/added/deleted. Moreover, the present invention proposes a scheme of including an overhead reduction function in the link layer such that radio resources may be efficiently used.

In this figure, protocols and layers such as IP, UDP, TCP, ALC/LCT, RCP/RTCP, HTTP, FLUTE, and the like are as described above.

In this figure, a link layer t88010 may be another example of the above-described data link (encapsulation) part. The present invention proposes a configuration and/or an operation of the link layer t88010. The link layer t88010 proposed by the present invention may process signaling necessary for operations of the link layer and/or the physical layer. In addition, the link layer t88010 proposed by the present invention may encapsulate TS and IP packets and the like, and perform overhead reduction in this process.

The link layer t88010 proposed by the present invention may be referred to by several terms such as data link layer, encapsulation layer, layer 2, and the like. According to a given embodiment, a new term may be applied to the link layer and used.

Figure 51:
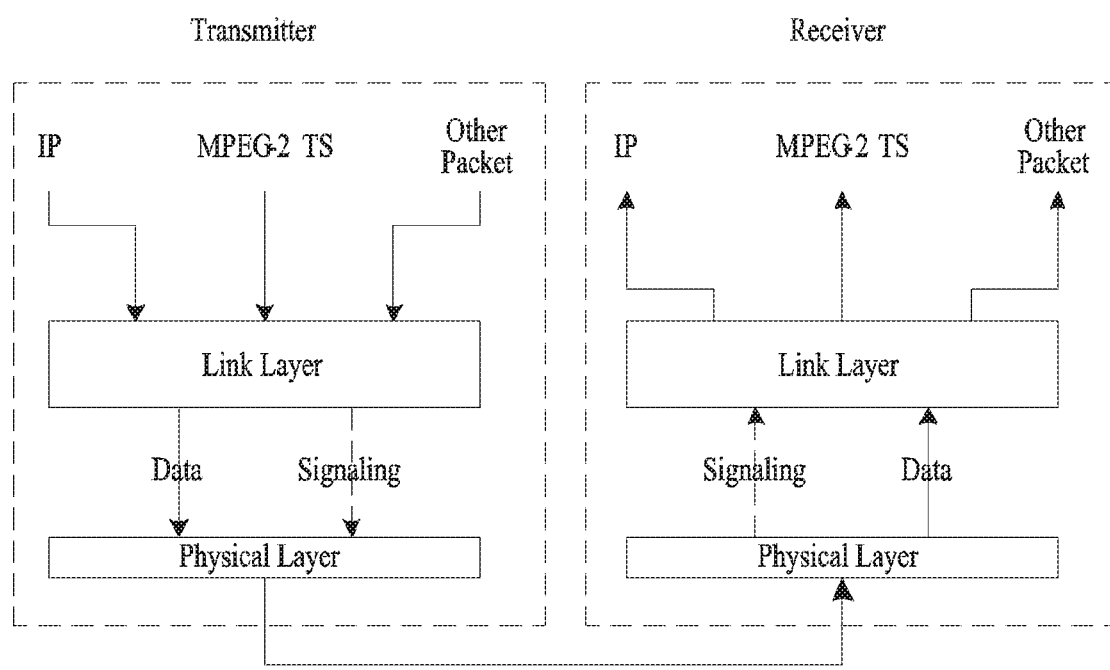
FIG. 51 is a view illustrating the interface of a link layer according to an embodiment of the present invention.
Figure 52:
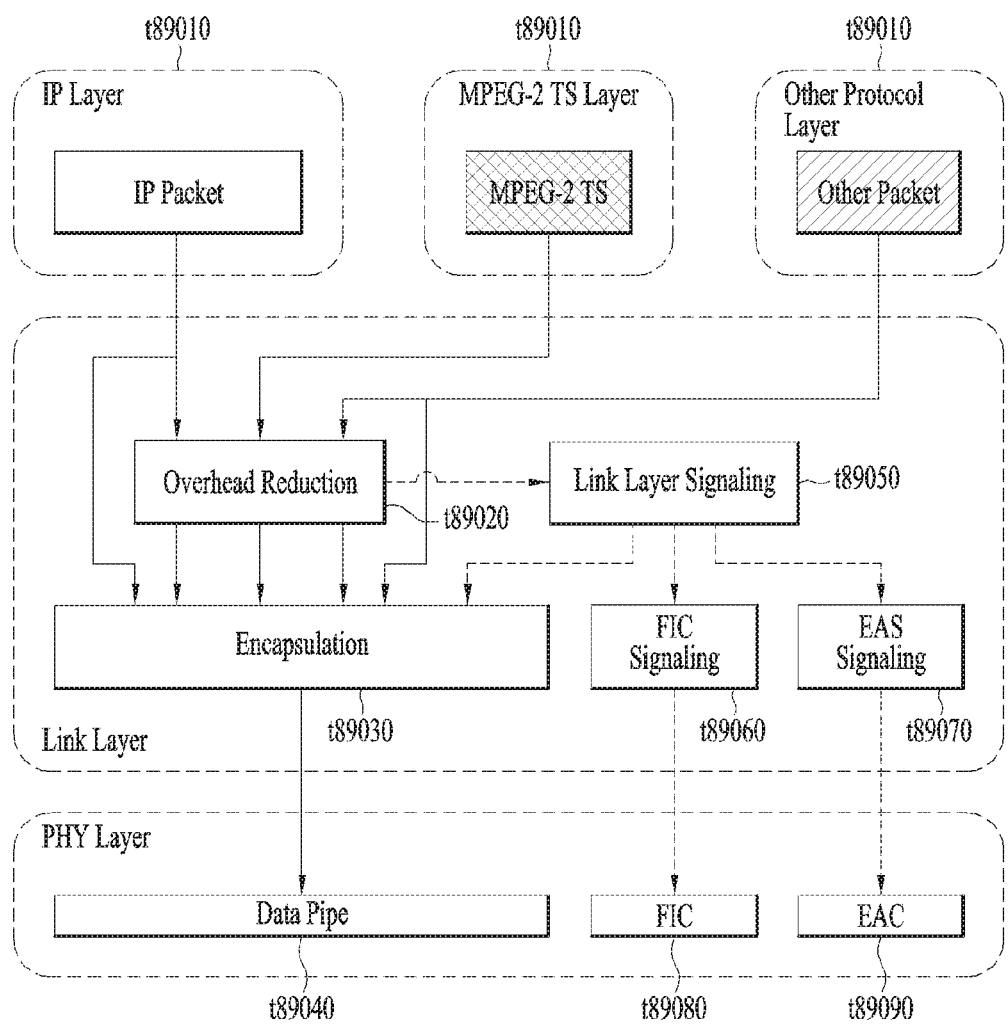
FIG. 52 is a view illustrating an operation diagram of a normal mode, which is one of the operation modes of a link layer according to an embodiment of the present invention.

FIG. 51 is a conceptual diagram illustrating an interface of a link layer according to an embodiment of the present invention.

Referring to FIG. 71, the transmitter may consider an exemplary case in which IP packets and/or MPEG-2 TS packets mainly used in the digital broadcasting are used as input signals. The transmitter may also support a packet structure of a new protocol capable of being used in the next generation broadcast system. The encapsulated data of the link layer and signaling information may be transmitted to a physical layer. The transmitter may process the transmitted data (including signaling data) according to the protocol of a physical layer supported by the broadcast system, such that the transmitter may transmit a signal including the corresponding data.

On the other hand, the receiver may recover data and signaling information received from the physical layer into other data capable of being processed in a upper layer. The receiver may read a header of the packet, and may determine whether a packet received from the physical layer indicates signaling information (or signaling data) or recognition data (or content data).

The signaling information (i.e., signaling data) received from the link layer of the transmitter may include first signaling information that is received from an upper layer and needs to be transmitted to an upper layer of the receiver; second signaling information that is generated from the link layer and provides information regarding data processing in the link layer of the receiver; and/or third signaling information that is generated from the upper layer or the link layer and is transferred to quickly detect specific data (e.g., service, content, and/or signaling data) in a physical layer.

Figure 82:
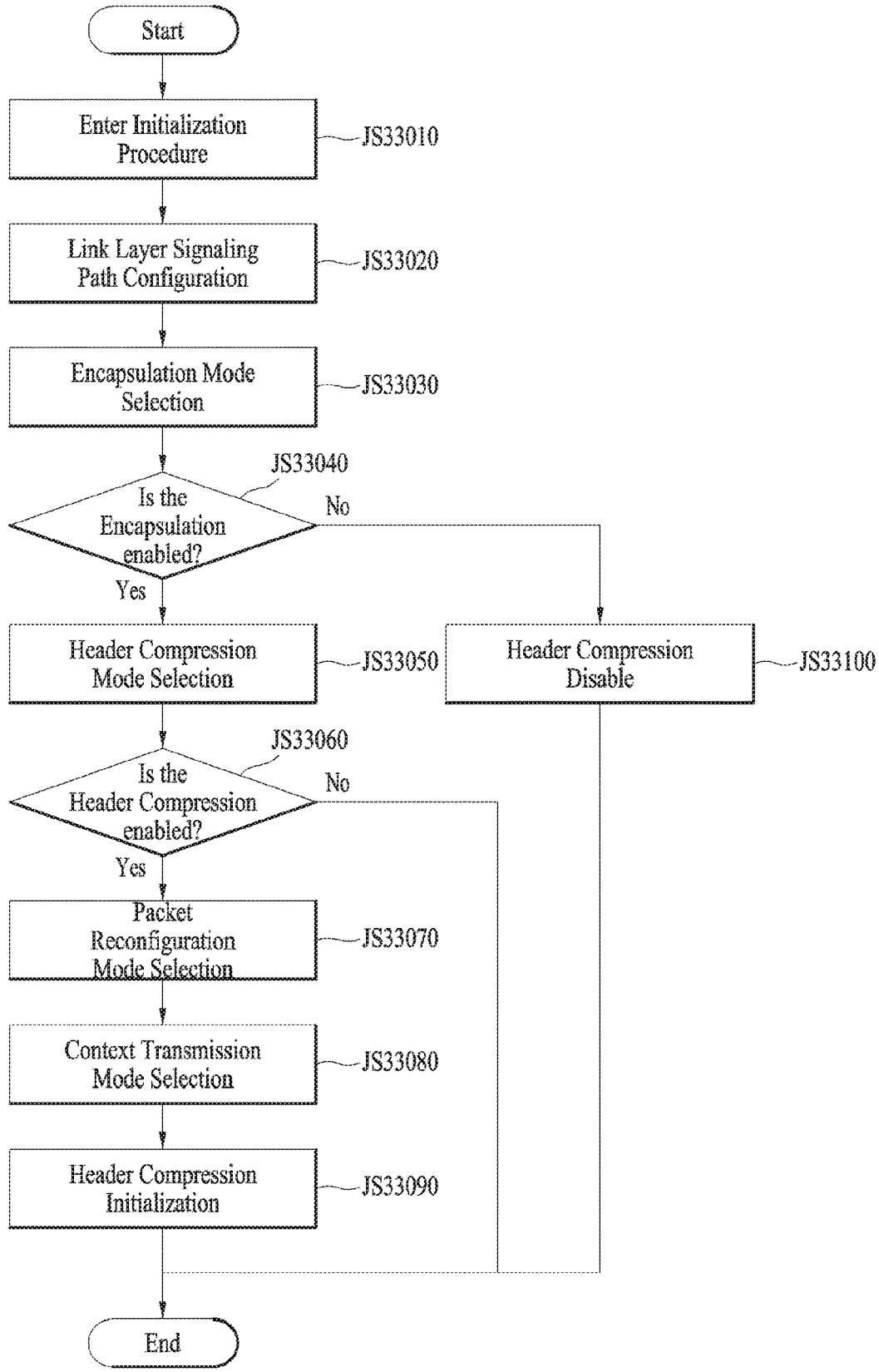
FIG. 82 is a flowchart illustrating a link layer initialization procedure according to another embodiment of the present invention.

FIG. 82 illustrates an operation in a normal mode corresponding to one of operation modes of a link layer according to an embodiment of the present invention.

The link layer proposed by the present invention may have various operation modes for compatibility between an upper layer and a lower layer. The present invention proposes a normal mode and a transparent mode of the link layer. Both the operation modes may coexist in the link layer, and an operation mode to be used may be designated using signaling or a system parameter. According to a given embodiment, one of the two operation modes may be implemented. Different modes may be applied according to an IP layer, a TS layer, and the like input to the link layer. In addition, different modes may be applied for each stream of the IP layer and for each stream of the TS layer.

According to a given embodiment, a new operation mode may be added to the link layer. The new operation mode may be added based on configurations of the upper layer and the lower layer. The new operation mode may include different interfaces based on the configurations of the upper layer and the lower layer. Whether to use the new operation mode may be designated using signaling or a system parameter.

In the normal mode, data may be processed through all functions supported by the link layer, and then delivered to a physical layer.

First, each packet may be delivered to the link layer from an IP layer, an MPEG-2 TS layer, or another particular layer t89010. In other words, an IP packet may be delivered to the link layer from an IP layer. Similarly, an MPEG-2 TS packet may be delivered to the link layer from the MPEG-2 TS layer, and a particular packet may be delivered to the link layer from a particular protocol layer.

Each of the delivered packets may go through or not go through an overhead reduction process t89020, and then go through an encapsulation process t89030.

First, the IP packet may go through or not go through the overhead reduction process t89020, and then go through the encapsulation process t89030. Whether the overhead reduction process t89020 is performed may be designated by signaling or a system parameter. According to a given embodiment, the overhead reduction process t89020 may be performed or not performed for each IP stream. An encapsulated IP packet may be delivered to the physical layer.

Second, the MPEG-2 TS packet may go through the overhead reduction process t89020, and go through the encapsulation process t89030. The MPEG-2 TS packet may not be subjected to the overhead reduction process t89020 according to a given embodiment. However, in general, a TS packet has sync bytes (0x47) and the like at the front and thus it may be efficient to eliminate such fixed overhead. The encapsulated TS packet may be delivered to the physical layer.

Third, a packet other than the IP or TS packet may or may not go through the overhead reduction process t89020, and then go through the encapsulation process t89030. Whether or not the overhead reduction process t89020 is performed may be determined according to characteristics of the corresponding packet. Whether the overhead reduction process t89020 is performed may be designated by signaling or a system parameter. The encapsulated packet may be delivered to the physical layer.

In the overhead reduction process t89020, a size of an input packet may be reduced through an appropriate scheme. In the overhead reduction process t89020, particular information may be extracted from the input packet or generated. The particular information is information related to signaling, and may be transmitted through a signaling region. The signaling information enables a receiver to restore an original packet by restoring changes due to the overhead reduction process t89020. The signaling information may be delivered to a link layer signaling process t89050.

The link layer signaling process t89050 may transmit and manage the signaling information extracted/generated in the overhead reduction process t89020. The physical layer may have physically/logically divided transmission paths for signaling, and the link layer signaling process t89050 may deliver the signaling information to the physical layer according to the divided transmission paths. Here, the above-described FIC signaling process t89060, EAS signaling process t89070, or the like may be included in the divided transmission paths. Signaling information not transmitted through the divided transmission paths may be delivered to the physical layer through the encapsulation process t89030.

Signaling information managed by the link layer signaling process t89050 may include signaling information delivered from the upper layer, signaling information generated in the link layer, a system parameter, and the like. Specifically, the signaling information may include signaling information delivered from the upper layer to be subsequently delivered to an upper layer of the receiver, signaling information generated in the link layer to be used for an operation of a link layer of the receiver, signaling information generated in the upper layer or the link layer to be used for rapid detection in a physical layer of the receiver, and the like.

Data going through the encapsulation process t89030 and delivered to the physical layer may be transmitted through a data pipe (DP) t89040. Here, the DP may be a physical layer pipe (PLP). Signaling information delivered through the above-described divided transmission paths may be delivered through respective transmission paths. For example, an FIC signal may be transmitted through an FIC t89080 designated in a physical frame. In addition, an EAS signal may be transmitted through an EAC t89090 designated in a physical frame. Information about presence of a dedicated channel such as the FIC, the EAC, or the like may be transmitted to a preamble area of the physical layer through signaling, or signaled by scrambling a preamble using a particular scrambling sequence. According to a given embodiment, FIC signaling/EAS signaling information may be transmitted through a general DP area, PLS area, or preamble rather than a designated dedicated channel.

The receiver may receive data and signaling information through the physical layer. The receiver may restore the received data and signaling information into a form processable in the upper layer, and deliver the restored data and signaling information to the upper layer. This process may be performed in the link layer of the receiver. The receiver may verify whether a received packet is related to the signaling information or the data by reading a header of the packet and the like. In addition, when overhead reduction is performed at a transmitter, the receiver may restore a packet, overhead of which has been reduced through the overhead reduction process, to an original packet. In this process, the received signaling information may be used.

Figure 53:
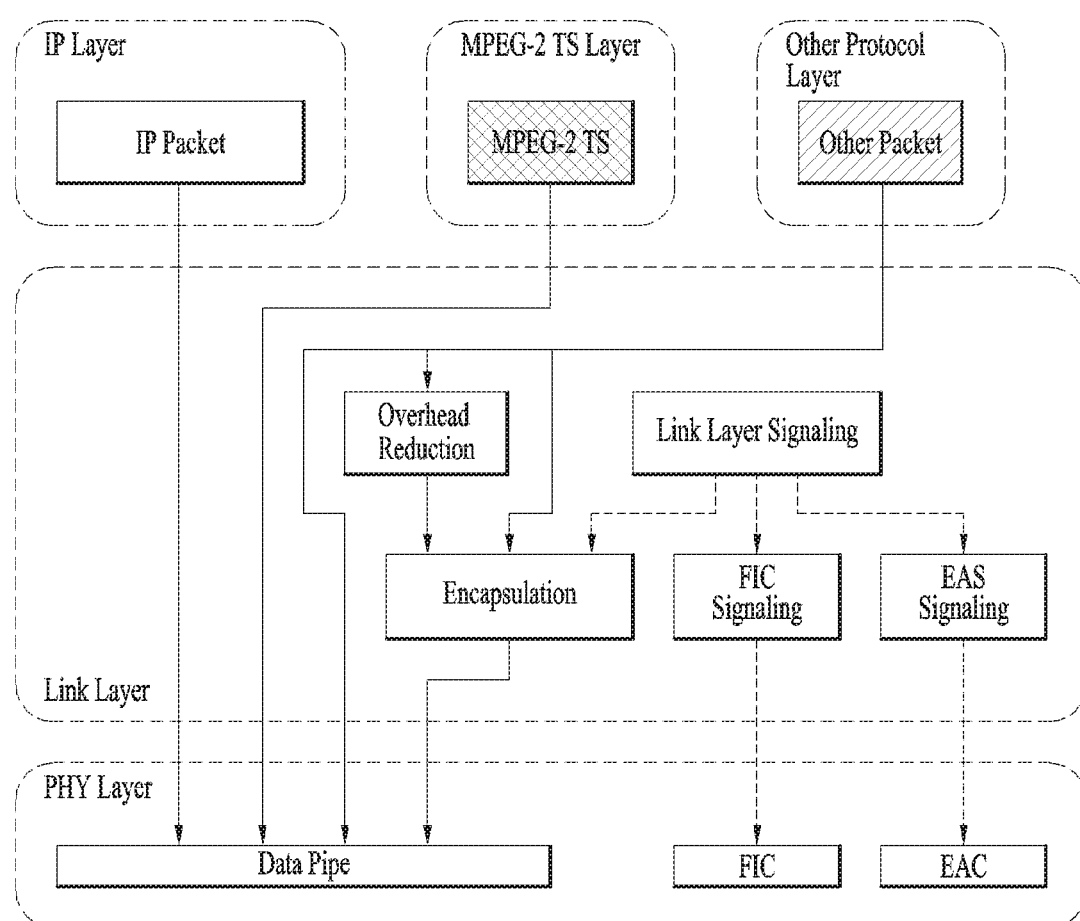
FIG. 53 is a view illustrating an operation diagram of a transparent mode, which is one of the operation modes of a link layer according to an embodiment of the present invention.
Figure 54:
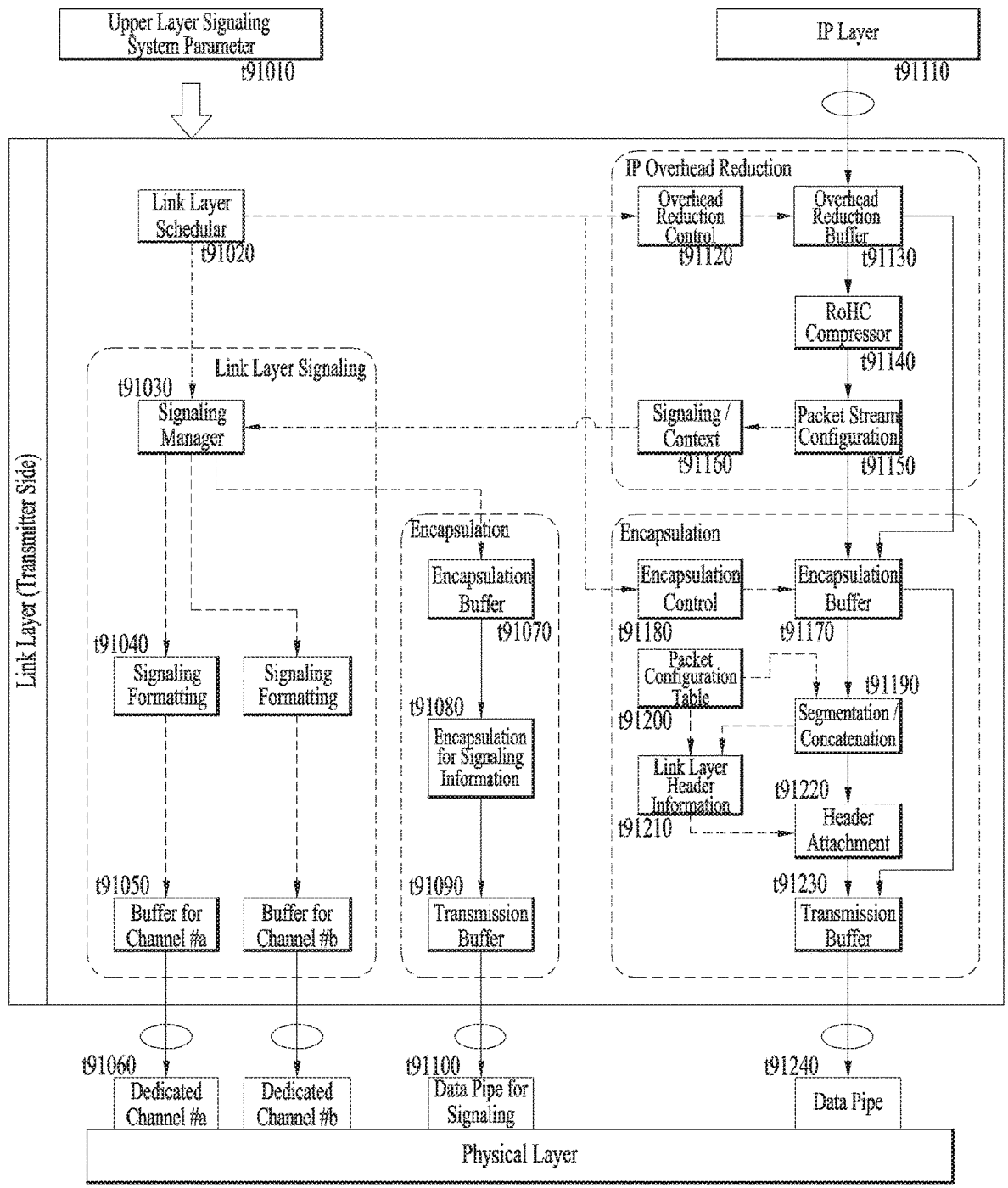
FIG. 54 is a view illustrating the structure of a link layer on a transmitter side according to an embodiment of the present invention (normal mode)

FIG. 53 illustrates an operation in a transparent mode corresponding to one of operation modes of a link layer according to an embodiment of the present invention.

In the transparent mode, data may not be subjected to functions supported by the link layer or may be subjected to some of the functions, and then delivered to a physical layer. In other words, in the transparent mode, a packet delivered to an upper layer may be delivered to a physical layer without going through a separate overhead reduction and/or encapsulation process. Other packets may go through the overhead reduction and/or encapsulation process as necessary. The transparent mode may be referred to as a bypass mode, and another term may be applied to the transparent mode.

According to a given embodiment, some packets may be processed in the normal mode and some packets may be processed in the transparent mode based on characteristics of the packets and a system operation.

A packet to which the transparent mode may be applied may be a packet having a type well known to a system. When the packet may be processed in the physical layer, the transparent mode may be used. For example, a well-known TS or IP packet may go through separate overhead reduction and input formatting processes in the physical layer and thus the transparent mode may be used in a link layer step. When the transparent mode is applied and a packet is processed through input formatting and the like in the physical layer, an operation such as the above-described TS header compression may be performed in the physical layer. On the other hand, when the normal mode is applied, a processed link layer packet may be treated as a GS packet and processed in the physical layer.

In the transparent mode, a link layer signaling module may be included when signal transmission needs to be supported. As described above, the link layer signaling module may transmit and manage signaling information. The signaling information may be encapsulated and transmitted through a DP, and FIC signaling information and EAS signaling information having divided transmission paths may be transmitted through an FIC and an EAC, respectively.

In the transparent mode, whether information corresponds to signaling information may be displayed using a fixed IP address and port number. In this case, the signaling information may be filtered to configure a link layer packet, and then transmitted through the physical layer.

FIG. 84 illustrates a configuration of a link layer at a transmitter according to an embodiment of the present invention (normal mode).

The present embodiment is an embodiment presuming that an IP packet is processed. The link layer at the transmitter may largely include a link layer signaling part for processing signaling information, an overhead reduction part, and/or an encapsulation part from a functional perspective. The link layer at the transmitter may further include a scheduler t91020 for a control of the entire operation of the link layer and scheduling, input and output parts of the link layer, and/or the like.

First, upper layer signaling information and/or system parameter t91010 may be delivered to the link layer. In addition, an IP stream including IP packets may be delivered to the link layer from an IP layer t91110.

As described above, the scheduler t91020 may determine and control operations of several modules included in the link layer. The delivered signaling information and/or system parameter t91010 may be filtered or used by the scheduler t91020. Information corresponding to a part of the delivered signaling information and/or system parameter t91010 and necessary for a receiver may be delivered to the link layer signaling part. In addition, information corresponding to a part of the signaling information and necessary for an operation of the link layer may be delivered to an overhead reduction control block t91120 or an encapsulation control block t91180.

The link layer signaling part may collect information to be transmitted as signaling in the physical layer, and transform/configure the information in a form suitable for transmission. The link layer signaling part may include a signaling manager t91030, a signaling formatter t91040, and/or a buffer for channels t91050.

The signaling manager t91030 may receive signaling information delivered from the scheduler t91020, signaling delivered from the overhead reduction part, and/or context information. The signaling manager t91030 may determine paths for transmission of the signaling information with respect to delivered data. The signaling information may be delivered through the paths determined by the signaling manager t91030. As described in the foregoing, signaling information to be transmitted through divided channels such as an FIC, an EAS, and the like may be delivered to the signaling formatter t91040, and other signaling information may be delivered to an encapsulation buffer t91070.

The signaling formatter t91040 may format associated signaling information in forms suitable for respective divided channels so that the signaling information may be transmitted through separately divided channels. As described in the foregoing, the physical layer may include physically/logically divided separate channels. The divided channels may be used to transmit FIC signaling information or EAS-related information. The FIC or EAS-related information may be divided by the signaling manager t91030 and input to the signaling formatter t91040. The signaling formatter t91040 may format information such that the information is suitable for respective separate channels. Besides the FIC and the EAS, when the physical layer is designed to transmit particular signaling information through separately divided channels, a signaling formatter for the particular signaling information may be added. Through this scheme, the link layer may be compatible with various physical layers.

The buffer for channels t91050 may deliver signaling information delivered from the signaling formatter t91040 to designated dedicated channels t91060. The number and content of the dedicated channels t91060 may vary depending on an embodiment.

As described in the foregoing, the signaling manager t91030 may deliver signaling information which is not delivered to a dedicated channel to the encapsulation buffer t91070. The encapsulation buffer t91070 may function as a buffer that receives the signaling information not delivered to the dedicated channel.

An encapsulation for signaling information t91080 may encapsulate the signaling information not delivered to the dedicated channel. A transmission buffer t91090 may function as a buffer that delivers the encapsulated signaling information to a DP for signaling information t91100. Here, the DP for signaling information t91100 may refer to the above-described PLS area.

The overhead reduction part may allow efficient transmission by eliminating overhead of packets delivered to the link layer. It is possible to configure overhead reduction parts, the number of which is the same as the number of IP streams input to the link layer.

An overhead reduction buffer t91130 may receive an IP packet delivered from an upper layer. The delivered IP packet may be input to the overhead reduction part through the overhead reduction buffer t91130.

An overhead reduction control block t91120 may determine whether to perform overhead reduction on a packet stream input to the overhead reduction buffer t91130. The overhead reduction control block t91120 may determine whether to perform overhead reduction for each packet stream. When overhead reduction is performed on the packet stream, packets may be delivered to an RoHC compressor t91140 and overhead reduction may be performed. When overhead reduction is not performed on the packet stream, packets may be delivered to the encapsulation part and encapsulation may be performed without overhead reduction. Whether to perform overhead reduction on packets may be determined by signaling information t91010 delivered to the link layer. The signaling information t91010 may be delivered to the encapsulation control block t91180 by the scheduler t91020.

The RoHC compressor t91140 may perform overhead reduction on a packet stream. The RoHC compressor t91140 may compress headers of packets. Various schemes may be used for overhead reduction. Overhead reduction may be performed by schemes proposed in the present invention. The present embodiment presumes an IP stream and thus the compressor is expressed as the RoHC compressor. However, the term may be changed according to a given embodiment. In addition, an operation is not restricted to compression of an IP stream, and overhead reduction may be performed on all types of packets by the RoHC compressor t91140.

A packet stream configuration block t91150 may divide IP packets having compressed headers into information to be transmitted to a signaling region and information to be transmitted to a packet stream. The information to be transmitted to the packet stream may refer to information to be transmitted to a DP area. The information to be transmitted to the signaling region may be delivered to a signaling and/or context control block t91160. The information to be transmitted to the packet stream may be transmitted to the encapsulation part.

The signaling and/or context control block t91160 may collect signaling and/or context information and deliver the collected information to the signaling manager t91030. In this way, the signaling and/or context information may be transmitted to the signaling region.

The encapsulation part may encapsulate packets in suitable forms such that the packets may be delivered to the physical layer. The number of configured encapsulation parts may be the same as the number of IP streams.

An encapsulation buffer t91170 may receive a packet stream for encapsulation. Packets subjected to overhead reduction may be received when overhead reduction is performed, and an input IP packet may be received without change when overhead reduction is not performed.

An encapsulation control block t91180 may determine whether to perform encapsulation on an input packet stream. When encapsulation is performed, the packet stream may be delivered to segmentation/concatenation t91190. When encapsulation is not performed, the packet stream may be delivered to a transmission buffer t91230. Whether to perform encapsulation of packets may be determined based on the signaling information t91010 delivered to the link layer. The signaling information t91010 may be delivered to the encapsulation control block t91180 by the scheduler t91020.

In the segmentation/concatenation t91190, the above-descried segmentation or concatenation operation may be performed on packets. In other words, when an input IP packet is longer than a link layer packet corresponding to an output of the link layer, one IP packet may be divided into several segments to configure a plurality of link layer packet payloads. In addition, when the input IP packet is shorter than the link layer packet corresponding to the output of the link layer, several IP packets may be combined to configure one link layer packet payload.

A packet configuration table t91200 may have information about a configuration of segmented and/or concatenated link layer packets. A transmitter and a receiver may have the same information of the packet configuration table t91200. The transmitter and the receiver may refer to the information of the packet configuration table t91200. An index value of the information of the packet configuration table t91200 may be included in headers of the link layer packets.

A link layer header information block t91210 may collect header information generated in an encapsulation process. In addition, the link layer header information block t91210 may collect information included in the packet configuration table t91200. The link layer header information block t91210 may configure header information according to a header configuration of a link layer packet.

A header attachment block t91220 may add headers to payloads of the segmented and/or concatenated link layer packets. The transmission buffer t91230 may function as a buffer for delivering a link layer packet to a DP t91240 of the physical layer.

Each block or module and parts may be configured as one module/protocol or a plurality of modules/protocols in the link layer.

Figure 55:
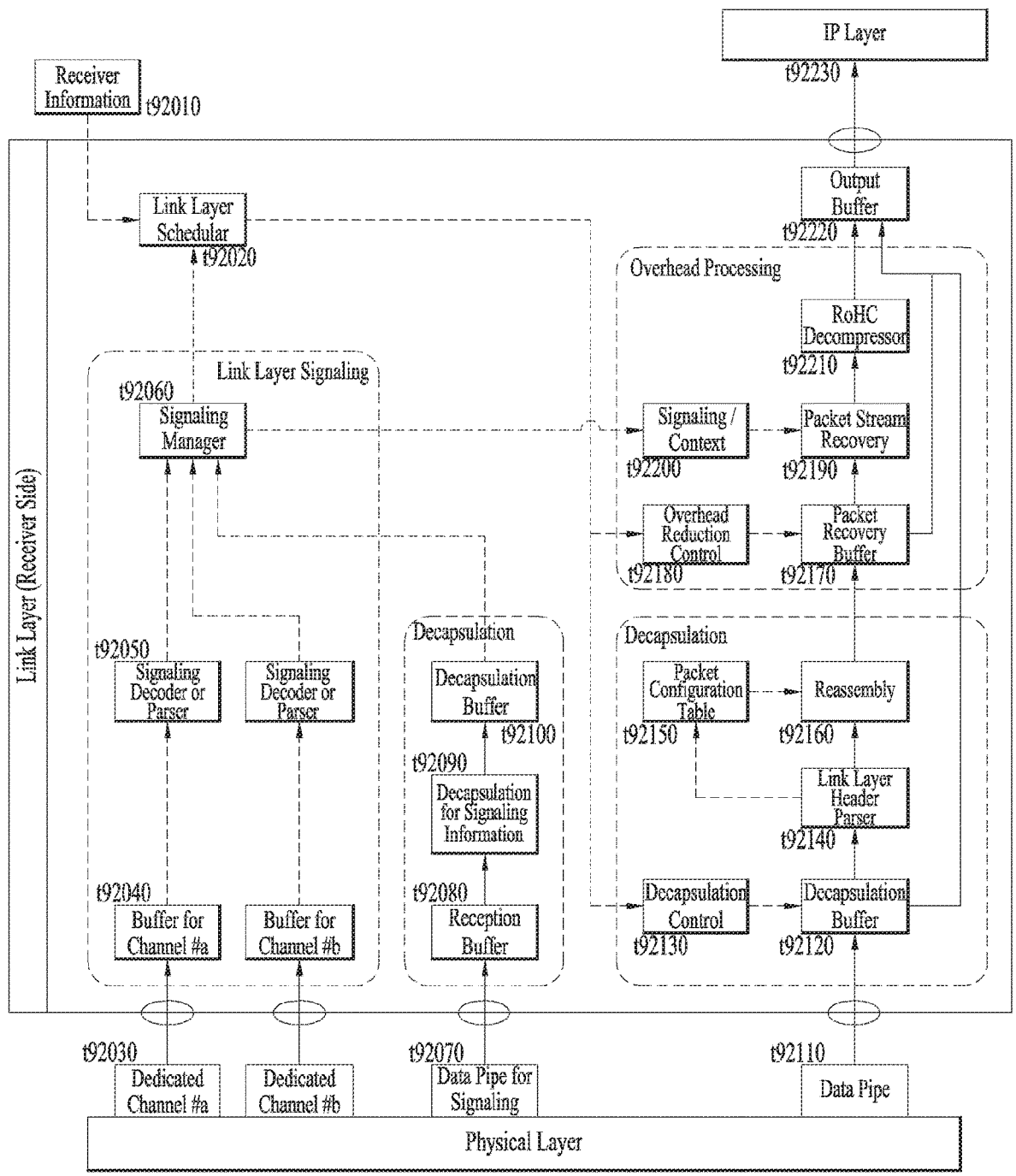
FIG. 55 is a view illustrating the structure of a link layer on a receiver side according to an embodiment of the present invention (normal mode)

FIG. 55 illustrates a configuration of a link layer at a receiver according to an embodiment of the present invention (normal mode).

The present embodiment is an embodiment presuming that an IP packet is processed. The link layer at the receiver may largely include a link layer signaling part for processing signaling information, an overhead processing part, and/or a decapsulation part from a functional perspective. The link layer at the receiver may further include a scheduler for a control of the entire operation of the link layer and scheduling, input and output parts of the link layer, and/or the like.

First, information received through a physical layer may be delivered to the link layer. The link layer may process the information to restore the information to an original state in which the information is not yet processed by a transmitter, and deliver the information to an upper layer. In the present embodiment, the upper layer may be an IP layer.

Information delivered through dedicated channels t92030 separated from the physical layer may be delivered to the link layer signaling part. The link layer signaling part may distinguish signaling information received from the physical layer, and deliver the distinguished signaling information to each part of the link layer.

A buffer for channels t92040 may function as a buffer that receives signaling information transmitted through the dedicated channels. As described above, when physically/logically divided separate channels are present in the physical layer, it is possible to receive signaling information transmitted through the channels. When the information received from the separate channels is in a divided state, the divided information may be stored until the information is in a complete form.

A signaling decoder/parser t92050 may check a format of signaling information received through a dedicated channel, and extract information to be used in the link layer. When the signaling information received through the dedicated channel is encoded, decoding may be performed. In addition, according to a given embodiment, it is possible to check integrity of the signaling information.

A signaling manager t92060 may integrate signaling information received through several paths. Signaling information received through a DP for signaling t92070 to be described below may be integrated by the signaling manager t92060. The signaling manager t92060 may deliver signaling information necessary for each part in the link layer. For example, context information for recovery of a packet and the like may be delivered to the overhead processing part. In addition, signaling information for control may be delivered to a scheduler t92020.

General signaling information not received through a separate dedicated channel may be received through the DP for signaling t92070. Here, the DP for signaling may refer to a PLS or the like. A reception buffer t92080 may function as a buffer for receiving the signaling information received from the DP for signaling t92070. The received signaling information may be decapsulated in a decapsulation for signaling information block t92090. The decapsulated signaling information may be delivered to the signaling manager t92060 through a decapsulation buffer t92100. As described in the foregoing, the signaling manager t92060 may collect signaling information and deliver the collected signaling information to a desired part in the link layer.

The scheduler t92020 may determine and control operations of several modules included in the link layer. The scheduler t92020 may control each part of the link layer using receiver information t92010 and/or information delivered from the signaling manager t92060. In addition, the scheduler t92020 may determine an operation mode and the like of each part. Here, the receiver information t92010 may refer to information previously stored by the receiver. The scheduler t92020 may use information changed by a user such as a channel change and the like for control.

The decapsulation part may filter a packet received from a DP t92110 of the physical layer, and separate the packet based on a type of the packet. The number of configured decapsulation parts may be the same as the number of DPs that may be simultaneously decoded in the physical layer.

A decapsulation buffer t92120 may function as a buffer that receives a packet stream from the physical layer to perform decapsulation. A decapsulation control block t92130 may determine whether to decapsulate the received packet stream. When decapsulation is performed, the packet stream may be delivered to a link layer header parser t92140. When decapsulation is not performed, the packet stream may be delivered to an output buffer t92220. The signaling information delivered from the scheduler t92020 may be used to determine whether to perform decapsulation.

The link layer header parser t92140 may identify a header of a received link layer packet. When the header is identified, it is possible to identify a configuration of an IP packet included in a payload of the link layer packet. For example, the IP packet may be segmented or concatenated.

A packet configuration table t92150 may include payload information of link layer packets configured through segmentation and/or concatenation. The transmitter and the receiver may have the same information as information of the packet configuration table t92150. The transmitter and the receiver may refer to the information of the packet configuration table t92150. A value necessary for reassembly may be found based on index information included in the link layer packets.

A reassembly block t92160 may configure payloads of the link layer packets configured through segmentation and/or concatenation as packets of an original IP stream. The reassembly block t92160 may reconfigure one IP packet by collecting segments, or reconfigure a plurality of IP packet streams by separating concatenated packets. The reassembled IP packets may be delivered to the overhead processing part.

The overhead processing part may perform a reverse process of overhead reduction performed by the transmitter. In the reverse process, an operation of returning packets experiencing overhead reduction to original packets is performed. This operation may be referred to as overhead processing. The number of configured overhead processing parts may be the same as the number of DPs that may be simultaneously decoded in the physical layer.

A packet recovery buffer t92170 may function as a buffer that receives an RoHC packet or an IP packet decapsulated for overhead processing.

An overhead control block t92180 may determine whether to perform packet recovery and/or decompression of decapsulated packets. When the packet recovery and/or decompression are performed, the packets may be delivered to a packet stream recovery t92190. When the packet recovery and/or decompression are not performed, the packets may be delivered to the output buffer t92220. Whether to perform the packet recovery and/or decompression may be determined based on the signaling information delivered by the scheduler t92020.

The packet stream recovery t92190 may perform an operation of integrating a packet stream separated from the transmitter and context information of the packet stream. The operation may correspond to a process of restoring the packet stream such that the packet stream may be processed by an RoHC decompressor t92210. In this process, signaling information and/or context information may be delivered from a signaling and/or context control block t92200. The signaling and/or context control block t92200 may distinguish signaling information delivered from the transmitter and deliver the signaling information to the packet stream recovery t92190 such that the signaling information may be mapped to a stream suitable for a context ID.

The RoHC decompressor t92210 may recover headers of packets of a packet stream. When the headers are recovered, the packets of the packet stream may be restored to original IP packets. In other words, the RoHC decompressor t92210 may perform overhead processing.

The output buffer t92220 may function as a buffer before delivering an output stream to an IP layer t92230.

The link layer of the transmitter and the receiver proposed in the present invention may include the blocks or modules described above. In this way, the link layer may independently operate irrespective of the upper layer and the lower layer, and efficiently perform overhead reduction. In addition, a function which is supportable depending on the upper and lower layers may be easily extended/added/deleted.

FIG. 56 is a diagram illustrating definition according to link layer organization type according to an embodiment of the present invention.

When a link layer is actually embodied as a protocol layer, a broadcast service can be transmitted and received through one frequency slot. Here, an example of one frequency slot may be a broadcast channel that mainly has a specific bandwidth. As described above, according to the present invention, in a broadcast system in which a configuration of a physical layer is changed or in a plurality of broadcast systems with different physical layer configurations, a compatible link layer may be defined.

The physical layer may have a logical data path for an interface of a link layer. The link layer may access the logical data path of the physical layer and transmit information associated with the corresponding data path to the logical data path. The following types may be considered as the data path of the physical layer interfaced with the link layer.

In a broadcast system, a normal data pipe (Normal DP) may exist as a type of data path. The normal data pipe may be a data pipe for transmission of normal data and may include one or more data pipes according to a configuration of a physical layer.

In a broadcast system, a base data pipe (Base DP) may exist as a type of data path. The base data pipe may be a data pipe used for specific purpose and may transmit signaling information (entire or partial signaling information described in the present invention) and/or common data in a corresponding frequency slot. As necessary, in order to effectively manage a bandwidth, data that is generally transmitted through a normal data pipe may be transmitted through a base data pipe. When the amount of information to be transmitted when a dedicated channel is present exceeds processing capacity of a corresponding channel, the base data pipe may perform a complementary function. That is, data that exceeds the processing capacity of the corresponding channel may be transmitted through the base data pipe.

In general, the base data pipe continuously uses one designated data pipe. However, one or more data pipes may be dynamically selected for the base data pipe among a plurality of data pipes using a method such as physical layer signaling, link layer signaling, or the like in order to effectively manage a data pipe.

In a broadcast system, a dedicated channel may exist as a type of data path. The dedicated channel may be a channel used for signaling in a physical layer or a similar specific purpose and may include a fast information channel (FIC) for rapidly acquiring matters that are mainly served on a current frequency slot and/or an emergency alert channel (EAC) for immediately transmitting notification of emergency alert to a user.

In general, a logical data path is embodied in a physical layer in order to transmit the normal data pipe. A logical data path for the base data pipe and/or the dedicated channel may not be embodied in a physical layer.

A configuration of data to be transmitted in the link layer may be defined as illustrated in the drawing.

Organization Type 1 may refer to the case in which a logical data path includes only a normal data pipe.

Organization Type 2 may refer to the case in which a logical data path includes a normal data pipe and a base data pipe.

Organization Type 3 may refer to the case in which a logical data path includes a normal data pipe and a dedicated channel.

Organization Type 4 may refer to the case in which a logical data path includes a normal data pipe, a data base pipe, and a dedicated channel.

As necessary, the logical data path may include a base data pipe and/or a dedicated channel.

According to an embodiment of the present invention, a transmission procedure of signaling information may be determined according to configuration of a logical data path. Detailed information of signaling transmitted through a specific logical data path may be determined according to a protocol of a upper layer of a link layer defined in the present invention. Regarding a procedure described in the present invention, signaling information parsed through a upper layer may also be used and corresponding signaling may be transmitted in the form of an IP packet from the upper layer and transmitted again after being encapsulated in the form of a link layer packet.

When such signaling information is transmitted, a receiver may extract detailed signaling information from session information included in an IP packet stream according to protocol configuration. When signaling information of a upper layer is used, a database (DB) may be used or a shared memory may be used. For example, in the case of extracting the signaling information from the session information included in the IP packet stream, the extracted signaling information may be stored in a DB, a buffer, and/or a shared memory of the receiver. Next, when the signaling information is needed in a procedure of processing data in a broadcast signal, the signaling information may be obtained from the above storage device.

Figure 57:
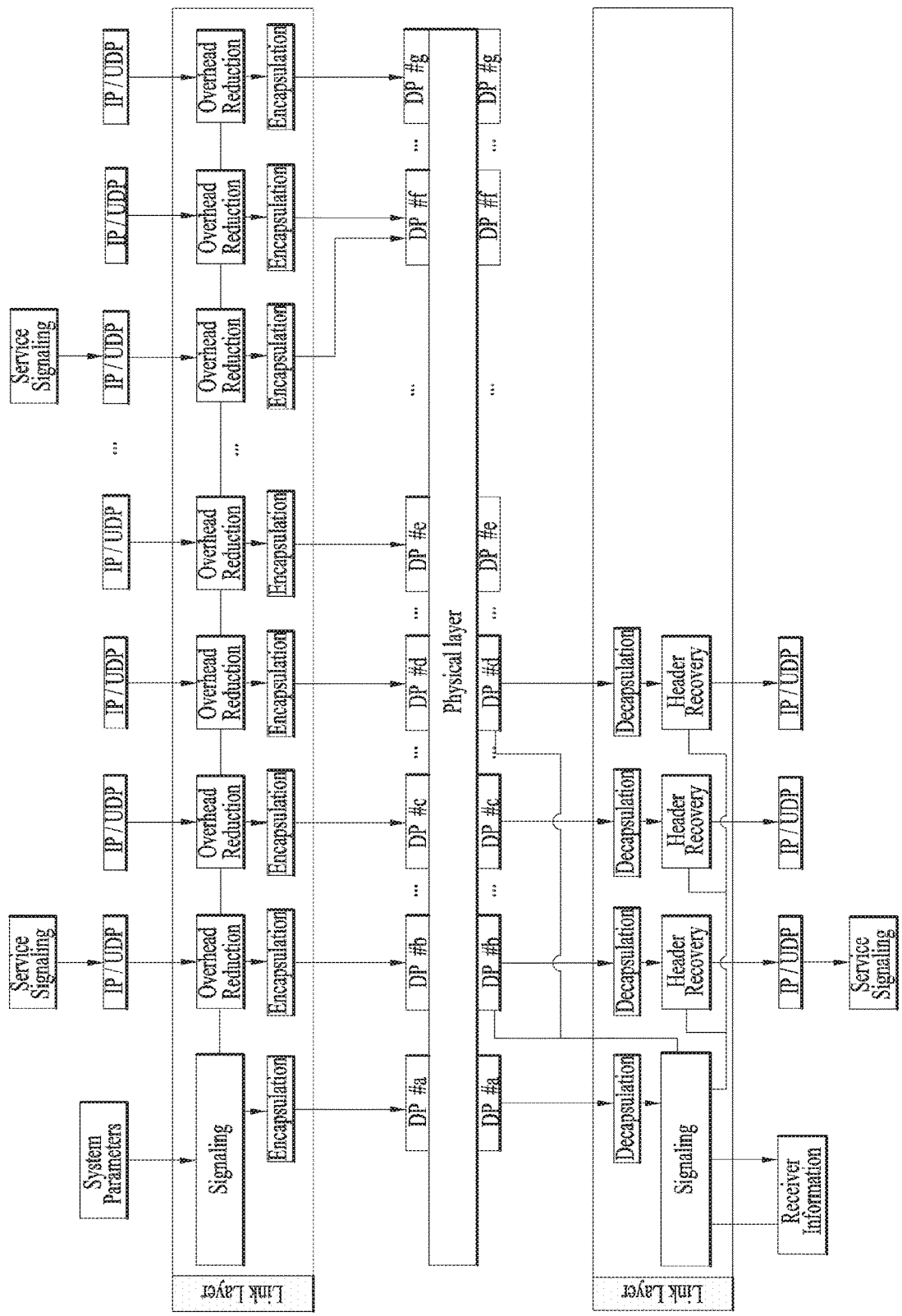
FIG. 57 is a view illustrating the processing of a broadcast signal, in a case in which a logical data path includes only a normal data pipe, according to an embodiment of the present invention.

FIG. 57 is a diagram illustrating processing of a broadcast signal when a logical data path includes only a normal data pipe according to an embodiment of the present invention.

The diagram illustrates a structure of a link layer when the logical of the physical layer includes only a normal data pipe. As described above, the link layer may include a link layer signaling processor, an overhead reduction processor, and an encapsulation (decapsulation) processor. Transmission of information output from each functional module (which may be embodied as hardware or software) to an appropriate data path of the physical layer may be one of main functions of the link layer.

With regard to an IP stream configured on a upper layer of a link layer, a plurality of packet streams may be transmitted according to a data rate at which data is to be transmitted, and overhead reduction and encapsulation procedures may be performed for each respective corresponding packet stream. A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, and/or signaling transmitted in a upper layer and collect information to be transmitted via signaling. Since only a normal data pipe is configured in a physical layer, corresponding signaling needs to be transmitted in the form of packet. Accordingly, signaling may be indicated using a header, etc. of a packet during link layer packet configuration. In this case, a header of a packet including signaling may include information for identifying whether signaling data is contained in a payload of the packet.

In the case of service signaling transmitted in the form of IP packet in a upper layer, in general, it is possible to process different IP packets in the same way. However, information of the corresponding IP packet can be read for a configuration of link layer signaling. To this end, a packet including signaling may be found using a filtering method of an IP address. For example, since IANA designates an IP address of 224.0.23.60 as ATSC service signaling, the receiver may check an IP packet having the corresponding IP address use the IP packet for configuration of link layer signaling. In this case, the corresponding packet needs to also be transmitted to a receiver, processing for the IP packet is performed without change. The receiver may parse an IP packet transmitted to a predetermined IP address and acquire data for signaling in a link layer.

When a plurality of broadcast services are transmitted through one frequency band, the receiver does not have to decode all DPs, and it is efficient to pre-check signaling information and to decode only a DP associated with a required service. Accordingly, with regard to an operation for a link layer of the receiver, the following procedures may be performed.

When a user selects or changes a service to be received, the receiver tunes a corresponding frequency and reads information of the receiver, stored in a DB, etc. with regard to a corresponding channel.

The receiver checks information about a DP that transmits link layer signaling and decodes the corresponding DP to acquire a link layer signaling packet.

The receiver parses the link layer signaling packet and acquires information about a DP that transmits data associated with a service selected by the user among one or more DPs transmitted through a current channel and overhead reduction information about a packet stream of the corresponding DP. The receiver may acquire information for identification of a DP that transmits the data associated with the service selected by the user from a link layer signaling packet and obtain a corresponding DP based on the information. In addition, the link layer signaling packet may include information indicating overhead reduction applied to the corresponding DP, and the receiver may restore a DP to which overhead reduction is applied, using the information.

The receiver transmits DP information to be received, to a physical layer processor that processes a signal or data in a physical layer and receives a packet stream from a corresponding DP.

The receiver performs encapsulation and header recovery on the packet stream decoded by the physical layer processor.

Then the receiver performs processing according to a protocol of a upper layer and provides a broadcast service to the user.

Figure 58:
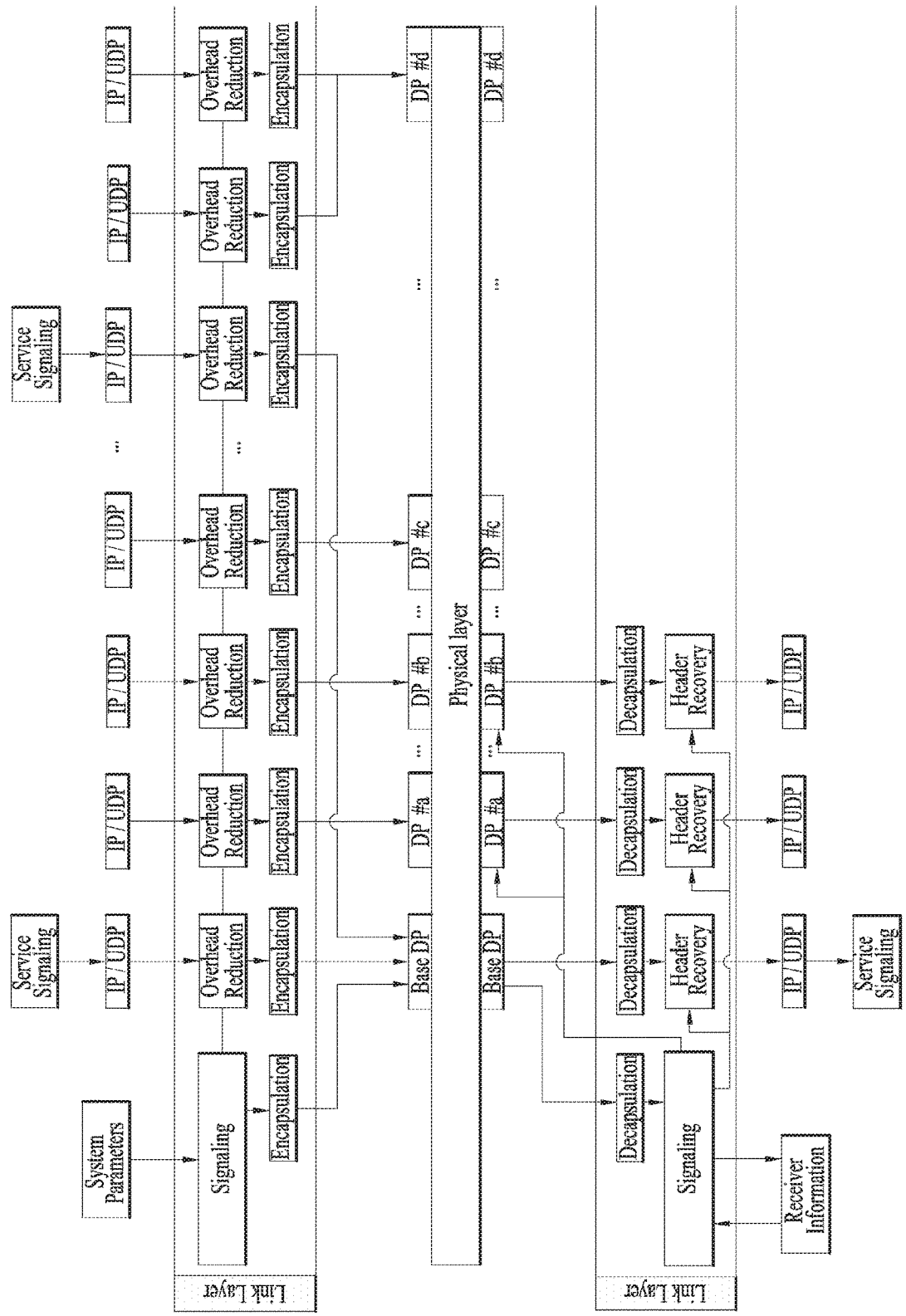
FIG. 58 is a view illustrating the processing of a broadcast signal, in a case in which a logical data path includes a normal data pipe and a base data pipe, according to an embodiment of the present invention.

FIG. 58 is a diagram illustrating processing of a broadcast signal when a logical data path includes a normal data pipe and a base data pipe according to an embodiment of the present invention.

The diagram illustrates a structure of a link layer when the logical data path of the physical layer includes a base data pipe and a normal data pipe. As described above, the link layer may include a link layer signaling part, an overhead reduction part, and an encapsulation (decapsulation) part. In this case, a link layer processor for processing a signal and/or data in a link layer may include a link layer signaling processor, an overhead reduction processor, and an encapsulation (decapsulation) processor.

Transmission of information output from each functional module (which may be embodied as hardware or software) to an appropriate data path of the physical layer may be one of main functions of the link layer.

With regard to an IP stream configured on a upper layer of a link layer, a plurality of packet streams may be transmitted according to a data rate at which data is to be transmitted, and overhead reduction and encapsulation procedures may be performed for each respective corresponding packet stream.

A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, upper layer signaling, etc. and collect information to be transmitted via signaling. Since a broadcast signal of the physical layer includes a base DP and a normal DP, signaling may be transmitted to the base DP and signaling data may be transmitted in the form of packet appropriate for transmission of the base DP in consideration of a data rate. In this case, signaling may be indicated using a header, etc. of a packet during link layer packet configuration. For example, a header of a link layer packet may include information indicating that data contained in a payload of the packet is signaling data.

In a physical layer structure in which a logical data path such as a base DP exists, it may be efficient to transmit data that is not audio/video content, such as signaling information to the base DP in consideration of a data rate. Accordingly, service signaling that is transmitted in the form of IP packet in a upper layer may be transmitted to the base DP using a method such as IP address filtering, etc. For example, IANA designates an IP address of 224.0.23.60 as ATSC service signaling, an IP packet stream with the corresponding IP address may be transmitted to the base DP.

When a plurality of IP packet streams about corresponding service signaling is present, the IP packet streams may be transmitted to one base DP using a method such as multiplexing, etc. However, a packet about different service signaling may be divided into field values such as a source address and/or a port. In this case, information required for configuration of link layer signaling can also be read from the corresponding service signaling packet.

When a plurality of broadcast services are transmitted through one frequency band, the receiver may not have to decode all DPs, may pre-check signaling information, and may decode only a DP that transmits data and/or a signal about a corresponding service. Accordingly, the receiver may perform the following operation with regard to data and/or processing in a link layer.

When a user selects or changes a service to be received, the receiver tunes a corresponding frequency and reads information of the receiver, stored in a DB, etc. with regard to a corresponding channel. Here, the information stored in the DB, etc. may include information for identification of the base DP.

The receiver decodes the base DP and acquires a link layer signaling packet included in the base DP.

The receiver parses the link layer signaling packet to acquire DP information for reception of the service selected by the user and overhead reduction information about a packet stream of the corresponding DP among a plurality of DPs transmitted through a current channel and overhead reduction information about a packet stream of the corresponding DP. The link layer signaling packet may include information for identification of a DP that transmits a signal and/or data associated with a specific service, and/or information for identification of a type of overhead reduction applied to a packet stream transmitted to the corresponding DP. The receiver may access one or more DPs or restore the packet included in the corresponding DP using the above information.

The receiver is a physical layer processor that processes a signal and/or data according to a protocol of a physical layer, transmits information about a DP to be received for a corresponding service, and receives a packet stream from the corresponding DP.

The receiver performs decapsulation and header recovery on the packet stream decoded in the physical layer and transmits the packet stream to a upper layer of the receiver in the form of IP packet stream.

Then, the receiver performs processing according to a upper layer protocol and provides a broadcast service to the user.

In the above-described process of acquiring the link layer packet by decoding the base DP, information about the base DP (e.g., an identifier (ID) information of the base DP, location information of the base DP, or signaling information included in the base DP) may be acquired during previous channel scan and then stored in a DB and the receiver may use the stored base DP. Alternatively, the receiver may acquire the base DP by first seeking a DP that the receiver has pre-accessed.

In the above-described process of acquiring the DP information for a service selected by the user and the overhead reduction information about a DP packet stream transmitting the corresponding service, by parsing the link layer packet, if the information about the DP transmitting the service selected by the user is transmitted through upper layer signaling (e.g., a layer higher than a link layer, or an IP layer), the receiver may acquire corresponding information from the DB, the buffer, and/or the shared memory as described above and use the acquired information as information about a DP requiring decoding.

If link layer signaling (link layer signaling information) and normal data (e.g., broadcast content data) is transmitted through the same DP or if only a DP of one type is used in a broadcast system, the normal data transmitted through the DP may be temporarily stored in the buffer or the memory while the signaling information is decoded and parsed. Upon acquiring the signaling information, the receiver may transmit a command for extracting a DP that should be obtained according to the corresponding signaling information to a device for extracting and processing the DP by a method using interior command words of the system.

Figure 59:
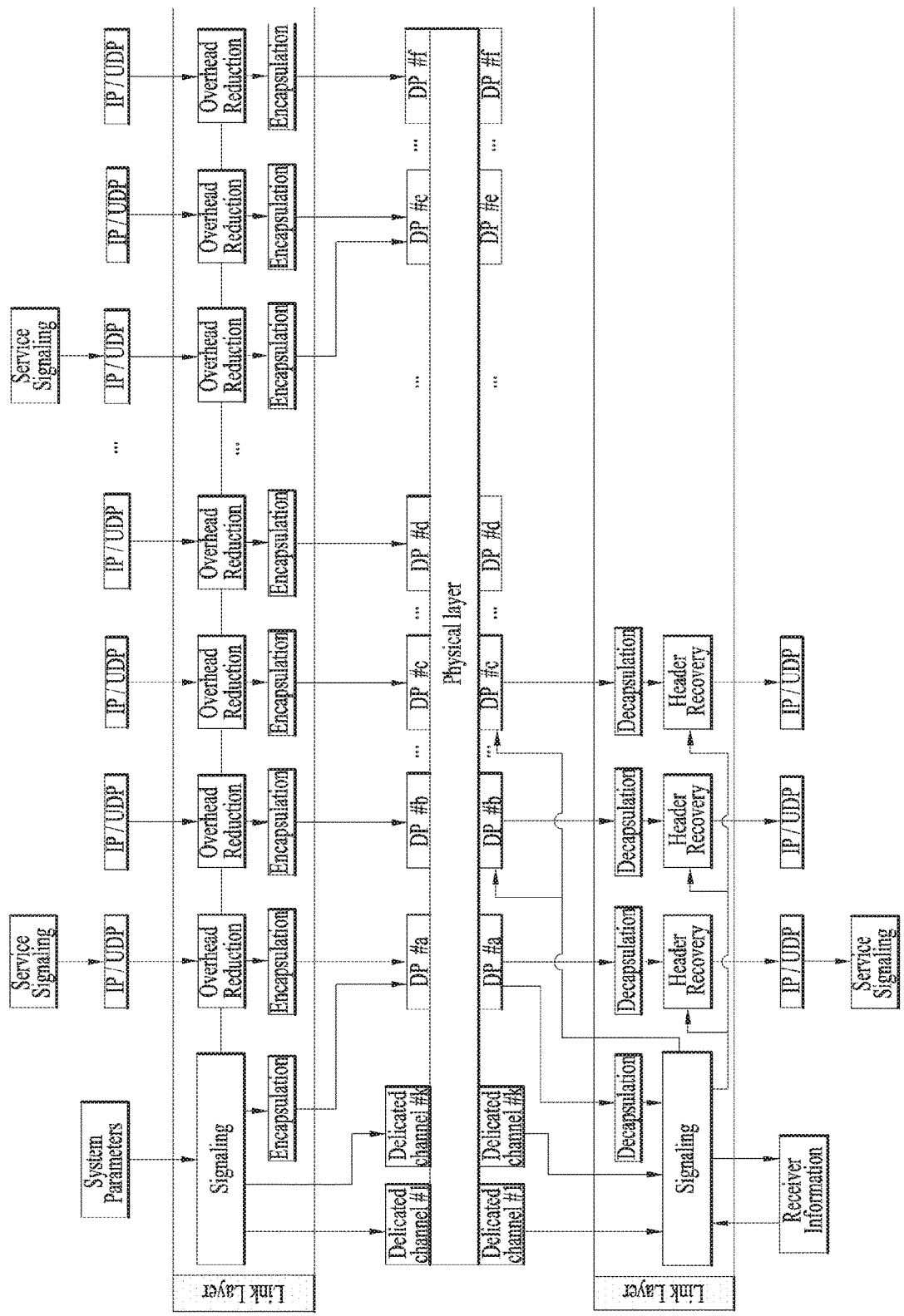
FIG. 59 is a view illustrating the processing of a broadcast signal, in a case in which a logical data path includes a normal data pipe and a dedicated channel, according to an embodiment of the present invention.

FIG. 59 is a diagram illustrating processing of a broadcast signal when a logical data path includes a normal data pipe and a dedicated channel according to an embodiment of the present invention.

The diagram illustrates a structure of a link layer when the logical data path of the physical layer includes a dedicated channel and a normal data pipe. As described above, the link layer may include a link layer signaling part, an overhead reduction part, and an encapsulation (decapsulation) part. In this regard, a link layer processor to be included in the receiver may include a link layer signaling processor, an overhead reduction processor, and/or an encapsulation (decapsulation) processor. Transmission of information output from each functional module (which may be embodied as hardware or software) to an appropriate data path of the physical layer may be one of main functions of the link layer.

With regard to an IP stream configured on a upper layer of a link layer, a plurality of packet streams may be transmitted according to a data rate at which data is to be transmitted, and overhead reduction and encapsulation procedures may be performed for each respective corresponding packet stream. A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, upper layer signaling, etc. and collect information to be transmitted via signaling. In a physical layer structure in which a logical data path such as a dedicate channel exists, it may be efficient to mainly transmit signaling information through a dedicated channel in consideration of a data rate. However, when a large amount of data needs to be transmitted through a dedicated channel, a bandwidth for the dedicated channel corresponding to the amount of the dedicated channel needs to be occupied, and thus it is general to set a high data rate of the dedicated channel. In addition, since a dedicated channel is generally received and decoded at higher speed than a DP, it is more efficient to signaling data in terms of information that needs to be rapidly acquired from the receiver. As necessary, when sufficient signaling data cannot be transmitted through the dedicated channel, signaling data such as the aforementioned link layer signaling packet may be transmitted through the normal DP, and signaling data transmitted through the dedicated channel may include information for identification of the corresponding link layer signaling packet.

A plurality of dedicated channels may exist as necessary and a channel may be enable/disable according to a physical layer.

In the case of service signaling transmitted in the form of IP packet in a upper layer, in general, it is possible to process different IP packets in the same way. However, information of the corresponding IP packet can be read for a configuration of link layer signaling. To this end, a packet including signaling may be found using a filtering method of an IP address. For example, since IANA designates an IP address of 224.0.23.60 as ATSC service signaling, the receiver may check an IP packet having the corresponding IP address use the IP packet for configuration of link layer signaling. In this case, the corresponding packet needs to also be transmitted to a receiver, processing for the IP packet is performed without change.

When a plurality of IP packet streams about service signaling is present, the IP packet streams may be transmitted to one DP together with audio/video data using a method such as multiplexing, etc. However, a packet about service signaling and audio/video data may be divided into field values of an IP address, a port, etc.

When a plurality of broadcast services are transmitted through one frequency band, the receiver does not have to decode all DPs, and it is efficient to pre-check signaling information and to decode only a DP that transmit signal and/or data associated with a required service. Thus, the receiver may perform processing according to a protocol of a link layer as the following procedure.

When a user selects or changes a service to be received, the receiver tunes a corresponding frequency and reads information stored in a DB, etc. with regard to a corresponding channel. The information stored in the DB may include information for identification of a dedicated channel and/or signaling information for acquisition of channel/service/program.

The receiver decodes data transmitted through the dedicated channel and performs processing associated with signaling appropriate for purpose of the corresponding channel. For example, a dedicated channel for transmission of FIC may store and update information such as a service and/or a channel, and a dedicated channel for transmission of EAC may transmit emergency alert information.

The receiver may acquire information of DP to be decoded using information transmitted to the dedicated channel. As necessary, when link layer signaling is transmitted through a DP, the receiver may pre-decode a DP that transmits signaling and transmit the DP to a dedicated channel in order to pre-acquire signaling information. In addition, a packet for link layer signaling may be transmitted through a normal DP, and in this case, the signaling data transmitted through the dedicated channel may include information for identification of a DP including a packet for link layer signaling.

The receiver acquires DP information for reception of a service selected by a user among a plurality of DPs that are transmitted to a current channel and overhead reduction information about a packet stream of the corresponding DP using the link layer signaling information. The link layer signaling information may include information for identification of a DP for transmission of a signal and/or data associated with a specific service, and/or information for identification of a type of overhead reduction applied to a packet stream transmitted to the corresponding DP. The receiver may access one or more DPs for a specific service or restore a packet included in the corresponding DP using the information.

The receiver transmits information for identification of a DP to be received by a physical layer to a physical layer processor that processes a signal and/or data in a physical layer and receives a packet stream from the corresponding DP.

The receiver performs decapsulation and header recovery on a packet stream decoded in a physical layer and transmits the packet stream to a upper layer of the receiver in the form of IP packet stream.

Then the receiver performs processing according to a protocol of a upper layer and provides a broadcast service to the user.

Figure 60:
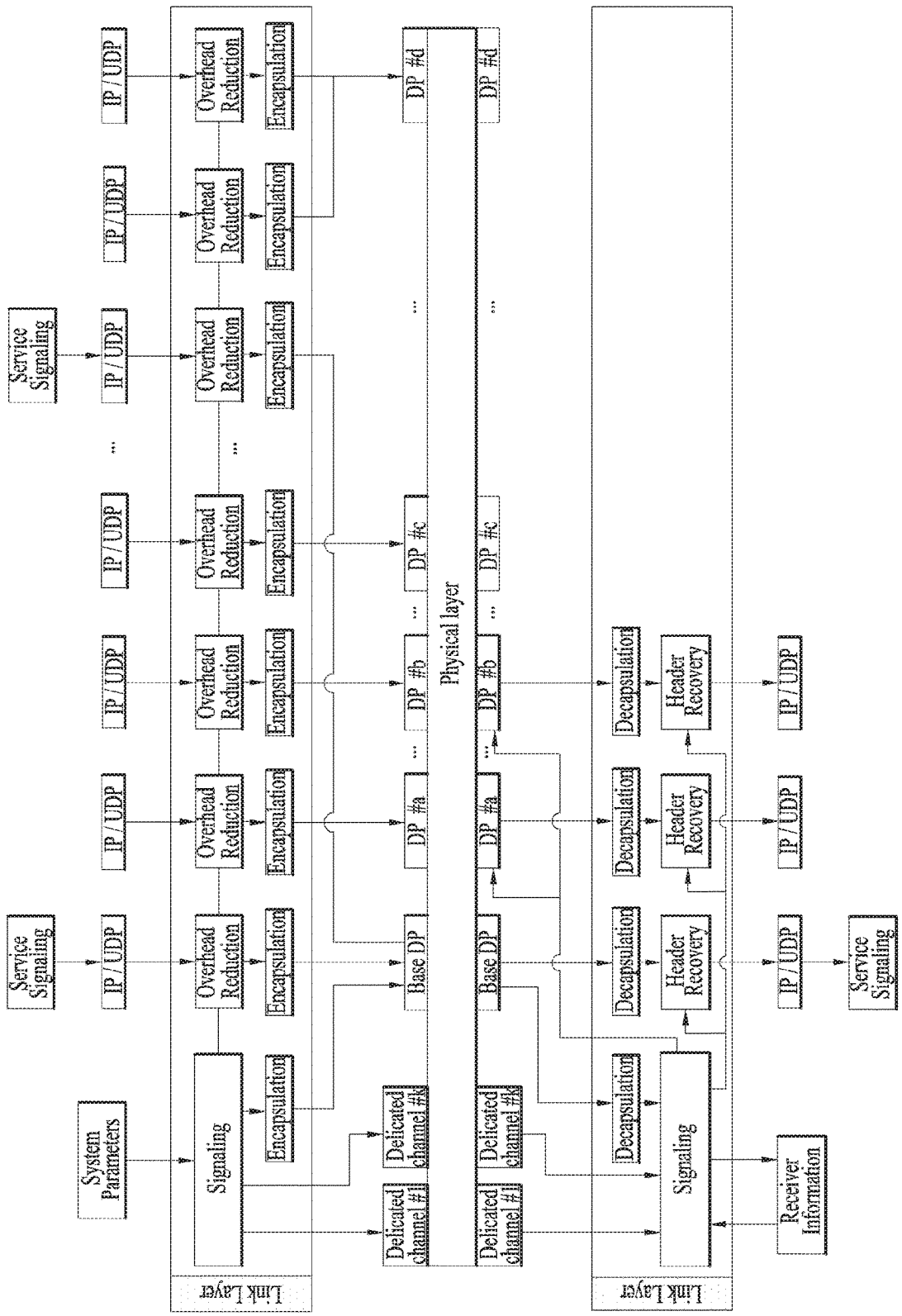
FIG. 60 is a view illustrating the processing of a broadcast signal, in a case in which a logical data path includes a normal data pipe, a base data pipe, and a dedicated channel, according to an embodiment of the present invention.

FIG. 60 is a diagram illustrating processing of a broadcast signal when a logical data path includes a normal data pipe, a base data pipe, and a dedicated channel according to an embodiment of the present invention.

The diagram illustrates a structure of a link layer when the logical data path of the physical layer includes a dedicated channel, a base data pipe, and a normal data pipe. As described above, the link layer may include a link layer signaling part, an overhead reduction part, and an encapsulation (decapsulation) part. In this regard, a link layer processor to be included in the receiver may include a link layer signaling processor, an overhead reduction processor, and/or an encapsulation (decapsulation) processor. Transmission of information output from each functional module (which may be embodied as hardware or software) to an appropriate data path of the physical layer may be one of main functions of the link layer.

With regard to an IP stream configured on a upper layer of a link layer, a plurality of packet streams may be transmitted according to a data rate at which data is to be transmitted, and overhead reduction and encapsulation procedures may be performed for each respective corresponding packet stream. A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, upper layer signaling, etc. and collect information to be transmitted via signaling. Since a signal of the physical layer includes a base DP and a normal DP, it may be efficient to transmit signaling to the base DP in consideration of a data rate. In this case, the signaling data needs to be transmitted in the form of packet appropriate for transmission through the base DP. Signaling may be indicated using a header, etc. of a packet during link layer packet configuration. That is, a header of a link layer signaling packet including signaling data may include information indicating that signaling data is contained in a payload of the corresponding packet.

In a physical layer structure in which a dedicate channel and a base DP exist simultaneously, signaling information may be divided and transmitted to the dedicated channel and the base DP. In general, since a high data rate of the dedicated channel is not set, signaling information that has a small amount of signaling and needs to be rapidly acquired may be transmitted to the dedicated channel and signaling with a high amount of signaling to the base DP. As necessary, a plurality of dedicated channels may exist and a channel may be enable/disable according to a physical layer. In addition, the base DP may be configured with a separate structure from a normal DP. In addition, it is possible to designate one of normal DPs and use the normal DP as a base DP.

Service signaling that is transmitted in the form of IP packet in a upper layer may be transmitted to the base DP using a method such as IP address filtering, etc. An IP packet stream with a specific IP address and including signaling information may be transmitted to the base DP. When a plurality of IP packet streams about corresponding service signaling is present, the IP packet streams may be transmitted to one base DP using a method such as multiplexing, etc. A packet about different service signaling may be divided into field values such as a source address and/or a port. The receiver may read information required for configuration of the link layer signaling in the corresponding service signaling packet.

When a plurality of broadcast services are transmitted through one frequency band, the receiver may not have to decode all DPs, and it may be efficient to pre-check the signaling information and to decode only a DP that transmits a signal and/or data associated with a required service. Thus, the receiver may perform the following processors as processing according to a protocol of a link layer.

When a user selects or changes a service to be received, the receiver tunes a corresponding frequency and reads information stored in a database DB, etc. with regard to a corresponding channel. The information stored in the DB may include information for identification of a dedicated channel, information for identification of a base data pipe, and/or signaling information for acquisition of channel/service/program.

The receiver decodes data transmitted through the dedicated channel and performs processing associated with signaling appropriate for purpose of the corresponding channel. For example, a dedicated channel for transmission of FIC may store and update information such as a service and/or a channel, and a dedicated channel for transmission of EAC may transmit emergency alert information.

The receiver may acquire information of the base DP using information transmitted to the dedicated channel. The information transmitted to the dedicated channel may include information for identification of the base DP (e.g., an identifier of the base DP and/or an IP address of the base DP). As necessary, the receiver may update signaling information pre-stored in a DB of the receiver and related parameters to information transmitted in the dedicated channel.

The receiver may decode the base DP and acquire a link layer signaling packet. As necessary, the link layer signaling packet may be combined with signaling information received from the dedicated channel. The receiver may find the base DP using the dedicate channel and the signaling information pre-stored in the receiver.

The receiver acquires DP information for reception of a service selected by a user among a plurality of DPs that are transmitted to a current channel and overhead reduction information about a packet stream of the corresponding DP using the link layer signaling information. The link layer signaling information may include information for identification of a DP for transmission of a signal and/or data associated with a specific service, and/or information for identification of a type of overhead reduction applied to a packet stream transmitted to the corresponding DP. The receiver may access one or more DPs for a specific service or restore a packet included in the corresponding DP using the information.

The receiver transmits information for identification of a DP to be received by a physical layer to a physical layer processor that processes a signal and/or data in a physical layer and receives a packet stream from the corresponding DP.

The receiver performs decapsulation and header recovery on a packet stream decoded in a physical layer and transmits the packet stream to a upper layer of the receiver in the form of IP packet stream.

Then the receiver performs processing according to a protocol of a upper layer and provides a broadcast service to the user.

According to an embodiment of the present invention, when information for service signaling is transmitted by one or more IP packet streams, the IP packet streams may be multiplexed and transmitted as one base DP. The receiver may distinguish between packets for different service signaling through a field of a source address and/or a port. The receiver may read out information for acquiring/configuring link layer signaling from a service signaling packet.

In the process of processing signaling information transmitted through the dedicated channel, the receiver may obtain version information of the dedicated channel or information identifying whether update has been performed and, if it is judged that there is no change in the signaling information in the dedicated channel, the receiver may omit processing (decoding or parsing) of the signaling information transmitted through the dedicated channel. If it is confirmed that the dedicated channel has not been updated, the receiver may acquire information of a base DP using prestored information.

In the above-described process of acquiring the DP information for a service selected by the user and the overhead reduction information about the DP packet stream transmitting the corresponding service, if the information about the DP transmitting the service selected by the user is transmitted through upper layer signaling (e.g., a layer higher than a link layer, or an IP layer), the receiver may acquire the corresponding information from the DB, the buffer, and/or the shared memory as described above and use the acquired information as information about a DP requiring decoding.

If link layer signaling (link layer signaling information) and normal data (e.g., broadcast content data) is transmitted through the same DP or if only type of DP is used in a broadcast system, the normal data transmitted through the DP may be temporarily stored in the buffer or the memory while the signaling information is decoded and parsed. Upon acquiring the signaling information, the receiver may transmit a command for extracting a DP that should be obtained according to the corresponding signaling information to a device for extracting and processing the DP by a method using system interior command words.

Figure 61:
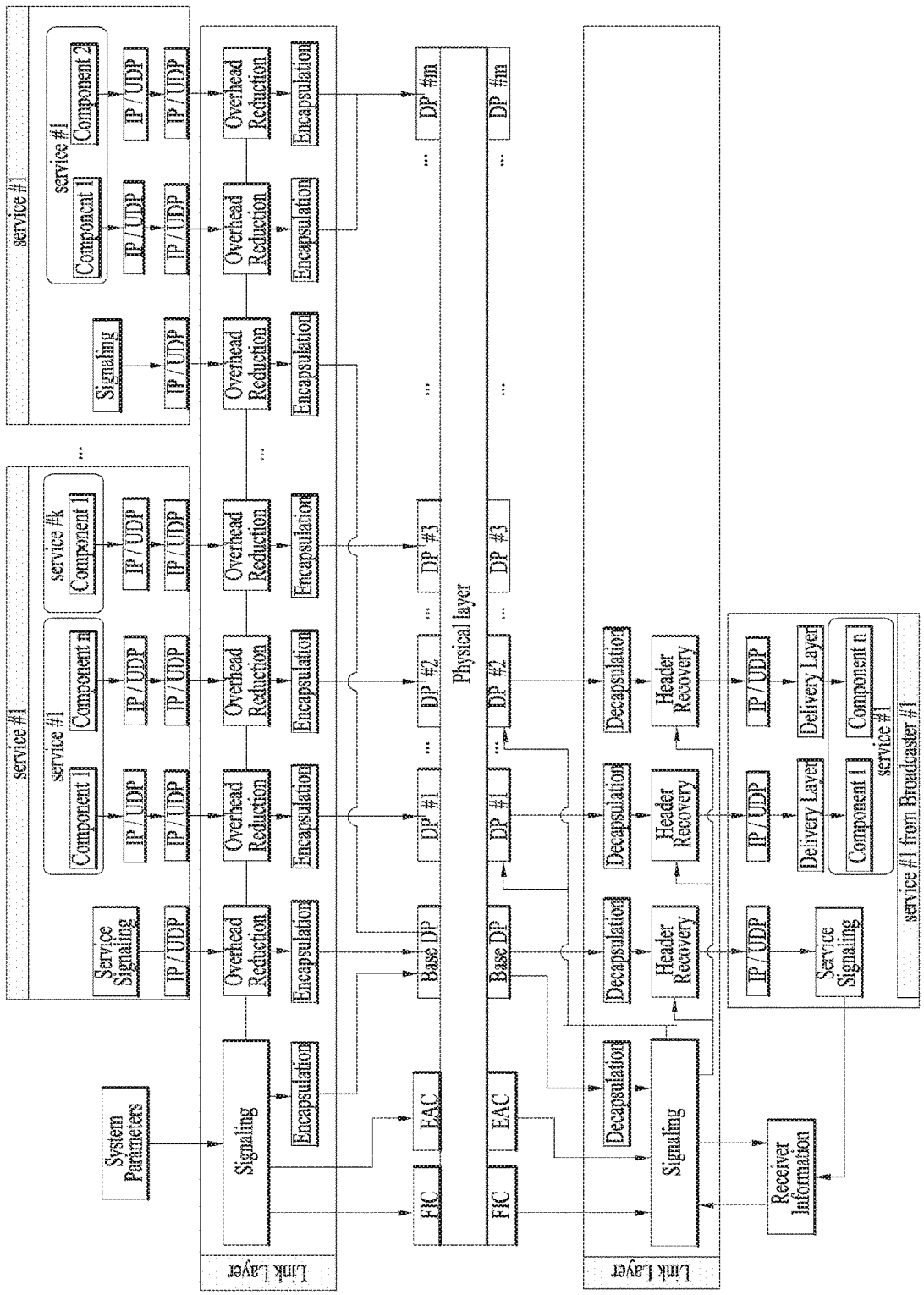
FIG. 61 is a view illustrating a detailed processing operation of signals and/or data in a link layer of a receiver, in a case in which a logical data path includes a normal data pipe, a base data pipe, and a dedicated channel, according to an embodiment of the present invention.

FIG. 61 is a diagram illustrating a detailed processing operation of a signal and/or data in a link layer of a receiver when a logical data path includes a normal data pipe, a base data pipe, and a dedicated channel according to an embodiment of the present invention.

The present embodiment considers a situation in which one or more services provided by one or more broadcasters are transmitted in one frequency band. It may be considered that one broadcaster transmits one or more broadcast services, one service includes one or more components and a user receives content in units of broadcast services. In addition, some of one or more components included in one broadcast service may be replaced with other components according to user selection.

A fast information channel (FIC) and/or emergency alert channel (EAC) may be transmitted to a dedicated channel. A base DP and a normal DP may be differentiated in a broadcast signal and transmitted or managed. Configuration information of the FIC and/or the EAC may be transmitted through physical layer signaling so as to notify the receiver of the FIC and/or the EAC, and the link layer may format signaling according to the characteristic of the corresponding channel. Transmission of data to a specific channel of a physical layer is performed from a logical point of view and an actual operation may be performed according to the characteristic of a physical layer.

Information about a service of each broadcaster, transmitted in a corresponding frequency, and information about a path for reception of the service may be transmitted through the FIC. To this end, the following information may be provided (signaled) via link layer signaling.

System Parameter: Transmitter related parameter, and/or parameter related to a broadcaster that provides a service in a corresponding channel.

Link layer: which includes context information associated with IP header compression and/or ID of a DP to which corresponding context is applied.

Upper layer: IP address and/or UDP port number, service and/or component information, emergency alert information, and mapping relation information between a DP and an IP address of a packet stream transmitted in an IP layer.

When a plurality of broadcast services is transmitted through one frequency band, a receiver may not have to decode all DPs, and it may be efficient to pre-check signaling information and to decode only a DP about a required service. In a broadcast system, a transmitter may transmit information for identification of only a required DP through an FIC, and the receiver may check a DP to be accessed for a specific serviced, using the FIC. In this case, an operation associated with the link layer of the receiver may be performed as follows.

When a user selects or changes a service to be received by a user, the receiver tunes a corresponding frequency and reads information of a receiver, stored in a DB, etc. in regard to a corresponding channel. The information stored in the DB of the receiver may be configured by acquiring an FIC during initial channel scan and using information included in the FIC.

The receiver may receive an FIC and update a pre-stored DB or acquire information about a component about a service selected by the user and information about a mapping relation for DPs that transmit components from the FIC. In addition, the information about a base DP that transmits signaling may be acquired from the FIC.

When initialization information related to robust header compression (RoHC) is present in signaling transmitted through the FIC, the receiver may acquire the initialization information and prepare header recovery.

The receiver decodes a base DP and/or a DP that transmits a service selected by a user based on information transmitted through the FIC.

The receiver acquires overhead reduction information about a DP that is being received, included in the base DP, performs decapsulation and/or header recovery on a packet stream received in a normal DP using the acquired overhead information, and transmits the packet stream to a upper layer of the receiver in the form of IP packet stream.

The receiver may receive service signaling transmitted in the form of IP packet with a specific address through a base DP and transmit the packet stream to the upper layer with regard to a received service.

When emergency alert occurs, in order to rapidly transmit an emergency alert message to a user, the receiver receives signaling information included in a CAP message through signaling, parses the signaling information, and immediately transmits the signaling information to a user, and finds a path for reception of a corresponding service and receives service data when information of a path through which an first signaling data can be received via signaling can be confirmed. In addition, when information transmitted through a broadband and so on is present, an NRT service and additional information are received using corresponding uniform resource identifier (URI) information and so on. Signaling information associated with emergency alert will be described below in detail.

The receiver processes the emergency alert as follows.

The receiver recognizes a situation in which an emergency alert message is transmitted through a preamble and so on of a physical layer. The preamble of the physical layer may be a signaling signal included in a broadcast signal and may correspond to signaling in the physical layer. The preamble of the physical layer may mainly include information for acquisition of data, a broadcast frame, a data pipe, and/or a transmission parameter that are included in a broadcast signal.

The receiver checks configuration of an emergency alert channel (EAC) through physical layer signaling of the receiver and decodes the EAC to acquire EAT. Here, the EAC may correspond to the aforementioned dedicated channel.

The receiver checks the received EAT, extracts a CAP message, and transmits the CAP message to a CAP parser.

The receiver decodes a corresponding DP and receives service data when service information associated with the emergency alert is present in the EAT. The EAT may include information for identification of a DP for transmitting a service associated with the emergency alert.

When information associated with NRT service data is present in the EAT or the CAP message, the receiver receives the information through a broadband.

FIG. 62 is a diagram illustrating syntax of a fast information channel (FIC) according to an embodiment of the present invention.

Information included in the FIC may be transmitted in the form of fast information table (FIT).

Information included in the FIT may be transmitted in the form of XML and/or section table.

The FIT may include table_id information, FIT_data_version information, num_broadcast information, broadcast_id information, delivery_system_id information, base_DP_id information, base_DP_version information, num_service information, service_id information, service_category information, service_hidden_flag information, SP_indicator information, num_component information, component_id information, DP_id information, context_id information, RoHC_init_descriptor, context_profile information, max_cid information, and/or large_cid information.

The table_id information indicates that a corresponding table section refers to fast information table.

The FIT_data_version information may indicate version information about syntax and semantics contained in the fast information table. The receiver may determine whether signaling contained in the corresponding fast information table is processed, using the FIT_data_version information. The receiver may determine whether information of pre-stored FIC is updated, using the information.

The num_broadcast information may indicate the number of broadcasters that transmit a broadcast service and/or content through a corresponding frequency or a transmitted transport frame.

The broadcast_id information may indicate a unique identifier of a broadcaster that transmits a broadcast service and/or content through a corresponding frequency or a transmitted transport frame. In the case of a broadcaster that transmits MPEG-2 TS-based data, broadcast_id may have a value such as transport_stream_id of MPEG-2 TS.

The delivery_system_id information may indicate an identifier for a broadcast transmission system that applies and processes the same transmission parameter on a broadcast network that performs transmission.

The base_DP_id information is information for identification of a base DP in a broadcast signal. The base DP may refer to a DP that transmits service signaling including overhead reduction and/or program specific information/system information (PSI/SI) of a broadcaster corresponding to broadcast_id. Alternatively, the base_DP_id information may refer to a representative DP that can decode a component included in a broadcast service in the corresponding broadcaster.

The base_DP_version information may refer to version information about data transmitted through a base DP. For example, when service signaling such as PSI/SI and so on is transmitted through the base DP, if service signaling is changed, a value of the base_DP_version information may be increased one by one.

The num_service information may refer to the number of broadcast services transmitted from a broadcaster corresponding to the broadcast_id in a corresponding frequency or a transport frame.

The service_id information may be used as an identifier for identification of a broadcast service.

The service_category information may refer to a category of a broadcast service. According to a value of a corresponding field, the service_category information may have the following meaning. When a value of the service_category information is 0x01, the service_category information may refer to a basic TV, when the value of the service_category information is 0x02, the service_category information may refer to a basic radio, when the value of the service_category information is 0x03, the service_category information may refer to an RI service, when the value of the service_category information is 0x08, the service_category information may refer to a service guide, and when the value of the service_category information is 0x09, the service_category information may refer to emergency alerting.

The service_hidden_flag information may indicate whether a corresponding broadcast service is hidden. When the service is hidden, the broadcast service may be a test service or a self-used service and may be processed to be disregarded or hidden from a service list by a broadcast receiver.

The SP_indicator information may indicate whether service protection is applied to one or more components in a corresponding broadcast service.

The num_component information may indicate the number of components included in a corresponding broadcast service.

The component_id information may be used as an identifier for identification of a corresponding component in a broadcast service.

The DP_id information may be used as an identifier indicating a DP that transmits a corresponding component.

The RoHC_init_descriptor may include information associated with overhead reduction and/or header recovery. The RoHC_init_descriptor may include information for identification of a header compression method used in a transmission terminal.

The context_id information may represent a context corresponding to a following RoHC related field. The context_id information may correspond to a context identifier (CID).

The context_profile information may represent a range of a protocol for compression of a header in RoHC. When a compressor and a decompressor have the same profile, it is possible to compress and restore a stream in the RoHC.

The max_cid information is used for indicating a maximum value of a CID to a decompressor.

The large_cid information has a boolean value and indicates whether a short CID (0 to 15) or an embedded CID (0 to 16383) is used for CID configuration. Accordingly, the sized of byte for representing the CID is determined together.

FIG. 63 is a diagram illustrating syntax of an emergency alert table (EAT) according to an embodiment of the present invention.

Information associated with emergency alert may be transmitted through the EAC. The EAC may correspond to the aforementioned dedicated channel.

The EAT according to an embodiment of the present invention may include EAT_protocol_version information, automatic_tuning_flag information, num_EAS_messages information, EAS_message_id information, EAS_IP_version_flag information, EAS_message_transfer_type information, EAS_message_encoding_type information, EAS_NRT_flag information, EAS_message_length information, EAS_message_byte information, IP_address information, UDP_port_num information, DP_id information, automatic_tuning_channel_number information, automatic_tuning_DP_id information, automatic_tuning_service_id information, and/or EAS_NRT_service_id information.

The EAT_protocol_version information indicates a protocol version of received EAT.

The automatic_tuning_flag information indicates whether a receiver automatically performs channel conversion.

The num_EAS_messages information indicates the number of messages contained in the EAT.

The EAS_message_id information is information for identification of each EAS message.

The EAS_IP_version_flag information indicates IPv4 when a value of the EAS_IP_version_flag information is 0, and indicates IPv6 when a value of the EAS_IP_version_flag information is 1.

The EAS_message_transfer_type information indicates the form in which an EAS message is transmitted. When a value of the EAS_message_transfer_type information is 000, the EAS_message_transfer_type information indicates a not specified state, when a value of the EAS_message_transfer_type information is 001, the EAS_message_transfer_type information indicates a no alert message (only AV content), and when a value of the EAS_message_transfer_type information is 010, the EAS_message_transfer_type information indicates that an EAS message is contained in corresponding EAT. To this end, a length field and a field about the corresponding EAS message are added. When a value of the EAS_message_transfer_type information is 011, the EAS_message_transfer_type information indicates that the EAS message is transmitted through a data pipe. The EAS may be transmitted in the form of IP datagram in a data pipe. To this end, IP address, UDP port information, and DP information of a transmitted physical layer may be added.

The EAS_message_encoding_type information indicates information about an encoding type of an emergence alert message. For example, when a value of the EAS_message_encoding_type information is 000, the EAS_message_encoding_type information indicates a not specific state, when a value of the EAS_message_encoding_type information is 001, the EAS_message_encoding_type information indicates No Encoding, when a value of the EAS_message_encoding_type information is 010, the EAS_message_encoding_type information indicates DEFLATE algorithm (RFC1951), and 001 to 111 among values of the EAS_message_encoding_type information may be reserved for other encoding types.

The EAS_NRT_flag information indicates whether NRT contents and/or NRT data associated with a received message is present. When a value of the EAS_NRT_flag information is 0, the EAS_NRT_flag information indicates that NRT contents and/or NRT data associated with a received emergency message is not present, and when a value of the EAS_NRT_flag information is 1, the EAS_NRT_flag information indicates that NRT contents and/or NRT data associated with a received emergency message is present.

The EAS_message_length information indicates a length of an EAS message.

The EAS_message_byte information includes content of an EAS message.

The IP_address information indicates an IP address of an IP address for transmission of an EAS message.

The UDP_port_num information indicates a UDP port number for transmission of an EAS message.

The DP_id information identifies a data pipe that transmits an EAS message.

The automatic_tuning_channel_number information includes information about a number of a channel to be converted.

The automatic_tuning_DP_id information is information for identification of a data pipe that transmits corresponding content.

The automatic_tuning_service_id information is information for identification of a service to which corresponding content belongs.

The EAS_NRT_service_id information is information for identification of an NRT service corresponding to the case in which NRT contents and data associated with a received emergency alert message and transmitted, that is, the case in which an EAS_NRT_flag is enabled.

Figure 64:
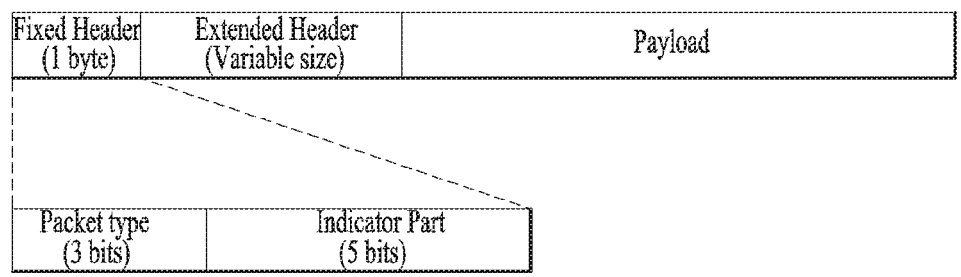
FIG. 64 is a view illustrating a packet that is transmitted through a data pipe according to an embodiment of the present invention.

FIG. 64 is a diagram illustrating a packet transmitted to a data pipe according to an embodiment of the present invention.

According to an embodiment of the present invention, configuration of a packet in a link layer is newly defined so as to generate a compatible link layer packet irrespective of change in protocol of a upper layer or the link layer or a lower layer of the link layer.

The link layer packet according to an embodiment of the present invention may be transmitted to a normal DP and/or a base DP.

The link layer packet may include a fixed header, an expansion header, and/or a payload.

The fixed header is a header with a fixed size and the expansion header is a header, the size of which can be changed according to configuration of the packet of the upper layer. The payload is a region in which data of the upper layer is transmitted.

A header (the fixed header or the expansion header) of a packet may include a field indicating a type of the payload of the packet. In the case of the fixed header, first 3 bits (packet type) of 1 byte may include data for identification of a packet type of the upper layer, and the remaining 5 bits may be used as an indicator part. The indicator part may include data for identification of a configuring method of a payload and/or configuration information of the expansion header and may be changed according to a packet type.

A table shown in the diagram represents a type of a upper layer included in a payload according to a value of a packet type.

According to system configuration, an IP packet and/or an RoHC packet of the payload may be transmitted through a DP, and a signaling packet may be transmitted through a base DP. Accordingly, when a plurality of packets are mixed and transmitted, packet type values may also be applied so as to differentiate a data packet and a signaling packet.

When a packet type value is 000, an IP packet of IPv4 is included in a payload.

When a packet type value is 001, an IP packet of IPv6 is included in a payload.

When a packet type value is 010, a compressed IP packet is included in a payload. The compressed IP packet may include an IP packet to which header compression is applied.

When a packet type value is 110, a packet including signaling data is included in a payload.

When a packet type value is 111, a framed packet type is included in a payload.

Figure 65:
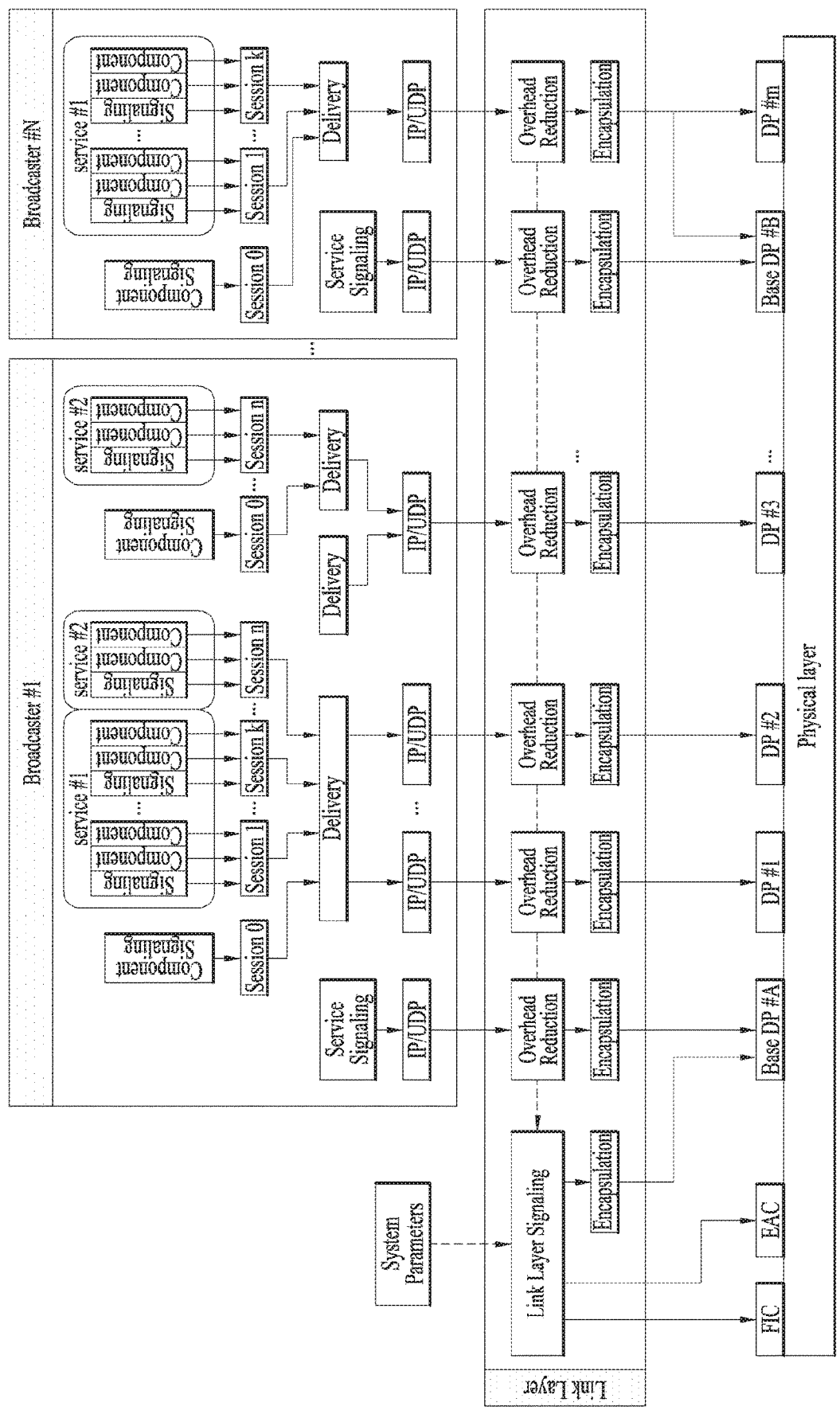
FIG. 65 is a view illustrating the detailed processing operation of signals and/or data in each protocol stack of a transmitter, in a case in which a logical data path of a physical layer includes a dedicated channel, a base DP, and a normal data DP, according to another embodiment of the present invention.

FIG. 65 is a diagram illustrating a detailed processing operation of a signal and/or data in each protocol stack of a transmitter when a logical data path of a physical layer includes a dedicated channel, a base DP, and a normal data DP, according to another embodiment of the present invention.

In one frequency band, one or more broadcasters may provide broadcast services. A broadcaster transmits multiple broadcast services and one broadcast service may include one or more components. A user may receive content in units of broadcast services.

In a broadcast system, a session-based transmission protocol may be used to support IP hybrid broadcast and the contents of signaling delivered to each signaling path may be determined according to the structure of the corresponding transmission protocol.

As described above, data related to the FIC and/or the EAC may be transmitted/received over the dedicated channel. In the broadcast system, a base DP and a normal DP may be used to distinguish therebetween.

Configuration information of the FIC and/or EAC may be included in physical layer signaling (or a transmission parameter). A link layer may format signaling according to characteristics of a corresponding channel. Transmission of data to a specific channel of a physical layer may be performed from a logical point of view and actual operation may be performed according to characteristics of a physical layer.

The FIC may include information about services of each broadcaster, transmitted in a corresponding frequency and information about paths for receiving the services. The FIC may include information for service acquisition and may be referred to as service acquisition information.

The FIC and/or the EAC may be included in link layer signaling.

Link layer signaling may include the following information.

System Parameter—A parameter related to a transmitter or a parameter related to a broadcaster that provides a service in a corresponding channel.

Link layer: Context information associated with IP header compression and an ID of a DP to which a corresponding context is applied.

Upper layer: IP address and UDP port number, service and component information, emergency alert information, and a mapping relationship between an ID address, a UDP port number, a session ID, and a DP of a packet stream and signaling transmitted in an IP layer.

As described above, one or more broadcast services are transmitted in one frequency band, the receiver does not need to decode all DPs and it is efficient to pre-check signaling information and to decode only a DP related to a necessary service.

In this case, referring to the drawing, the broadcast system may provide and acquire information for mapping a DP and a service, using the FIC and/or the base DP.

A process of processing a broadcast signal or broadcast data in a transmitter of the drawing will now be described. One or more broadcasters (broadcasters #1 to #N) may process component signaling and/or data for one or more broadcast services so as to be transmitted through one or more sessions. One broadcast service may be transmitted through one or more sessions. The broadcast service may include one or more components included in the broadcast service and/or signaling information for the broadcast service. Component signaling may include information used to acquire components included in the broadcast service in a receiver. Service signaling, component signaling, and/or data for one or more broadcast services may be transmitted to a link layer through processing in an IP layer.

In the link layer, the transmitter performs overhead reduction when overhead reduction for an IP packet is needed and generates related information as link layer signaling. Link layer signaling may include a system parameter specifying the broadcast system, in addition to the above-described information. The transmitter may process an IP packet in a link layer processing procedure and transmit the processed IP packet to a physical layer in the form of one or more DPs.

The transmitter may transmit link layer signaling to the receiver in the form or configuration of an FIC and/or an EAC. Meanwhile, the transmitter may also transmit link layer signaling to the base DP through an encapsulation procedure of the link layer.

Figure 66:
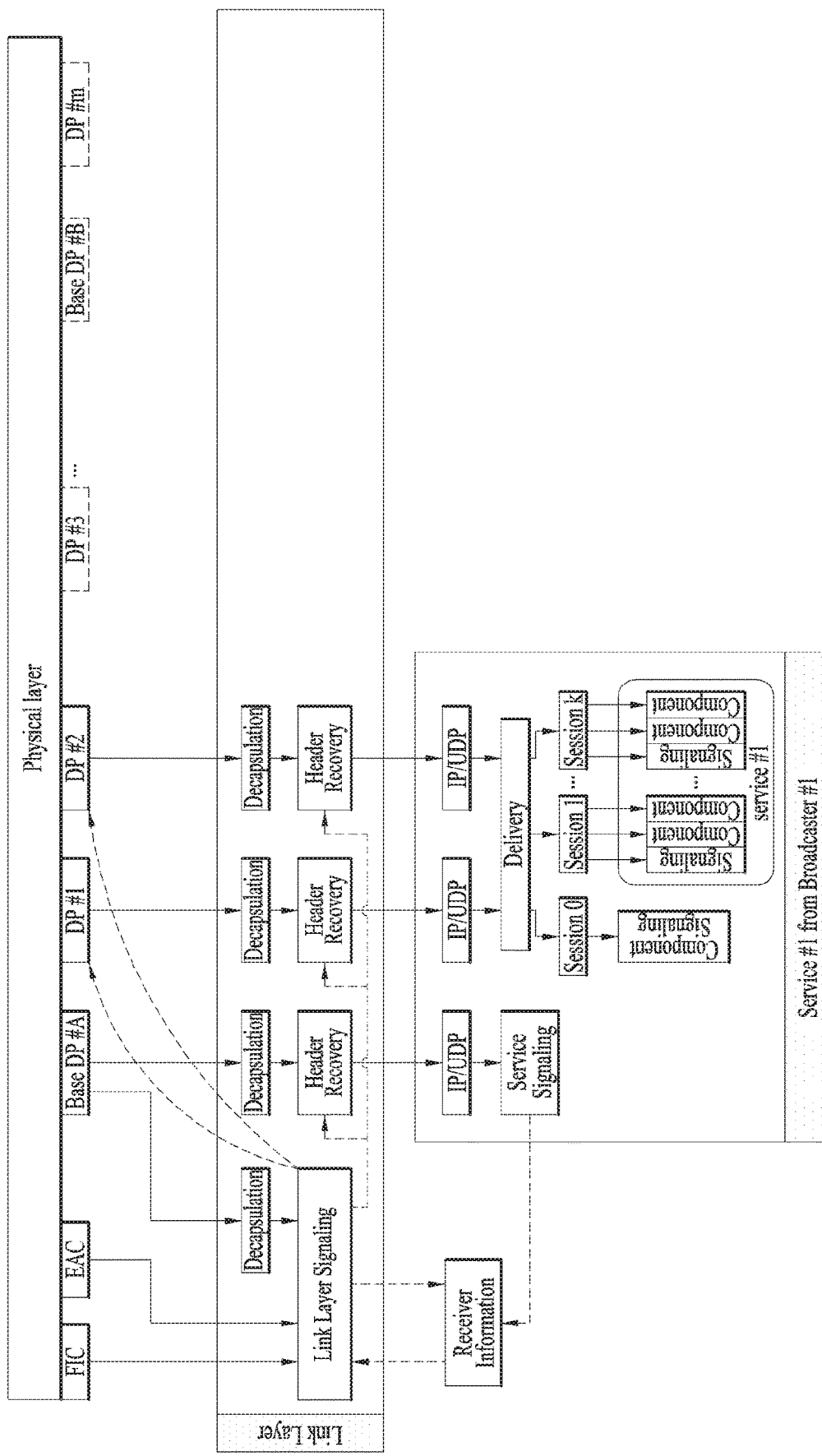
FIG. 66 is a view illustrating a detailed processing operation of signals and/or data in each protocol stack of a receiver, in a case in which a logical data path of a physical layer includes a dedicated channel, a base DP, and a normal data DP, according to another embodiment of the present invention.

FIG. 66 is a diagram illustrating a detailed processing operation of a signal and/or data in each protocol stack of a receiver when a logical data path of a physical layer includes a dedicated channel, a base DP, and a normal data DP, according to another embodiment of the present invention.

If a user selects or changes a service desired to be received, a receiver tunes to a corresponding frequency. The receiver reads information stored in a DB etc. in association with a corresponding channel. The information stored in the DB etc. of the receiver may be information included upon acquiring an FIC and/or an EAC during initial channel scan. Alternatively, the receiver may extract transmitted information as described above in this specification.

The receiver may receive the FIC and/or the EAC, receive information about a channel that the receiver desires to access, and then update information pre-stored in the DB. The receiver may acquire components for a service selected by a user and information about a mapping relationship of a DP transmitted by each component or acquire a base DP and/or a normal DP through which signaling necessary to obtain such information is transmitted. Meanwhile, when it is judged that there is no change in corresponding information using version information of the FIC or information identifying whether to require additional update of a dedicated channel, the receiver may omit a procedure of decoding or parsing the received FIC and/or EAC.

The receiver may acquire a link layer signaling packet including link layer signaling information by decoding a base DP and/or a DP through which signaling information is transmitted, based on information transmitted through the FIC. The receiver may use, when necessary, the received link layer signaling information by a combination with signaling information (e.g., receiver information in the drawing) received through the dedicated channel.

The receiver may acquire information about a DP for receiving a service selected by the user among multiple DPs that are being transmitted over a current channel and overhead reduction information about a packet stream of the corresponding DP, using the FIC and/or the link layer signaling information.

When the information about the DP for receiving the selected service is transmitted through upper layer signaling, the receiver may acquire signaling information stored in the DB and/or the shared memory as described above and then acquire information about a DP to be decoded, indicated by the corresponding signaling information.

When the link layer signaling information and normal data (e.g., data included in broadcast content) are transmitted through the same DP or only one DP is used for transmission of the link layer signaling information and normal data, the receiver may temporarily store the normal data transmitted through the DP in a device such as a buffer while the signaling information is decoded and/or parsed.

The receiver may acquire the base DP and/or the DP through which the signaling information is transmitted, acquire overhead reduction information about a DP to be received, perform decapsulation and/or header recovery for a packet stream received in a normal DP, using the acquired overhead information, process the packet stream in the form of an IP packet stream, and transmit the IP packet stream to a upper layer of the receiver.

FIG. 67 is a diagram illustrating a syntax of an FIC according to another embodiment of the present invention.

Information included in the FIC described in this drawing may be selectively combined with other information included in the FIC and may configure the FIC.

The receiver may rapidly acquire information about a channel, using the information included in the FIC. The receiver may acquire bootstrap related information using the information included in the FIC. The FIC may include information for fast channel scan and/or fast service acquisition. The FIC may be referred to by other names, for example, a service list table or service acquisition information. The FIC may be transmitted by being included in an IP packet in an IP layer according to a broadcast system. In this case, an IP address and/or a UDP port number, transmitting the FIC, may be fixed to specific values and the receiver may recognize that the IP packet transmitted with the corresponding IP address and/or UDP port number includes the FIC, without an additional processing procedure.

The FIC may include FIC_protocol_version information, transport_stream_id information, num_partitions information, partition_id information, partition_protocol_version information, num_services information, service_id information, service_data_version information, service_channel_number information, service_category information, service_status information, service_distribution information, sp_indicator information, IP_version_flag information, SSC_source_IP_address_flag information, SSC_source_IP_address information, SSC_destination_IP_address information, SSC_destination_UDP_port information, SSC_TSI information, SSC DP_ID information, num_partition_level_descriptors information, partition_level_descriptor( ) information, num_FIC_level_descriptors information, and/or FIC_level_descriptor( ) information.

FIC_protocol_version information represents a version of a protocol of an FIC.

transport_stream_id information identifies a broadcast stream. transport_stream_id information may be used as information for identifying a broadcaster.

num_partitions information represents the number of partitions in a broadcast stream. The broadcast stream may be transmitted after being divided into one or more partitions. Each partition may include one or more DPs. The DPs included in each partition may be used by one broadcaster. In this case, the partition may be defined as a data transmission unit allocated to each broadcaster.

partition_id information identifies a partition. partition_id information may identify a broadcaster.

partition_protocol_version information represents a version of a protocol of a partition.

num_services information represents the number of services included in a partition. A service may include one or more components.

service_id information identifies a service.

service_data_version information represents change when a signaling table (signaling information) for a service is changed or a service entry for a service signaled by an FIC is changed. service_data_version information may increment a value thereof whenever such change is present.

service_channel_number information represents a channel number of a service.

service_category information represents a category of a service. The category of a service includes A/V content, audio content, an electronic service guide (ESG), and/or content on demand (CoD).

service_status information represents a state of a service. A state of a service may include an active or suspended state and a hidden or shown state. The state of a service may include an inactive state. In the inactive state, broadcast content is not currently provided but may be provided later. Accordingly, when a viewer scans a channel in a receiver, the receiver may not show a scan result for a corresponding service to the viewer.

service_distribution information represents a distribution state of data for a service. For example, service_distribution information may represent that entire data of a service is included in one partition, partial data of a service is not included in a current partition but content is presentable only by data in this partition, another partition is needed to present content, or another broadcast stream is needed to present content.

sp_indicator information identifies whether service protection has been applied. sp_indicator information may identify, for example, for meaningful presentation, whether one or more necessary components are protected (e.g., a state in which a component is encrypted).

IP_version_flag information identifies whether an IP address indicated by SSC source IP address information and/or SSC destination IP address information is an IPv4 address or an IPv6 address.

SSC_source_IP_address_flag information identifies whether SSC_source_IP_address information is present.

SSC_source_IP_address information represents a source IP address of an IP datagram that transmits signaling information for a service. The signaling information for a service may be referred to as service layer signaling. Service layer signaling includes information specifying a broadcast service. For example, service layer signaling may include information identifying a data unit (a session, a DP, or a packet) that transmits components constituting a broadcast service.

SSC_destination_IP_address information represents a destination IP address of an IP datagram (or channel) that transmits signaling information for a service.

SSC_destination_UDP_port information represents a destination UDP port number for a UDP/IP stream that transmits signaling information for a service.

SSC_TSI information represents a transport session identifier (TSI) of an LCT channel (or session) that transmits signaling information (or a signaling table) for a service.

SSC_DP_ID information represents an ID for identifying a DP including signaling information (or a signaling table) for a service. As a DP including the signaling information, the most robust DP in a broadcast transmission process may be allocated.

num_partition_level_descriptors information identifies the number of descriptors of a partition level for a partition.

partition_level_descriptor( ) information includes zero or more descriptors that provide additional information for a partition.

num_FIC_level_descriptors information represents the number of descriptors of an FIC level for an FIC.

FIC_level_descriptor( ) information includes zero or more descriptors that provide additional information for an FIC.

FIG. 68 is a diagram illustrating signaling_Information_Part( ) according to an embodiment of the present invention.

A broadcast system may add additional information to an extended header part in the case of a packet for transmitting signaling information in a structure of a packet transmitted through the above-described DP. Such additional information will be referred to as Signaling_Information_Part( ).

Signaling_Information_Part( ) may include information used to determine a processing module (or processor) for received signaling information. In a system configuration procedure, the broadcast system may adjust the number of fields indicating information and the number of bits allocated to each field, in a byte allocated to Signaling_Information_Part( ). When signaling information is transmitted through multiplexing, a receiver may use information included in Signaling_Information_Part( ) to determine whether corresponding signaling information is processed and determine to which signaling processing module signaling information should be transmitted.

Signaling_Information_Part( ) may include Signaling_Class information, Information_Type information, and/or signaling format information.

Signaling_Class information may represent a class of transmitted signaling information. Signaling information may correspond to an FIC, an EAC, link layer signaling information, service signaling information, and/or upper layer signaling information. Mapping for a class of signaling information indicated by each value of configuration of the number of bits of a field of Signaling_Class information may be determined according to system design.

Information_Type information may be used to indicate details of signaling information identified by signaling class information. Meaning of a value indicated by Information_Type information may be additionally defined according to class of signaling information indicated by Signaling_Class information.

Signaling format information represents a form (or format) of signaling information configured in a payload. The signaling format information may identify formats of different types of signaling information illustrated in the drawing and identify a format of additionally designated signaling information.

Signaling_Information_Part( ) of (a) and (b) illustrated in the drawing is one embodiment and the number of bits allocated to each field thereof may be adjusted according to characteristics of the broadcast system.

Signaling_Information_Part( ) as in (a) of the drawing may include signaling class information and/or signaling format information. Signaling_Information_Part( ) may be used when a type of signaling information need not be designated or an information type can be judged in signaling information. Alternatively, when only one signaling format is used or when an additional protocol for signaling is present so that signaling formats are always equal, only a 4-bit signaling class field may be used without configuring a signaling field and the other fields may be reserved for later use or an 8-bit signaling class maybe configured to support various types of signaling.

Signaling_Information_Part( ) as in (b) of the drawing may further include information type information for indicating a type or characteristic of more detailed information in a signaling class when the signaling class is designated and may also include signaling format information. Signaling class information and information type information may be used to determine decapsulation of signaling information or a processing procedure of corresponding signaling. A detailed structure or processing of link layer signaling may refer to the above description and a description which will be given below.

Figure 69:
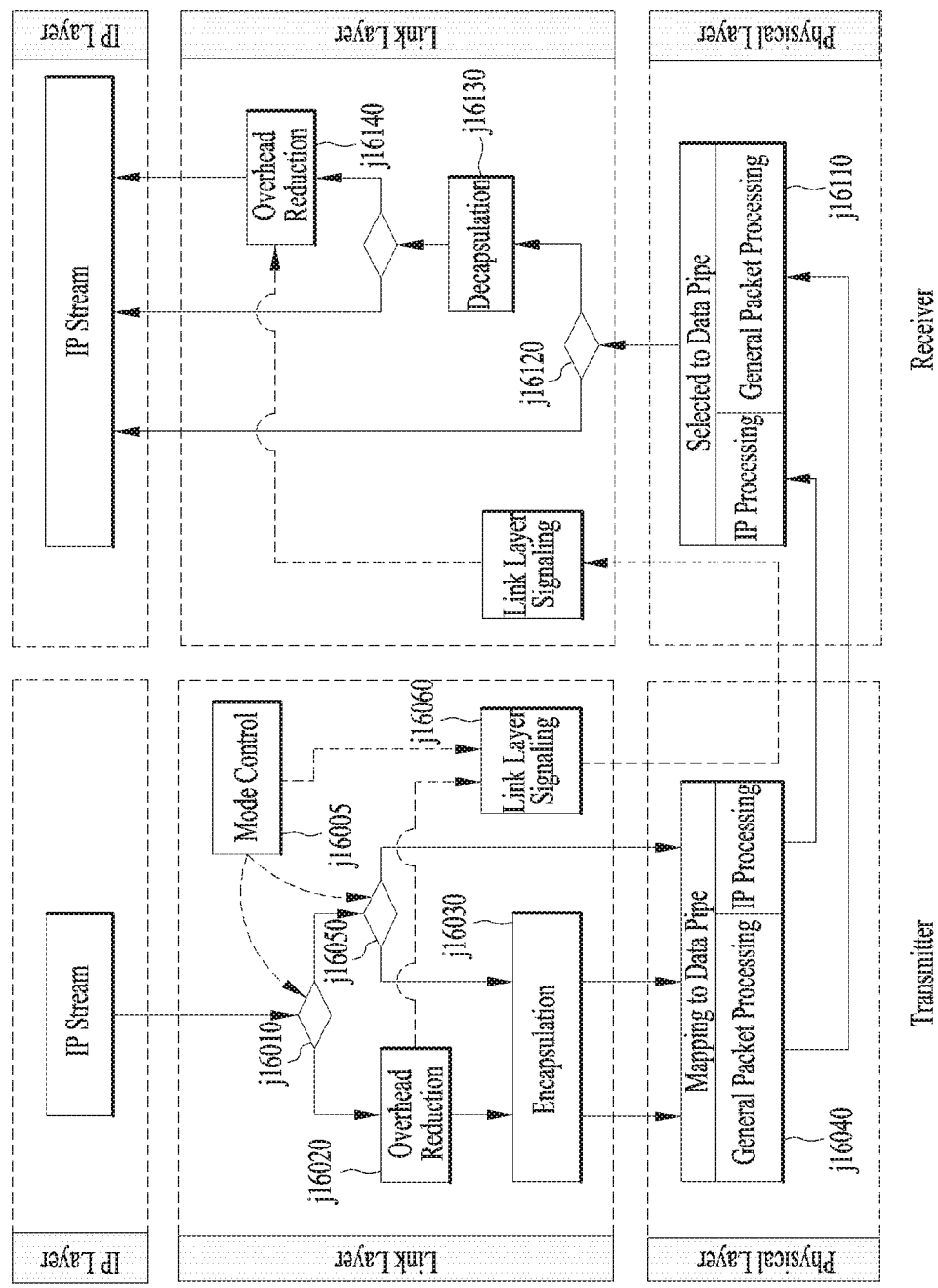
FIG. 69 is a view illustrating a process of controlling an operation mode of a transmitter and/or a receiver in a link layer according to an embodiment of the present invention.

FIG. 69 is a diagram illustrating a procedure for controlling an operation mode of a transmitter and/or a receiver in a link layer according to an embodiment of the present invention.

When the operation mode of the transmitter or the receiver of the link layer is determined, a broadcast system can be more efficiently used and can be flexibly designed. The method of controlling the link layer mode proposed according to the present invention can dynamically convert a mode of a link layer in order to efficiently manage a system bandwidth and processing time. In addition, the method of controlling the link layer mode according to the present invention may easily cope with the case in which a specific mode needs to be supported due to change in a physical layer or on the other hand, the specific mode does not have to be changed any more. In addition, the method of controlling the link layer mode according to the present invention may also allow a broadcast system to easily satisfy requirements of a corresponding broadcaster when a broadcaster providing a broadcast service intends to designate a method of transmitting a corresponding service.

The method of controlling the mode of the link layer may be configured to be performed only in a link layer or to be performed via change in data configuration in the link layer. In this case, it is possible to perform an independent operation of each layer in a network layer and/or a physical layer without embodiment of a separate function. In the mode of the link layer proposed according to the present invention, it is possible to control the mode with signaling or parameters in a system without changing a system in order to satisfy configuration of a physical layer. A specific mode may be performed only when processing of corresponding input is supported in a physical layer.

The diagram is a flowchart illustrating processing of signal and/or data in an IP layer, a link layer, and a physical layer by a transmitter and/or a receiver.

A function block (which may be embodied as hardware and/or software) for mode control may be added to the link layer and may manage parameter and/or signaling information for determination of whether a packet is processed. The link layer may determine whether a corresponding function is performed during processing of a packet stream using information of a mode control functional block.

First, an operation of the transmitter will be described.

When an IP is input to a link layer, the transmitter determines whether overhead reduction (j16020) is performed using a mode control parameter (j16005). The mode control parameter may be generated by a service provider in the transmitter. The mode control parameter will be described below in detail.

When the overhead reduction (j16020) is performed, information about overhead reduction is generated and is added to link layer signaling (j16060) information. The link layer signaling (j16060) information may include all or some of mode control parameters. The link layer signaling (j16060) information may be transmitted in the form of link layer signaling packet. The link layer signaling packet may be mapped to a DP and transmitted to the receiver, but may not be mapped to the DP and may be transmitted to the receiver in the form of link layer signaling packet through a predetermined region of a broadcast signal.

A packet stream on which the overhead reduction (j16020) is performed is encapsulated (j16030) and input to a DP of a physical layer (j16040). When overhead reduction is not performed, whether encapsulation is performed is re-determined (16050).

A packet stream on which the encapsulation (j16030) is performed is input to a DP (j16040) of a physical layer. In this case, the physical layer performs an operation for processing a general packet (a link layer packet). When overhead reduction and encapsulation are not performed, an IP packet is transmitted directly to a physical layer. In this case, the physical layer performs an operation for processing the IP packet. When the IP packet is directly transmitted, a parameter may be applied to perform the operation only when the physical layer support IP packet input. That is, a value of a mode control parameter may be configured to be adjusted such that a process of transmitting an IP packet directly to a physical layer is not performed when the physical layer does not support processing of an IP packet.

The transmitter transmits a broadcast signal on which this process is performed, to the receiver.

An operation of the receiver will be described below.

When a specific DP is selected for the reason such channel change and so on according to user manipulation and a corresponding DP receives a packet stream (j16110), the receiver may check a mode in which a packet is generated, using a header and/or signaling information of the packet stream (j16120). When the operation mode during transmission of the corresponding DP is checked, decapsulation (j16130) and overhead reduction (j16140) processes are performed through a receiving operating process of a link layer and then an IP packet is transmitted to a upper layer. The overhead reduction (j16140) process may include an overhead recovery process.

FIG. 70 is a diagram illustrating an operation in a link layer according to a value of a flag and a type of a packet transmitted to a physical layer according to an embodiment of the present invention.

In order to determine an operation mode of the link layer, the aforementioned signaling method may be used. Signaling information associated with the method may be transmitted directly to a receiver. In this case, the aforementioned signaling data or link layer signaling packet may include mode control that will be described below and related information.

In consideration of the complexity of the receiver, an operation mode of the link layer may be indirectly indicated to the receiver.

The following two flags may be configured with regard to control of an operation mode.

Header compression flag (HCF): This may be a flag for determination of whether header compression is applied to a corresponding link layer and may have a value indicating enable or disable.

Encapsulation flag (EF): This may be a flag for determination of whether encapsulation is applied in a corresponding link layer and may have a value indicating enable or disable. However, when encapsulation needs to be performed according to a header compression scheme, the EF may be defined to be dependent upon a HCF.

A value mapped to each flag may be applied according to system configuration as long as the value represents Enable and Disable, and a bit number allocated to each flag can be changed. According to an embodiment of the present invention, an enable value may be mapped to 1 and a disable value may be mapped to 0.

The diagram shows whether header compression and encapsulation included in a link layer are performed according to values of HCF and EF and in this case, a packet format transmitted to a physical layer. That is, according to an embodiment of the present invention, the receiver can know a type of a packet input to the physical layer as information about the HCF and the EF.

FIG. 71 is a diagram a descriptor for signaling a mode control parameter according to an embodiment of the present invention.

Flags as information about mode control in a link layer may be signaling information, generated by the transmitter in the form of descriptor, and transmitted to the receiver. Signaling including a flag as information about mode control may be used to control an operation mode in a transmitter of a headend terminal, and whether a flag as information about mode control is included in signaling transmitted to the receiver may be optionally selected.

When signaling including a flag as information about mode control is transmitted to the receiver, the receiver may directly select an operation mode about a corresponding DP and perform a packet decapsulation operation. When signaling including a flag as information about mode control is not transmitted to the receiver, the receiver can determine a mode in which the signaling is transmitted, using physical layer signaling or field information of a packet header, which is transmitted to the receiver.

The link layer mode control description according to an embodiment of the present invention may include DP_id information, HCF information, and/or EF information. The link layer mode control description may be included in a transmission parameter in the aforementioned FIC, link layer signaling packet, signaling via a dedicated channel, PSI/SI, and/or physical layer.

The DP_id information identifies a DP to which a mode in a link layer is applied.

The HCF information identifies whether header compression is applied in the DP identified by the DP_id information.

The EF information identifies whether encapsulation is performed on the DP identified by the DP_id information.

Figure 72:
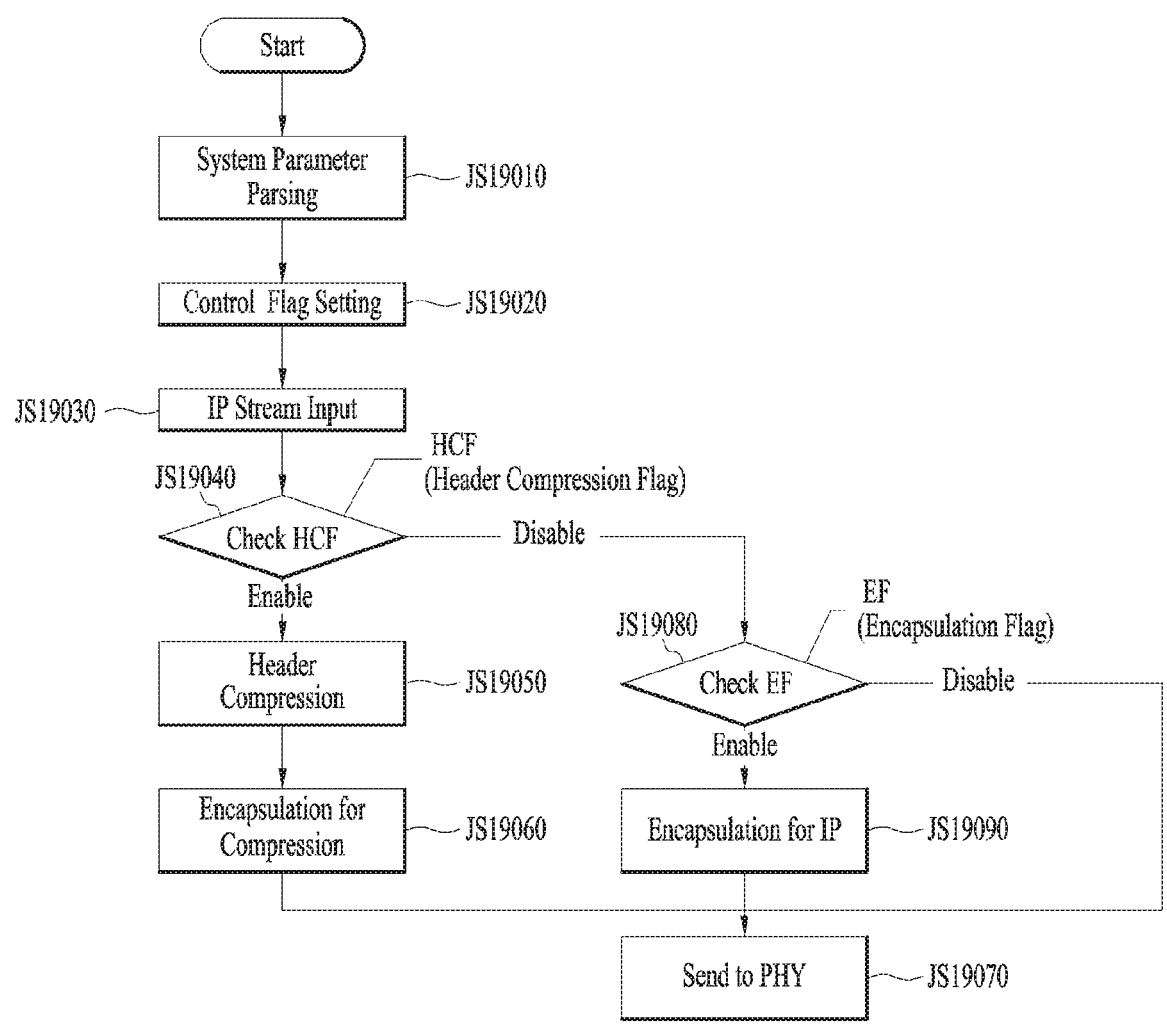
FIG. 72 is a view illustrating the operation of a transmitter that controls an operation mode according to an embodiment of the present invention.

FIG. 72 is a diagram illustrating an operation of a transmitter for controlling a operation mode according to an embodiment of the present invention.

Although not illustrated in the diagram, prior to a processing process of al ink layer, a transmitter may perform processing in a upper layer (e.g., an IP layer). The transmitter may generate an IP packet including broadcast data for a broadcast service.

The transmitter parses or generates a system parameter (JS19010). Here, the system parameter may correspond to the aforementioned signaling data and signaling information.

The transmitter may receive or set mode control related parameter or signaling information during a broadcast data processing process in a link layer and sets a flag value associated with operation mode control (JS19020). The transmitter may perform this operation after the header compression operation or the encapsulation operation. That is, the transmitter may perform the header compression or encapsulation operation and generate information associated with this operation.

The transmitter acquires a packet of a upper layer that needs to be transmitted through a broadcast signal (JS19030). Here, the packet of the upper layer may correspond to an IP packet.

The transmitter checks HCF in order to determine whether header compression is applied to the packet of the upper layer (JS19040).

When the HCF is enabled, the transmitter applies the header compression to the packet of the upper layer (JS19050). After header compression is performed, the transmitter may generate the HCF. The HCF may be used to signal whether header compression is applied, to the receiver.

The transmitter performs encapsulation on the packet of the upper layer to which header compression is applied to generate a link layer packet (JS19060). After the encapsulation process is performed, the transmitter may generate an EF. The EF may be used to signal whether encapsulation is applied to the upper layer packet, to the receiver.

The transmitter transmits the link layer packet to a physical layer processor (JS19070). Then the physical layer processor generates a broadcast signal including the link layer packet and transmits the broadcast signal to the receiver.

When the HCF is disabled, the transmitter checks the EF in order to determine whether encapsulation is applied (JS19080).

When the EF is enabled, the transmitter performs encapsulation on the upper layer packet (JS19090). When the EF is disabled, the transmitter does not perform separate processing on the corresponding packet stream. The transmitter transmits the packet stream (link layer packet) on which processing is completed in the link layer, to a physical layer (JS19070). Header compression, encapsulation, and/or generation of link layer may be performed by a link layer packet generator (i.e. link layer processor) in the transmitter.

The transmitter may generate service signaling channel (SCC) data. The service signaling channel data may be generated by a service signaling data encoder. The service signaling data encoder may be included in a link layer processor and may present separately from the link layer processor. The service signaling channel data may include the aforementioned FIC and/or EAT. The service signaling channel data may be transmitted to the aforementioned dedicated channel.

Figure 73:
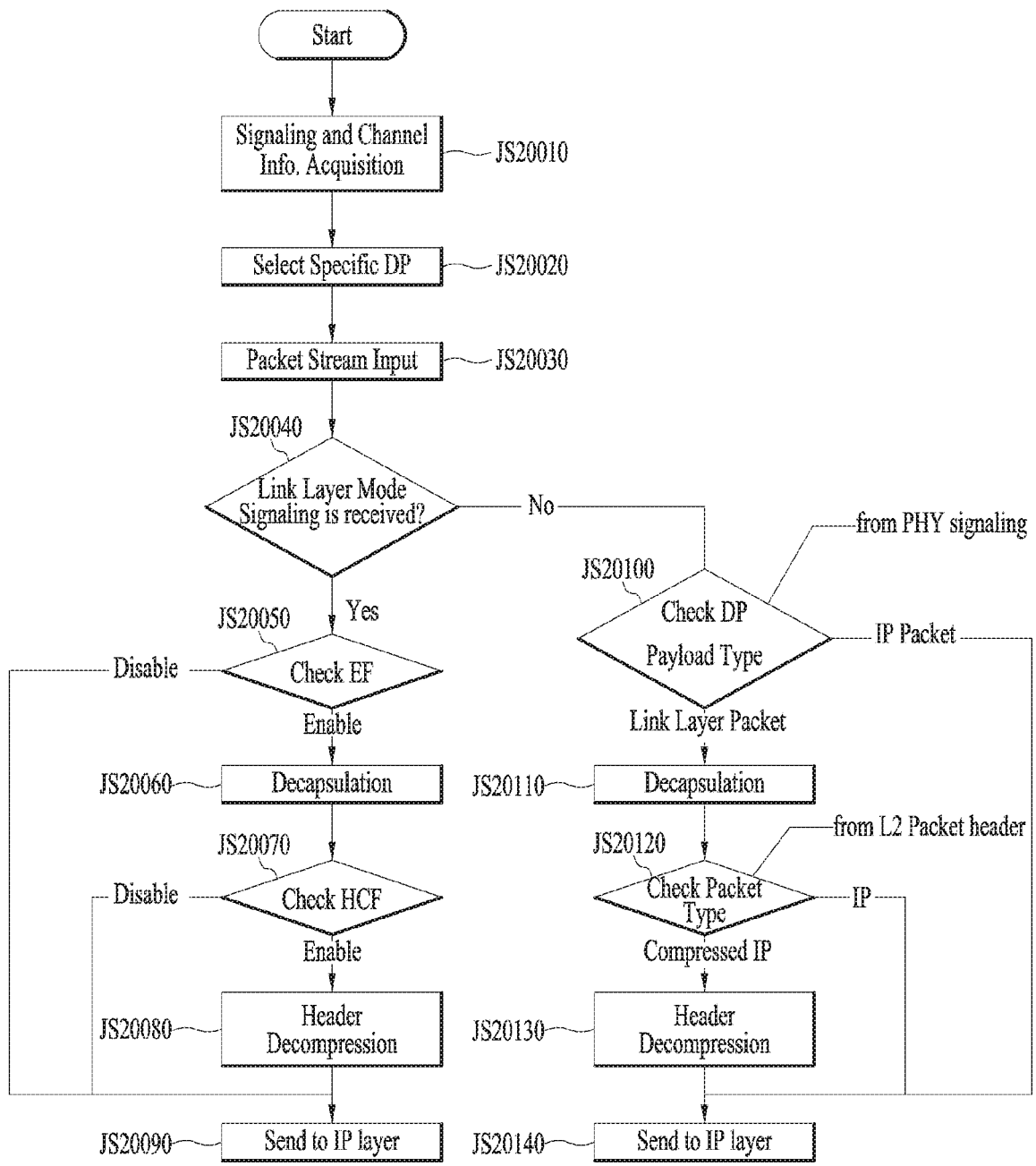
FIG. 73 is a view illustrating the operation of a transmitter that processes a broadcast signal based on an operation mode according to an embodiment of the present invention.

FIG. 73 is a diagram illustrating an operation of a receiver for processing a broadcast signal according to an operation mode according to an embodiment of the present invention.

A receiver may receive information associated with an operation mode in a link layer together with a packet stream.

The receiver receives signaling information and/or channel information (JS20010). Here, a description of the signaling information and/or the channel information is replaced with the above description.

The receiver selects a DP for receiving and processing according to the signaling information and/or the channel information (JS20020).

The receiver performs decoding of a physical layer on the selected DP and receives a packet stream of a link layer (JS20030).

The receiver checks whether link layer mode control related signaling is included in the received signaling (JS20040).

When the receiver receives the link layer mode related information, the receiver checks an EF (JS20050).

When the EF is enabled, the receiver performs a decapsulation process on a link layer packet (JS20060).

The receiver checks an HCF after decapsulation of the packet, and performs a header decompression process when the HCF is enabled (JS20080).

The receiver transmits the packet on which header decompression is performed, to a upper layer (e.g., an IP layer) (JS20090). During the aforementioned process, when the HCF and the EF are disabled, the receiver recognizes the processed packet stream as an IP packet and transmits the corresponding packet to the IP layer.

When the receiver does not receive link layer mode related information or a corresponding system does not transmit the link layer mode related information to the receiver, the following operation is performed.

The receiver receives signaling information and/or channel information (JS20010) and selects a DP for reception and processing according to corresponding information (JS20020). The receiver performs decoding of the physical layer on the selected DP to acquire a packet stream (JS20030).

The receiver checks whether the received signaling includes link layer mode control related signaling (JS20040).

Since the receiver does not receive link layer mode related signaling, the receiver checks a format of the packet transmitted using physical layer signaling, etc. (JS20100). Here, the physical layer signaling information may include information for identification of a type of the packet included in a payload of the DP. When the packet transmitted from the physical layer is an IP packet, the receiver transmits the packet to the IP layer without a separate process in a link layer.

When a packet transmitted from a physical layer is a packet on which encapsulation is performed, the receiver performs a decapsulation process on the corresponding packet (JS20110).

The receiver checks the form of a packet included in a payload using information such as a header, etc. of the link layer packet during the decapsulation process (JS20120), and the receiver transmits the corresponding packet to the IP layer processor when the payload is an IP packet.

When the payload of the link layer packet is a compressed IP, the receiver performs a decompression process on the corresponding packet (JS20130).

The receiver transmits the IP packet to an IP layer processor (JS20140).

FIG. 74 is a diagram illustrating information for identifying an encapsulation mode according to an embodiment of the present invention.

In a broadcast system, when processing in a link layer operates in one or more modes, a procedure for determining as which mode processing in the link layer operates (in a transmitter and/or a receiver) may be needed. In a procedure of establishing a transmission link between the transmitter and the receiver, the transmitter and/or the receiver may confirm configuration information of the link layer. This case may correspond to the case in which the receiver is initially set up or performs a scan procedure for a service or a mobile receiver newly enters an area within a transmission radius of the transmitter. This procedure may be referred to as an initialization procedure or a bootstrapping procedure. This procedure may be configured as a partial process of a procedure supported by the system without being configured by an additional procedure. In this specification, this procedure will be referred to as an initialization procedure.

Parameters needed in the initialization procedure may be determined according to functions supported by a corresponding link layer and types of operating modes possessed by each function. A description will be given hereinafter of the parameters capable of determining functions constituting the link layer and operation modes according to the functions.

The above-described drawing illustrates parameters for identifying an encapsulation mode.

When a procedure for encapsulating a packet in a link layer or a upper layer (e.g., an IP layer) can be configured, indexes are assigned to respective encapsulation modes and a proper field value may be allocated to each index. The drawing illustrates an embodiment of a field value mapped to each encapsulation mode. While it is assumed that a 2-bit field value is assigned in this embodiment, the field value may be expanded within a range permitted by the system in actual implementation, when more supportable encapsulation modes are present.

In this embodiment, if a field of information indicating an encapsulation mode is set to '00', the corresponding information may represent that encapsulation in a link layer is bypasses and not performed. If a field of information indicating an encapsulation mode is set to '01', the corresponding information may represent that data is processed by a first encapsulation scheme in the link layer. If a field of information indicating an encapsulation mode is set to '10', the corresponding information may represent that data is processed by a second encapsulation scheme in the link layer. If a field of information indicating an encapsulation mode is set to '11', the corresponding information may represent that data is processed by a third encapsulation scheme in the link layer.

FIG. 75 is a diagram illustrating information for identifying a header compression mode according to an embodiment of the present invention.

Processing in a link layer may include a function of header compression of an IP packet. If a few IP header compression schemes are capable of being supported in the link layer, a transmitter may determine which scheme the transmitter is to use.

Determination of a header compression mode generally accompanies an encapsulation function. Therefore, when the encapsulation mode is disabled, the header compression mode may also be disabled. The above-described drawing illustrates an embodiment of a field value mapped to each header compression mode. While it is assumed that a 3-bit field value is assigned in this embodiment, the field value may be expanded or shortened within a range permitted by the system in actual implementation according to a supportable header compression mode.

In this embodiment, if a field of information indicating the header compression mode is set to '000', the corresponding information may indicate that header compression processing for data is not performed in a link layer. If a field of information indicating the header compression mode is set to '001', the corresponding information may indicate that header compression processing for data in the link layer uses an RoHC scheme. If a field of information indicating the header compression mode is set to '010', the corresponding information may indicate that header compression processing for data in the link layer uses a second RoHC scheme. If a field of information indicating the header compression mode is set to '011', the corresponding information may indicate that header compression processing for data in the link layer uses a third RoHC scheme. If a field of information indicating the header compression mode is set to '100' to '111', the corresponding information may indicate that header compressing for data is reserved as a region for identifying a new header compression processing scheme for data in the link layer.

FIG. 76 is a diagram illustrating information for identifying a packet reconfiguration mode according to an embodiment of the present invention.

To apply a header compression scheme to a unidirectional link such as a broadcast system, the broadcast system (transmitter and/or receiver) needs to rapidly acquire context information. The broadcast system may transmit/receive a packet stream after a header compression procedure in an out-of-band form through reconfiguration of partial compressed packets and/or extraction of context information. In the present invention, a mode for reconfiguring a packet or performing processing such as addition of information capable of identifying the structure of the packet may be referred to as a packet reconfiguration mode.

The packet reconfiguration mode may use a few schemes and the broadcast system may designate a corresponding scheme in an initialization procedure of a link layer. The above-described drawing illustrates an embodiment of an index and a field value mapped to the packet reconfiguration mode. While it is assumed that a 2-bit field value is assigned in this embodiment, the field value may be expanded or shortened within a range permitted by the system in actual implementation according to a supportable packet reconfiguration mode.

In this embodiment, if a field of information indicating the packet reconfiguration mode is set to '00', corresponding information may represent that reconfiguration for a packet transmitting data is not performed in a link layer. If a field of information indicating the packet reconfiguration mode is set to '01', corresponding information may represent that a first reconfiguration scheme is performed for a packet transmitting data in the link layer. If a field of information indicating the packet reconfiguration mode is set to '10', corresponding information may represent that a second reconfiguration scheme is performed for a packet transmitting data in the link layer. If a field of information indicating the packet reconfiguration mode is set to '11', corresponding information may represent that a third reconfiguration scheme is performed for a packet transmitting data in the link layer.

FIG. 77 is a diagram illustrating a context transmission mode according to an embodiment of the present invention.

A transmission scheme of the above-described context information may include one or more transmission modes. That is, the broadcast system may transmit the context information in many ways. In the broadcast system, a context transmission mode may be determined according to the system and/or a transmission path of a logical physical layer and information for identifying the context transmission scheme may be signaled. The above-described drawing illustrates an embodiment of an index and a field value mapped to the context transmission mode. While it is assumed that a 3-bit field value is assigned in this embodiment, the field value may be expanded or shortened within a range permitted by the system in actual implementation according to a supportable context transmission mode.

In this embodiment, if a field of information indicating the context transmission mode is set to '000', corresponding field information may represent that context information is transmitted as a first transmission mode. If a field of information indicating the context transmission mode is set to '001', corresponding information may represent that context information is transmitted as a second transmission mode. If a field of information indicating the context transmission mode is set to '010', corresponding information may represent that context information is transmitted as a third transmission mode. If a field of information indicating the context transmission mode is set to '011', corresponding information may represent that context information is transmitted as a fourth transmission mode. If a field of information indicating the context transmission mode is set to '100', corresponding information may represent that context information is transmitted as a fifth transmission mode. If a field of information indicating a context transmission mode is set to '101' to '111', corresponding information may represent that context information is reserved to identify a new transmission mode.

FIG. 78 is a diagram illustrating initialization information when RoHC is applied by a header compression scheme according to an embodiment of the present invention.

While the case in which RoHC is used for header compression has been described by way of example in the present invention, similar initialization information may be used in the broadcast system even when a header compression scheme of other types is used.

In the broadcast system, transmission of initialization information suitable for a corresponding compression scheme according to a header compression mode may be needed. In this embodiment, an initialization parameter for the case in which a header compression mode is set to RoHC is described. Initialization information for RoHC may be used to transmit information about configuration of an RoHC channel which is a link between a compressor and a decompressor.

One RoHC channel may include one or more context information and information commonly applied to all contexts in the RoHC channel may be transmitted/received by being included in the initialization information. A path through which related information is transmitted by applying RoHC may be referred to as an RoHC channel and, generally, the RoHC channel may be mapped to a link. In addition, the RoHC channel may be generally transmitted through one DP and, in this case, the RoHC channel may be expressed using information related to the DP.

The initialization information may include link_id information, max_cid information, large_cids information, num_profiles information, profiles( ) information, num_IP stream information, and/or IP_address( ) information.

link_id information represents an ID of a link (RoHC channel) to which corresponding information is applied. When the link or the RoHC channel is transmitted through one DP, link_id information may be replaced with DP_id.

max_cid information represents a maximum value of a CID. max_cid information may be used to inform a decompressor of the maximum value of the CID.

large_cids information has a Boolean value and identifies whether a short CID (0 to 15) is used or an embedded CID (0 to 16383) is used in configuring a CID. Therefore, a byte size expressing the CID may also be determined.

num_profiles information represents the number of profiles supported in an identified RoHC channel.

profiles( ) information represents a range of a protocol header-compressed in RoHC. Since a compressor and a decompressor should have the same profile in RoHC to compress and recover a stream, a receiver may acquire a parameter of RoHC used in a transmitter from profiles( ) information.

num_IP_stream information represents the number of IP streams transmitted through a channel (e.g., an RoHC channel).

IP_address information represents an address of an IP stream. IP_address information may represent a destination address of a filtered IP stream which is input to an RoHC compressor (transmitter).

FIG. 79 is a diagram illustrating information for identifying link layer signaling path configuration according to an embodiment of the present invention.

In the broadcast system, generally, a path through which signaling information is delivered is designed not to be changed. However, when the system is changed or while replacement between different standards occurs, information about configuration of a physical layer in which link layer signaling information rather than an IP packet is transmitted needs to be signaled. In addition, when a mobile receiver moves between regions covered by transmitters having different configurations, since paths through which link layer signaling information is transmitted may differ, the case in which link layer signaling path information should be transmitted may occur. The above-described drawing illustrates information for identifying a signaling path which is a path through which the link layer signaling information is transmitted/received. Indexes may be expanded or shortened with respect to the link layer signaling information according to a signaling transmission path configured in a physical layer. Separately from configuration in a link layer, operation of a corresponding channel may conform to a procedure of the physical layer.

The above-described drawing illustrates an embodiment in which information about signaling path configuration is allocated to a field value. In this specification, when multiple signaling paths are supported, indexes may be mapped to signaling paths having great importance in order of small values. Signaling paths having priority prioritized according to an index value may also be identified.

Alternatively, the broadcast system may use all signaling paths having higher priority than signaling paths indicated by the information about signaling path configuration. For example, when a signaling path configuration index value is 3, a corresponding field value may be '011' indicating that all of a dedicated data path, a specific signaling channel (FIC), and a specific signaling channel (EAC), priorities of which are 1, 2, and 3, are being used.

Signaling of the above scheme can reduce the amount of data that transmits signaling information.

FIG. 80 is a diagram illustrating information about signaling path configuration by a bit mapping scheme according to an embodiment of the present invention.

The above-described information about signaling path configuration may be transmitted/received through definition of a bit mapping scheme. In this embodiment, allocation of 4 bits to the information about signaling path configuration is considered and signaling paths corresponding to respective bits b1, b2, b3, and b4 may be mapped. If a bit value of each position is 0, this may indicate that a corresponding path is disabled and, if a bit value of each position is 1, this may indicate that a corresponding path is enabled. For example, if a 4-bit signaling path configuration field value is '1100', this may indicate that the broadcast system is using a dedicated DP and a specific signaling channel (FIC) in a link layer.

Figure 81:
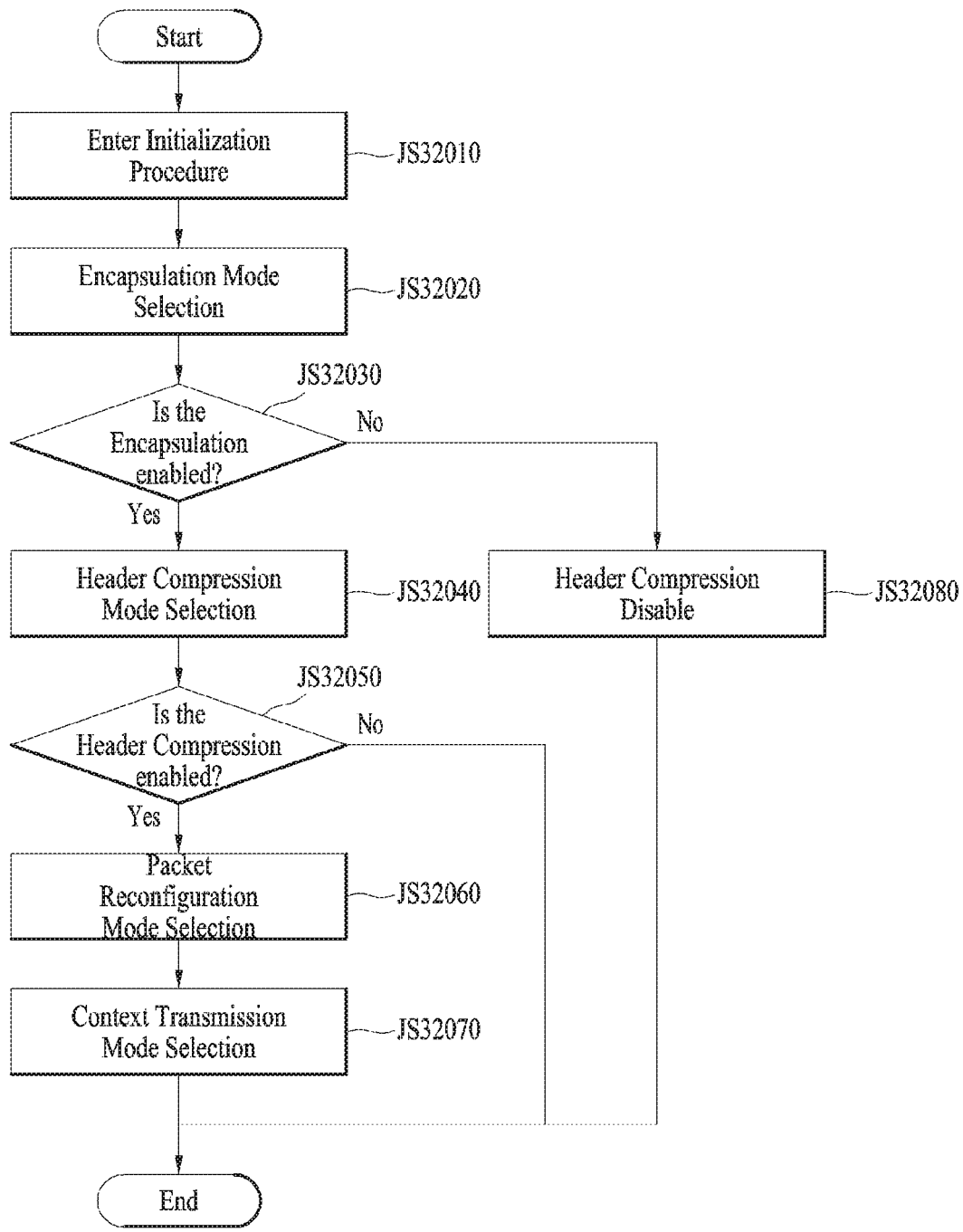
FIG. 81 is a flowchart illustrating a link layer initialization procedure according to an embodiment of the present invention.

FIG. 81 is a flowchart illustrating a link layer initialization procedure according to an embodiment of the present invention.

If a receiver is powered on or a mobile receiver enters a transmission region of a new transmitter, the receiver may perform an initialization procedure for all or some system configurations. In this case, an initialization procedure for a link layer may also be performed. Initial setup of the link layer in the receiver, using the above-described initialization parameters may be performed as illustrated in the drawing.

The receiver enters an initialization procedure of a link layer (JS32010).

Upon entering the initialization procedure of the link layer, the receiver selects an encapsulation mode (JS32020). The receiver may select the encapsulation mode using the above-described initialization parameters in this procedure.

The receiver determines whether encapsulation is enabled (JS32030). The receiver may determine whether encapsulation is enabled using the above-described initialization parameters in this procedure.

Generally, since a header compression scheme is applied after the encapsulation procedure, if an encapsulation mode is disabled, the receiver may determine that a header compression mode is disabled (JS32080). In this case, since it is not necessary for the receiver to proceed to the initialization procedure any more, the receiver may immediately transmit data to another layer or transition to a data processing procedure.

The receiver selects a header compression mode (JS32040) when the encapsulation mode is enabled. Upon selecting the header compression mode, the receiver may determine a header compression scheme applied to a packet, using the above-described initialization parameter.

The receiver determines whether header compression is enabled (JS32050). If header compression is disabled, the receiver may immediately transmit data or transition to a data processing procedure.

If header compression is enabled, the receiver selects a packet stream reconfiguration mode and/or a context transmission mode (JS32060 and JS32070) with respect to a corresponding header compression scheme. The receiver may select respective modes using the above-described information in this procedure.

Next, the receiver may transmit data for another processing procedure or perform the data processing procedure.

FIG. 82 is a flowchart illustrating a link layer initialization procedure according to another embodiment of the present invention.

The receiver enters an initialization procedure of a link layer (JS33010).

The receiver identifies link layer signaling path configuration (JS33020). The receiver may identify a path through which link layer signaling information is transmitted, using the above-described information.

The receiver selects an encapsulation mode (JS33030). The receiver may select the encapsulation mode using the above-described initialization parameter.

The receiver determines whether encapsulation is enabled (JS33040). The receiver may determine whether encapsulation is enabled, using the above-described initialization parameter in this procedure.

Generally, since a header compression scheme is applied after the encapsulation procedure, if an encapsulation mode is disabled, the receiver may determine that a header compression mode is disabled (JS34100). In this case, since it is not necessary for the receiver to proceed to the initialization procedure any more, the receiver may immediately transmit data to another layer or transition to a data processing procedure.

The receiver selects a header compression mode (JS33050) when the encapsulation mode is enabled. Upon selecting the header compression mode, the receiver may determine a header compression scheme applied to a packet, using the above-described initialization parameter.

The receiver determines whether header compression is enabled (JS33060). If header compression is disabled, the receiver may immediately transmit data or transition to the data processing procedure.

If header compression is enabled, the receiver selects a packet stream reconfiguration mode and/or a context transmission mode (JS33070 and JS32080) with respect to a corresponding header compression scheme. The receiver may select respective modes using the above-described information in this procedure.

The receiver performs header compression initialization (JS33090). The receiver may use the above-described information in a procedure of performing header compression initialization. Next, the receiver may transmit data for another processing procedure or perform the data processing procedure.

FIG. 83 is a diagram illustrating a signaling format for transmitting an initialization parameter according to an embodiment of the present invention.

To actually transmit the above-described initialization parameter to a receiver, the broadcast system may transmit/receive corresponding information in the form of a descriptor. When multiple links operated in a link layer configured in the system are present, link_id information capable of identifying the respective links may be assigned and different parameters may be applied according to link_id information. For example, if a type of data transmitted to the link layer is an IP stream, when an IP address is not changed in the corresponding IP stream, configuration information may designate n IP address transmitted by a upper layer.

The link layer initialization descriptor for transmitting the initialization parameter according to an embodiment of the present invention may include descriptor_tag information, descriptor_length information, num_link information, link_id information, encapsulation_mode information, header_compression_mode information, packet_reconfiguration_mode information, context_transmission_mode information, max_cid information, large_cids information, num_profiles information, and/or profiles( ) information. A description of the above information is replaced with a description of the above-described information having a similar or identical name.

FIG. 84 is a diagram illustrating a signaling format for transmitting an initialization parameter according to another embodiment of the present invention.

The drawing illustrates a descriptor of another form to actually transmit the above-described initialization parameter to a receiver. In this embodiment, the above-described initial configuration information of header compression is excluded. When an additional header compression initialization procedure is performed in data processing of each link layer or an additional header compression parameter is given to a packet of each link layer, the descriptor configured in the same form as in this embodiment may be transmitted and received.

The link layer initialization descriptor for transmitting the initialization parameter according to another embodiment of the present invention may include descriptor_tag information, descriptor_length information, num_link information, link_id information, encapsulation_mode information, header_compression_mode information, packet_reconfiguration_mode information, and/or context_transmission_mode information. A description of the above information is replaced with a description of the above-described information having a similar or identical name.

FIG. 85 is a diagram illustrating a signaling format for transmitting an initialization parameter according to another embodiment of the present invention.

The drawing illustrates a descriptor of another form to actually transmit the above-described initialization parameter to a receiver. In this embodiment, a descriptor for transmitting the initialization parameter includes configuration information about a signaling transmission path without including initial configuration information of header compression.

The configuration parameter about the signaling transmission path may use a 4-bit mapping scheme as described above. When a broadcast system (or transmitter or a receiver) for processing a broadcast signal is changed, a link layer signaling transmission scheme or the contents of link layer signaling may differ. In this case, if the initialization parameter is transmitted in the same form as in this embodiment, the initialization parameter may be used even in the case of change of link layer signaling.

The link layer initialization descriptor for transmitting the initialization parameter according to another embodiment of the present invention may include descriptor_tag information, descriptor_length information, num_link information, signaling_path_configuration information, dedicated_DP_id information, link_id information, encapsulation_mode information, header_compression_mode information, packet_reconfiguration_mode information, and/or context_transmission_mode information.

When the link layer signaling information is transmitted through a dedicated DP, dedicated_DP_id information is information identifying the corresponding DP. When the dedicated DP is determined as a path for transmitting the signaling information in signaling path configuration, DP_id may be designated to include DP_id information in the descriptor for transmitting the initialization parameter.

A description of the above information contained in the descriptor is replaced with a description of the above-described information having a similar or identical name.

Figure 86:
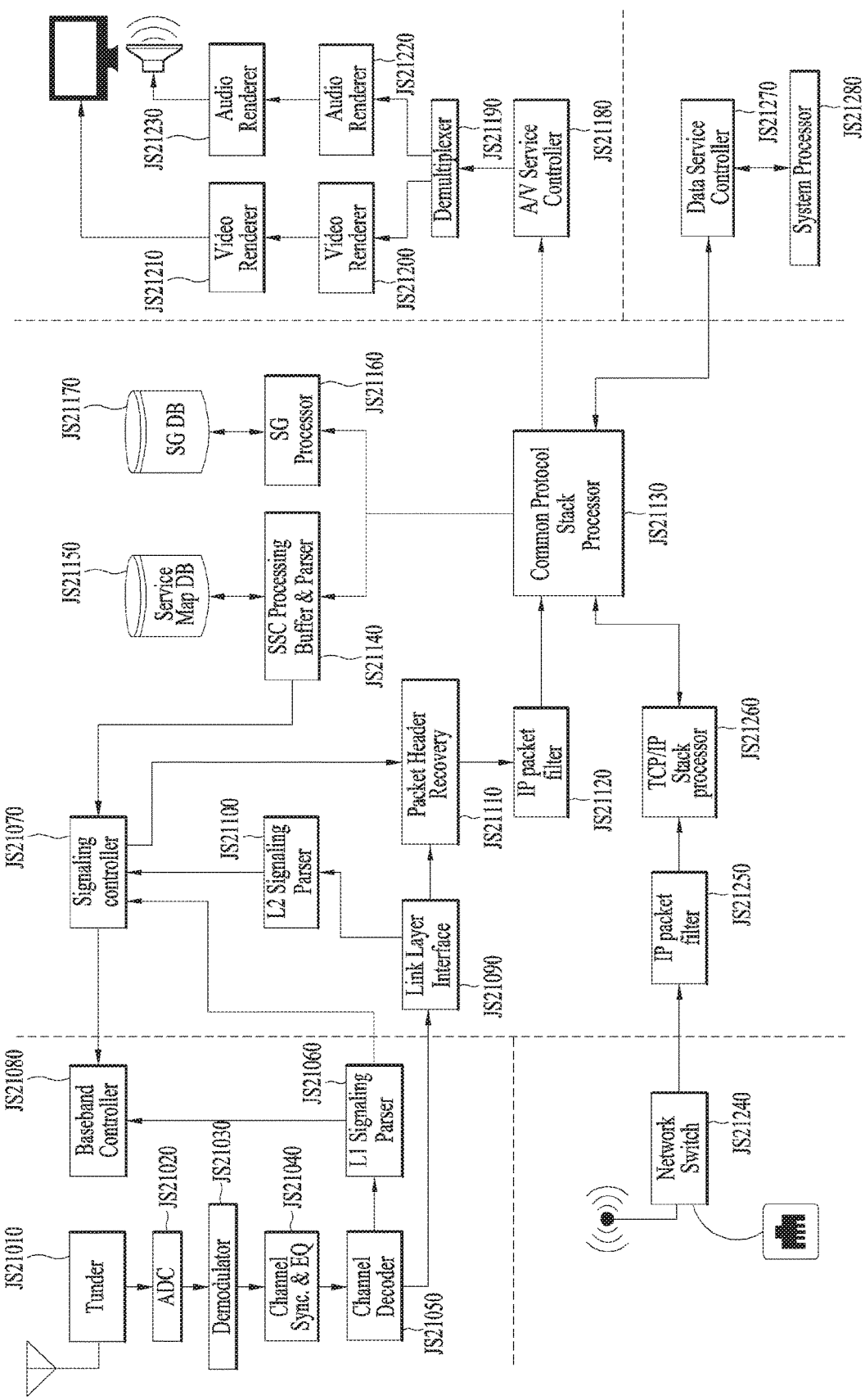
FIG. 86 is a view illustrating a receiver according to an embodiment of the present invention.

FIG. 86 is a diagram illustrating a receiver according to an embodiment of the present invention.

The receiver according to an embodiment of the present invention may include a tuner JS21010, an ADC JS21020, a demodulator JS21030, a channel synchronizer & equalizer JS21040, a channel decoder JS21050, an L1 signaling parser JS21060, a signaling controller JS21070, a baseband controller JS21080, a link layer interface JS21090, an L2 signaling parser JS21100, packet header recovery JS21110, an IP packet filter JS21120, a common protocol stack processor JS21130, an SSC processing buffer and parser JS21140, a service map database (DB) JS21150, a service guide (SG) processor JS21160, a SG DB JS21170, an AV service controller JS21180, a demultiplexer JS21190, a video decoder JS21200, a video renderer JS21210, an audio decoder JS21220, an audio renderer JS21230, a network switch JS21240, an IP packet filter JS21250, a TCP/IP stack processor JS21260, a data service controller JS21270, and/or a system processor JS21280.

The tuner JS21010 receives a broadcast signal.

When a broadcast signal is an analog signal, the ADC JS21020 converts the broadcast signal to a digital signal.

The demodulator JS21030 demodulates the broadcast signal.

The channel synchronizer & equalizer JS21040 performs channel synchronization and/or equalization.

The channel decoder JS21050 decodes a channel in the broadcast signal.

The L1 signaling parser JS21060 parses L1 signaling information from the broadcast signal. The L1 signaling information may correspond to physical layer signaling information. The L1 signaling information may include a transmission parameter.

The signaling controller JS21070 processes the signaling information or the broadcast receiver transmits the signaling information to an apparatus that requires the corresponding signaling information.

The baseband controller JS21080 controls processing of the broadcast signal in a baseband. The baseband controller JS21080 may perform processing in the physical layer on the broadcast signal using the L1 signaling information. When a connection relation between the baseband controller JS21080 and other apparatuses is not indicated, the baseband controller JS21080 may transmit the processed broadcast signal or broadcast data to another apparatus in the receiver.

The link layer interface JS21090 accesses the link layer packet and acquires the link layer packet.

The L2 signaling parser JS21100 parses L2 signaling information. The L2 signaling information may correspond to information included in the aforementioned link layer signaling packet.

When header compression is applied to a packet of a upper layer (e.g., an IP packet) than a link layer, the packet header recovery JS21110 performs header decompression on the packet. Here, the packet header recovery JS21110 may restore a header of the packet of the upper layer using information for identification of whether the aforementioned header compression is applied.

The IP packet filter JS21120 filters the IP packet transmitted to a specific IP address and/or UDP number. The IP packet transmitted to the specific IP address and/or UDP number may include signaling information transmitted through the aforementioned dedicated channel. The IP packet transmitted to the specific IP address and/or UDP number may include the aforementioned FIC, FIT, EAT, and/or emergency alert message (EAM).

The common protocol stack processor JS21130 processes data according to a protocol of each layer. For example, the common protocol stack processor JS21130 decodes or parses the corresponding IP packet according to a protocol of an IP layer and/or a upper layer than the IP layer.

The SSC processing buffer and parser JS21140 stores or parses signaling information transmitted to a service signaling channel (SSC). The specific IP packet may be designated as an SSC and the SSC may include information for acquisition of a service, attribute information included in the service, DVB-SI information, and/or PSI/PSIP information.

The service map DB JS21150 stores a service map table. The service map table includes attribute information about a broadcast service. The service map table may be included in the SSC and transmitted.

The SG processor JS21160 parses or decodes a service guide.

The SG DB JS21170 stores the service guide.

The AV service controller JS21180 performs overall control for acquisition of broadcast AV data.

The demultiplexer JS21190 divides broadcast data into video data and audio data.

The video decoder JS21200 decodes video data.

The video renderer JS21210 generates video provided to a user using the decoded video data.

The audio decoder JS21220 decodes audio data.

The audio renderer JS21230 generates audio provided to the user using the decoded audio data.

The network switch JS21240 controls an interface with other networks except for a broadcast network. For example, the network switch JS21240 may access an IP network and may directly receive an IP packet.

The IP packet filter JS21250 filters an IP packet having a specific IP address and/or a UDP number.

TCP/IP stack processor JS21260 decapsulates an IP packet according to a protocol of TCP/IP.

The data service controller JS21270 controls processing of a data service.

The system processor JS21280 performs overall control on the receiver.

Figure 87:
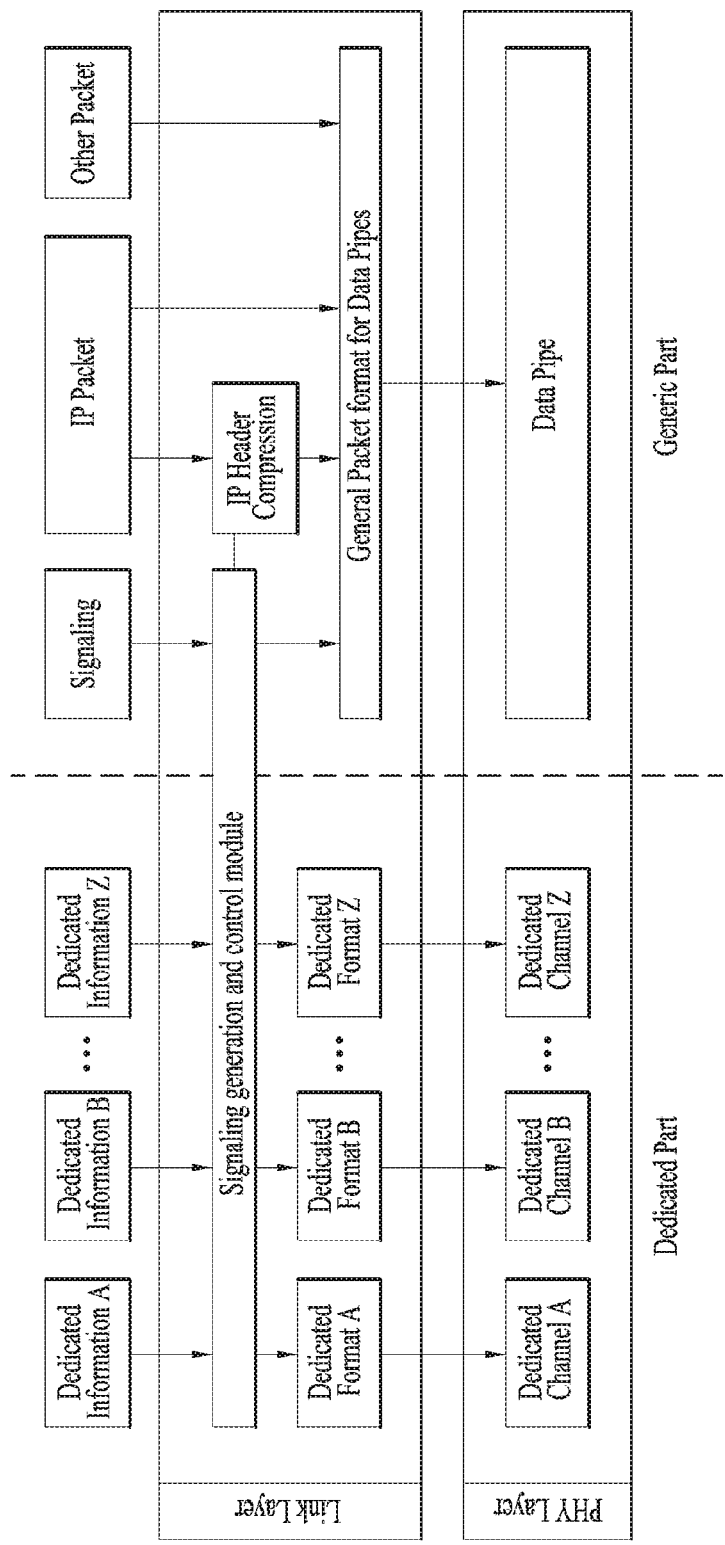
FIG. 87 is a diagram illustrating a layer structure when a dedicated channel is present according to an embodiment of the present invention.

FIG. 87 is a diagram illustrating a layer structure when a dedicated channel is present according to an embodiment of the present invention.

Data transmitted to a dedicated channel may not be an IP packet stream. Accordingly, a separate protocol structure from an existing IP-based protocol needs to be applied. Data transmitted to a dedicated channel may be data for a specific purpose. In the dedicated channel, various types of data may not coexist. In this case, the meaning of corresponding data may frequently become clear immediately after a receiver decodes the corresponding data in a physical layer.

In the above situation, it may not be required to process the data transmitted to the dedicated channel according to all of the aforementioned protocol structures (for normal broadcast data). That is, in a physical layer and/or a link layer, the data transmitted to the dedicated channel may be completely processed and information contained in the corresponding data can be used.

In a broadcast system, data transmitted to the dedicated channel may be data (signaling) for signaling and the data (signaling data) for signaling may be transmitted directly to a dedicated channel, but not in an IP stream. In this case, a receiver may more rapidly acquire the data transmitted to the dedicated channel than data transmitted in the IP stream.

With reference to the illustrated protocol structure, a dedicated channel may be configured in a physical layer, and a protocol structure related to processing of broadcast data of this case is illustrated.

In the present invention, a part that is conformable to a general protocol structure may be referred to as a generic part and a protocol part for processing a dedicated channel may be referred to as a dedicated part, but the present invention is not limited thereto. A description of processing of broadcast data through a protocol structure in the generic part may be supplemented by the above description of the specification.

On or more information items (dedicated information A, dedicated information B, and/or dedicated information C) may be transmitted through a dedicated part, and corresponding information may be transmitted from outside of a link layer or generated in the link layer. The dedicated part may include one or more dedicated channels. In the dedicated part, the data transmitted to the dedicated channel may be processed using various methods.

Dedicated information transmitted from outside to a link layer may be collected through a signaling generation and control module in the link layer and processed in the form appropriate for each dedicated channel. A processing form of the dedicated information transmitted to the dedicated channel may be referred to as a dedicated format in the present invention. Each dedicated format may include each dedicated information item.

As necessary, data (signaling data) transmitted through the generic part may be processed in the form of a packet of a protocol of a corresponding link layer. In this process, signaling data transmitted to the generic part and signaling data transmitted to the dedicated part may be multiplexed. That is, the signaling generation and control module may include a function for performing the aforementioned multiplexing.

When the dedicated channel is a structure that can directly process dedicated information, data in a link layer may be processed by a transparent mode; bypass mode, as described above. An operation may be performed on some or all of dedicated channels in a transport mode, data in a dedicated part may be processed in a transparent mode, and data in a generic part may be processed in a normal mode. Alternatively, general data in the generic part may be processed in a transparent mode and only signaling data transmitted to the generic part and data in the dedicated part can be processed in a normal mode.

According to an embodiment of the present invention, when a dedicated channel is configured and dedicated information is transmitted, processing is not required according to each protocol defined in a broadcast system, and thus information (dedicated information) required in a receiving side can be rapidly accessed.

A description of data processing in a generic part and/or higher layers in a link layer illustrated in the drawing may be substituted with the above description.

Figure 88:
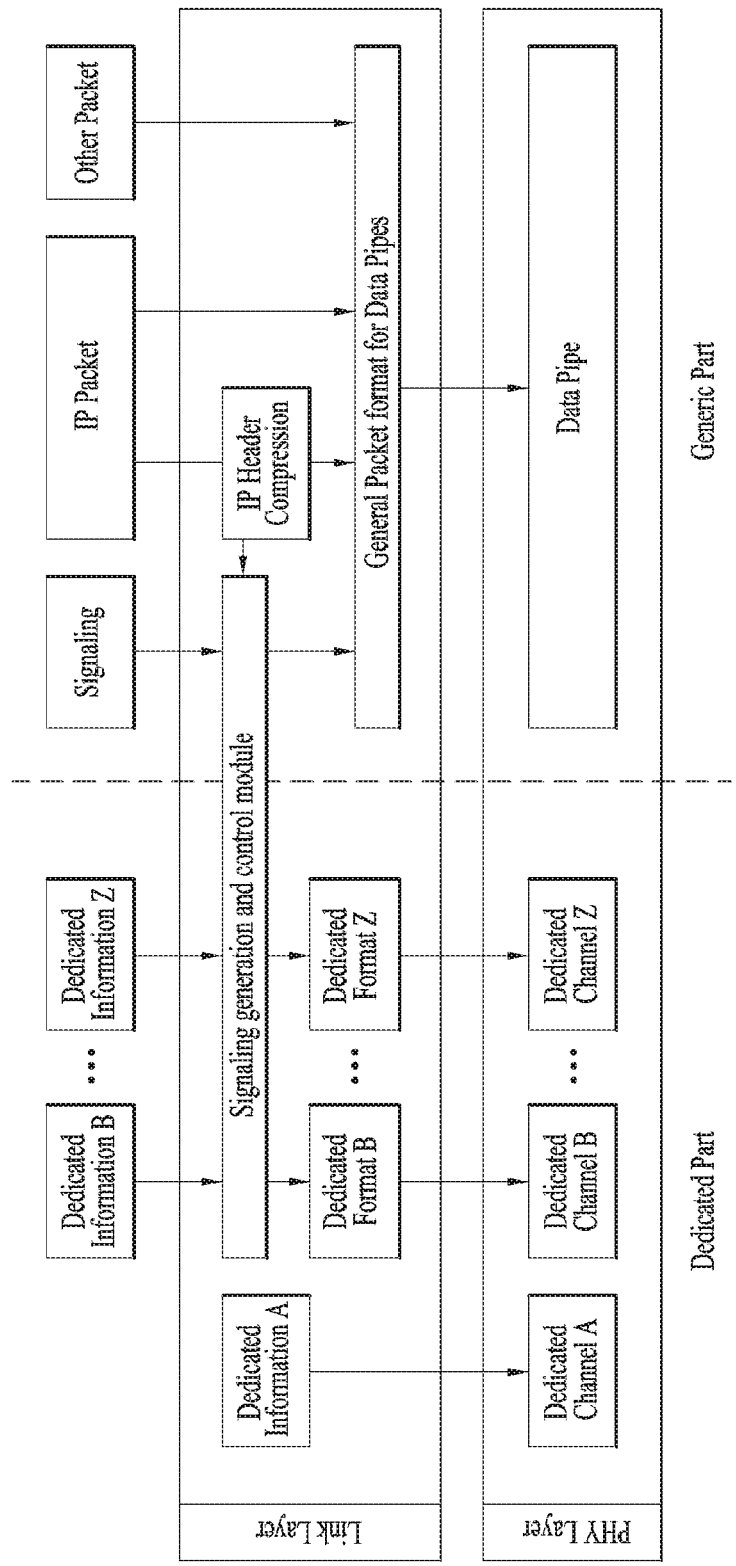
FIG. 88 is a diagram illustrating a layer structure when a dedicated channel is present according to another embodiment of the present invention.

FIG. 88 is a diagram illustrating a layer structure when a dedicated channel is present according to another embodiment of the present invention.

According to another embodiment of the present invention, with respect to some dedicated channels among dedicated channels, a link layer may be processed in a transparent mode. That is, processing of data transmitted to some dedicated channels may be omitted in the link layer. For example, dedicated information A may not be configured in a separate dedicated format and may be transmitted directly to a dedicated channel. This transmitting structure may be used when the dedicated information A is conformable to a structure that is known in a broadcast system. Examples of the structure that is known in the broadcast system may include a section table and/or a descriptor.

In the embodiment of the present invention, as a wider meaning, when dedicated information corresponds to dedicated information, up to a portion in which the corresponding signaling data is generated may be considered as a region of a link layer. That is, dedicated information may be generated in the link layer.

Figure 89:
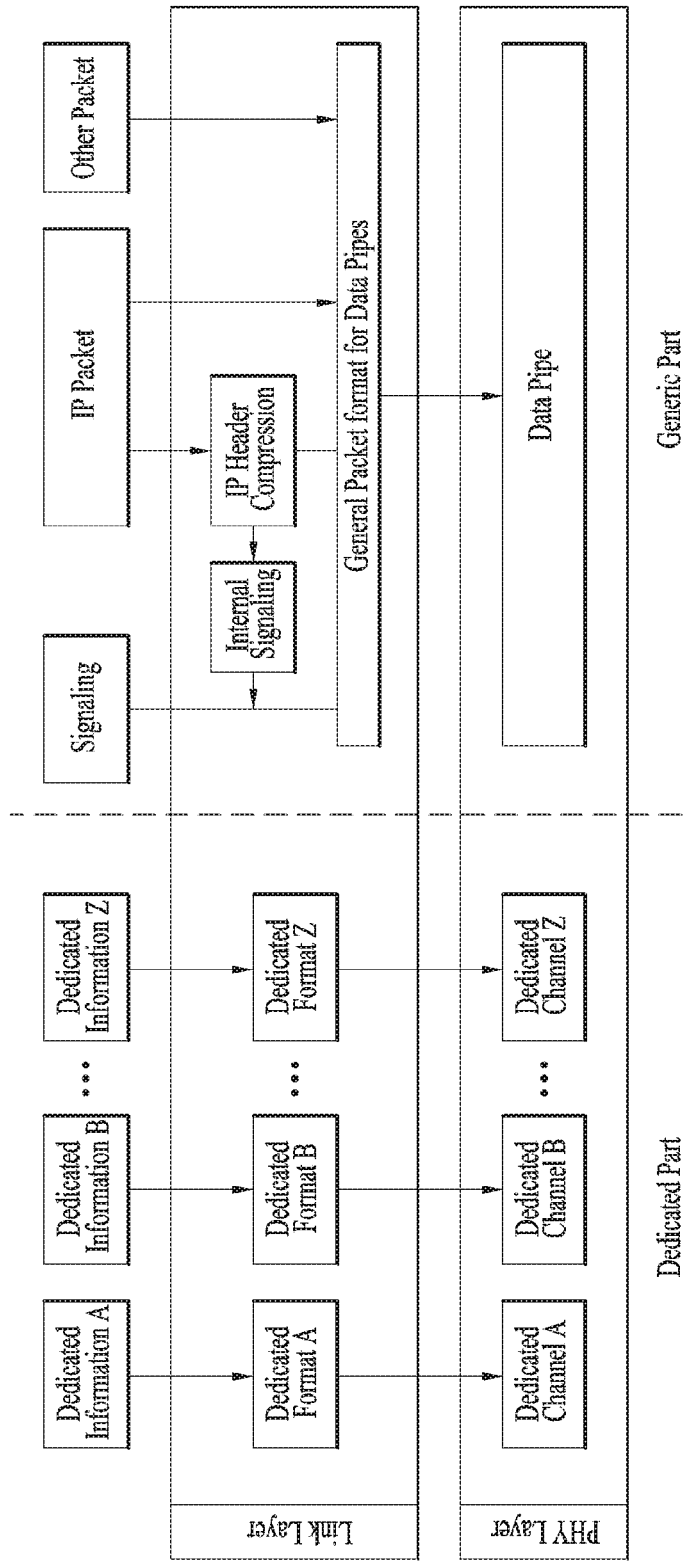
FIG. 89 is a diagram illustrating a layer structure when a dedicated channel is independently present according to an embodiment of the present invention.

FIG. 89 is a diagram illustrating a layer structure when a dedicated channel is independently present according to an embodiment of the present invention.

The drawing illustrates a protocol structure for processing broadcast data when a separate signaling generation and control module is not configured in a link layer. Each dedicated information item may be processed in the form of dedicated format and transmitted to a dedicated channel.

Signaling information that is not transmitted to a dedicated channel may be processed in the form of a link layer packet and transmitted to a data pipe.

A dedicated part may have one or more protocol structure appropriate for each dedicated channel. When the dedicated part has this structure, a separate control module is not required in the link layer, and thus it may be possible to configure a relatively simple system.

In the present embodiment, dedicated information A, dedicated information B, and dedicated information C may be processed according to different protocols or the same protocol. For example, the dedicated format A, the dedicated format B, and the dedicated format C may have different forms.

According to the present invention, an entity for generating dedicated information can transmit data anytime without consideration of scheduling of a physical layer and a link layer. As necessary, in the link layer, data may be processed on some or all of dedicated channels in a transparent mode or a bypass mode.

A description of data processing in a generic part and/or higher layers in a link layer illustrated in the drawing may be substituted with the above description.

Figure 90:
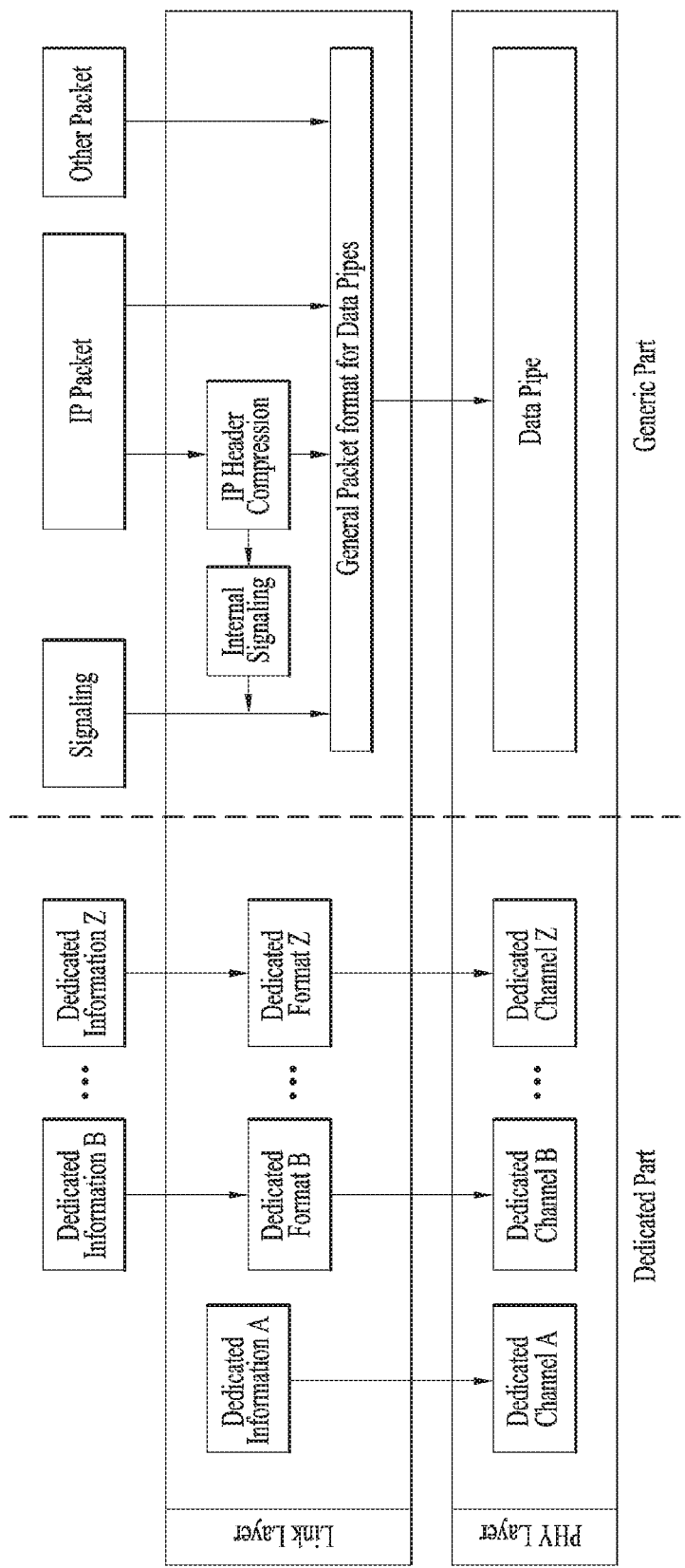
FIG. 90 is a diagram illustrating a layer structure when a dedicated channel is independently present according to another embodiment of the present invention.

FIG. 90 is a diagram illustrating a layer structure when a dedicated channel is independently present according to another embodiment of the present invention.

When the aforementioned dedicated channel is independently present, processing in a link layer may be performed on some dedicated channels in a transparent mode in an embodiment corresponding to a layer structure. With reference to the drawing, dedicated information A may be transmitted directly to a dedicated channel rather than being processed in a separate format. This transmitting structure may be used when the dedicated information A is conformable to a structure that is known in a broadcast system. Examples of the structure that is known in the broadcast system may include a section table and/or a descriptor.

In the embodiment of the present invention, as a wider meaning, when dedicated information corresponds to dedicated information, up to a portion in which the corresponding signaling data is generated may be considered as a region of a link layer. That is, dedicated information may be generated in the link layer.

Figure 91:
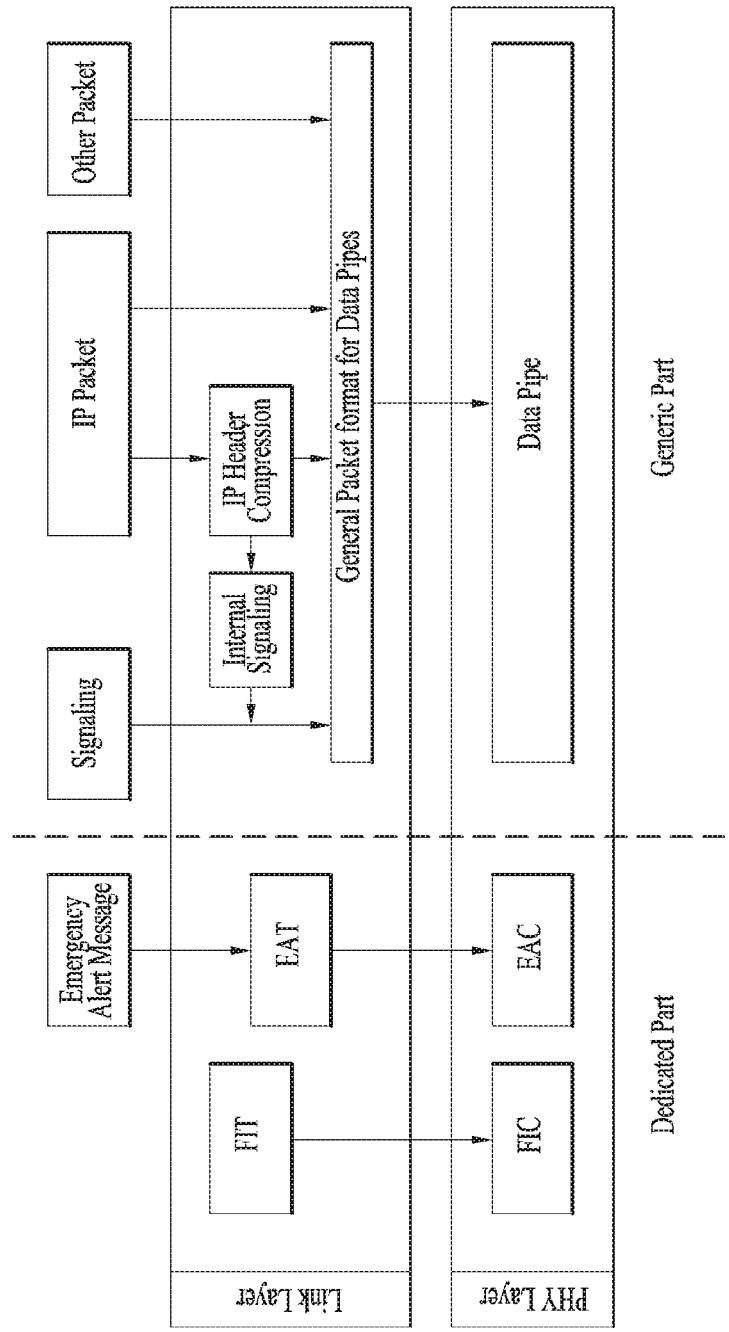
FIG. 91 is a diagram illustrating a layer structure when a dedicated channel transmits specific data according to an embodiment of the present invention.

FIG. 91 is a diagram illustrating a layer structure when a dedicated channel transmits specific data according to an embodiment of the present invention.

Service level signaling may be bootstrapped to a dedicated channel, or a fast information channel (FIC) as information for scanning a service and/or an emergency alert channel (EAC) including information for emergency alert may be transmitted. Data transmitted through the FIC may be referred to as a fast information table (FIT) or a service list table (SLT) and data transmitted through the EAC may be referred to as an emergency alert table (EAT).

A description of information to be contained in a FIT and the FIT may be substituted with the above description. The FIT may be generated and transmitted directly by a broadcaster or a plurality of information items may be collected and generated in the link layer. When the FIT is generated and transmitted by a broadcaster, information for identifying a corresponding broadcaster may be contained in the FIT. When a plurality of information items are collected to generate an FIT in the link layer, information for scanning services provided by all broadcasters may be collected to generate the FIT.

When the FIT is generated and transmitted by a broadcaster, the link layer may be operated in a transparent mode to directly transmit the FIT to an FIC. When the FIT as a combination of a plurality of information items owned by a transmitter is generated, generation of the FIT and configuration of corresponding information in the form of a table may be within an operating range of the link layer.

A description of information to be contained in an EAT and the EAT may be substituted with the above description. In the case of the EAC, when an entity (e.g., IPAWS) for managing an emergency alert message transmits a corresponding message to a broadcaster, an EAT related to the corresponding message may be generated and the EAT may be transmitted through the EAC. In this case, generation of a signaling table based on an emergency alert message may be within an operating range of the link layer.

The aforementioned signaling information generated in order to process IP header compression may be transmitted to a data pipe rather than being transmitted through a dedicated channel. In this case, processing for transmission of corresponding signaling information may be conformable to a protocol of a generic part and may be transmitted in the form of a general packet (e.g., a link layer packet).

FIG. 92 is a diagram illustrating a format of (or a dedicated format) of data transmitted through a dedicated channel according to an embodiment of the present invention.

When dedicated information transmitted to a dedicated channel is not appropriate for transmission to a corresponding channel or requires an additional function, the dedicated information may be encapsulated as data, which can be processed in a physical layer, in a link layer. In this case, as described above, a packet structure that is conformable to a protocol of a generic part supported in a link layer may be used. In many cases, a function supported by a structure of a packet transmitted through a generic part may not be required in a dedicated channel. In this case, the corresponding dedicated information may be processed in the format of the dedicated channel.

For example, in the following cases, the dedicated information may be processed in a dedicated format and transmitted to a dedicated channel.

1) When the size of data transmitted to a dedicated channel is not matched with a size of dedicated information to be transmitted.

2) When dedicated information is configured in the form of data (e.g., XML) that requires a separate parser instead of a form of a table.

3) When a version of corresponding information needs to be pre-checked to determine whether corresponding information is processed before corresponding data is parsed.

4) When error needs to be detected from dedicated information.

As described above, when dedicated information needs to be processed in a dedicated format, the dedicated format may have the illustrated form. Within a range appropriate to a purpose of each dedicated channel, a header including some of listed fields may be separately configured and a bit number allocated to a field may be changed.

According to an embodiment of the present invention, a dedicated format may include a length field, a data_version field, a payload_format field (or a data_format field), a stuffing_flag field, a CRC field, a payload_data_bytes( ) element, a stuffing_length field, and/or a stuffing_bytes field.

The length field may indicate a length of data contained in a payload. The length field may indicate the length of data in units of bytes.

The data_version field may indicate a version of information of corresponding data. A receiver may check whether the corresponding data is already received information or new information using the version information and determine whether the corresponding information is used using the the version information.

The data_format field may indicate a format of information contained in the dedicated information. For example, when the data_format field has a value of '000', the value may indicate that dedicated information is transmitted in the form of a table. When the data_format field has a value of '001', the value may indicate that the dedicated information is transmitted in form of a descriptor. When the data_format field has a value of '010', the value may indicate that the dedicated information is transmitted in form of a binary format instead of a table format or a descriptor form. When the data_format field has a value of '011', the value may indicate that the dedicated information is transmitted in form of XML.

When a dedicated channel is larger than dedicated information, a stuffing byte may be added in order to match the lengths of required data. In this regard, the stuffing_flag field may identify whether the stuffing byte is contained.

The stuffing_length field may indicate the length of the stuffing_bytes field.

The stuffing_bytes field may be filled with a stuffing byte by as much as the size indicated by the stuffing_length field. The stuffing_bytes field may indicate the size of a stuffing byte.

The CRC field may include information for checking error of data to be transmitted to a dedicated channel. The CRC field may be calculated using information (or a field) contained in dedicated information. Upon determining that the error is detected using the CRC field, a receiver may disregard received information.

FIG. 93 is a diagram illustrating configuration information of a dedicated channel for signaling information about a dedicated channel according to an embodiment of the present invention.

In general, determination of an operation in a transparent mode or a normal mode with respect to the aforementioned dedicated channel may be pre-determined during design of a dedicated channel and may not be changed during management of a system. However, since a plurality of transmitting systems and a plurality of receiving systems are present in a broadcast system, there may be a need to flexibly adjust a processing mode for a dedicated channel. In order to change or reconfigure an operating mode of a flexible system and provide information about the operating mode to a receiving side, signaling information may be used. The signaling information may be contained in a physical layer signaling; L1 signaling; transmitting parameter and transmitted, and may be transmitted to one specific dedicated channel. Alternatively, the signaling information may be contained in a portion of a descriptor or a table used in a broadcast system. That is, the information may be contained as a portion of one or more signaling information items described in the specification.

The dedicated channel configuration information may include a num_dedicated_channel field, a dedicated_channel_id field, and/or an operation_mode field.

The num_dedicated_channel field may indicate the number of dedicated channels contained in a physical layer.

The dedicated_channel_id field may correspond to an identifier for identifying a dedicated channel. As necessary, an arbitrary identifier (ID) may be applied to a dedicated channel.

The operation_mode field may indicate a processing mode for a dedicated channel. For example, when the operation_mode field has a value of '0000', the value may indicate that the dedicated channel is processed in a normal mode. When the operation_mode field has a value of '1111', the value may indicate that the dedicated channel is processed in a transparent mode or a bypass mode. '0001' to '1110' among values of the operation_mode field may be reserved for future use.

Figure 94:
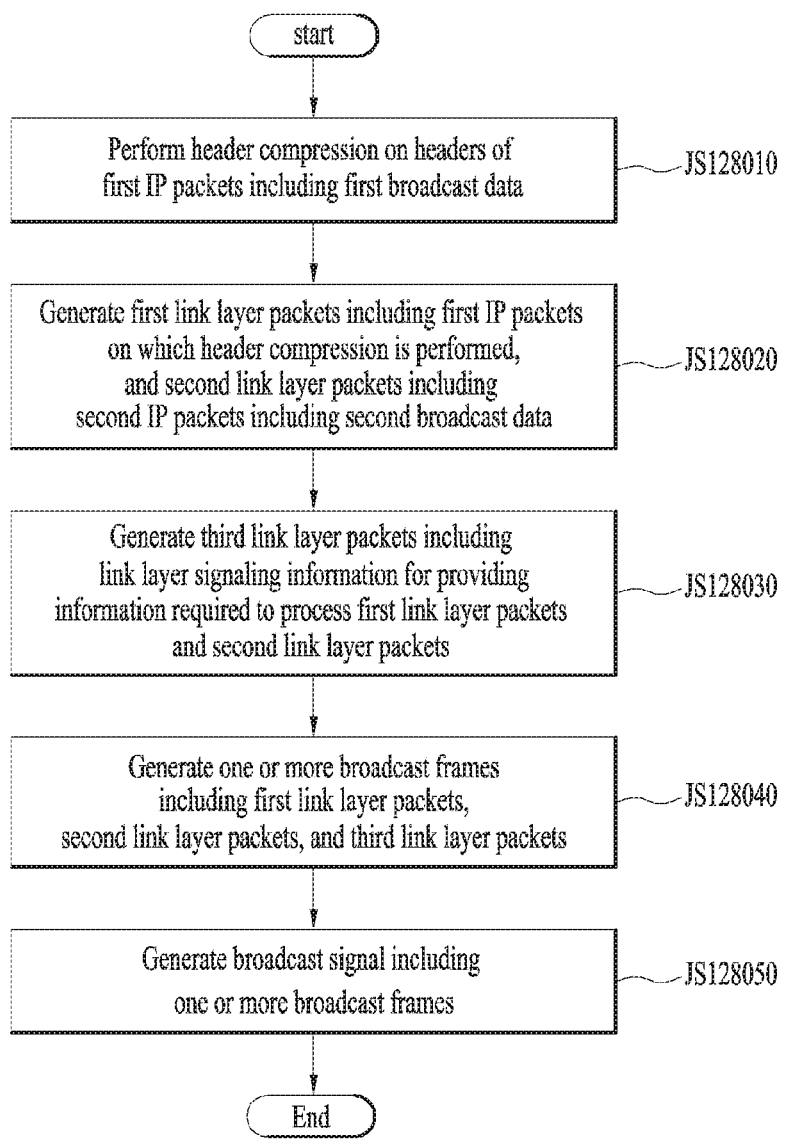
FIG. 94 is a flowchart illustrating a broadcast signal transmission processing method according to an embodiment of the present invention.

FIG. 94 is a flowchart illustrating a broadcast signal transmission processing method according to an embodiment of the present invention.

A broadcast transmitter may perform header compression on headers of first IP packets including first broadcast data (JS12810)

The broadcast transmitter may generate first link layer packets including the first IP packets on which the header compression is performed and second link layer packets including second IP packets including second broadcast data (JS128020).

The broadcast transmitter may generate third link layer packets including link layer signaling information for providing information required to process the first link layer packets and the second link layer packets (JS128030). The link layer signaling information may include compression flag information for identifying whether the header compression is performed on the first IP packets or the second IP packets.

The broadcast transmitter may generate one or more broadcast frames including the first link layer packets, the second link layer packets, and the third link layer packets (JS128040).

The broadcast transmitter may generate a broadcast signal including the one or more broadcast frames (JS128050).

The broadcast transmitter may generate first dedicated information, generate second dedicated information, generate a dedicated format packet including the second dedicated information, transmit the first dedicated information to a first dedicated channel as a specific region in the broadcast signal, and transmit the dedicated format packet to a second dedicated channel as a specific region in the broadcast signal. Here, the first dedicated information or the second dedicated information may correspond to information required to scan one or more broadcast channels and to acquire a broadcast service or information for performing emergency alert.

The broadcast signal may further include dedicated channel configuration information including information related to processing of a dedicated channel, and the dedicated channel configuration information may include dedicated channel number information for identifying the number of dedicated channels contained in the broadcast signal.

The dedicated channel configuration information may further include dedicated channel identification information for identifying the dedicated channel and may further include operating mode information for identifying whether the first dedicated information and the second dedicated information, which are transmitted to the dedicated channel, are encapsulated in the dedicated format packet. Here, the dedicated channel configuration information may be included in the link layer signaling information.

The dedicated format packet may further include data format information for identifying a form of information for forming the second dedicated information.

Figure 95:
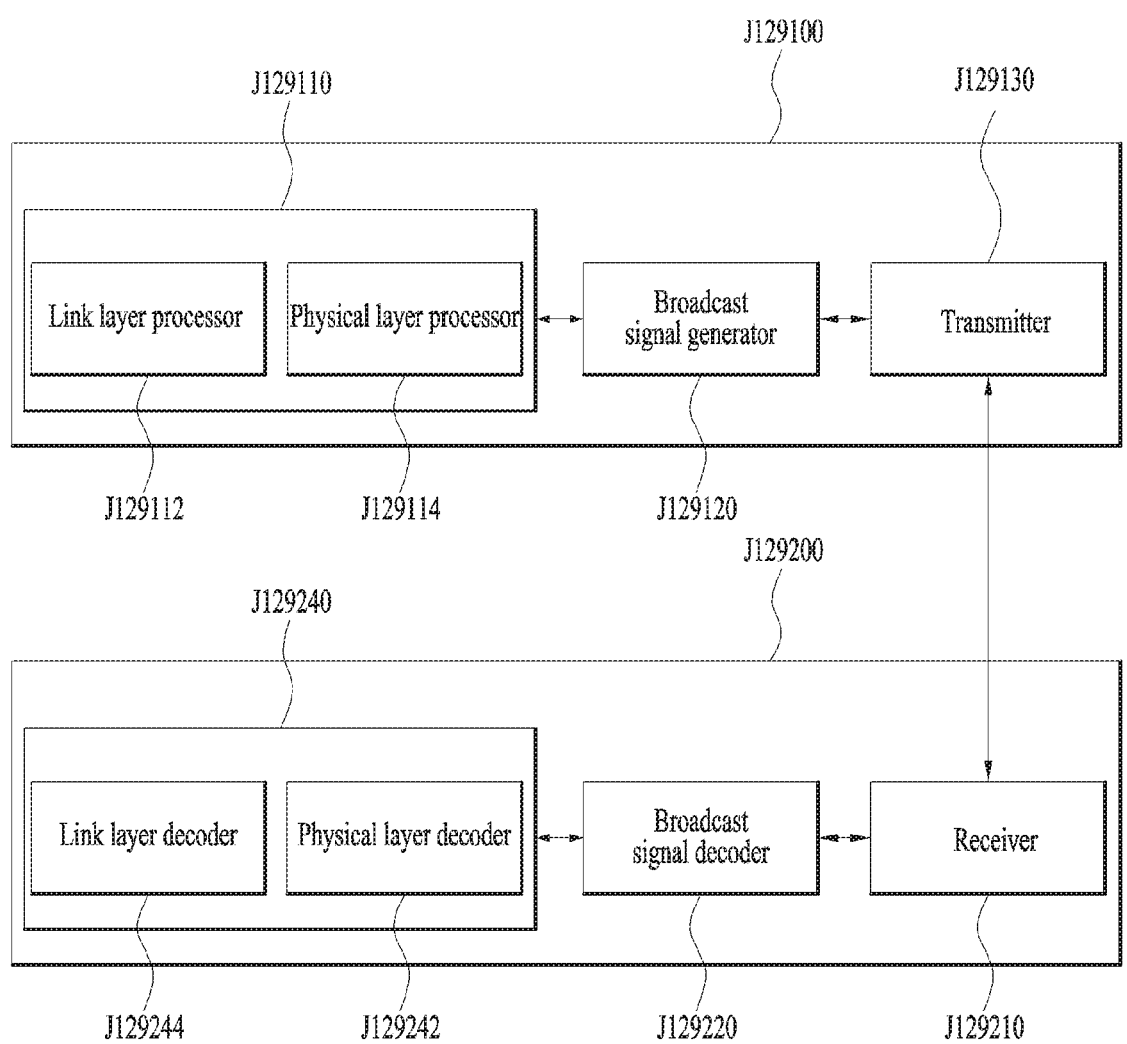
FIG. 95 is a diagram illustrating a broadcast system according to an embodiment of the present invention.

FIG. 95 is a diagram illustrating a broadcast system according to an embodiment of the present invention.

The broadcast system may include a broadcast transmitter J129100 and/or a broadcast receiver J129200.

The broadcast transmitter J129100 may include a processor J129110, a broadcast signal generator J129120, and/or a transmitter J129130.

The processor J129110 may include a link layer processor J129112 and/or a physical layer processor J129114.

The broadcast receiver J129200 may include a receiver J129210, a broadcast signal decoder J129220, and/or a decoder J129240.

The decoder J129240 may include a physical layer decoder J129242 and/or a link layer decoder J129244.

The processor J129110 may perform a series of processing on data contained in a broadcast service.

The link layer processor J129112 may process broadcast data in a link layer. An operation of the link layer processor J129112 may be performed by the processor J129110, and in this case, the link layer processor J129112 may not be separately included.

The link layer processor J129112 may perform header compression on headers of first IP packets containing first broadcast data, generate first link layer packets including the first IP packets on the header compression is performed and second link layer packets including second IP packets including second broadcast data, and generate third link layer packets including link layer signaling information for providing information required to process the first link layer packets and the second link layer packets. Here, the link layer signaling information may include compression flag information for identifying whether the header compression is performed on the first IP packets or the second IP packets.

The physical layer processor J129114 may process broadcast data in a physical layer. An operation of the physical layer processor J129114 may be performed by the processor J129110, and in this case, the physical layer processor J129114 may not be separately included. The physical layer processor J129114 has been described with regard to a process for processing data in a physical layer in the specification.

The physical layer processor J129114 may generate one or more broadcast frames including the first link layer packets, the second link layer packets, and the third link layer packets.

The broadcast signal generator J129120 may generate a broadcast signal. As necessary, the broadcast signal may be generated by the physical layer processor J129114 and in this case, it may be deemed that the broadcast signal generator J129120 is included in the physical layer processor J129114.

The transmitter J129130 may transmit the broadcast signal. The transmitter J129130 may receive a request of the broadcast receiver J129200.

The receiver J129210 may receive the broadcast signal. The receiver J129210 may transmit the request to the broadcast transmitter J129100.

The broadcast signal decoder J129220 may decode the broadcast signal.

The decoder J129240 may perform a series of processing on broadcast data in order to embody a broadcast service.

The physical layer decoder J129242 may decode data in the physical layer. A function of the physical layer decoder J129242 may be performed by the decoder J129240 and in this case, the physical layer decoder J129242 may not be separately included.

The link layer decoder J129244 may decode data in a link layer. A function of the link layer decoder J129244 may be performed by the decoder J129240 and in this case, the link layer decoder J129244 may not be separately included.

Figure 96:
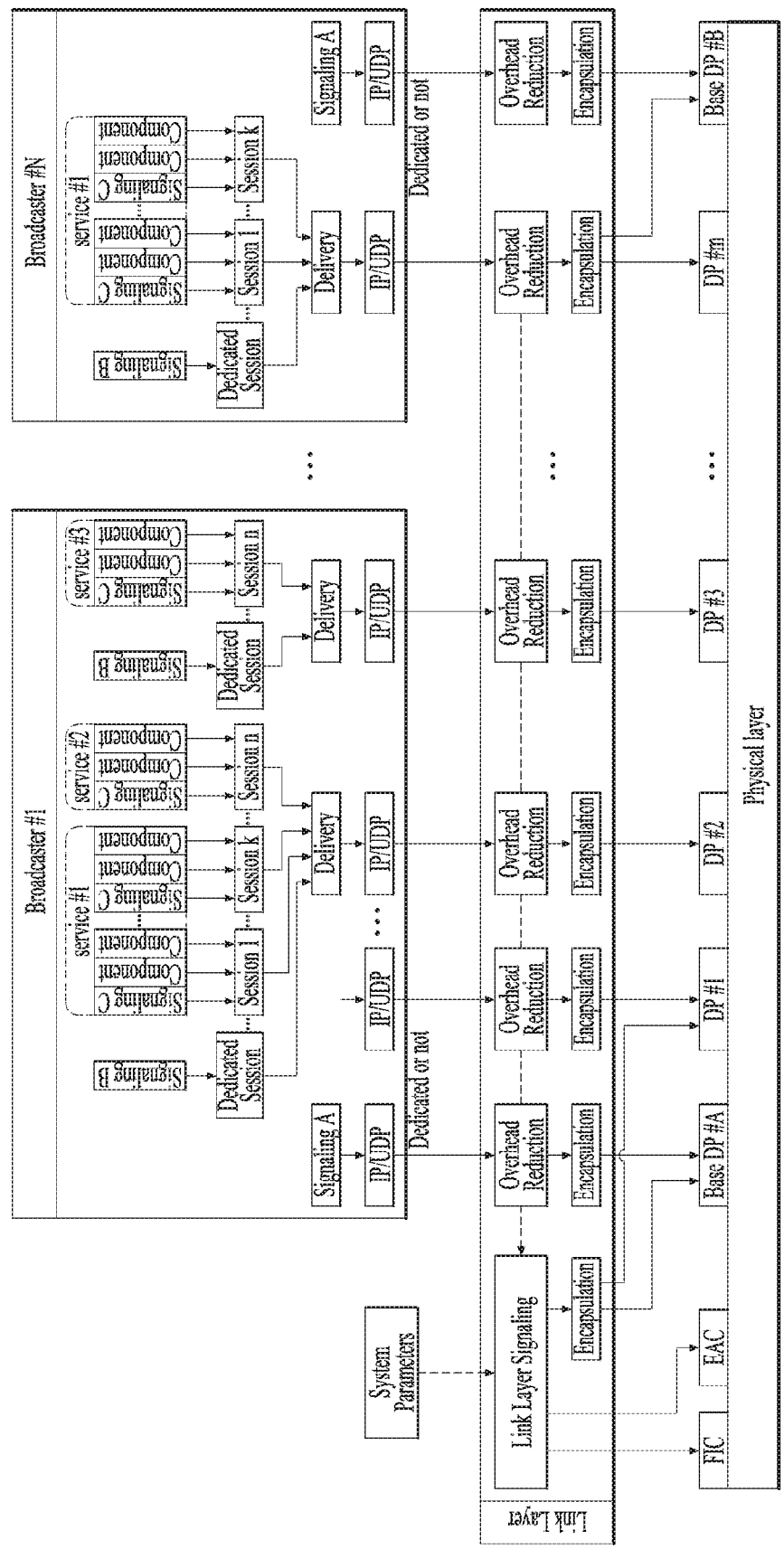
FIG. 96 is a diagram showing a transmission structure of signaling data according to an embodiment of the present invention.

FIG. 96 is a diagram showing a transmission structure of signaling data according to an embodiment of the present invention.

The figure shows an embodiment of the transmitter of a signaling transmission structure based on a method of organizing the above-proposed link layer. Hereinafter, signaling may include signaling data.

Within one frequency band, one or more broadcasters may provide broadcast services. Each broadcaster may transmit several broadcast services and one broadcast service may include one or more components. A user may receive broadcast content in service units.

In a broadcast system, a session based transport protocol may be used to support an IP hybrid broadcast and the content of signaling delivered through each signaling path may be determined according to the transmission structure of the protocol. Terms different from those used in the present embodiment may be used in the broadcast system. In addition, a plurality of session based transport protocols may be used in the broadcast system.

As described above, data related to a fast information channel (FIC) and/or an emergency alert channel (EAC) may be transmitted/received through a dedicated channel. Within the broadcast system, a base DP and a normal DP may be distinguishably used. Signaling delivered through the FIC may be referred to as a fast information table (FIT) and signaling delivered through an EAC may be referred to as an emergency alert table (EAT).

If a dedicated channel is not configured, FIT, EAT and/or link layer signaling may be transmitted using a general link layer signaling transmission method. For example, FIT, EAT, and/or link layer signaling may be subjected to an encapsulation procedure of a link layer and transmitted through a base DP and/or a normal DP.

The configuration information of the FIC and/or EAC may be included in physical layer signaling (or transmission parameter). The link layer may format signaling according to the properties of the channel. Delivery of data through a specific channel of a physical layer may be performed from the logical viewpoint and actual operation may be performed according to the properties of the physical layer.

The FIT and/or FIC transmitted through link layer signaling may include information on a service of each broadcaster transmitted at a corresponding frequency and a path for receiving the same. The FIT and/or FIC transmitted through link layer signaling may include information for acquiring a service and may be referred to as service acquisition information.

The FIT and/or the EAT may be included in link layer signaling.

Link layer signaling may include the following information.

System Parameter—Transmitter related parameter and broadcaster related parameter for providing a service through a corresponding channel Link layer—IP header compression related context information and DP identifier (ID), to which the corresponding context is applied Upper layer—Mapping relation among IP address and UDP port number, Service and component information, emergency alert information, packet stream delivered from IP layer and IP address of signaling, UDP port number, Session ID and DP.

As described above, when one or more broadcast services are transmitted through one frequency band, the receiver does not need to decode all DPs and may first check signaling data (or signaling information) to decode only DPs related to a necessary service.

In this case, referring to the figure, in a broadcast system, information for mapping a DP and a service may be provided or acquired using the FIC, the base DP and/or the normal DP.

Referring to the figure, the transmitter may transmit one or more signaling data and/or one or more services. The signaling data may include physical layer signaling data, link layer signaling data and/or service layer signaling data.

Each transmitter may provide one or more service signaling data and/or one or more services related to a plurality of broadcasters broadcast #1, . . . , or #N.

For example, the transmitter may transmit one or more service layer signaling data (e.g., Signaling A, Signaling B, Signaling C) and/or one or more services (Service #1, Service #2 and Service #3) related to a first broadcaster broadcast #1. The service layer signaling data may include one or more first service layer signaling data Signaling A, one or more second service layer signaling data Signaling B and one or more third service signaling data Signaling C. The first service layer signaling data Signaling A, the second service layer signaling data Signaling B and/or the third service signaling data Signaling C will be described later. One service may include one or more third service layer signaling data Signaling C and/or one or more components (or service data) for the service.

Here, the second service layer signaling data Signaling B may be transmitted through a dedicated session. In addition, one service (e.g., Service #1) may be transmitted through one or more sessions (e.g., Session 1, . . . , Session K). At this time, one or more third service layer signaling data Signaling C and/or one or more components may be transmitted through each session. The dedicated session and/or one or more sessions may be one of the above-described MMTP session and/or ROUTE session.

The transmitter may packetize one or more second service layer signaling data Signaling B and/or one or more services into one or more delivery packets. For example, the delivery packet may be an MMTP packet for the above-described MMTP session and/or a ROUTE packet for the ROUTE session.

Then, the transmitter may encapsulate one or more first service layer signaling data Signaling A and/or one or more delivery packets into one or more IP/UDP datagrams. Here, the IP/UDP datagram including the first service layer signaling data Signaling A may or may not be a dedicated IP/UDP datagram.

The first service layer signaling data Signaling A, the second service layer signaling data Signaling B, the third service signaling data Signaling C and/or data for a broadcast service, such as a component, may be processed at an IP layer and delivered through a link layer.

At the link layer, the transmitter performs overhead reduction with respect to IP packets as necessary and generates related information using link layer signaling data (or link layer signaling). The link layer signaling data may include a system parameter describing a broadcast system in addition to the above-described information. The transmitter may process the IP packets in a link layer processing step and transmit the IP packets at a physical layer in the form of one or more DPs.

The transmitter may transmit the link layer signaling data to the receiver through the FIC and/or EAC of the physical layer. Meanwhile, the transmitter may encapsulate the link layer signaling data into link layer packets. Then, the transmitter may transmit the encapsulated link layer packets through the base DP and/or normal DP of the physical layer.

Figure 97:
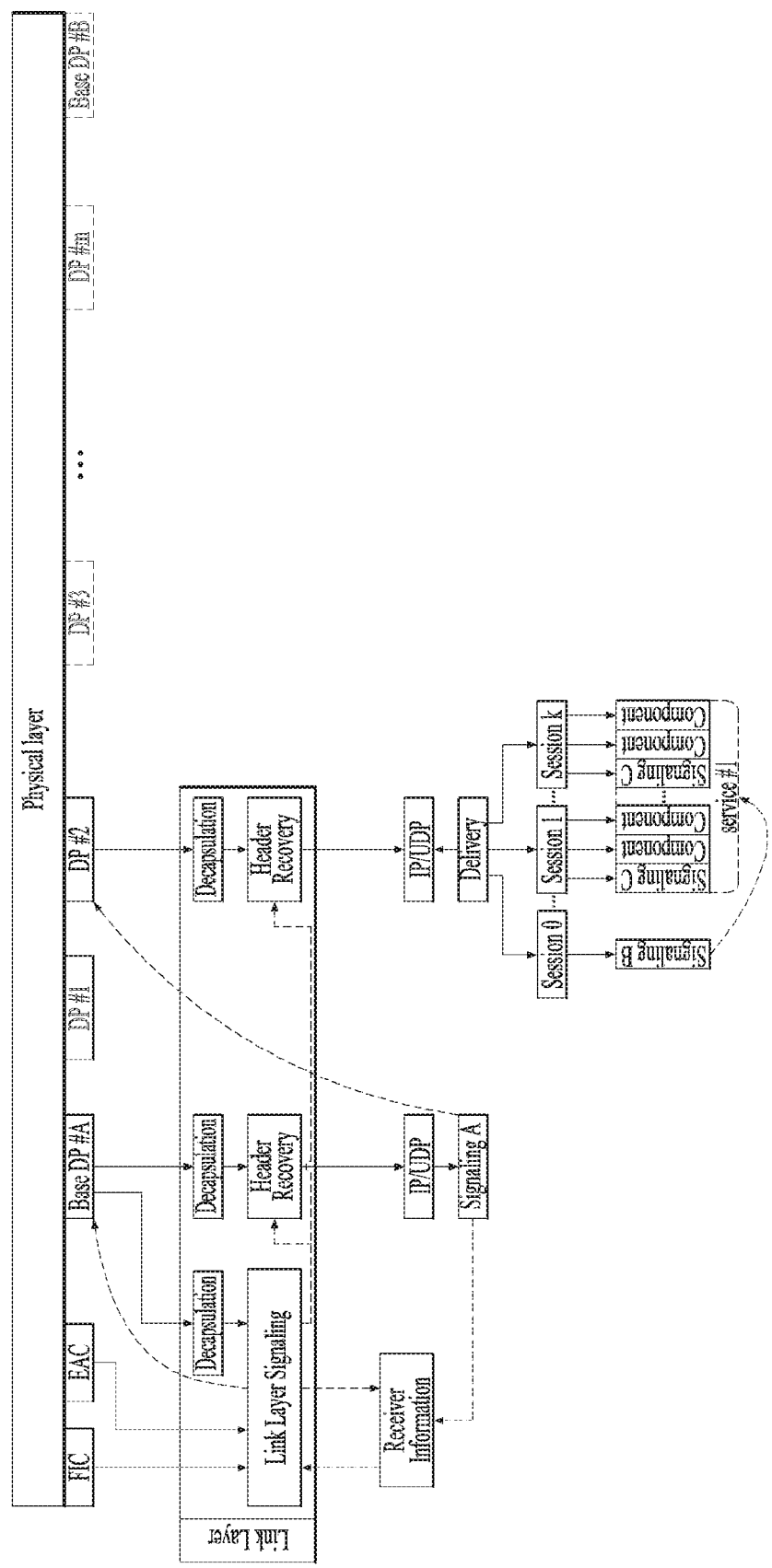
FIG. 97 is a diagram showing a reception structure of signaling data according to an embodiment of the present invention.

FIG. 97 is a diagram showing a reception structure of signaling data according to an embodiment of the present invention.

When a user selects or changes a service to be received, the receiver tunes to a frequency corresponding thereto. The receiver reads information stored in a DB, etc. in association with the channel. Here, the information stored in the DB of the receiver may be configured based on information included in a FIT acquired upon initial channel scan. Alternatively, the receiver may extract information to be transmitted as described above in this specification.

The receiver may receive the FIT and update the information stored in the DB after receiving the information on the channel to be accessed. The receiver may acquire a transmission path and/or component information of the service selected by the user or acquire information on a path, through which signaling data necessary to acquire such information is transmitted. For example, the receiver may acquire information on a path (e.g., base DP #A), through which link layer signaling data and/or first service layer signaling data Signaling A are transmitted, based on the FIT. Meanwhile, the receiver may omit the decoding and/or parsing procedure of the received FIT, upon determining that the information is not changed using the version information of the FIT or information for identifying whether the dedicated channel needs to be updated. The information related to the transmission path may include information such as an IP address, a UDP port number, a Session ID, and/or a DP ID.

The receiver may decode the base DP and/or the DP, through which the signaling data is transmitted, to acquire link layer signaling data based on information on the FIT. In some cases, the receiver may use a combination of the received link layer signaling data and signaling data received from the dedicated channel (for example, in the figure, receiver information). The receiver may omit this process when additional link layer signaling data other than the FIT does not need to be received. If the FIT is not transmitted through the dedicated channel but is transmitted through the base DP, the receiver may simultaneously receive other link layer signaling data and the FIT when the base DP is decoded. If necessary, the other link layer signaling data may be combined with the FIT and used for operation of the receiver.

The receiver may acquire transmission path information for receiving upper layer signaling data (e.g., service layer signaling data) necessary to receive the service selected by the user among several packet streams and DPs currently transmitted through the channel using the FIT and/or the link layer signaling data. The transmission path information may include an IP address, a UDP port number, a Session ID, and/or a DP ID. Among others, the IP address and/or the UDP port number may be a (dedicated) address and/or (dedicated) port number predefined in an IANA or broadcast system. When upper layer signaling data is delivered through the base DP, the receiver may previously check information on the base DP.

The receiver may acquire overhead reduction information of the packet stream of the DP. In addition, the receiver may acquire overhead reduction information of the packet stream of the DP using the previously received link layer signaling data. For example, when the information on the DP for receiving the selected service is delivered through upper layer signaling data, the receiver may acquire the signaling data using the DB and shared memory access method to acquire the DP information to be decoded, as described above. If link layer signaling data and service data (or other data) are transmitted through the same DP or only one DP is used, service data transmitted through the DP may be temporarily stored in a device such as a buffer while signaling data is decoded and/or parsed.

The receiver may acquire information on a path, through which a service is actually transmitted, using upper layer signaling data of the service to be received. For example, the receiver may acquire information on a path (e.g., DP #2), through which a first service Service #1 is transmitted, based on the first service layer signaling data Signaling A. Then, the receiver may perform decapsulation and/or header recovery with respect to the received packet stream using the overhead reduction information of the DP to be received. Then, the receiver may transmit IP/UDP datagrams to the upper layer of the receiver in the form of an IP packet stream. Then, the receiver may acquire a first service based on the second service layer signaling data Signaling B and/or the third service layer signaling data Signaling C. For example, the receiver may acquire one or more third service layer signaling data Signaling C based on the second service layer signaling data Signaling B, and acquire the first service based on one or more third service layer signaling data Signaling C.

Figure 98:
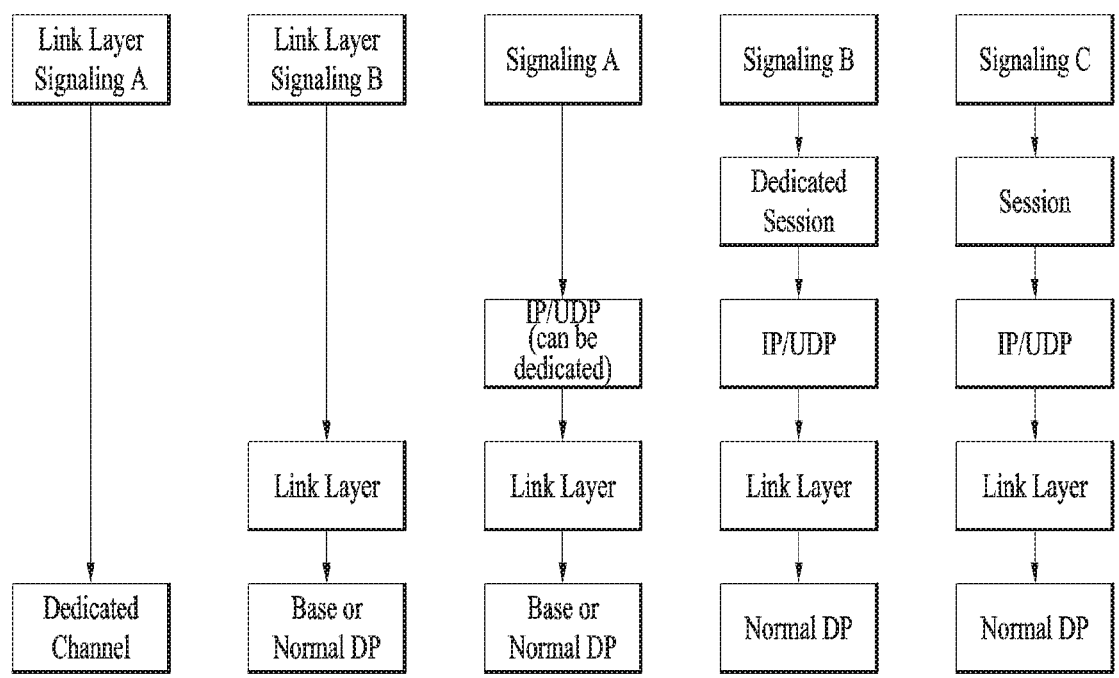
FIG. 98 is a diagram showing signaling data according to an embodiment of the present invention.

FIG. 98 is a diagram showing signaling data according to an embodiment of the present invention.

As shown in the figure, signaling data may be divided according to transmission path. For example, the signaling data may include link layer signaling data and/or service layer signaling data. The link layer signaling data may include first link layer signaling data and/or second link layer signaling data. The link layer signaling data may be divided depending on whether the data is to be transmitted through a dedicated channel. The service layer signaling data may include first service layer signaling data Signaling A, second service layer signaling data Signaling B and third service layer signaling data Signaling C. The first to third service layer signaling data Signaling A to C may be transmitted in the form of an IP packet from the viewpoint of the link layer, and may be referred to as upper layer signaling and/or service layer signaling.

Hereinafter, the signaling data will be described in greater detail.

The first link layer signaling data (Link Layer Signaling A) may be transmitted through the dedicated channel.

The second link layer signaling data (Link Layer Signaling B) may be transmitted through the DP in the form of a link layer packet. At this time, the DP may be a base DP and/or a normal DP for signaling transmission.

The first service layer signaling data Signaling A may be directly included in the payload of the IP/UDP packet and transmitted through the DP. At this time, the DP may be a base DP and/or a normal DP for signaling transmission. The IP address and/or the UDP port, to which the first service layer signaling data is transmitted, may use a value specified in the IANA and/or the broadcast system. The receiver may acquire the first service layer signaling data using the IP address and/or the port number. For example, the first service layer signaling data Signaling A may include the above-described FIT and/or SLT.

The second service layer signaling data Signaling B may be transmitted through a transmission session based protocol and may be transmitted through a session specified in the transmission session. Since several transmission sessions may be transmitted using the same IP address and/or port number, the receiver may acquire the second service layer signaling data using the dedicated session ID, etc. In order to acquire specific second service layer signaling data transmitted in the same session, the receiver may use the header of the packet of the transmission session based protocol. For example, the second service layer signaling data may include the above-described USBD, S-TSID, and/or MPD.

The third service layer signaling data Signaling C may not be assigned a session or may be transmitted along with broadcast data. The transmission structure of the third service layer signaling data may be equal to that of a general session based protocol. In order to acquire the third service layer signaling data transmitted in the same session, the receiver may use the header of the packet of the transmission session based protocol. Here, the session may include the above-described ROUTE session and/or MMTP session. For example, the third service layer signaling data may include the above-described USBD, S-TSID, and/or MPD.

FIG. 99 is a diagram showing the syntax of a FIT according to an embodiment of the present invention.

The figure shows an embodiment of the syntax of the FIT transmitted through the dedicated channel.

According to first syntax (Syntax A), the FIT may include transmission information (e.g., transmission path information) of upper layer signaling data (e.g., service layer signaling data) transmitted through each protocol.

According to a second syntax (Syntax B), the FIT may include transmission information (e.g., transmission path information) of upper layer signaling data (e.g., service layer signaling data) transmitted through each protocol. In addition, the FIT may further include a table identifier (table ID information) capable of identifying the FIT from other signaling data.

Figure 100:
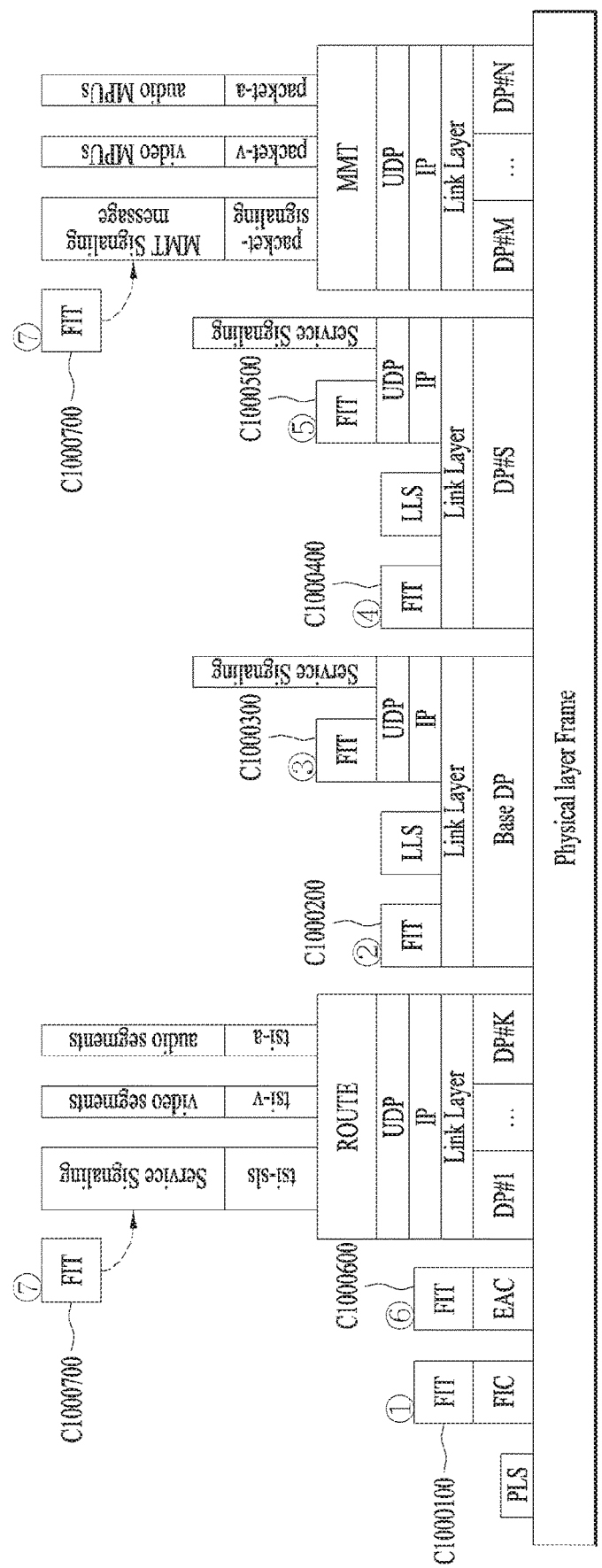
FIG. 100 is a diagram showing a transmission path of a FIT according to an embodiment of the present invention.

FIG. 100 is a diagram showing a transmission path of a FIT according to an embodiment of the present invention.

The figure shows a detailed embodiment of a path, through which the FIT may be transmitted, in association with the above-described method of the signaling data. The transmission path may be determined by the channel and/or the data pipe configured in the physical layer. In addition, the transmission path may be determined by the protocol for transmitting the FIT. As described above, for the path, the DP (Data Pipe) may be referred to as a PLP (Physical Layer Pipe) and the base DP may be referred to as a Common PLP and/or a signaling PLP.

The FIT according to the embodiment of the present invention may be transmitted through the dedicated channel (C1000100).

When the dedicated channel (ex. FIC) for FIT transmission is configured in the physical layer, the FIT may be transmitted through the dedicated channel. If the FIT is transmitted through such a transmission path, the FIT may be defined like the above-described first syntax (syntax A). That is, the FIT may include transmission information of upper layer signaling data (e.g., service layer signaling data) transmitted through each protocol.

The FIT according to the embodiment of the present invention may be transmitted through the base DP (C1000200).

If the base DP is a dedicated DP which may be decoded without separate signaling or display, the receiver may immediately enter the base DP to acquire the FIT upon acquiring a physical layer frame. Alternatively, if the base DP is not predetermined in the broadcast system and thus separate signaling and display are required, the receiver may signal the base DP through signaling data (PLS). The receiver may check and/or decode the base DP using the same. The FIT transmitted through the base DP may be defined like the above-described first syntax (syntax A). That is, the FIT may include transmission information of upper layer signaling data (e.g., service layer signaling data) transmitted through each protocol. If the FIT is transmitted through the base DP, the FIT may be encapsulated into a link layer packet capable of being processed at the physical layer. In addition, if the FIT and/or other link layer signaling (LLS) data are simultaneously transmitted through the base DP, a scheme capable of indicating which link layer packet includes the FIT may be obtained through the link layer packet.

The FIT according to the embodiment of the present invention may be transmitted through the base DP in the form of an IP/UDP packet (C1000300).

As described in the case where the FIT is transmitted through the base DP (C1000200), if the base DP is configured, the link layer packet is transmitted through the base DP and the payload of the link layer packet may be composed of an IP/UDP packet. Such an IP/UDP packet may include a FIT. The IP/UDP packet including the FIT may have a pre-registered dedicated IP address and port number value. Otherwise, the transmitter may transmit the IP address and port number value, to which the FIT is transmitted, through separate signaling data. If the FIT and/or other signaling data (service layer signaling data) have the same IP address and or port number, table ID information capable of identifying the FIT from the other signaling data should be included in the FIT. In this case, the FIT may be defined like the above-described second syntax (syntax B). That is, the FIT may include transmission information of upper layer signaling data (e.g., service layer signaling data) transmitted through each protocol. In addition, the FIT may further include a table ID (table ID information) capable of identifying the FIT from other signaling data.

The FIT according to the embodiment of the present invention may be transmitted through the normal DP (C1000400).

If the FIT is transmitted through the normal DP, separate signaling data (e.g., physical layer signaling (PLS) data) may indicate the normal DP, through which the signaling data (e.g., FIT) is transmitted. The receiver may check the normal DP, through which the signaling data (e.g., FIT) is transmitted, based on the separate signaling data (e.g., physical layer signaling (PLS) data. The FIT transmitted through the normal DP may be defined like the above-described first syntax (syntax A). That is, the FIT may include transmission information of the upper layer signaling data (e.g., service layer signaling data) transmitted through each protocol. If the FIT is transmitted through the normal DP, the FIT may be encapsulated into a link layer packet which has a structure capable of being processed at a physical layer. In addition, if the FIT and/or other link layer signaling (LLS) data are transmitted through the normal DP, a separate scheme capable of indicating which link layer packet includes the FIT may be obtained through the link layer packet.

The FIT according to the embodiment of the present invention may be transmitted through an IP/UDP packet transmitted through the normal DP (C10000500).

Using the method described in the case where the FIT is transmitted through the normal DP (C10000400), separate signaling data (e.g., physical layer signaling (PLS) data and link layer signaling (LLS) data) may indicate the normal DP, through which the signaling data (e.g., FIT) is transmitted. The receiver may check the normal DP, through which the signaling data (e.g., FIT) is transmitted, based on the separate signaling data (e.g., physical layer signaling (PLS) data and/or the link layer signaling (LLS) data). The payload of the link layer packet transmitted through the normal DP may be composed of an IP/UDP packet and such an IP/UDP packet may include a FIT. Using the method described in the case where the FIT is transmitted through the base DP in the form of the IP/UDP packet (C1000300), information on the IP/UDP packet including the FIT may be signaled. That is, the IP/UDP packet including the FIT may have a previously registered dedicated IP address and port number value. Otherwise, the transmitter may transmit the IP address and port number value, to which the FIT is transmitted, through separate signaling data. If the FIT and/or other signaling data (e.g., service layer signaling data) have the same IP address and/or port number, table ID information capable of identifying the FIT from the other signaling data should be included in the FIT. In this case, the FIT may be defined like the above-described second syntax (syntax B). That is, the FIT may include transmission information of the upper layer signaling data (e.g., service layer signaling data) transmitted through each protocol. In addition, the FIT may further include table ID information capable of identifying the FIT from the other signaling data. As described above, the FIT may be referred to as a service list table (SLT).

The FIC according to the embodiment of the present invention may be transmitted through the EAC (C10000600).

The EAC is defined as a separate dedicated channel for transmitting emergency alert information, but the FIT may be transmitted through the EAC, for fast reception of the FIT. In addition, if another dedicated channel is configured, the FIT may be transmitted through the dedicated channel. In this case, the FIT may be defined like the above-described first syntax (syntax A). That is, the FIT may include transmission information of the upper layer signaling data (e.g., service layer signaling data) transmitted through each protocol.

The FIT according to the embodiment of the present invention may be transmitted in the form of a transmission session based packet (C10000700).

If the signaling data is transmitted using the transmission session based protocol, the FIT may also be transmitted in the form of the packets for the transmission session based protocol. For example, the transmission session may include a ROUTE session and/or an MMT session. The packet for the session based protocol may include a ROUTE session based ROUTE packet and/or an MMT session based MMT packet. At this time, the transmission session based packet including the FIT may be identified using a session ID. In this case, the FIT may be defined like the above-described second syntax (syntax B). That is, the FIT may include transmission information of the upper layer signaling data (e.g., service layer signaling data) transmitted through each protocol. In addition, the FIT may further include table ID information capable of identifying the FIT from the other signaling data.

The following description is applicable to C1000200, C1000300, C1000400, C1000500, and/or C1000700. In addition, the DP (or PLP) may correspond to the normal DP (or normal PLP) and/or the base DP (or common PLP or signaling PLP).

The DP (normal DP or base DP), through which the FIT is transmitted, may be one specified DP. For efficient DP management, one or more of several DPs may be dynamically set as a DP, through which the FIT is transmitted, using the physical layer signaling (PLS) data and/or the link layer signaling (LLS) data. That is, the physical layer signaling (PLS) data and/or the link layer signaling (LLS) data may include signaling data indicating whether low level signaling data exists. For example, the low level signaling data may include a FIT (or an SLT).

The physical layer signaling data may include information necessary to configure physical layer parameters. The physical layer signaling (PLS) data may include L1-Basic signaling data and/or L1-Detail signaling data.

The L1-Basic signaling data may include basic signaling information of the broadcast system and define parameters for decoding the L1-Detail signaling data. In addition, the L1-Basic signaling data may include information related to the entire frame. The L1-Basic signaling data may include L1B_lls_flag data.

The L1B_lls_flag data may indicate whether low level signaling data in one or more DPs (or PLPs) are included in a current frame. That is, the L1B_lls_flag data may indicate whether the low level signaling data is included in the current frame including the L1B_lls_flag data.

For example, if the L1B_lls_flag data has a value of "0", the L1B_lls_flag data may indicate that the low level signaling data (FIC and/or SLT) is not included in the current frame. If the L1B_lls_flag data has a value of "1", the L1B_lls_flag data may indicate that the low level signaling data (FIC and/or SLT) is included in the current frame.

Here, the L1B_lls_flag data may be included in each frame and/or PLP.

The L1-Detail signaling data may include data context and information necessary to decode the data context. In addition, the L1-Detail signaling data may be information related to the characteristics of the physical layer pipe (PLP). The L1-Detail signaling data may include L1D_plp_lls_flag data.

The L1D_plp_lls_flag data may indicate whether the current DP (or PLP) includes low level signaling data (Low Level Signaling Data). That is, the L1D_plp_lls_flag data may indicate whether the current DP including the L1D_plp_lls_flag data includes low level signaling data (FIC and/or SLT). The receiver may rapidly find the location of the upper layer signaling information (upper layer signaling information) based on the L1D_plp_lls_flag data. For example, the upper layer signaling information may include low level signaling data and/or service layer signaling data. That is, the receiver may rapidly find the location of the low level signaling data based on the L1D_plp_lls_flag data and rapidly find the location of the service layer signaling data based on the low level signaling information.

Here, the L1D_plp_lls_flag data may be included in each frame and/or PLP.

The L1B_lls_flag data and/or the L1D_plp_lls_flag data may be included in the physical layer signaling (PLS) data and the link layer signaling (LLS) data.

As described above, the transmitter may select at least one DP (or PLP), through which the low level signaling data is transmitted, and transmit the L1B_lls_flag data and/or the L1D_plp_lls_flag data. The receiver may receive the L1B_lls_flag data and/or the L1D_plp_lls_flag data and rapidly acquire the upper layer signaling information and/or the service data.

FIG. 101 is a diagram showing a FIT according to an embodiment of the present invention.

The figure shows an embodiment of signaling information (e.g., FIT) capable of being delivered through the FIC or DP in the structure of the above-described link layer. In the present embodiment, the DP may also be referred to as a PLP (Physical Layer Pipe).

The FIT may include information on each service in a broadcast stream to support rapid channel scan and/or service acquisition. The FIT may include sufficient information allowing meaningful presentation of a service list supporting service selection through channel number and/or up/down/zapping to users. In addition, the FIT may include sufficient information for finding the location of the service layer signaling data of the service. The service layer signaling data may be transmitted through broadcast and/or broadband which may be used by the signaling data. The FIT according to the embodiment of the present invention may be referred to as an SLT.

The FIT according to the embodiment of the present invention may include at least one of FIT_protocol_version information, broadcast_stream_id information, FIT_section_number information, total_FIT_section_number information, FIT_section_version information, FIT_section_length information, num_services information, service_id information, SLS_data_version information, service_category information, provider_id information, short_service_name_length information, short_service_name information, service_status information, sp_indicator information, num_service_level_descriptors information, service_level_descriptor( ) information, num_FIT_level_descriptors information, and/or FIT_level_descriptor( ) information.

The FIT_protocol_version information may indicate the version of the FIT protocol. The FIT_protocol_version information may be an 8-bit unsigned integer.

The broadcast_stream_id information may identify an entire broadcast stream. The broadcast_stream_id information may be a 16-bit unsigned integer.

The FIT_section_number information may indicate a section number. The FIT may be composed of a plurality of FIT sections. The FIT_section_number information may have 4 bits.

The total_FIT_section_number information may indicate the total number of FIT sections of the FIT including the section. That is, the total number of FIT sections may indicate FIT_section_number information having a highest number. The total_FIT_section_number information may have 4 bits.

The FIT_section_version information may indicate the version number of the FIT section. When information transmitted within the FIT section is changed, the version number may be incremented by one. If the version number reaches a maximum value, the version number may become "0" again. The FIT_section_version information may have 4 bits.

The FIT_section_length information may indicate the number of bytes of the FIT section from just behind the FIT_section_length information. The FIT_section_length information may have 12 bits.

The num_services information may indicate the number of services described in the instance of the FIT. Services having at least one component may be included in each broadcast stream. The num_services information may be an 8-bit unsigned integer.

The service_id information may uniquely identify the service within the range of the broadcast region. The service_id information may be a 16-bit unsigned integer.

The value of the SLS_data_version information may increase when the service entry of the service in the FIT is changed or when at least one of signaling tables for the service transmitted through service layer signaling is changed. The SLS_data_version information may enable the receiver to the monitor the FIT and enable the receiver to check whether signaling for several services has been changed. The SLS_data_version information may be an 8-bit unsigned integer.

The service_category information may indicate the category of the service. The service_category information may be a 5-bit unsigned integer.

The provider_id information may indicate a provider for broadcasting the service. The provider_id information may be an 8-bit unsigned integer.

The short_service_name_length information may indicate the number of byte pairs in the short_service_name information. If the short name for the service is not provided, the value of the short_service_name_length information may be "0". The short_service_name_length information may be a three-bit unsigned integer.

The short_service_name information may indicate the short name of the service. Each character of the short name may be encoded in UTF-8. If there is an odd number of bytes in the short name, the second byte of a last byte pair per pair count indicated by the short_service_name_length information shall contain "0x00" (when there are an odd number of bytes in the short name, the second byte of the last byte pair per the pair count indicated by the short_service_name_length field shall contain 0x00).

The service_status information may indicate the status (active/inactive, and/or hidden/shown) of the service. The most significant bit of the service_status information may indicate whether the service is active (set to 1) or inactive (set to 0). The least significant bit of the service_status information may indicate whether the service is hidden (set to 1) or not (set to 0). The service_status information may be a 3-bit unsigned integer. For example, the service_status information may indicate that the service is used for test or dedicated use and is not selected as a general TV receiver.

The sp_indicator information may indicate that one or more components are protected for meaningful presentation, if set. If the sp_indicator information is set to "0", this may indicate that any component is not protected for meaningful presentation of the service. The sp_indicator information may be a 1-bit flag (service protection flag).

The num_service_level_descriptors information may indicate the number of service level descriptors for the service. The num_service_level_descriptors information may be a 4-bit unsigned integer.

The service_level_descriptor( ) information may indicate zero or more descriptors for providing additional information of the service, if included.

The num_FIT_level_descriptors information may indicate the number of descriptors of the FIT level for the FIT. The num_FIT_level_descriptors information may have 4 bits.

The FIT_level_descriptor( ) information may include zero or more descriptors for providing additional information of the FIT, if included.

FIG. 102 is a diagram showing a code value for service_category information according to an embodiment of the present invention.

The service_category information may indicate the category of the service.

The meaning of the service_category information may be changed according to embodiment. According to one embodiment, if the value of this field is 1, 2, 3 or 8, each service may correspond to a linear A/V service, a linear audio only service, an app-based service, a service guide service (Service Guide and/or Service Guide (Announcement). If the value of this field is 0, this may be a service of an undefined category and values other than 0, 1, 2, 3 and 8 may be reserved for future use.

FIG. 103 is a diagram showing broadcast_signaling_location_descriptor( ) according to an embodiment of the present invention.

In the FIT, as a method of adding necessary information, a descriptor may be added according to the content of the table, and a service level descriptor and a FIT level descriptor may be defined according to the properties of the information included in the descriptor. The service level descriptor may become a descriptor having information limited to a specific service and the FIT level descriptor may have information commonly used in all services.

As one service level descriptor, the FIT may include broadcast_signaling_location_descriptor( ).

The broadcast_signaling_location_descriptor( ) may include bootstrap addresses for service layer signaling data of each service. At places indicated by bootstrap addresses, the receiver may acquire service layer signaling data transmitted through broadcast.

The broadcast_signaling_location_descriptor( ) according to the embodiment of the present invention may include at least one of descriptor_tag information, descriptor_length information, IP_version_flag information, SLS_source_IP_address_flag information, SLS_source IP address information, SLS_destination IP address information, SLS_destination_UDP_port information, SLS_TSI information, and/or SLS_PLP_ID information.

The descriptor_tag information may identify the descriptor. The descriptor_tag information may be an 8-bit unsigned integer.

The descriptor_length information may indicate the length from just behind descriptor_length information to the last part of the descriptor in bytes. The descriptor_length information may be an 8-bit unsigned integer.

The IP_version_flag information may indicate that SLS_source_IP_address information and/or SLS_destination IP address information are IPv4 addresses if this is set to "0". IP_version_flag information may indicate that SLS_source_IP_address information and/or SLS_destination IP address information are IPv6 addresses if this is set to "1". The IP_version_flag may be a 1-bit indicator.

The SLS_source_IP_address_flag information may indicate that there is a service signaling channel source IP address value for the service if this is set to "1". The SLS_source_IP_address_flag information may indicate that there is no service signaling channel source IP address value for the service if this is set to "0". The SLS_source_IP_address_flag information may be a 1-bit Boolean flag.

The SLS_source_IP_address information may indicate the source IP address of the service layer signaling LCT channel for the service, if present. If the IP_version_flag information indicates "0", the SLS_source_IP_address information may be a 32-bit IPv4 address. If the IP_version_flag information indicates "1", the SLS_source_IP_address information may be a 128-bit IPv6 address.

The SLS_destination_IP_address information may indicate the destination IP address of the service layer signaling LCT channel for the service. If the IP_version_flag information indicates "0", the SLS_destination_IP_address information may be a 32-bit IPv4 address. If the IP_version_flag information indicates "1", the SLS_destination_IP_address information may be a 128-bit IPv6 address.

The SLS_destination_UDP_port information may indicate the destination UDP port number of the service layer signaling LCT channel for the service. The SLS_destination_UDP_port information may be a 16-bit unsigned integer.

The SLS_TSI information may indicate the Transport Session Identifier (TSI) of the service layer signaling LCT channel for the service. The SLS_TSI information may be a 16-bit unsigned integer.

The SLS_PLP_ID information may indicate the identifier of the "physical layer pipe" including the service layer signaling LCT channel for the service. The "physical layer pipe" including the service layer signaling LCT channel may be generally more robust pipe than the other pipes used by the service.

Figure 104:
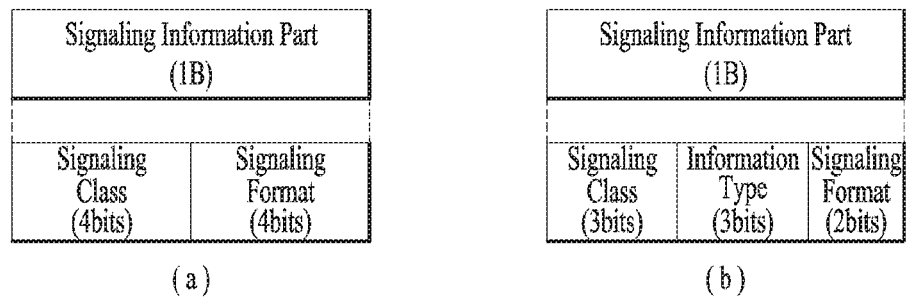
FIG. 104 is a diagram showing Signaling_Information_Part( ) according to an embodiment of the present invention.

FIG. 104 is a diagram showing Signaling_Information_Part( ) according to an embodiment of the present invention.

The broadcast system may add supplementary information to an extended header part in the case of a packet for transmitting signaling data, in the structure of the packet transmitted through the DP. Hereinafter, such supplementary information is referred to as Signaling_Information_Part( ).

The Signaling_Information_Part( ) may include information used to determine a module (or processor) for processing the received signaling information. In the configuration step of the system, the broadcast system may adjust the number of fields indicating the information and the number of bits allocated to each field within bytes allocated to Signaling_Information_Part( ). If the signaling information is multiplexed and transmitted, the receiver may use the information included in Signaling_Information_Part( ) to determine whether signaling information is processed and to which signaling processing module each piece of signaling information is delivered.

The Signaling_Information_Part( ) may include Signaling_Class information, Information_Type information and/or Signaling Format information.

The Signaling_Class information may indicate the class of the transmitted signaling information. The signaling information may correspond to FIC, EAC, link layer signaling information, service signaling information, and/or upper layer signaling information. Mapping of the number of bits of the field of the Signaling_Class information and the class of signaling information indicated by each value may be determined according to system design.

The Information_Type information may be used to indicate details of the signaling information identified by the signaling class information. The meaning of the value of the Information_Type information may be defined according to the class of the signaling information indicated by Signaling_Class information.

The Signaling Format information indicates the form (or format) of the signaling information configured in the payload. The Signaling Format information may identify the signaling information of the other classes shown in the figure or may identify the format of newly specified signaling information.

The Signaling_Information_Part( ) of (a) and (b) of the figure is an example and the number of bits allocated to each field may be adjusted according to the characteristics of the broadcast system.

The Signaling_Information_Part( ) shown in (a) of the figure may include signaling class information and/or signaling format information. Such Signaling_Information_Part( ) may be used when the type of the signaling information does not need to be specified or when the information type can be checked through the signaling information. Alternatively, if only one signaling format is used and a separate protocol for signaling is present and thus the signaling format is always the same, only a 4-bit signaling class field is used without the signaling field and the other fields may be reserved for future use or an 8-bit signaling class may be used to support various types of signaling.

In the Signaling_Information_Part( ) shown in (b) of the figure, if the signaling class is set, in order to indicate the type or properties of the information, information type information may be added and signaling format information may also be included. The signaling class information and information type information may be used to determine decapsulation of the signaling information or processing of the signaling. Description of the detailed structure or processing for link layer signaling is replaced by the above description and the below description.

Figure 105:
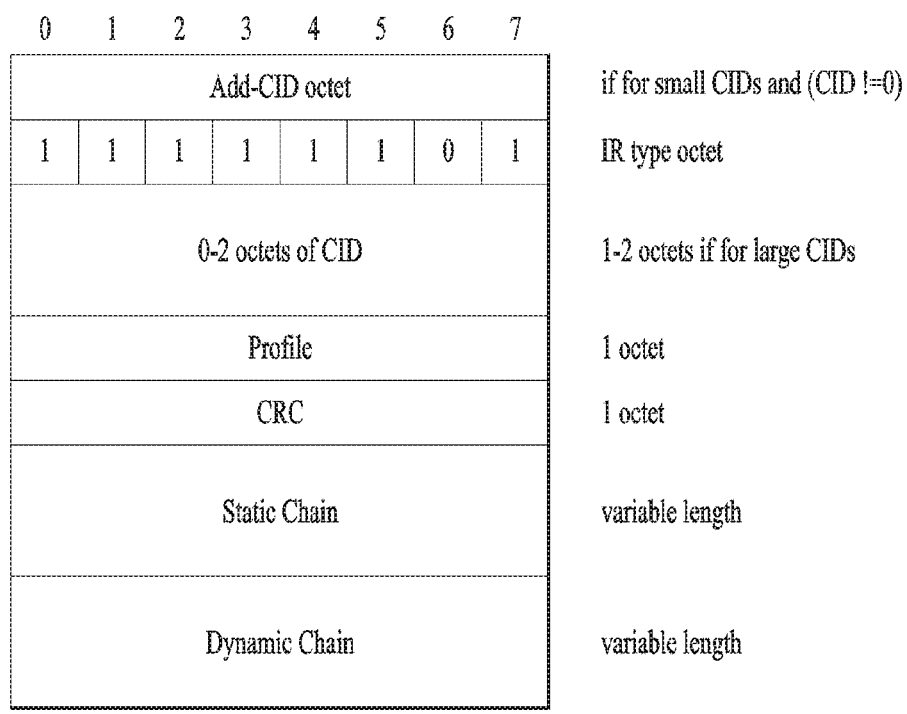
FIG. 105 is a diagram showing the structure of an IR packet according to an embodiment of the present invention.

FIG. 105 is a diagram showing the structure of an IR packet according to an embodiment of the present invention.

The structure of the RoHCv2 packet may be an improved version of the structure of the above-described RoHC packet. The structure of the RoHCv2 packet may be one of an IR packet structure, a CO_repair packet structure and/or a general header-compressed packet structure. The structure of the RoHCv2 packet may be used to transmit, receive and/or extract context.

The IR packet according to an embodiment of the present invention may be used to deliver information on the entire uncompressed header.

The IR packet according to an embodiment of the present invention may include a packet type, a context ID, a profile, CRC, a static chain, a dynamic chain and/or a payload.

The packet type may indicate the type of the IR packet. For example, in this figure, the packet type of the IR packet may indicate 11111101 and '1' of the last part may indicate whether the dynamic chain is included in the packet.

The context ID may use 8 or more bits. The context ID may identify a channel, through which the packet is transmitted. The context ID may be referred to as CID (context identifier). When a transmitter (compressor) initially adds a specific CID to a packet having a uncompressed full header and transmits the packet and omits header fields having static, dynamic or inferred properties with the same CID at a next packet, a receiver (decompressor) refers to the initially stored header field information of the CID and adds the omitted fields to the compressed header received after a second packet, thereby restoring the entire RTP header.

The profile may indicate the profile of the IR packet identified by the packet type.

The CRC may indicate a CRC code for error check.

The static chain may indicate information which is rarely changed during streaming. For example, upon IP streaming, an IP version, an IP source address, an IP destination address, an IP fragment flag, a UDP source port, a UDP destination port, etc. may be included in the static chain. The static chain may consist of one item for each header of the chain of protocol headers that is compressed, starting from the outermost IP header. The static chain may be used only in the header of the IR packet.

The dynamic chain may indicate information which is frequently changed but is maintained for a predetermined time.

The payload may include data to be transmitted.

Figure 106:
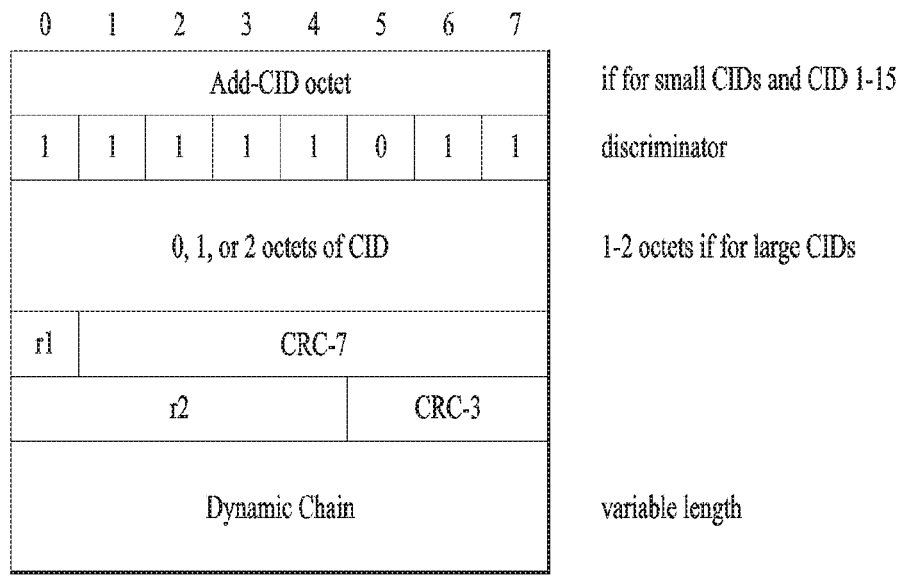
FIG. 106 is a diagram showing the structure of a CO_repair packet according to an embodiment of the present invention.

FIG. 106 is a diagram showing the structure of a CO_repair packet according to an embodiment of the present invention.

The CO_repair packet according to the embodiment of the present invention may be used to transmit the dynamic chain and/or to update the context. The CO_repair packet may be used to transmit the uncompressed values of the dynamic fields to update the context of all dynamic fields. The CO_repair packet may be particularly used when context may be damaged or when context is restored. The CO_repair packet may be protected by 7-bit CRC. In addition, the CO_repair packet may transmit 3-bit CRC through control fields.

The CO_repair packet according to the embodiment of the present invention may include a packet type, a context ID, r1, CRC-7, r2, CRC-3, a dynamic chain, and/or a payload.

The packet type may indicate the type of the CO_repair packet. The packet type may be represented by a discriminator for discriminating the type of the CO_repair packet.

The context ID may use 8 or more bits. The context ID may identify a channel, through which the packet is transmitted. The context ID may be referred to as a CID (context identifier).

r1 may be set to '0'. Otherwise, the decompressor may discard the packet.

CRC-7 may indicate a CRC code for error check. CRC-7 may be 7-bit CRC on the entire uncompressed header. CRC-7 may be calculated using a crc7 (data_value, data_length) encoding method. Here, the data_value may correspond to the entire uncompressed header chain, and a data_length may indicate the length of the entire uncompressed header chain.

r2 may be set to '0'. Otherwise, the decompressor may discard the packet.

CRC-3 may indicate a CRC code for error check. CRC-3 may be 3-bit CRC.

The dynamic chain may indicate information which is frequently changed but is maintained for a predetermined time. The dynamic chain consists of one item for each header of the chain of protocol headers that is compressed, starting from the outermost IP header. The dynamic chain may be used only in the header of the IR packet and/or the co_repaIR packet.

The payload may include data to be transmitted.

Figure 107:
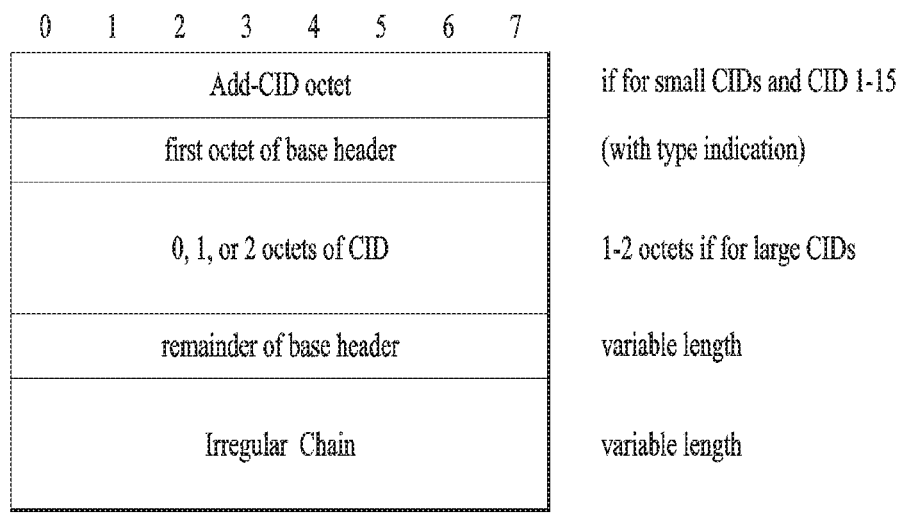
FIG. 107 is a diagram showing a general header-compressed packet according to an embodiment of the present invention.

FIG. 107 is a diagram showing a general header-compressed packet according to an embodiment of the present invention.

The general header-compressed packet may be used to update context. The general header-compressed packet may include irregularities in the packet. As the formats of all general header-compressed packets except for the CO_repair packet, the formats shown in the figure may be used.

The general header-compressed packet may include a first base header, a context ID, a second base header and/or an irregular chain.

The first base header may include information on a first octet of a base header. In addition, the first base header may include type information indicating the type of the packet.

That is, the first base header may include a packet type indicating the type of the general header-compressed packet. Here, the base header may be a compressed representation of the innermost IP header and/or other header(s).

The context ID may use 8 or more bits. The context ID may identify a channel, through which the packet is transmitted. The context ID may be referred to as CID (context identifier).

The second base header may include the base headers except for the first base header among all base headers. The second base header may have a variable size.

The irregular chain may indicate irregular information which is frequently changed. The structure of the irregular chain may be similar to that of the static chain. For each compressed header packet, the irregular chain may be added to a specific location of the general format of the compressed headers. The irregular chain may have a variable size.

The type of the structure of the general header-compressed packet may be differently applied according to the configuration of the compressed header. In the broadcast system according to the embodiment of the present invention, a pt_0_crc3 packet having a smallest size may be used as the general header-compressed packet.

The pt_0_crc3 packet according to the embodiment of the present invention may include a master sequence number (MSN). Accordingly, the pt_0_crc3 packet may update the MSN and/or the fields of the MSN. The fields of the MSN may include an IP-ID and/or a RTP Timestamp. The pt_0_crc3 packet may be protected by 3-bit CRC.

Figure 108:
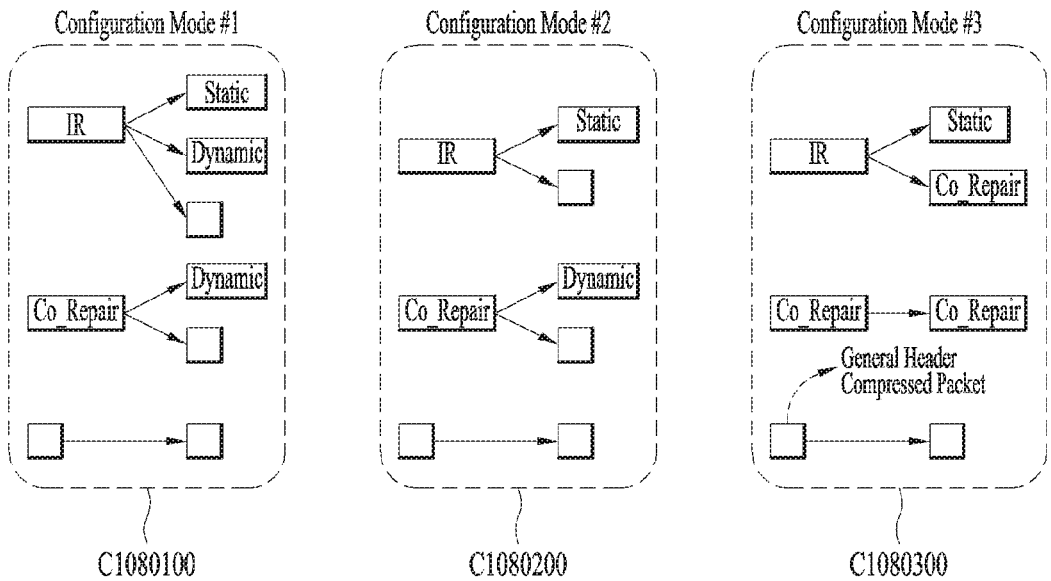
FIG. 108 is a diagram showing a process of reconfiguring an RoHCv2 packet to configure a new packet stream according to an embodiment of the present invention.

FIG. 108 is a diagram showing a process of reconfiguring an RoHCv2 packet to configure a new packet stream according to an embodiment of the present invention.

The RoHC scheme applicable to the broadcast system may include an RoHC module and an adaptation module. The adaptation module may determine a context extraction and transmission method. Conventionally, only RoHCv1 is designed.

The adaptation module according to the embodiment of the present invention may perform the following packet conversion with respect to RoHCv1.

One embodiment of the present invention may include three configuration modes.

According to a first configuration mode (Configuration Mode #1, C1080100) of the embodiment of the present invention, the first configuration mode may extract the static chain and the dynamic chain from the IR packet and convert the remaining part of the packet into a general header-compressed packet. The first configuration mode may extract the dynamic chain from the CO_repair packet and convert the remaining part of the packet into a general header-compressed packet. The first configuration mode may transmit the general header-compressed packet without change.

According to a second configuration mode (Configuration Mode #2, C1080200) of the embodiment of the present invention, the second configuration mode may extract only the static chain from the IR packet and convert the remaining part of the packet into a general header-compressed packet. The second configuration mode may extract the dynamic chain from the CO_repair packet and convert the remaining part of the packet into a general header-compressed packet. The second configuration mode may transmit the general header-compressed packet without change.

According to a third configuration mode (Configuration Mode #3, C1080300) of the embodiment of the present invention, the third configuration mode may extract the static chain from the IR packet and convert the remaining part of the packet into a CO_repair packet. The third configuration mode may transmit CO_repair packet without change and may transmit the general header-compressed packet without change.

A detailed method of reconfiguring an RoHCv2 packet to configure a new packet stream according to an embodiment of the present invention may include a method of reconfiguring the above-described RoHC(v1) packet to configure a new packet stream.

Figure 109:
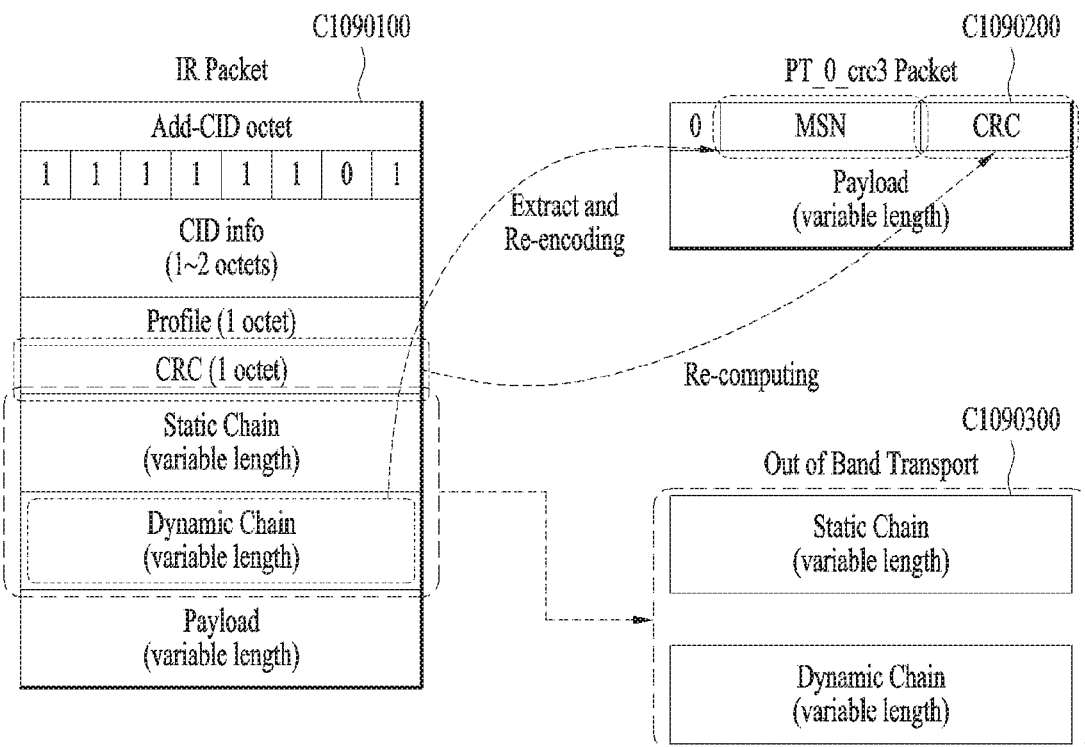
FIG. 109 is a diagram showing a process of converting an IR packet into a general header-compressed packet in a process of reconfiguring an RoHCv2 packet to configure a new packet stream according to an embodiment of the present invention.

FIG. 109 is a diagram showing a process of converting an IR packet into a general header-compressed packet in a process of reconfiguring an RoHCv2 packet to configure a new packet stream according to an embodiment of the present invention.

The IR packet (C1090100) according to the embodiment of the present invention may include a packet type, a context ID, a profile, CRC, a static chain, a dynamic chain and/or a payload. Details of the IR packet (C1090100) according to the embodiment of the present invention may include details of the IR packet.

The general header-compressed packet (C1090200) according to the embodiment of the present invention may include a master sequence number (MSN), CRC and/or a payload. The general header-compressed packet according to the embodiment of the present invention may correspond to a pt_0_crc3 packet. The MSN may be used to identify reference headers upon receiving feedback data. In addition, the MSN may be used to infer the values of the increasing fields (e.g., IPv4, identifier). The MSN may indicate information indicating the order of packets. CRC may indicate a 3-bit CRC code for error check. The payload may include data to be transmitted.

According to the embodiment of the present invention, the IR packet (C1090100) may include context. According to the embodiment of the present invention, the static chain and the dynamic chain may be extracted from the IR packet (C1090100) and the extracted static chain and dynamic chain may be transmitted out-of-band (C1090300). For example, out-of-band (C1090300) may include link layer signaling data. The MSN included in the general header-compressed packet (C1090200) may be extracted and/or re-encoded using information on the dynamic chain included in the IR packet (C1090100). The CRC included in the general header-compressed packet (C1090200) may be re-calculated based on the CRC included in the IR packet (C1090100).

Figure 110:
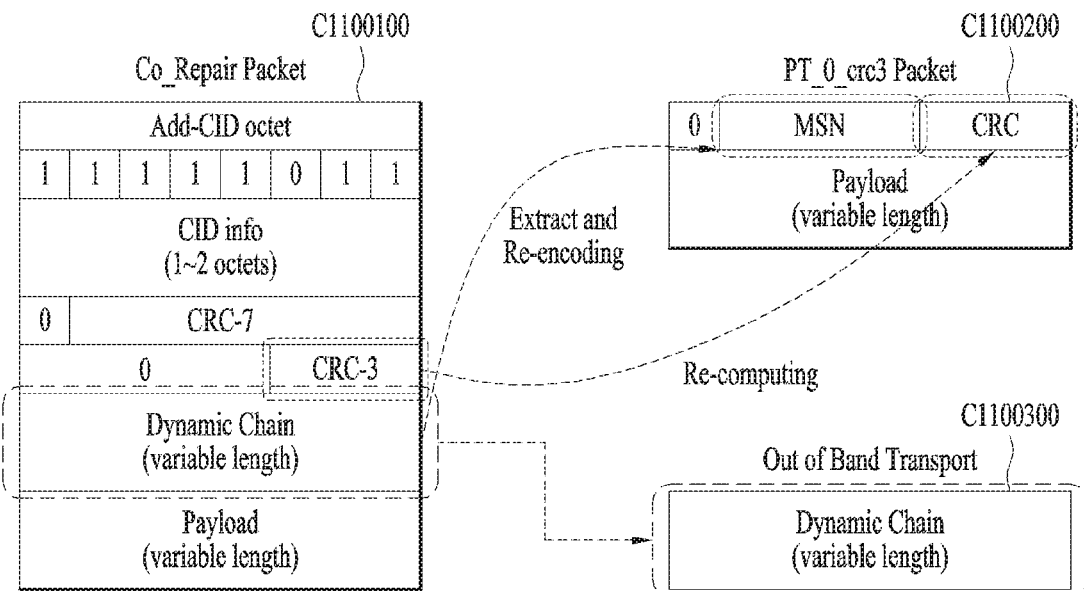
FIG. 110 is a diagram showing a process of converting a Co_Repair packet into a general header-compressed packet in a process of reconfiguring an RoHCv2 packet to configure a new packet stream according to an embodiment of the present invention.

FIG. 110 is a diagram showing a process of converting a Co_Repair packet into a general header-compressed packet in a process of reconfiguring an RoHCv2 packet to configure a new packet stream according to an embodiment of the present invention.

The Co_Repair packet (C1100100) according to the embodiment of the present invention may include a packet type, a context ID, r1, CRC-7, r2, CRC-3, a dynamic chain, and/or a payload. Details of the Co_Repair packet (C1100100) may include details of the above-described Co_Repair packet.

The general header-compressed packet (C1090200) according to the embodiment of the present invention may include a master sequence number (MSN), CRC and/or a payload, all of which have been described above.

According to the embodiment of the present invention, the Co_Repair packet (C1100100) may include context. According to the embodiment of the present invention, the dynamic chain may be extracted from the Co_Repair packet (C1100100) and the extracted dynamic chain may be transmitted through out-of-band (C1100300). For example, outof-band (C1100300) may include link layer signaling data. The MSN included in the general header-compressed packet (C1100200) may be extracted and/or re-encoded using information on the dynamic chain included in the Co_Repair packet (C1100100). The CRC included in the general header-compressed packet (C1100200) may be re-calculated based on the CRC included in the Co_Repair packet (C1100100).

Figure 111:
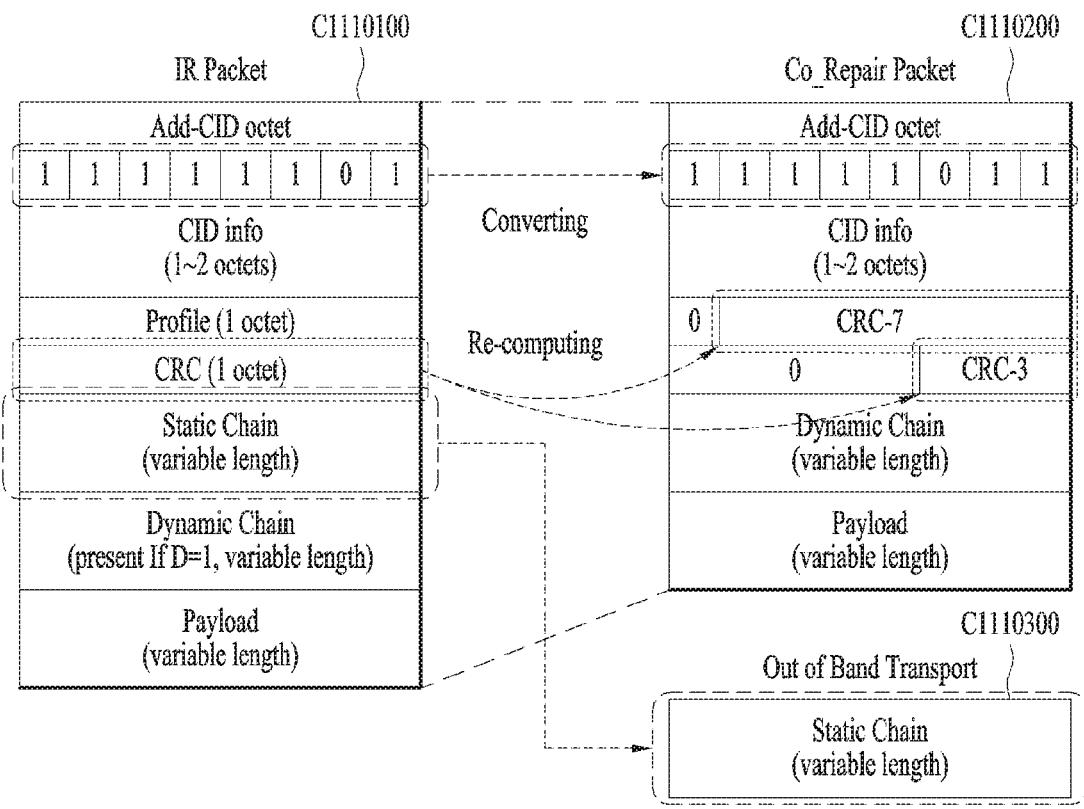
FIG. 111 is a diagram showing a process of converting an IR packet into Co_Repair packet in a process of reconfiguring an RoHCv2 packet to configure a new packet stream according to an embodiment of the present invention.

FIG. 111 is a diagram showing a process of converting an IR packet into Co_Repair packet in a process of reconfiguring an RoHCv2 packet to configure a new packet stream according to an embodiment of the present invention.

The IR packet (C1110100) and Co_Repair packet (C1110200) according to the embodiment of the present invention have been described above.

According to the embodiment of the present invention, the packet type of the IR packet (C1110100) may be changed to a packet type value corresponding to the Co_Repair packet (C1110200). The static chain may be extracted from the IR packet (C1110100) and the extracted static chain may be transmitted out-of-band (C1110300). For example, out-of-band (C1110300) may include link layer signaling data. CRC-7 and/or CRC-3 included in the Co_Repair packet (C1110200) may be re-calculated based on the CRC included in the IR packet (C1110100). The fields except for the packet type, the CRC, and/or the static chain among the fields included in the IR packet (C1110100) may be equally used in the Co_Repair packet (C1110200).

According to the embodiment of the present invention, an encoding and calculation method related to the fields used in a process of reconfiguring an RoHCv2 packet to configure a new packet stream may follow the related standard and the other methods are applicable.

Figure 112:
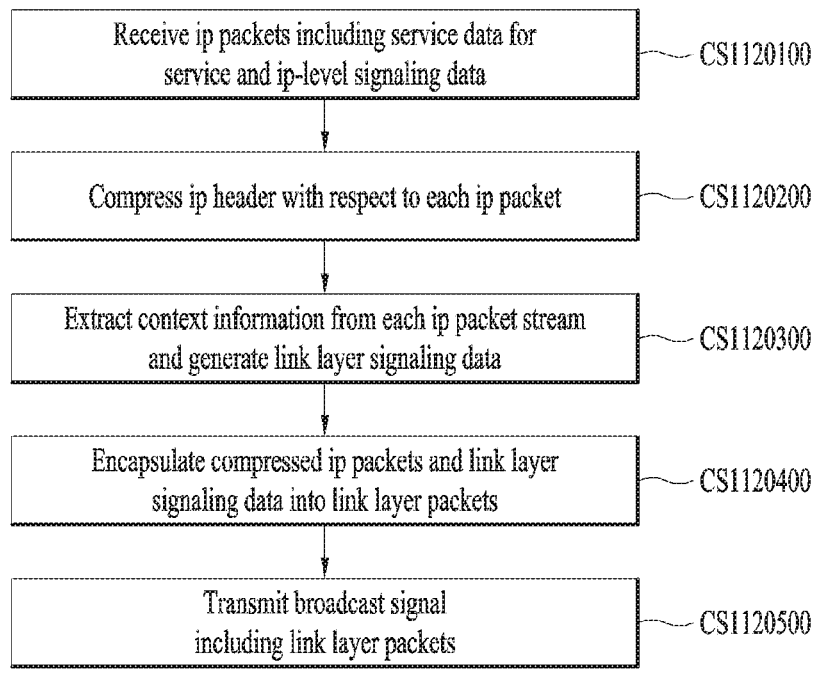
FIG. 112 is a diagram showing a broadcast signal transmission method of a transmitter according to an embodiment of the present invention.

FIG. 112 is a diagram showing a broadcast signal transmission method of a transmitter according to an embodiment of the present invention.

A transmitter may receive IF packets including service data for a service and Internet protocol (IP)-level signaling data using a buffer (CS1120100).

Then, the transmitter may compress an IP header with respect to each IP packet using a header compressor (CS1120200).

Then, the transmitter may extract context information from each IP packet stream and generate link layer signaling data using a signaling processor (CS1120300).

Then, the transmitter may encapsulate the compressed IP packets and the link layer signaling data into link layer packets using an encapsulation processor (CS1120400).

Then, the transmitter may transmit a broadcast signal including the link layer packets using a transmission unit (CS1120500).

The service may include a linear audio/video service, a linear audio service, a non-linear audio/video service, an ESG service, an EAS service, and/or an App-based service.

The signaling data according to the embodiment of the present invention may include IP-level signaling data, link layer signaling data, and/or physical layer signaling data.

The IP-level signaling data may include the above-described service layer signaling data (SLS). For example, the service layer signaling data may include the above-described USBD, S-TSID, and/or MPD.

The IP-level signaling data may include first signaling data supporting bootstrapping of service acquisition. For example, the first signaling data may include the above-described FIT and/or SLT. The first signaling data may be included in the payload of the IP packet having a well-known address and port. The first signaling data may include a table ID for identifying the first signaling data. The first signaling data may be transmitted through a PLP in the format of a PLP/IP/IDP packet.

The link layer packets include a header and a payload. Here, the header includes a base header and an additional header depending on a control field of the base header. Here, the size of the base header may be fixed. For example, the base header may indicate the above-described fixed header. The additional header may indicate the above-described extension header.

The additional header may include signaling type information indicating the type of the link layer signaling data. For example, the signaling type information may indicate the above-described Signaling_Class information.

The additional header may further include signaling type extension information indicating the attributes of the link layer signaling data. For example, the signaling type extension information may indicate the above-described Information_Type information.

The additional header may further include signaling format information indicating the data format of the link layer signaling data. For example, the signaling format information may indicate the above-described Signaling Format information.

In addition, the transmitter may generate at least one physical layer pipe including the link layer packets using a physical layer processor. Then, the transmitter may generate at least one physical layer frame including the at least one physical layer pipe using the physical layer processor. Then, the transmitter may transmit the broadcast signal including the at least one physical layer frame using a transmission unit.

Here, each physical layer frame may include first physical layer signaling data indicating whether each physical layer pipe includes the first signaling data. For example, the first physical layer signaling data may be the above-described L1D_plp_lls_flag data.

In addition, each physical layer frame may include second physical layer signaling data indicating whether low-level signaling data is present in one or more physical layer pipes of the current physical layer frame. For example, the second physical layer signaling data may be the above-described L1B_lls_flag data.

The transmitter according to the embodiment of the present invention may map IP address information and a service based on the first signaling data (e.g., SLT). In addition, the transmitter may map IP address information and PLP ID information based on the link layer signaling data (e.g., LMT). In addition, the transmitter may indicate a PLP, through which the LMT and/or SLT are transmitted, based on the physical layer signaling data (e.g., L1B_lls_flag information).

The IP-level signaling data (e.g., SLT and/or service layer signaling data) according to the embodiment of the present invention may be transmitted through the PLP in the format of a PLP/IP/IDP packet. The IP-level signaling data (e.g., SLT and/or service layer signaling data) according to the embodiment of the present invention may not include a DP ID and/or a PLP ID for identifying a DP and/or PLP.

The link layer signaling data according to the embodiment of the present invention may be transmitted through the PLP in the format of a PLP/IP/IDP packet. The link layer signaling data may further include the above-described LMT. The LMT may be transmitted through the PLP in the format of an ALP packet (e.g., link layer packet). The LMT may further include a PLP loop including information on the PLP, through which data is transmitted. For example, the LMT and/or PLP loop may further include a PLP ID for identifying the PLP, through which data is transmitted.

The physical layer signaling data according to the embodiment of the present invention may include L1 signaling information. The L1 signaling information may include information necessary to configure physical layer parameters. The L1 signaling information may include information for identifying the PLP, through which the LMT and/or SLT are transmitted. For example, the L1 signaling information may include L1B_lls_flag information indicating whether low-level signaling data (e.g., first signaling data, FIT, and/or SLT) and/or link layer signaling data (e.g., LMT) are present in one or more PLPs of the current frame. Accordingly, the LMT and/or SLT may be transmitted through the PLP indicated by the physical layer signaling data (e.g., L1B_lls_flag information).

Figure 113:
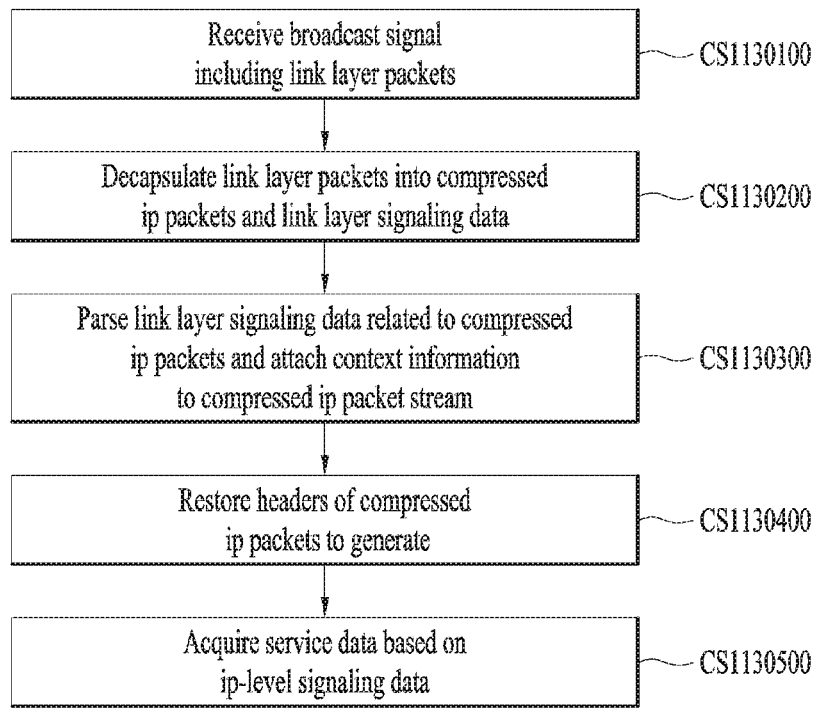
FIG. 113 is a diagram showing a broadcast signal reception method of a receiver according to an embodiment of the present invention.

FIG. 113 is a diagram showing a broadcast signal reception method of a receiver according to an embodiment of the present invention.

The receiver may receive a broadcast signal including link layer packets using a tuner (CS1130100).

Then, the receiver may decapsulate the link layer packets into compressed IP packets and link layer signaling data using a decapsulation processor (CS1130200).

Then, the receiver may parse the link layer signaling data related to the compressed IP packet stream and attach context information to the compressed IP packet stream using a signaling processor (CS1130300).

Then, the receiver may restore the headers of the compressed IP packets to generate IP packets using a header decompressor (CS1130400).

Here, the IP packets may include service data for a service and Internet protocol (IP)-level signaling data.

The receiver may acquire the service data based on the IP-level signaling data using an IP layer processor (CS1130500).

The receiver according to the embodiment of the present invention may select and/or acquire the service data based on physical layer signaling data (e.g., L1B_lls_flag information), link layer signaling data (e.g., LMT), or IP-level signaling data (e.g., SLT and/or service layer signaling data).

The service may include a linear audio/video service, a linear audio service, a non-linear audio/video service, an ESG service, an EAS service, and/or an App-based service.

The signaling data according to the embodiment of the present invention may include IP-level signaling data, link layer signaling data, and/or physical layer signaling data.

The IP-level signaling data may include the above-described service layer signaling data (SLS). For example, the service layer signaling data may include the above-described USBD, S-TSID, and/or MPD.

The IP-level signaling data may include first signaling data supporting bootstrapping of service acquisition. For example, the first signaling data may include the above-described FIT and/or SLT. The first signaling data may be included in the payload of the IP packet having a well-known address and port. The first signaling data may include a table ID for identifying the first signaling data. The first signaling data may be transmitted through a PLP in the format of a PLP/IP/IDP packet.

The link layer packets include a header and a payload. Here, the header includes a base header and an additional header depending on a control field of the base header. Here, the size of the base header may be fixed. For example, the base header may indicate the above-described fixed header. The additional header may indicate the above-described extension header.

The additional header may include signaling type information indicating the type of the link layer signaling data. For example, the signaling type information may indicate the above-described Signaling_Class information.

The additional header may further include signaling type extension information indicating the attributes of the link layer signaling data. For example, the signaling type extension information may indicate the above-described Information_Type information.

The additional header may further include signaling format information indicating the data format of the link layer signaling data. For example, the signaling format information may indicate the above-described Signaling Format information.

In addition, the receiver may receive the broadcast signal including at least one physical layer frame using the tuner.

Here, each physical layer frame may include first physical layer signaling data indicating whether each physical layer pipe includes the first signaling data. For example, the first physical layer signaling data may be the above-described L1D_plp_lls_flag data.

In addition, each physical layer frame may include second physical layer signaling data indicating whether low-level signaling data in one or more physical layer pipes is present in the current physical layer frame. For example, the second physical layer signaling data may be the above-described L1B_lls_flag data.

Then, the receiver may decode the at least one physical layer pipe included in the at least one physical layer frame using the physical layer processor (e.g., a physical layer decoder) of the receiver. At this time, the receiver may use the above-described first physical layer signaling data and/or second physical layer signaling data.

Then, the receiver may acquire the link layer packets from the at least one physical layer pipe using the physical layer processor (e.g., the physical layer decoder).

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both an apparatus invention and a method invention are mentioned and description of both the apparatus invention and the method invention can be applied complementarily.

MODE FOR INVENTION

Various embodiments have been described in the best mode for carrying out the invention.

INDUSTRIAL APPLICABILITY

The present invention is applied to broadcast signal providing fields.

Various equivalent modifications are possible within the spirit and scope of the present invention, as those skilled in the relevant art will recognize and appreciate. Accordingly, the present invention is intended to cover the modifications and variations of this invention provided they come within the scope of the appended claims and their equivalents.

The invention claimed is:

1. A method of transmitting broadcast signals, the method comprising:
compressing Internet Protocol (IP) headers included in first IP packets carrying service components for a service;
generating second IP packets carrying signaling data that includes information for listing services including information for identifying the service,
wherein the second IP packets are carried in a dedicated IP address and a dedicated User Datagram Protocol (UDP) port;
extracting context information from the compressed first IP packets and generating link layer signaling data that includes the context information;
encapsulating each of the second IP packets, the link layer signaling data and the compressed IP packets into each of first link layer packets, second link layer packets and third link layer packets;
generating a signal frame including the first link layer packets, the second link layer packets, and the third link layer packets,
wherein the first link layer packets and the second link layer packets are carried by a first Physical Layer Pipe (PLP) and the third link layer packets are carried by multiple PLPs that are different from the first PLP,
wherein context information is extracted from an IR packet in the compressed first IP packets, so that the context information includes static context information for a second PLP of the multiple PLPs, and
extracted from an IR packet and an IR-dynamic packet in the compressed first IP packets, so that the context information includes static context information and dynamic context information for a third PLP of the multiple PLPs,
wherein the link layer signaling data includes a PLP identifier corresponding to the link layer signaling data and information representing whether context information is extracted from the IR packet or context information is extracted from the IR packet and the IR-dynamic packet in a PLP identified by the PLP identifier; and
transmitting the broadcast signals including the signal frame.

2. The method of claim 1, wherein each of the second link layer packets includes a header having packet type field for representing that the link layer signaling data is encapsulated into the second link layer packets.

3. The method of claim 1, wherein the signaling data carried on the second IP packets includes information for identifying the signaling data carried on the second IP packets.

4. The method of claim 1, wherein each link layer packet includes a base header having a fixed size, and
wherein the base header further includes configuration information of an additional header and a payload following the base header.

5. The method of claim 4, wherein an additional header of a link layer packet carrying the link layer signaling data includes signaling type information indicating a type of the link layer signaling data, signaling type extension information indicating an attribute of the link layer signaling data and signaling format information indicating a data format of the link layer signaling data.

6. The method of claim 1, wherein the signaling data carried on the second IP packets further includes service identification information for identifying the service and service category information for representing a category of the service.

7. The method of claim 6, wherein the signaling data carried on the second IP packets further includes hidden information for representing whether the service is intended for testing or proprietary use, and
when the hidden information represents that the service is intended for testing or proprietary use, the service is not to be selected by a TV receiver.

8. An apparatus for transmitting broadcast signals, the apparatus comprising:
a link layer processor configured to:
compress Internet Protocol (IP) headers included in first IP packets carrying service components for a service;
extract context information from the compressed first IP packets and generate link layer signaling data that includes the context information; and
encapsulate each of second IP packets, the link layer signaling data, and the compressed IP packets into each of first link layer packets, second link layer packets and third link layer packets, wherein the second IP packets carrying signaling data that includes information for listing services including information for identifying the service, and wherein the second IP packets are carried in a dedicated IP address and a dedicated User Datagram Protocol (UDP) port;

a frame builder configured to generate a signal frame including the first link layer packets, the second link layer packets, and the third link layer packets, wherein the first link layer packets and the second link layer packets are carried by a first Physical Layer Pipe (PLP) and the third link layer packets are carried by multiple PLPs that are different from the first PLP, wherein context information is extracted from an IR packet in the compressed first IP packets, so that the context information includes static context information for a second PLP of the multiple PLPs, and extracted from an IR packet and an IR-dynamic packet in the compressed first IP packets, so that the context information includes static context information and dynamic context information for a third PLP of the multiple PLPs, wherein the link layer signaling data including a PLP identifier corresponding to the link layer signaling data and information representing whether context information is extracted from the IR packet or context information is extracted from the IR packet and IR-dynamic packet in a PLP identified by the PLP identifier; and a transmitter configured to transmit the broadcast signals including the signal frame.

9. The apparatus of claim 8, wherein each of the second link layer packets includes a header having packet type field for representing that the link layer signaling data is encapsulated into the second link layer packets.

10. The apparatus of claim 8, wherein the signaling data carried on the second IP packets includes information for identifying the signaling data carried on the second IP packets.

11. The apparatus of claim 8, wherein each link layer packet includes a base header having a fixed size, and wherein the base header further includes configuration information of an additional header and a payload following the base header.

12. The apparatus of claim 11, wherein an additional header of a link layer packet carrying the link layer signaling data includes signaling type information indicating a type of the link layer signaling data, signaling type extension information indicating an attribute of the link layer signaling data and signaling format information indicating a data format of the link layer signaling data.

13. The apparatus of claim 8, wherein the signaling data carried on the second IP packets further includes service identification information for identifying the service and service category information for representing a category of the service.

14. The apparatus of claim 13, wherein the signaling data carried on the second IP packets further includes hidden information for representing whether the service is intended for testing or proprietary use, and when the hidden information represents that the service is intended for testing or proprietary use, the service is not to be selected by a TV receiver.

15. A method of receiving broadcast signals, the method comprising:

receiving the broadcast signals including a signal frame including first link layer packets, second link layer packets, and third link layer packets, wherein the first link layer packets and the second link layer packets are carried by a first Physical Layer Pipe (PLP) and the third link layer packets are carried by multiple PLPs that are different from the first PLP;

decapsulating the first link layer packets and the second link layer packets, the first link layer packets including second IP packets including signaling data that includes information for listing services, wherein the second IP packets are carried in the dedicated IP address and the dedicated UDP port, the information for listing services including information for identifying the service;

obtaining link layer signaling data including context information extracted from compressed IP packets in response to a compression of an IP header included in each of first IP packets, from the second link layer packets, wherein context information is extracted from an IR packet in the compressed first IP packets, so that the context information includes static context information for a second PLP of the multiple PLPs, and extracted from an IR packet and an IR-dynamic packet in the compressed first IP packets, so that the context information includes static context information and dynamic context information for a third PLP of the multiple PLPs, wherein the link layer signaling data including a PLP identifier corresponding to the link layer signaling data and information representing whether context information is extracted from the IR packet or context information is extracted from the IR packet and the IR-dynamic packet in a PLP identified by the PLP identifier;

decapsulating the third link layer packets to obtain compressed IP packets carrying service components;

decompressing the compressed IP packets based on the context information included in the link layer signaling data.

16. An apparatus for receiving broadcast signals, the apparatus comprising:

a receiver configured to receive the broadcast signals including a signal frame including first link layer packets, second link layer packets, and third link layer packets, wherein the first link layer packets and the second link layer packets are carried by a first Physical Layer Pipe (PLP) and the third link layer packets are carried by multiple PLPs that are different from the first PLP;

a first decapsulator configured to decapsulate the first link layer packets and the second link layer packets, the first link layer packets including second IP packets including signaling data that includes information for listing services, wherein the second IP packets are carried in the dedicated IP address and the dedicated UDP port, the information for listing services including information for identifying the service;

a link layer signaling parser configured to obtain link layer signaling data including context information extracted from compressed IP packets in response to a compression of an IP header included in each of first IP packets, from the second link layer packets, wherein context information is extracted from an IR packet in the compressed first IP packets, so that the context information includes static context information for a second PLP of the multiple PLPs, and extracted from an IR packet and an IR-dynamic packet in the compressed first IP packets, so that the context information includes static context information and dynamic context information for a third PLP of the multiple PLPs, wherein the link layer signaling data including a PLP identifier corresponding to the link layer signaling data and information representing whether context information is extracted from the IR packet or context information is extracted from the IR packet and the IR-dynamic packet in a PLP identified by the PLP identifier;

a second decapsulator configured to decapsulate the third link layer packets to obtain compressed IP packets carrying service components; and a decompressor configured to decompress the compressed IP packets based on the context information included in the link layer signaling data.

* * * * *